United States Patent
Allen et al.

(10) Patent No.: US 11,021,564 B2
(45) Date of Patent: *Jun. 1, 2021

(54) HIGH STRENGTH POLYURETHANE FOAM COMPOSITIONS AND METHODS

(71) Applicant: Saudi Aramco Technologies Company, Dhahran (SA)

(72) Inventors: Scott D. Allen, Ithaca, NY (US); Vahid Sendijarevic, Troy, MI (US); Aisa Sendijarevic, Troy, MI (US)

(73) Assignee: Saudi Aramco Technologies Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/541,253

(22) Filed: Aug. 15, 2019

(65) Prior Publication Data

US 2020/0048399 A1   Feb. 13, 2020

Related U.S. Application Data

(63) Continuation of application No. 15/986,927, filed on May 23, 2018, now Pat. No. 10,428,173, which is a continuation of application No. 15/368,110, filed on Dec. 2, 2016, now Pat. No. 10,047,188, which is a continuation of application No. 14/440,903, filed as application No. PCT/US2013/068932 on Nov. 7, 2013, now Pat. No. 9,512,259.

(60) Provisional application No. 61/758,500, filed on Jan. 30, 2013, provisional application No. 61/731,723, filed on Nov. 30, 2012, provisional application No. 61/723,627, filed on Nov. 7, 2012.

(51) Int. Cl.
| | |
|---|---|
| C08G 18/44 | (2006.01) |
| C08G 18/76 | (2006.01) |
| C08G 18/40 | (2006.01) |
| C08G 18/66 | (2006.01) |
| C08G 18/32 | (2006.01) |
| C08G 18/08 | (2006.01) |
| C08G 18/72 | (2006.01) |

(52) U.S. Cl.
CPC ............ *C08G 18/44* (2013.01); *C08G 18/14* (2013.01); *C08G 18/3275* (2013.01); *C08G 18/4009* (2013.01); *C08G 18/4018* (2013.01); *C08G 18/6607* (2013.01); *C08G 18/72* (2013.01); *C08G 18/7621* (2013.01); *C08G 18/7664* (2013.01); *C08G 18/7671* (2013.01); *C08G 2110/005* (2021.01); *C08G 2110/0008* (2021.01); *C08G 2110/0016* (2021.01); *C08G 2110/0058* (2021.01); *C08G 2110/0083* (2021.01)

(58) Field of Classification Search
USPC .............. 521/159, 123, 128, 137, 170, 172
See application file for complete search history.

(56) References Cited

U.S. PATENT DOCUMENTS

| | | |
|---|---|---|
| 1,922,459 A | 8/1933 | Schmidt |
| 3,887,505 A | 6/1975 | Demou et al. |
| 4,005,035 A | 1/1977 | Deaver |
| 4,490,490 A | 12/1984 | Patton, Jr. et al. |
| 4,634,743 A | 1/1987 | Prier |
| 4,826,887 A | 5/1989 | Kuyper et al. |
| 4,851,507 A | 7/1989 | Kesling, Jr. et al. |
| 4,883,826 A | 11/1989 | Marugg et al. |
| 4,939,182 A | 7/1990 | Marugg et al. |
| 5,120,815 A | 6/1992 | Marugg et al. |
| 5,637,739 A | 6/1997 | Jacobsen et al. |
| 5,663,393 A | 9/1997 | Jacobsen et al. |
| 5,665,890 A | 9/1997 | Jacobsen et al. |
| 5,801,210 A | 9/1998 | Radovich et al. |
| 5,929,232 A | 7/1999 | Jacobsen et al. |
| 6,130,340 A | 10/2000 | Jacobsen et al. |
| 6,262,127 B1 | 7/2001 | Acemoglu et al. |
| 6,309,997 B1 | 10/2001 | Fujita et al. |
| 6,359,022 B1 | 3/2002 | Hickey et al. |
| 6,639,087 B2 | 10/2003 | Larrow et al. |
| 6,844,448 B2 | 1/2005 | Jacobsen et al. |
| 6,884,750 B2 | 4/2005 | Kim et al. |
| 6,903,043 B2 | 6/2005 | Kim et al. |
| 7,145,022 B2 | 12/2006 | Luinstra et al. |
| 7,244,805 B2 | 7/2007 | Park et al. |
| 7,388,037 B2 | 6/2008 | Sasaki et al. |
| 7,399,822 B2 | 7/2008 | Coates et al. |

(Continued)

FOREIGN PATENT DOCUMENTS

| | | |
|---|---|---|
| CN | 1483051 A | 3/2004 |
| CN | 1865316 A | 11/2006 |

(Continued)

OTHER PUBLICATIONS

U.S. Appl. No. 16/429,472, filed Jun. 3, 2019, Allen et al.

(Continued)

*Primary Examiner* — Terressa Boykin

(74) *Attorney, Agent, or Firm* — Choate, Hall & Stewart LLP; John P. Rearick; Nicholas J. Pace

(57) ABSTRACT

Disclosed are high strength polyurethane foam compositions and methods of making them. In one aspect, the inventive polyurethane foams include strength enhancing additives comprising one or more polycarbonate polyols derived from the copolymerization of $CO_2$ and one or more epoxides. In one aspect, the inventive methods include the step of substituting a portion of the polyether polyol in the B-side of a foam formulation with one or more polycarbonate polyols derived from the copolymerization of $CO_2$ and one or more epoxides.

49 Claims, 33 Drawing Sheets

(56) References Cited

U.S. PATENT DOCUMENTS

| | | |
|---|---|---|
| 8,163,867 B2 | 4/2012 | Lee et al. |
| 8,178,591 B2 | 5/2012 | Younes et al. |
| 8,207,365 B2 | 6/2012 | Zheng et al. |
| 8,232,267 B2 | 7/2012 | Groves |
| 8,247,520 B2 | 8/2012 | Allen et al. |
| 8,252,955 B2 | 8/2012 | Gao et al. |
| 8,461,290 B2 | 6/2013 | Carpentier et al. |
| 8,470,956 B2 | 6/2013 | Allen et al. |
| 8,507,733 B2 | 8/2013 | Ok et al. |
| 8,598,309 B2 | 12/2013 | Jeong et al. |
| 8,604,155 B2 | 12/2013 | Allen et al. |
| 8,642,721 B2 | 2/2014 | Ok et al. |
| 8,791,274 B2 | 7/2014 | Ok et al. |
| 8,921,508 B2 | 12/2014 | Allen et al. |
| 9,376,531 B2 | 6/2016 | Allen et al. |
| 9,453,100 B2 | 9/2016 | Allen et al. |
| 9,512,259 B2 | 12/2016 | Allen et al. |
| 9,809,678 B2 | 11/2017 | Allen et al. |
| 9,884,937 B2 | 2/2018 | Allen et al. |
| 9,994,760 B2 | 6/2018 | Allen et al. |
| 10,047,188 B2 | 8/2018 | Allen et al. |
| 10,138,369 B2 | 11/2018 | Allen et al. |
| 10,301,426 B2 | 5/2019 | Allen et al. |
| 10,351,654 B2 | 7/2019 | Allen et al. |
| 10,392,556 B2 | 8/2019 | Allen et al. |
| 10,428,173 B2 | 10/2019 | Allen et al. |
| 10,836,859 B2 | 11/2020 | Allen et al. |
| 2004/0092616 A1 | 5/2004 | Occhiello et al. |
| 2006/0089252 A1 | 4/2006 | Coates et al. |
| 2006/0131791 A1 | 6/2006 | Nakamura et al. |
| 2008/0058468 A1 | 3/2008 | Younes |
| 2009/0306237 A1 | 12/2009 | Babb et al. |
| 2009/0306239 A1 | 12/2009 | Mijolovic et al. |
| 2010/0031603 A1 | 2/2010 | Letts et al. |
| 2010/0036008 A1 | 2/2010 | Bruchmann et al. |
| 2010/0048935 A1 | 2/2010 | Mijolovic et al. |
| 2010/0256329 A1 | 10/2010 | Nozaki et al. |
| 2011/0230580 A1 | 9/2011 | Allen et al. |
| 2012/0095122 A1 | 4/2012 | Zhou et al. |
| 2012/0183694 A1 | 7/2012 | Olang |
| 2013/0066044 A1 | 3/2013 | Allen et al. |
| 2013/0244864 A1 | 9/2013 | Allen et al. |
| 2013/0296450 A1 | 11/2013 | Hofmann et al. |
| 2014/0046008 A1 | 2/2014 | Allen et al. |
| 2014/0066535 A1 | 3/2014 | Jacobs et al. |
| 2014/0072806 A1 | 3/2014 | Allen et al. |
| 2014/0187660 A1 | 7/2014 | Allen et al. |
| 2014/0249279 A1 | 9/2014 | Williams et al. |
| 2015/0299372 A1 | 10/2015 | Allen et al. |
| 2015/0299386 A1 | 10/2015 | Allen et al. |
| 2016/0115288 A1 | 4/2016 | Waddington |
| 2016/0264728 A1 | 9/2016 | Allen et al. |
| 2016/0319064 A1 | 11/2016 | Allen et al. |
| 2017/0145147 A1 | 5/2017 | Allen et al. |
| 2017/0198203 A1 | 7/2017 | Allen et al. |
| 2018/0022869 A1 | 1/2018 | Allen et al. |
| 2018/0305605 A1 | 10/2018 | Allen et al. |
| 2018/0334525 A1 | 11/2018 | Allen et al. |
| 2018/0340038 A1 | 11/2018 | Allen et al. |
| 2019/0100648 A1 | 4/2019 | Allen et al. |
| 2019/0233586 A1 | 8/2019 | Allen et al. |
| 2019/0322802 A1 | 10/2019 | Eagan et al. |
| 2020/0062900 A1 | 2/2020 | Farmer |
| 2020/0087436 A1 | 3/2020 | Allen et al. |
| 2020/0095375 A1 | 3/2020 | Allen et al. |
| 2020/0095494 A1 | 3/2020 | Allen et al. |
| 2020/0325296 A1 | 10/2020 | Waddington |

FOREIGN PATENT DOCUMENTS

| | | |
|---|---|---|
| CN | 1880356 A | 12/2006 |
| CN | 101134842 A | 3/2008 |
| CN | 101328254 A | 12/2008 |
| CN | 101600748 A | 12/2009 |
| CN | 101857670 A | 10/2010 |
| CN | 102149746 A | 8/2011 |
| EP | 0228037 A2 | 7/1987 |
| EP | 1726612 A2 | 11/2006 |
| EP | 1894956 A1 | 3/2008 |
| EP | 2465890 A1 | 6/2012 |
| EP | 2146977 B1 | 11/2012 |
| EP | 2 730 598 A1 | 5/2014 |
| EP | 2257559 B1 | 10/2014 |
| JP | S51-089597 A | 8/1976 |
| JP | S62-181331 A | 8/1987 |
| JP | H07-188376 A | 7/1995 |
| JP | 2001-503469 A | 3/2001 |
| JP | 2002-179787 A | 6/2002 |
| JP | 2003-082050 A | 3/2003 |
| JP | 2005-290202 A | 10/2005 |
| JP | 2006-104404 A | 4/2006 |
| JP | 2006-169436 A | 6/2006 |
| JP | 2008-081518 | 4/2008 |
| JP | 2008-274051 A | 11/2008 |
| JP | 2010-509479 A | 3/2010 |
| JP | 2012-502143 A | 1/2012 |
| KR | 10-1992-0701290 | 8/1992 |
| KR | 10-0853358 B1 | 8/2008 |
| KR | 10-2009-0107555 A | 10/2009 |
| KR | 10-2011-0048024 A | 5/2011 |
| WO | WO-90/11309 A1 | 10/1990 |
| WO | WO-98/04538 A1 | 2/1998 |
| WO | WO-98/21261 A1 | 5/1998 |
| WO | WO-03/054047 A1 | 7/2003 |
| WO | WO-2006/063701 A1 | 6/2006 |
| WO | WO-2008/058913 A1 | 5/2008 |
| WO | WO-2008/071622 A1 | 6/2008 |
| WO | WO-2008/136179 A1 | 11/2008 |
| WO | WO-2009/137540 A1 | 11/2009 |
| WO | WO-2010/028362 A1 | 3/2010 |
| WO | WO-2010/062703 A1 | 6/2010 |
| WO | WO-2010/115567 A1 | 10/2010 |
| WO | WO-2012/071505 A1 | 5/2012 |
| WO | WO-2012/080192 A1 | 6/2012 |
| WO | WO-2012/130760 A1 | 10/2012 |
| WO | WO-2012/154849 A1 | 11/2012 |
| WO | WO-2013/016331 A2 | 1/2013 |
| WO | WO-2013/138161 A1 | 9/2013 |
| WO | WO-2013/158621 A1 | 10/2013 |
| WO | WO-2014/074706 A1 | 5/2014 |
| WO | WO-2014/186397 A1 | 11/2014 |

OTHER PUBLICATIONS

U.S. Appl. No. 16/458,354, filed Jul. 1, 2019, Allen et al.
International Search Report for PCT/US2012/047967, 2 pages (dated Jan. 24, 2013).
International Search Report for PCT/US2013/068932, 2 pages (dated Mar. 10, 2014).
International Search Report for PCT/US2014/037903, 3 pages (dated Sep. 4, 2014).
Jialong, W. et al., Polyurethane Foam Plastics and Its Formation, Processing Technology of Plastics, Printing Industry Press, Section 4 first paragraph: 251 (2009).
Liu Yijun, Polyurethane resin and its application, 68-69 (2005). English Translation, pp. 1-3.
Peilin, X. et al., Combined Polyether Polyols, Polyurethane Materials Handbook, Chemical Industry Press, Section 5 first paragraph: 77 (2002).
Polyurethane Resin Handbook, The Nikkan Kogyo Shimbun, Ltd., ISBN: 4-526-02234-9, 36-37 (Sep. 25, 1987).
Written Opinion for PCT/US2012/047967, 16 pages (dated Jan. 24, 2013).
Written Opinion for PCT/US2013/068932, 17 pages (dated Mar. 10, 2014).
Written Opinion for PCT/US2014/037903, 8 pages (dated Sep. 4, 2014).
U.S. Appl. No. 16/683,820, filed Nov. 14, 2019, Waddington.
U.S. Appl. No. 17/095,827, filed Nov. 12, 2020, Allen et al.

(56) References Cited

OTHER PUBLICATIONS

Wang, J. et al. (editors), Polymer Science Experimentation, English translation of Textbook for Colleges and Universities of "Eleventh Five-Year Plan" (2009), 153-154.

*CELLULAR - MOLDED POLYURETHANE - HIGH RESILIENT (HR) TYPE - SEAT APPLICATIONS*

| CHRYSLER MATERIAL STANDARD: MS-DC-649<S> | | | | |
|---|---|---|---|---|
| | TYPE I | TYPE II | TYPE III | TYPE IV |
| CORE DENSITY, kg/m$^3$, MIN | 56 | 48 | 40 | 32 |
| INDENTATION FORCE DEFLECTION (IFD), N | PER ENGINEERING DRAWING WITH TOLERANCE | | | |
| LOAD INDENTATION (BOLSTER HARDNESS), N DUAL FIRMNESS / DUAL DENSITY PARTS ONLY) | PER ENGINEERING DRAWING WITH TOLERANCE | | | |
| HYSTERESIS LOSS, % LOSS, MAX | 23 | 25 | 30 | 35 |
| TEAR RESISTANCE, N/m, MIN | 500 | 450 | 450 | 450 |
| WET COMPRESSION SET, % LOSS, MAX (% OF ORIGINAL THICKNESS) | 12 | 15 | 20 | 25 |
| WET AGE CFD CHANGE (50%), %, MAX (±) | 20 | 20 | 20 | 20 |
| CONSTANT FORCE POUNDING | | | | |
| HEIGHT LOSS, %, MAX | 3 | 4 | 4 | 6 |
| IFD LOSS, (40% DEFLECTION), %, MAX | 15 | 15 | 20 | 25 |
| STAINING, DELTA E CHANGE | DIFFERENCE OF 20 OR LESS | | | |
| FOGGING, MIN | 70, OILY DROPLETS, CRYSTALS, OR OPAQUE FILM MAY BE CAUSE FOR REJECTION (1) | | | |
| BURN RATE, mm/MINUTE, MAX (2) | 100 | | | |

*CHRYSLER MATERIAL STANDARD: MS-DC-649 FOR "CELLULAR, MOLDED POLYURETHANE HIGH RESILIENT (HR) TYPE SEAT APPLICATIONS"*

FIG. 33

HIGH STRENGTH POLYURETHANE FOAM COMPOSITIONS AND METHODS

CROSS REFERENCE TO RELATED APPLICATIONS

The present application is a continuation of U.S. patent application Ser. No. 15/986,927, filed May 23, 2018 (now U.S. Pat. No. 10,428,173), which is a continuation of U.S. patent application Ser. No. 15/368,110, filed Dec. 2, 2016 (now U.S. Pat. No. 10,047,188), which is a continuation of U.S. patent application Ser. No. 14/440,903, filed May 6, 2015 (now U.S. Pat. No. 9,512,259), which is a national phase application under 35 U.S.C. § 371 of PCT International Application No. PCT/US2013/068932, filed Nov. 7, 2013, which claims priority to U.S. Provisional Patent Application Ser. No. 61/758,500, filed Jan. 30, 2013, 61/731,723, filed Nov. 30, 2012, and 61/723,627, filed Nov. 7, 2012, the entire contents each of which are incorporated herein by reference.

FIELD OF THE INVENTION

This invention pertains to the field of polyurethane foams. More particularly, the invention pertains to additives and methods for increasing the strength of polyurethane foams.

BACKGROUND OF THE INVENTION

Polyurethane foams derived from the reaction between polyisocyanates and reactive polymers are widely used in applications ranging from insulation and manufacture of furniture, mattresses, consumer goods, construction materials, automotive components and the like.

The cost of polyurethane foams has increased dramatically in recent years due to increases in the cost of petroleum-based feedstocks and the energy used to make them. At the same time, the market demands are increasing for high performing materials that are tough, have long service lifetimes and improved sustainability profiles. Unfortunately, the current solutions to these problems tend to increase one property at the expense of others.

For example, to make stronger foams, the density of the foam is typically increased leading to a greater use of materials and wasted energy required to transport materials. This is exacerbated in transportation applications where the foam will be part of a vehicle since the heavier foam will take a financial and environmental toll through increased fuel usage throughout its service lifetime. As such, compromises are often made wherein a less durable or lower performing foam is selected based on cost or weight considerations.

Similarly, efforts to make foam compositions more sustainable by addition of bio-based feedstocks have had mixed results. Incorporation of soy or corn-based feedstocks in polyurethane foam formulations often leads to sacrifice of desirable properties and requires other changes to the formulations to achieve acceptable performance—even with these concessions, it has been difficult to inrcorporate more than about 10% of the bio-based material. The true sustainability of this approach is also questionable especially when viewed as a whole, including the land and water use and petroleum resources required to produce biobased feedstocks—particularly if additional effort or petroleum-based additives are required to compensate for negative effects these materials have on the foam formulations.

It has previously been reported that polyurethane foams can be formulated from polyols manufactured from $CO_2$ (see for example, co-owned patent applications WO 2010/028362 and PCT/US12/047967). These foam compositions have improved carbon footprints since up to 50% of the polyol's mass can be derived from waste $CO_2$ that would otherwise be released to the atmosphere. In addition to sequestering a potential greenhouse gas, this strategy allows the amount of fossil-fuel derived feedstock utilized in manufacturing the polyol to be cut by up to 50%.

Nonetheless, there remains a need for polyurethane foam compositions with improved performance characteristics, and in particular for formulations that have superior strength and durability with equal or lesser weight than present materials.

SUMMARY OF THE INVENTION

As noted above, polyurethane foams incorporating epoxide $CO_2$ copolymers (aliphatic polycarbonate polyols) have been described. Nonetheless, in certain aspects these foams presented challenges. Foams formulated with epoxide $CO_2$ copolymers as the primary polyol component in the B-side can be difficult to formulate (for example because of high viscosity). Furthermore, the foams produced are sometimes friable or lacking in certain other physical properties desirable in foams—especially in flexible foams. In one aspect, the present invention emcompasses the recognition that when used as an additive in the B-side of a traditional foam formulation, the inclusion of epoxide $CO_2$ copolymers does not have these negative effects, but instead their presence unexpectedly increases desirable properties such as strength, compression force deflection, solvent resistance and the like.

Therefore, in one aspect, the present invention encompasses high strength polyurethane foam compositions comprising the reaction product of a polyol component and a polyisocyanate component, wherein the polyol component comprises a blend of polyols including from about 2 weight percent to about 50 weight of a polycarbonate polyol derived from the copolymerization of one or more epoxides and carbon dioxide. In certain embodiments, the remainder of the polyol component comprises traditional polyether or polyester polyols as are currently used in commercial foam formulations. The foam compositions of the present invention unexpectedly demonstrate improved physical strength including higher compression force deflection and higher tear resistance than foams formulated without the polycarbonate polyols. Importantly, these improved foam compositions do not have higher density than the initial foam, and other factors pertaining to comfort, durability, inulation value and the like are not sacrificed.

In another aspect, the present invention encompasses methods of strengthening polyurethane foam compositions. In certain embodiments, the methods include a step of substituting from about 2 weight percent to about 50 weight percent of the polyol content of a polyurethane foam formulation with a polycarbonate polyol derived from the copolymerization of one or more epoxides and carbon dioxide.

In another aspect, the present invention provides strength enhancing additives for foam formulations. The inventive additives comprise aliphatic polycarbonate polyols suitable for blending with polyether or polyester polyols and characterized in that their presence in a foam formulation increases one or more of the compression force deflection value, the tear resistance or the hysteresis of the final foam composition.

In another aspect, the present invention encompasses articles made from high strength polyurethane foam compositions resulting from adding polycarbonate polyols derived from the copolymerization of one or more epoxides and carbon dioxide to the foam formulation. Such articles include low density seating materials for transportation applications, non seating foam components for automobile manufacture, footwear foams, office furniture, mattresses, sporting goods, construction materials and consumer goods.

Definitions

Definitions of specific functional groups and chemical terms are described in more detail below. For purposes of this invention, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

Certain compounds of the present invention can comprise one or more asymmetric centers, and thus can exist in various stereoisomeric forms, e.g., enantiomers and/or diastereomers. Thus, inventive compounds and compositions thereof may be in the form of an individual enantiomer, diastereomer or geometric isomer, or may be in the form of a mixture of stereoisomers. In certain embodiments, the compounds of the invention are enantiopure compounds. In certain embodiments, mixtures of enantiomers or diastereomers are provided.

Furthermore, certain compounds, as described herein may have one or more double bonds that can exist as either the Z or E isomer, unless otherwise indicated. The invention additionally encompasses the compounds as individual isomers substantially free of other isomers and alternatively, as mixtures of various isomers, e.g., racemic mixtures of enantiomers. In addition to the above-mentioned compounds per se, this invention also encompasses compositions comprising one or more compounds.

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a stereoisomer may, in some embodiments, be provided substantially free of one or more corresponding stereoisomers, and may also be referred to as "stereochemically enriched."

Where a particular enantiomer is preferred, it may, in some embodiments be provided substantially free of the opposite enantiomer, and may also be referred to as "optically enriched." "Optically enriched," as used herein, means that the compound or polymer is made up of a significantly greater proportion of one enantiomer. In certain embodiments the compound is made up of at least about 90% by weight of a preferred enantiomer. In other embodiments the compound is made up of at least about 95%, 98%, or 99% by weight of a preferred enantiomer. Preferred enantiomers may be isolated from racemic mixtures by any method known to those skilled in the art, including chiral high pressure liquid chromatography (HPLC) and the formation and crystallization of chiral salts or prepared by asymmetric syntheses. See, for example, Jacques, et al., *Enantiomers, Racemates and Resolutions* (Wiley Interscience, New York, 1981); Wilen, S. H., et al., *Tetrahedron* 33:2725 (1977); Eliel, E. L. *Stereochemistry of Carbon Compounds* (McGraw-Hill, NY, 1962); Wilen, S. H. *Tables of Resolving Agents and Optical Resolutions* p. 268 (E. L. Eliel, Ed., Univ. of Notre Dame Press, Notre Dame, Ind. 1972).

The term "epoxide", as used herein, refers to a substituted or unsubstituted oxirane. Such substituted oxiranes include monosubstituted oxiranes, disubstituted oxiranes, trisubstituted oxiranes, and tetrasubstituted oxiranes. Such epoxides may be further optionally substituted as defined herein. In certain embodiments, epoxides comprise a single oxirane moiety. In certain embodiments, epoxides comprise two or more oxirane moieties.

The term "polymer", as used herein, refers to a molecule of high relative molecular mass, the structure of which comprises the multiple repetition of units derived, actually or conceptually, from molecules of low relative molecular mass. In certain embodiments, a polymer is comprised of substantially alternating units derived from $CO_2$ and an epoxide (e.g., poly(ethylene carbonate). In certain embodiments, a polymer of the present invention is a copolymer, terpolymer, heteropolymer, block copolymer, or tapered heteropolymer incorporating two or more different epoxide monomers. With respect to the structural depiction of such higher polymers, the convention of showing enchainment of different monomer units separated by a slash may be used herein

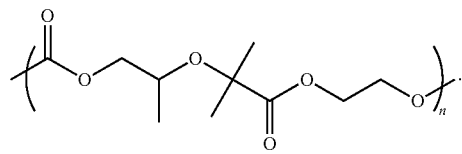

These structures are to be interpreted to encompass copolymers incorporating any ratio of the different monomer units depicted unless otherwise specified. This depiction is also meant to represent random, tapered, block co-polymers, and combinations of any two or more of these and all of these are implied unless otherwise specified.

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-40 carbon atoms. In certain embodiments, aliphatic groups contain 1-20 carbon atoms. In certain embodiments, aliphatic groups contain 3-20 carbon atoms. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in some embodiments aliphatic groups contain 1-3 carbon atoms, and in some embodiments aliphatic groups contain 1 or 2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "heteroaliphatic," as used herein, refers to aliphatic groups wherein one or more carbon atoms are independently replaced by one or more atoms selected from the group consisting of oxygen, sulfur, nitrogen, or phosphorus. In certain embodiments, one to six carbon atoms are independently replaced by one or more of oxygen, sulfur, nitrogen, or phosphorus. Heteroaliphatic groups may be substituted or unsubstituted, branched or unbranched, cyclic or acyclic, and include saturated, unsaturated or partially unsaturated groups.

As used herein, the term "bivalent $C_{1-8}$ (or $C_{1-3}$) saturated or unsaturated, straight or branched, hydrocarbon chain", refers to bivalent alkyl, alkenyl, and alkynyl, chains that are straight or branched as defined herein.

The term "unsaturated", as used herein, means that a moiety has one or more double or triple bonds.

The terms "cycloaliphatic", "carbocycle", or "carbocyclic", used alone or as part of a larger moiety, refer to a saturated or partially unsaturated cyclic aliphatic monocyclic or polycyclic ring systems, as described herein, having from 3 to 12 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic", "carbocycle" or "carbocyclic" also include aliphatic rings that are fused to one or more aromatic or nonaromatic rings, such as decahydronaphthyl or tetrahydronaphthyl, where the radical or point of attachment is on the aliphatic ring. In certain embodiments, the term "3- to 7-membered carbocycle" refers to a 3- to 7-membered saturated or partially unsaturated monocyclic carbocyclic ring. In certain embodiments, the term "3- to 8-membered carbocycle" refers to a 3- to 8-membered saturated or partially unsaturated monocyclic carbocyclic ring. In certain embodiments, the terms "3- to 14-membered carbocycle" and "$C_{3-14}$ carbocycle" refer to a 3- to 8-membered saturated or partially unsaturated monocyclic carbocyclic ring, or a 7- to 14-membered saturated or partially unsaturated polycyclic carbocyclic ring.

The term "alkyl," as used herein, refers to saturated, straight- or branched-chain hydrocarbon radicals derived from an aliphatic moiety containing between one and six carbon atoms by removal of a single hydrogen atom. Unless otherwise specified, alkyl groups contain 1-12 carbon atoms. In certain embodiments, alkyl groups contain 1-8 carbon atoms. In certain embodiments, alkyl groups contain 1-6 carbon atoms. In some embodiments, alkyl groups contain 1-5 carbon atoms, in some embodiments, alkyl groups contain 1-4 carbon atoms, in some embodiments alkyl groups contain 1-3carbon atoms, and in some embodiments alkyl groups contain 1-2 carbon atoms. Examples of alkyl radicals include, but are not limited to, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived from a straight- or branched-chain aliphatic moiety having at least one carbon-carbon double bond by the removal of a single hydrogen atom. Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms, in some embodiments, alkenyl groups contain 2-4 carbon atoms, in some embodiments alkenyl groups contain 2-3carbon atoms, and in some embodiments alkenyl groups contain 2 carbon atoms. Alkenyl groups include, for example, ethenyl, propenyl, butenyl, 1-methyl-2-buten-1-yl, and the like.

The term "alkynyl," as used herein, refers to a monovalent group derived from a straight- or branched-chain aliphatic moiety having at least one carbon-carbon triple bond by the removal of a single hydrogen atom. Unless otherwise specified, alkynyl groups contain 2-12 carbon atoms. In certain embodiments, alkynyl groups contain 2-8 carbon atoms. In certain embodiments, alkynyl groups contain 2-6 carbon atoms. In some embodiments, alkynyl groups contain 2-5 carbon atoms, in some embodiments, alkynyl groups contain 2-4 carbon atoms, in some embodiments alkynyl groups contain 2-3carbon atoms, and in some embodiments alkynyl groups contain 2 carbon atoms. Representative alkynyl groups include, but are not limited to, ethynyl, 2-propynyl (propargyl), 1-propynyl, and the like.

The term "alkoxy", as used herein refers to an alkyl group, as previously defined, attached to the parent molecule through an oxygen atom. Examples of alkoxy, include but are not limited to, methoxy, ethoxy, propoxy, isopropoxy, n-butoxy, tert-butoxy, neopentoxy, and n-hexoxy.

The term "acyl", as used herein, refers to a carbonyl-containing functionality, e.g., —C(=O)R', wherein R' is hydrogen or an optionally substituted aliphatic, heteroaliphatic, heterocyclic, aryl, heteroaryl group, or is a substituted (e.g., with hydrogen or aliphatic, heteroaliphatic, aryl, or heteroaryl moieties) oxygen or nitrogen containing functionality (e.g., forming a carboxylic acid, ester, or amide functionality). The term "acyloxy", as used here, refers to an acyl group attached to the parent molecule through an oxygen atom.

The term "aryl" used alone or as part of a larger moiety as in "aralkyl", "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring". In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenanthridinyl, or tetrahydronaphthyl, and the like. In certain embodiments, the terms "6- to 10-membered aryl" and "$C_{6-10}$ aryl" refer to a phenyl or an 8- to 10-membered polycyclic aryl ring.

The terms "heteroaryl" and "heteroar-", used alone or as part of a larger moiety, e.g., "heteroaralkyl", or "heteroaralkoxy", refer to groups having 5 to 14 ring atoms, preferably 5, 6, 9 or 10 ring atoms; having 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, i soxazolyl, oxadi az olyl, thi az olyl, i sothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be mono- or bicyclic. The term "heteroaryl" may be used interchangeably with the terms "heteroaryl ring", "heteroaryl group", or "heteroaromatic", any of which terms include rings that are optionally substituted. The term "heteroaralkyl" refers to an alkyl group substituted by a heteroaryl, wherein the alkyl and heteroaryl portions independently are optionally substituted. In certain embodiments, the term "5- to 10-membered heteroaryl" refers to a 5- to 6-membered heteroaryl ring having 1 to 3heteroatoms independently selected from nitrogen, oxygen, or sulfur, or an 8- to 10-membered bicyclic heteroaryl ring having 1 to 4 heteroatoms independently selected from nitrogen, oxygen, or sulfur. In certain embodiments, the term "5- to 12-membered heteroaryl" refers to a 5- to 6-membered heteroaryl ring having 1 to 3heteroatoms independently selected from nitrogen, oxygen, or sulfur, or an 8- to 12-membered bicyclic heteroaryl ring having 1 to 4 heteroatoms independently selected from nitrogen, oxygen, or sulfur.

As used herein, the terms "heterocycle", "heterocyclyl", "heterocyclic radical", and "heterocyclic ring" are used interchangeably and refer to a stable 5- to 7-membered monocyclic or 7-14-membered polycyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3heteroatoms selected from oxygen, sulfur or nitrogen, the nitrogen may be N (as in 3,4-dihydro-2H-pyrrolyl), NH (as in pyrrolidinyl), or $^+$NR (as in N-substituted pyrrolidinyl). In some embodiments, the term "3- to 7-membered heterocyclic" refers to a 3- to 7-membered saturated or partially unsaturated monocyclic heterocyclic ring having 1 to 2 heteroatoms independently selected from nitrogen, oxygen, or sulfur. In some embodiments, the term "3- to 12-membered heterocyclic" refers to a 3- to 8-membered saturated or partially unsaturated monocyclic heterocyclic ring having 1 to 2 heteroatoms independently selected from nitrogen, oxygen, or sulfur, or a 7- to 12-membered saturated or partially unsaturated polycyclic heterocyclic ring having 1-3heteroatoms independently selected from nitrogen, oxygen, or sulfur.

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle", "heterocyclyl", "heterocyclyl ring", "heterocyclic group", "heterocyclic moiety", and "heterocyclic radical", are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

As described herein, compounds of the invention may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; —(CH$_2$)$_{0-4}$R°; —(CH$_2$)$_{0-4}$OR°; —O—(CH$_2$)$_{0-4}$C(O)OR°; —(CH$_2$)$_{0-4}$CH(OR°)$_2$; —(CH$_2$)$_{1-4}$SR°; —(CH$_2$)$_{0-4}$Ph, which may be substituted with R°; —(CH$_2$)$_{0-4}$O(CH$_2$)$_{0-1}$Ph which may be substituted with R°; —CH=CHPh, which may be substituted with R°; —NO$_2$; —CN; —N$_3$; —(CH$_2$)$_{0-4}$N(R°)$_2$; —(CH$_2$)$_{0-4}$N(R°)C(O)R°; —N(R°)C(S)R°; —(CH$_2$)$_{0-4}$N(R°)C(O)NR°$_2$; —N(R°)C(S) NR°$_2$; —(CH$_2$)$_{0-4}$N(R°)C(O)OR°; —N(R°)N(R°)C(O)R°; —N(R°)N(R°)C(O)NR°$_2$; —N(R°)N(R°)C(O)OR°; —(CH$_2$)$_{0-4}$C(O)R°; —C(S)R°; —(CH$_2$)$_{0-4}$C(O)OR°; —(CH$_2$)$_{0-4}$C(O)N(R°)$_2$; —(CH$_2$)$_{0-4}$C(O)SR°; —(CH$_2$)$_{0-4}$C(O)OSiR°$_3$; —(CH$_2$)$_{0-4}$OC(O)R°; —OC(O)(CH$_2$)$_{0-4}$SR—, SC(S)SR°; —(CH$_2$)$_{0-4}$SC(O)R°; —(CH$_2$)$_{0-4}$C(O)NR°$_2$; —C(S)NR°$_2$; —C(S)SR°; —SC(S)SR°, —(CH$_2$)$_{0-4}$OC(O) NR°$_2$; —C(O)N(OR°)R°; —C(O)C(O)R°; —C(O)CH$_2$C(O) R°; —C(NOR°)R°; —(CH$_2$)$_{0-4}$SSR°; —(CH$_2$)$_{0-4}$S(O)$_2$R°; —(CH$_2$)$_{0-4}$S(O)$_2$OR°; —(CH$_2$)$_{0-4}$OS(O)$_2$R°; —S(O)$_2$NR°$_2$; —(CH$_2$)$_{0-4}$S(O)R°; —N(R°)S(O)$_2$NR°$_2$; —N(R°)S(O)$_2$R°; —N(OR°)R°; —C(NH)NR°$_2$; —P(O)$_2$R°; —P(O)R°$_2$; —OP(O)R°$_2$; —OP(O)(OR°)$_2$; SiR°$_3$; —(C$_{1-4}$ straight or branched) alkylene)O—N(R°)$_2$; or —(C$_{1-4}$ straight or branched)alkylene)C(O)O—N(R°)$_2$, wherein each R° may be substituted as defined below and is independently hydrogen, C$_{1-8}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur, or, notwithstanding the definition above, two independent occurrences of R°, taken together with their intervening atom(s), form a 3-12-membered saturated, partially unsaturated, or aryl mono- or polycyclic ring having 0-4 heteroatoms independently selected from nitrogen, oxygen, or sulfur, which may be substituted as defined below.

Suitable monovalent substituents on $R^o$ (or the ring formed by taking two independent occurrences of $R^o$ together with their intervening atoms), are independently halogen, —$(CH_2)_{0-2}R^\bullet$, —$(haloR^\bullet)$, —$(CH_2)_{0-2}OH$, —$(CH_2)_{0-2}OR^\bullet$, —$(CH_2)_{0-2}CH(OR^\bullet)_2$; —$O(haloR^\bullet)$, —$CN$, —$N_3$, —$(CH_2)_{0-2}C(O)R^\bullet$, —$(CH_2)_{0-2}C(O)OH$, —$(CH_2)_{0-2}C(O)OR^\bullet$, —$(CH_2)_{0-4}C(O)N(R^o)_2$; —$(CH_2)_{0-2}SR^\bullet$, —$(CH_2)_{0-2}SH$, —$(CH_2)_{0-2}NH_2$, —$(CH_2)_{0-2}NHR^\bullet$, —$(CH_2)_{0-2}NR^\bullet_2$, —$NO_2$, —$SiR^\bullet_3$, —$OSiR^\bullet_3$, —$C(O)SR^\bullet$, —$(C_{1-4}$ straight or branched alkylene)$C(O)OR^\bullet$, or —$SSR^\bullet$ wherein each $R^\bullet$ is unsubstituted or where preceded by "halo" is substituted only with one or more halogens, and is independently selected from $C_{1-4}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur. Suitable divalent substituents on a saturated carbon atom of $R^o$ include =O and =S.

Suitable divalent substituents on a saturated carbon atom of an "optionally substituted" group include the following: =O, =S, =NNR$^*_2$, =NNHC(O)R$^*$, =NNHC(O)OR$^*$, =NNHS(O)$_2$R$^*$, =NR$^*$, =NOR$^*$, —O(C(R$^*_2$))$_{2-3}$O—, or —S(C(R$^*_2$))$_{2-3}$S—, wherein each independent occurrence of R$^*$ is selected from hydrogen, $C_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR$^*_2$)$_{2-3}$O—, wherein each independent occurrence of R$^*$ is selected from hydrogen, $C_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R$^*$ include halogen, —R$^\bullet$, —(haloR$^\bullet$), —OH, —OR$^\bullet$, —O(haloR$^\bullet$), —CN, —C(O)OH, —C(O)OR$^\bullet$, —NH$_2$, —NHR$^\bullet$, —NR$^\bullet_2$, or —NO$_2$, wherein each R$^\bullet$ is unsubstituted or where preceded by "halo" is substituted only with one or more halogens, and is independently $C_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R$^\dagger$, —NR$^\dagger_2$, —C(O)R$^\dagger$, —C(O)OR$^\dagger$, —C(O)C(O)R$^\dagger$, —C(O)CH$_2$C(O)R$^\dagger$, —S(O)$_2$R$^\dagger$, —S(O)$_2$NR$^\dagger_2$, —C(S)NR$^\dagger_2$, —C(NH)NR$^\dagger_2$, or —N(R$^\dagger$)S(O)$_2$R$^\dagger$; wherein each R$^\dagger$ is independently hydrogen, $C_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R$^\dagger$, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of R$^\dagger$ are independently halogen, —R$^\bullet$, —(haloR$^\bullet$), —OH, —OR$^\bullet$, —O(haloR$^\bullet$), —CN, —C(O)OH, —C(O)OR$^\bullet$, —NH$_2$, —NHR$^\bullet$, —NR$^\bullet_2$, or —NO$_2$, wherein each R$^\bullet$ is unsubstituted or where preceded by "halo" is substituted only with one or more halogens, and is independently $C_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

When substituents are described herein, the term "radical" or "optionally substituted radical" is sometimes used. In this context, "radical" means a moiety or functional group having an available position for attachment to the structure on which the substituent is bound. In general the point of attachment would bear a hydrogen atom if the substituent were an independent neutral molecule rather than a substituent. The terms "radical" or "optionally-substituted radical" in this context are thus interchangeable with "group" or "optionally-substituted group".

As used herein, the "term head-to-tail" or "HT", refers to the regiochemistry of adjacent repeating units in a polymer chain. For example, in the context of poly(propylene carbonate) (PPC), the term head-to-tail based on the three regiochemical possibilities depicted below:

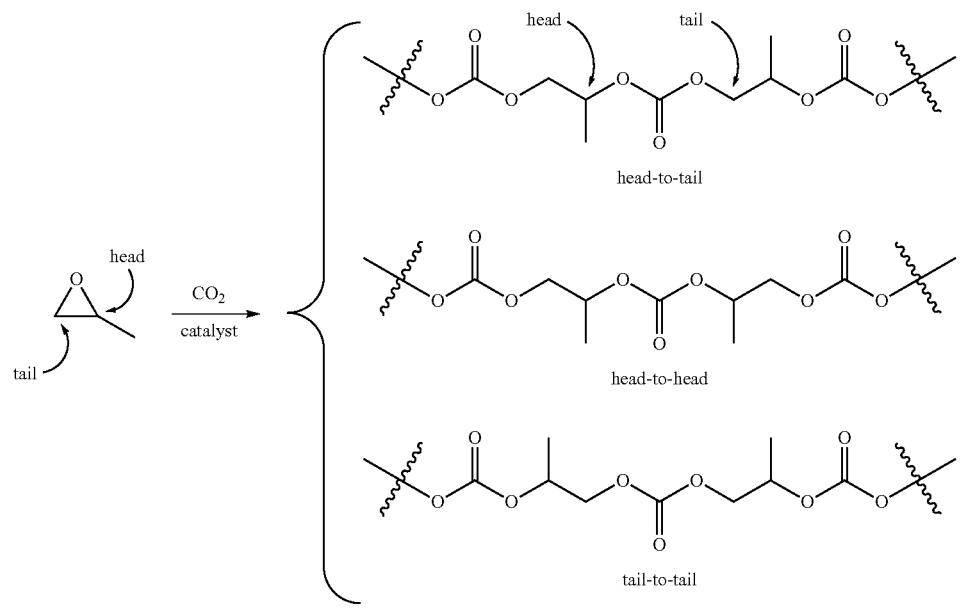

The term "head-to-tail ratio" or (H:T) refers to the proportion of head-to-tail linkages to the sum of all other regiochemical possibilities. With respect to the depiction of polymer structures, while a specific regiochemical orientation of monomer units may be shown in the representations of polymer structures herein, this is not intended to limit the polymer structures to the regiochemical arrangement shown but is to be interpreted to encompass all regiochemical arrangements including that depicted, the opposite regiochemistry, random mixtures, isotactic materials, syndiotactic materials, racemic materials, and/or enantioenriched materials and combinations of any of these unless otherwise specified.

As used herein the term "alkoxylated" means that one or more functional groups on a molecule (usually the functional group is an alcohol, amine, or carboxylic acid, but is not strictly limited to these) has appended to it a hydroxy-terminated alkyl chain. Alkoxylated compounds may comprise a single alkyl group or they may be oligomeric moieties such as hydroxyl-terminated polyethers. Alkoxylated materials can be derived from the parent compounds by treatment of the functional groups with epoxides.

Normalized CFD values for reference VE foams and VE foams based on Novomer PPC-2.3-PEOL (74-277) polyol: REF-3Reference foam (#1 in Tables 2B-5B); PPC-2.3-PEOL-10%—Foam prepared with 10% Novomer polyol 74-277 (#3in Table 4B); PPC-2.3-PEOL-20%—Foam prepared with 20% Novomer polyol 74-277 (#4 in Table 4B).

Figure 17:
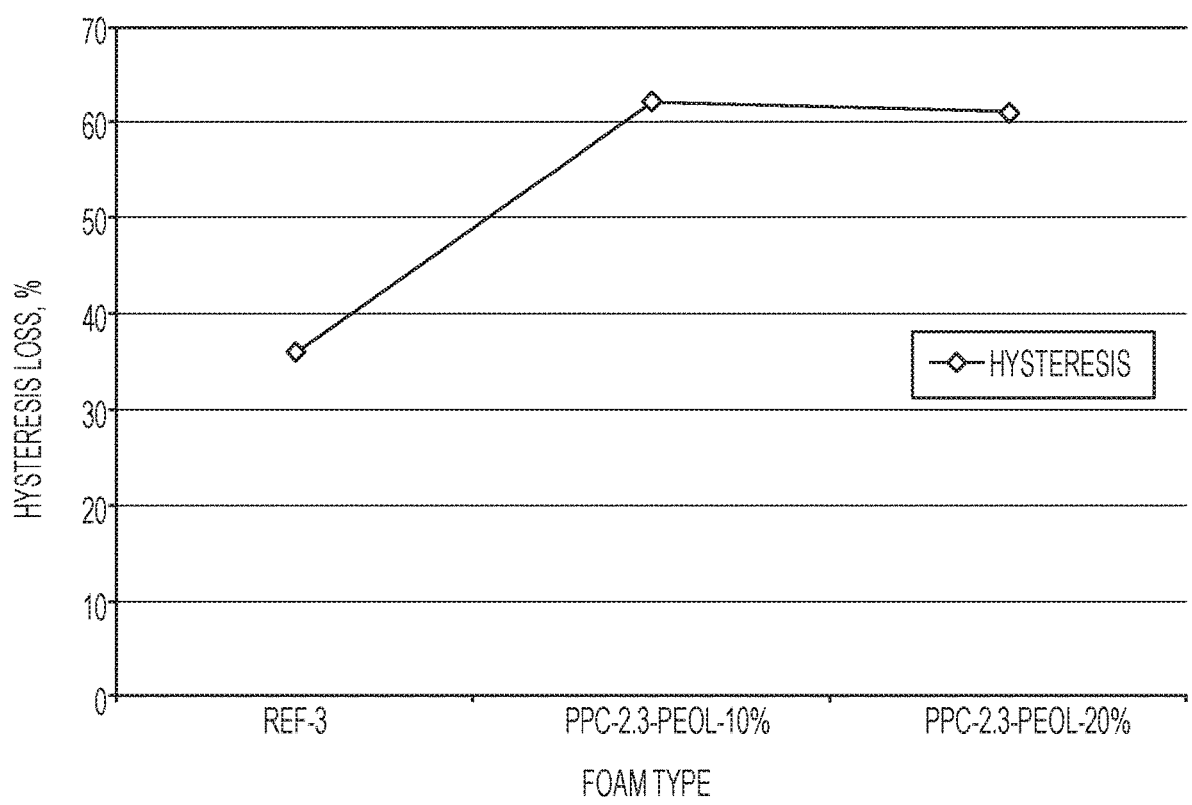

FIG. 17 Shows a graph comparing hysteresis of certain VE foams of the present invention with reference foams. Effect of Novomer PPC-2.3-PEOL polyol on Hysteresis of viscoelastic foams: REF-3—Reference foam (#1 in Tables 2B-5B); PPC-2.3-PEOL-10%—Foam prepared with 10% Novomer polyol 74-277 (#3in Table 4B); PPC-2.3-PEOL-20%—Foam prepared with 20% Novomer polyol 74-277 (#4 in Table 4B).

Figure 18A:
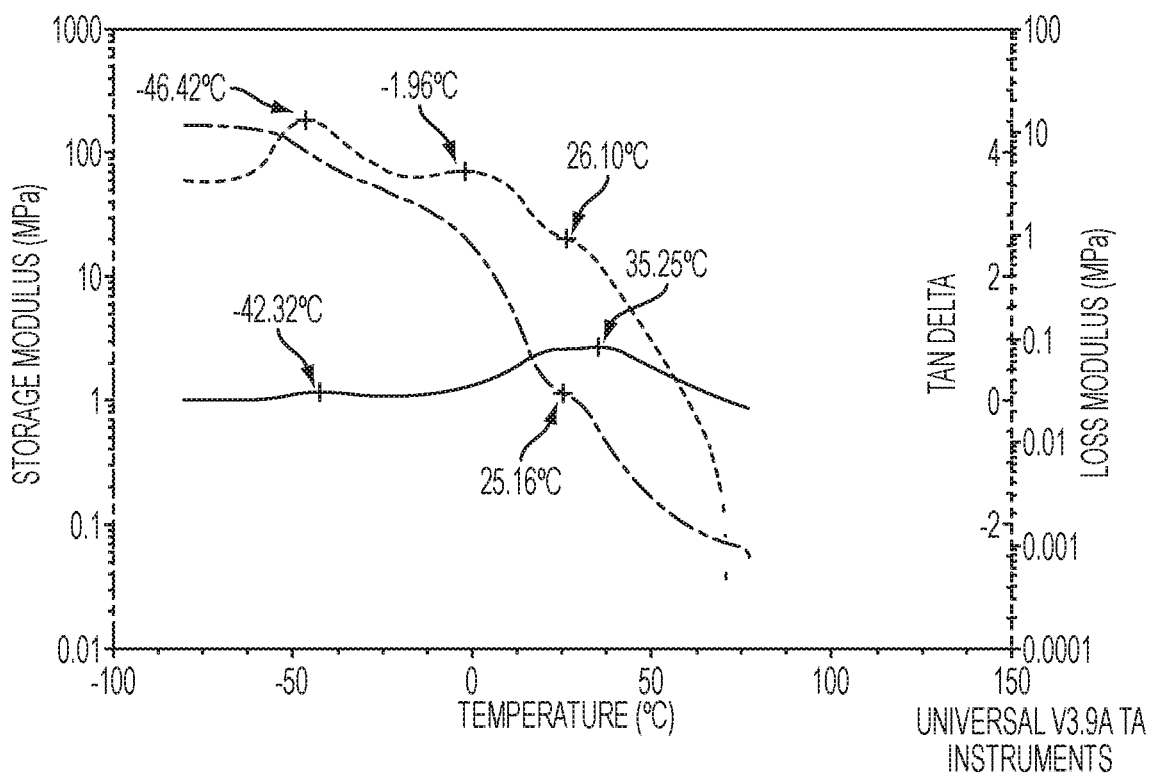

FIG. 18A Shows DMA graphs for a reference VE foam and a VE foam prepared according to the present invention. DMA graph of reference foam
(Formulation #1 in Tables 2B-5B).

Figure 18B:
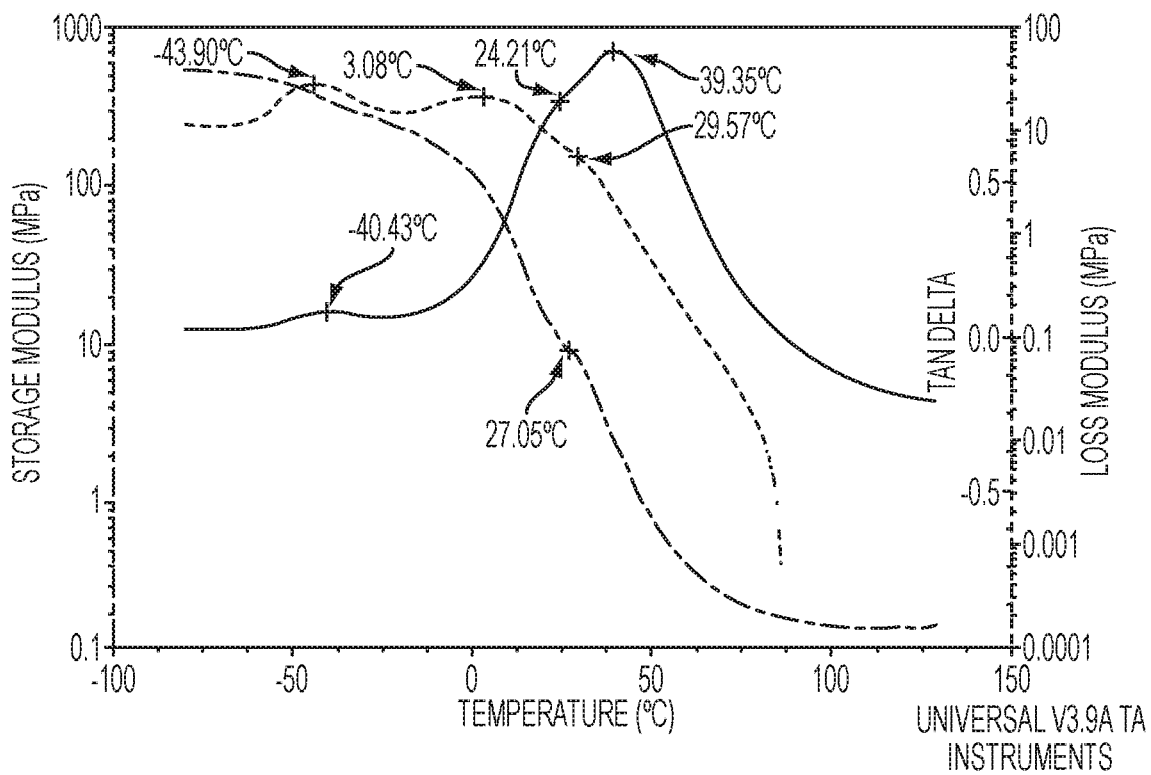

FIG. 18B Shows DMA graphs for a reference VE foam and a VE foam prepared according to the present invention. DMA graph of foam prepared with Novomer polyol 74-217 (Formulatino #4 in Table 3B).

Figure 19A:
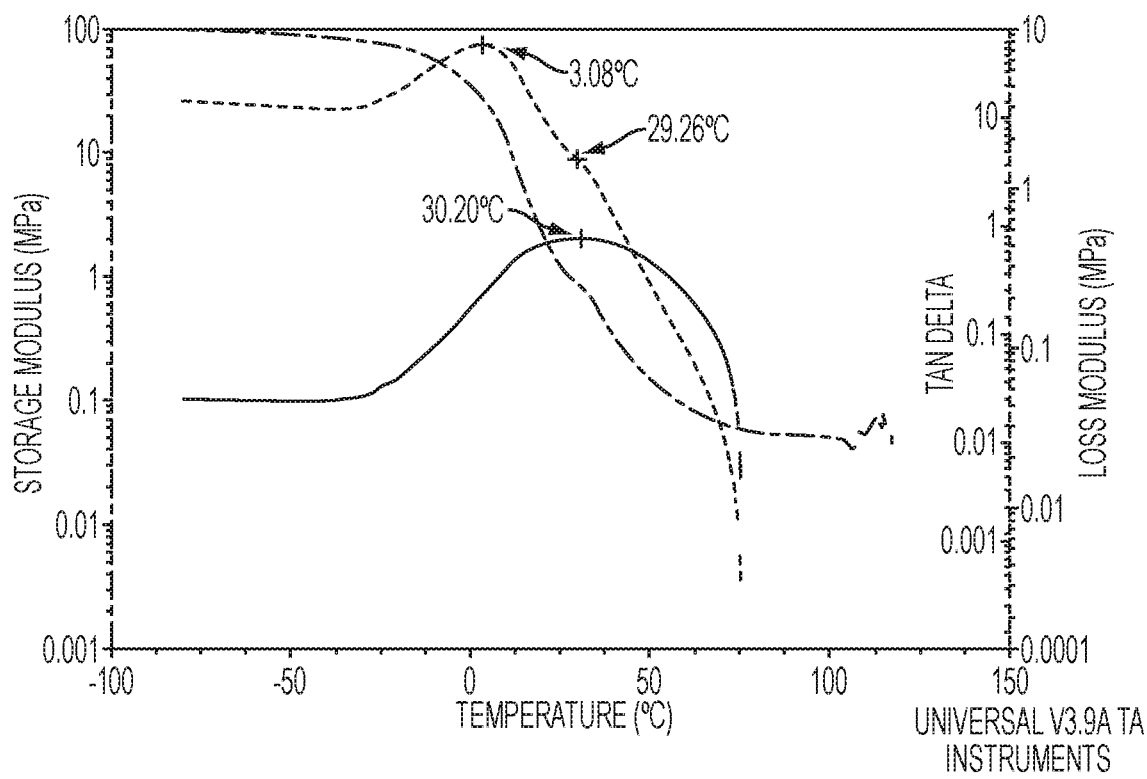

FIG. 19A Shows DMA graphs for two VE foam samples prepared according to the present invention. DMA graph of foam prepared with Novomer 58-103-C polyol (Formulation #3in Table 2B-1).

Figure 19B:
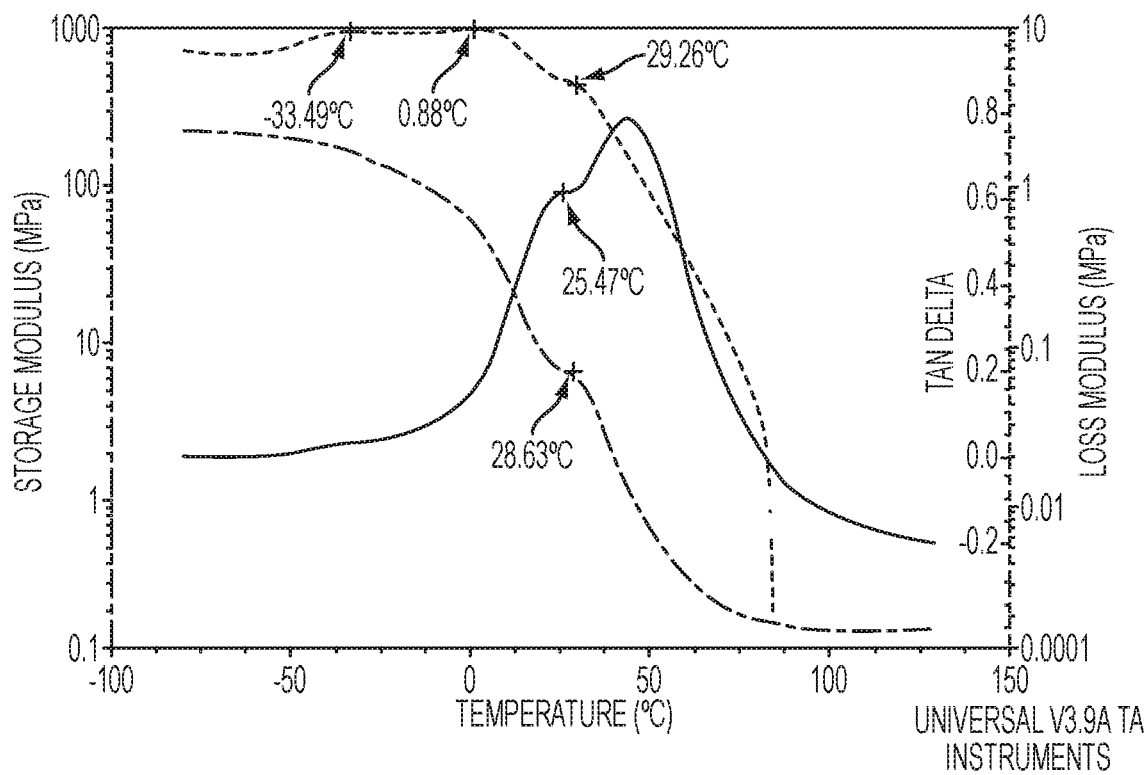

FIG. 19B Shows DMA graphs for two VE foam samples prepared according to the present invention. DMA graph of foam prepared with Novomer 58-103-C polyol (Formulation #4 in Table 4B).

Figure 20A:
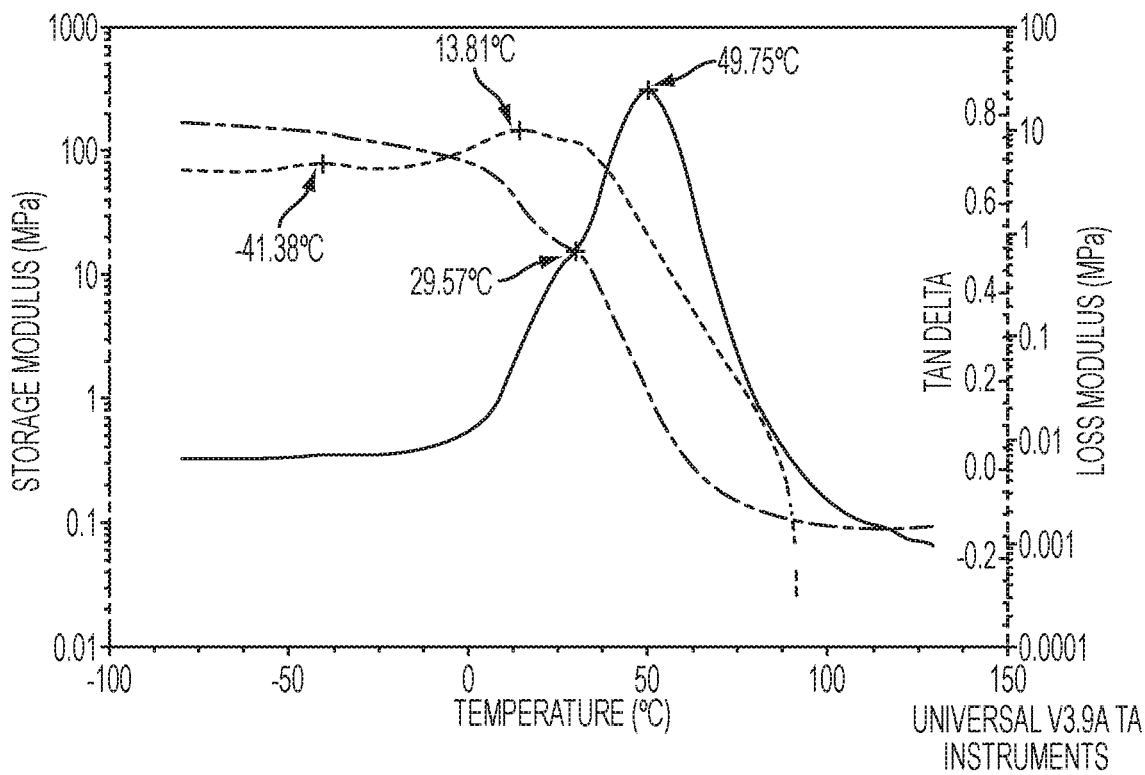

FIG. 20A Shows DMA graphs for two VE foam samples prepared according to the present invention. DMA graph of foam prepared with a mixture of three different Novomer polyols (Formula #5 in Table 5B).

Figure 20B:
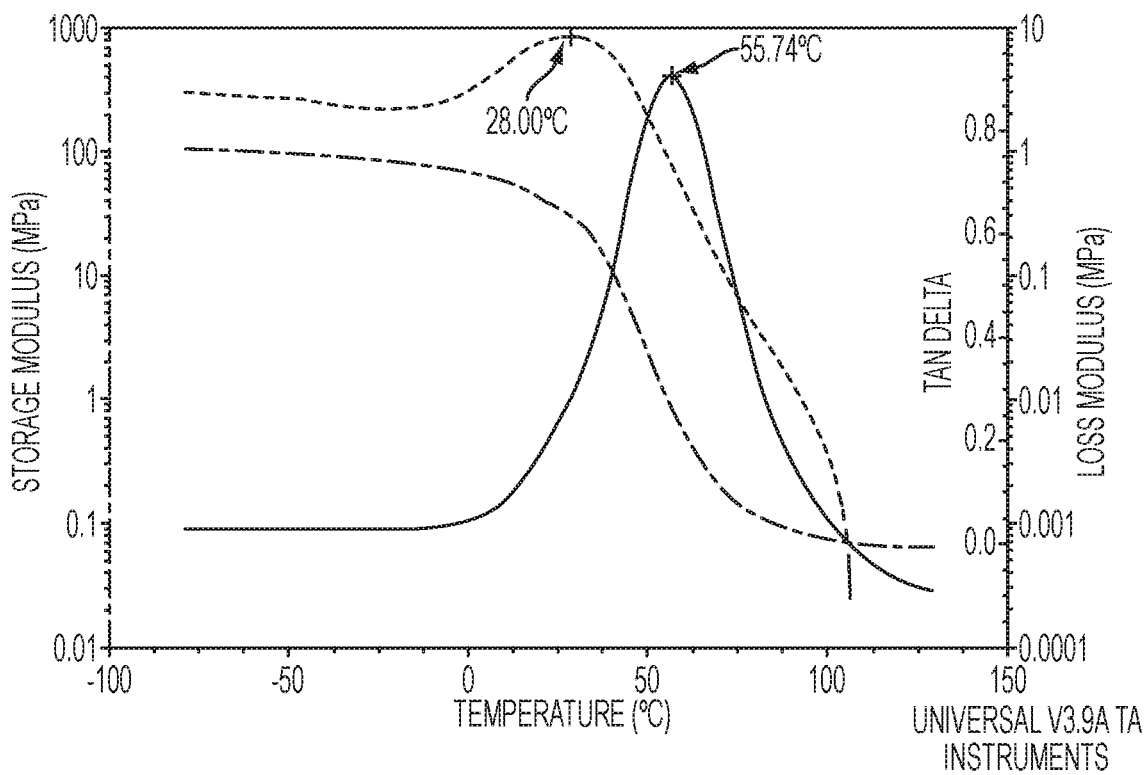

FIG. 20B Shows DMA graphs for two VE foam samples prepared according to the present invention. DMA graph of foam prepared with a mixture of three different Novomer Polyols (Formulation #6 in Table 5B).

Figure 21A:
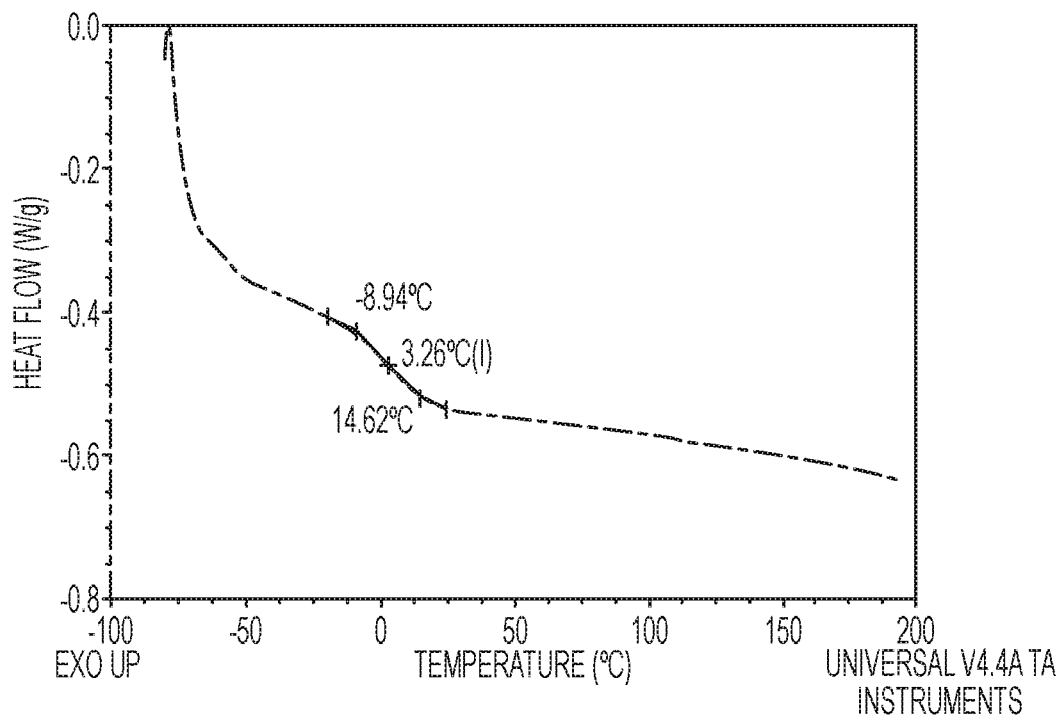

FIG. 21A Shows DSC graphs for a reference VE foam and a VE foam prepared according to the present invention. DSC graph of reference foam (Formulation #1 in Tables 2B-5B).

Figure 21B:
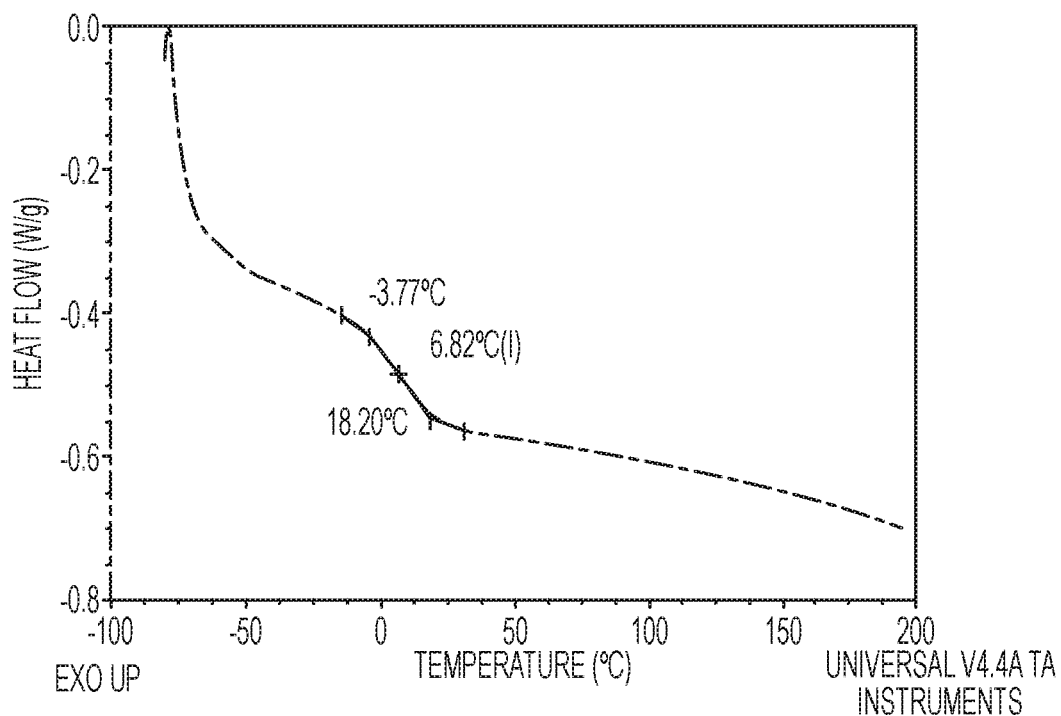

FIG. 21B Shows DSC graphs for a reference VE foam and a VE foam prepared according to the present invention. DSC graph of foam prepared with Novomer polyol 74-217 (Formulation #4 in Table 3B).

Figure 22A:
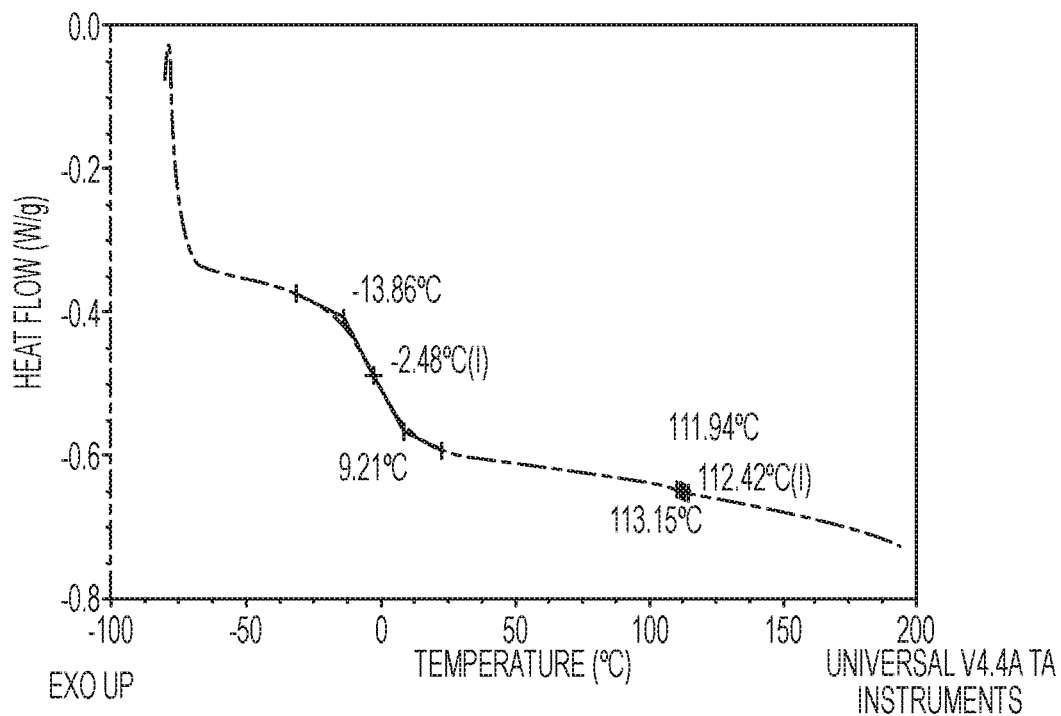

FIG. 22A Shows DSC graphs for two VE foam samples prepared according to the present invention. DSC graph of foam prepared with Novomer polyol 58-103-C (Formulation #3in Table 2B-1).

Figure 22B:
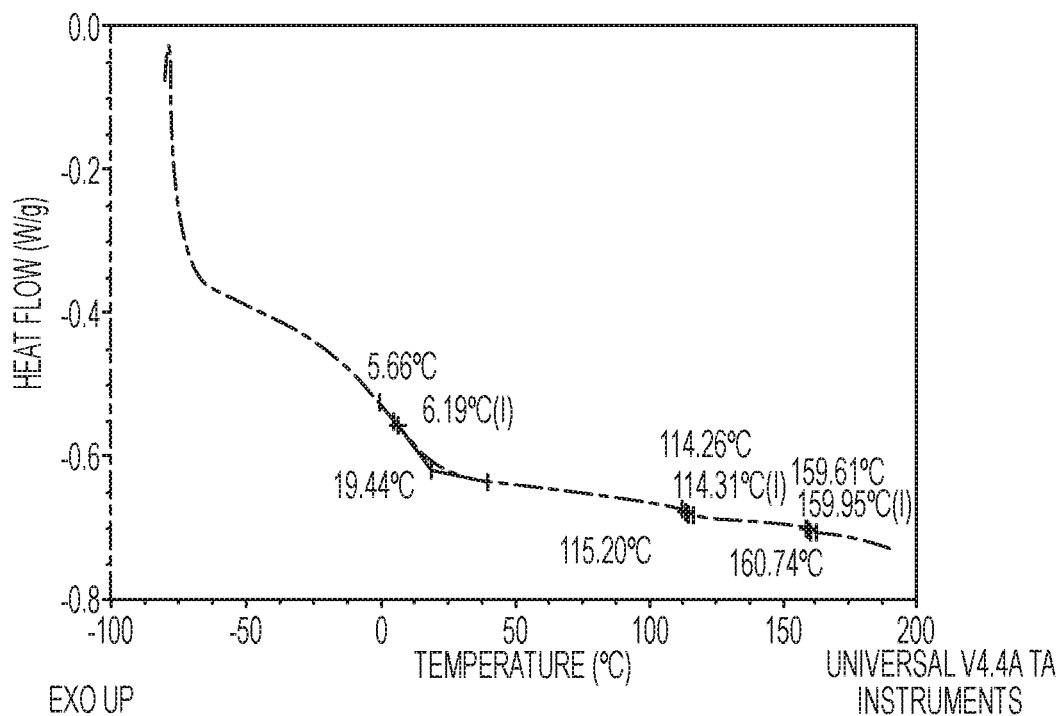

FIG. 22B Shows DSC graphs for two VE foam samples prepared according to the present invention. DSC graph of foam prepared with Novomer polyol 74-277 (Formulation #4 in Table 4B).

Figure 23A:
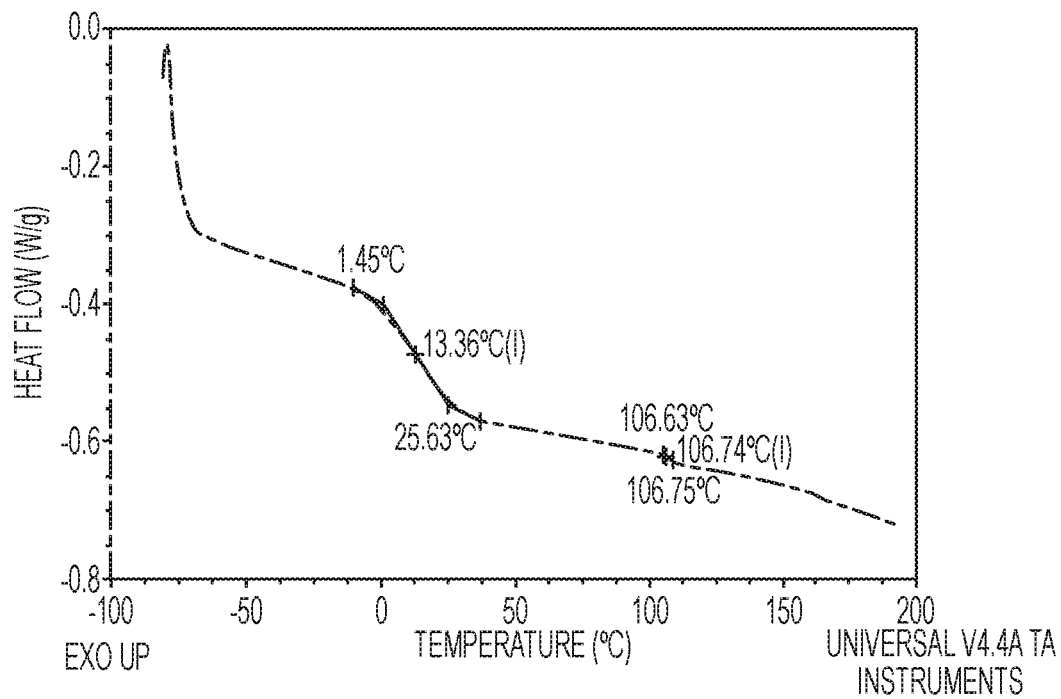

FIG. 23A Shows DSC graphs for two VE foam samples prepared according to the present invention. DSC graph of foam prepared with a mixture of three different Novomer Polyols (Formulation #5 in Table 5B).

Figure 23B:
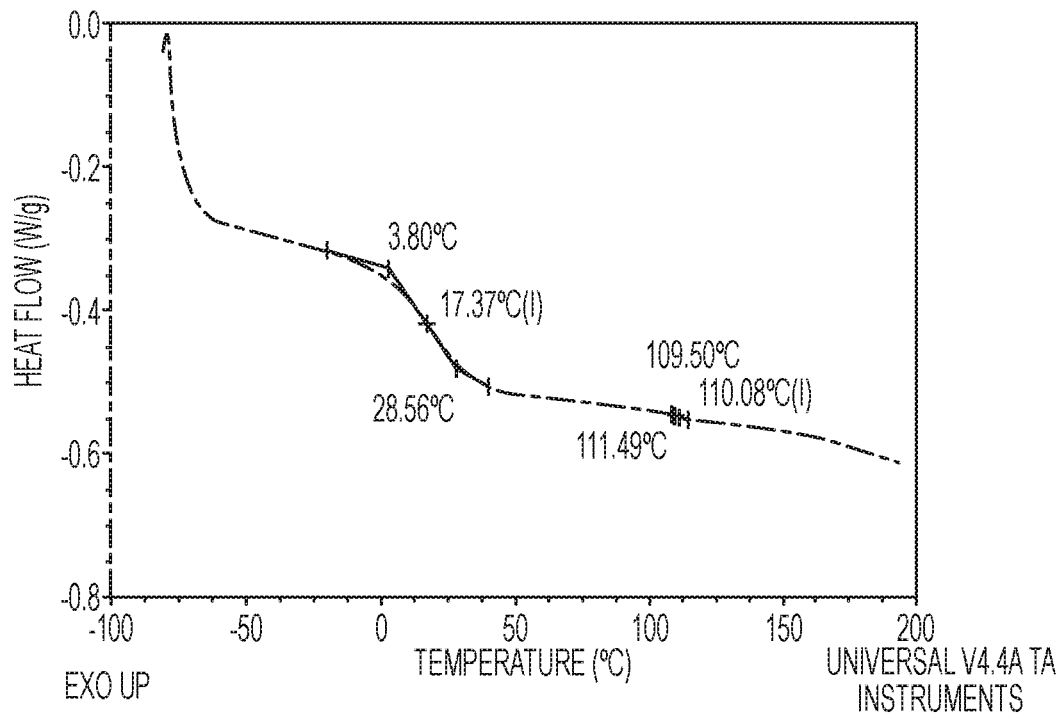

FIG. 23B Shows DSC graphs for two VE foam samples prepared according to the present invention. DSC graph of foam prepared with a mixture of three different Novomer Polyols (Formulation #6 in Table 5B).

Figure 24:
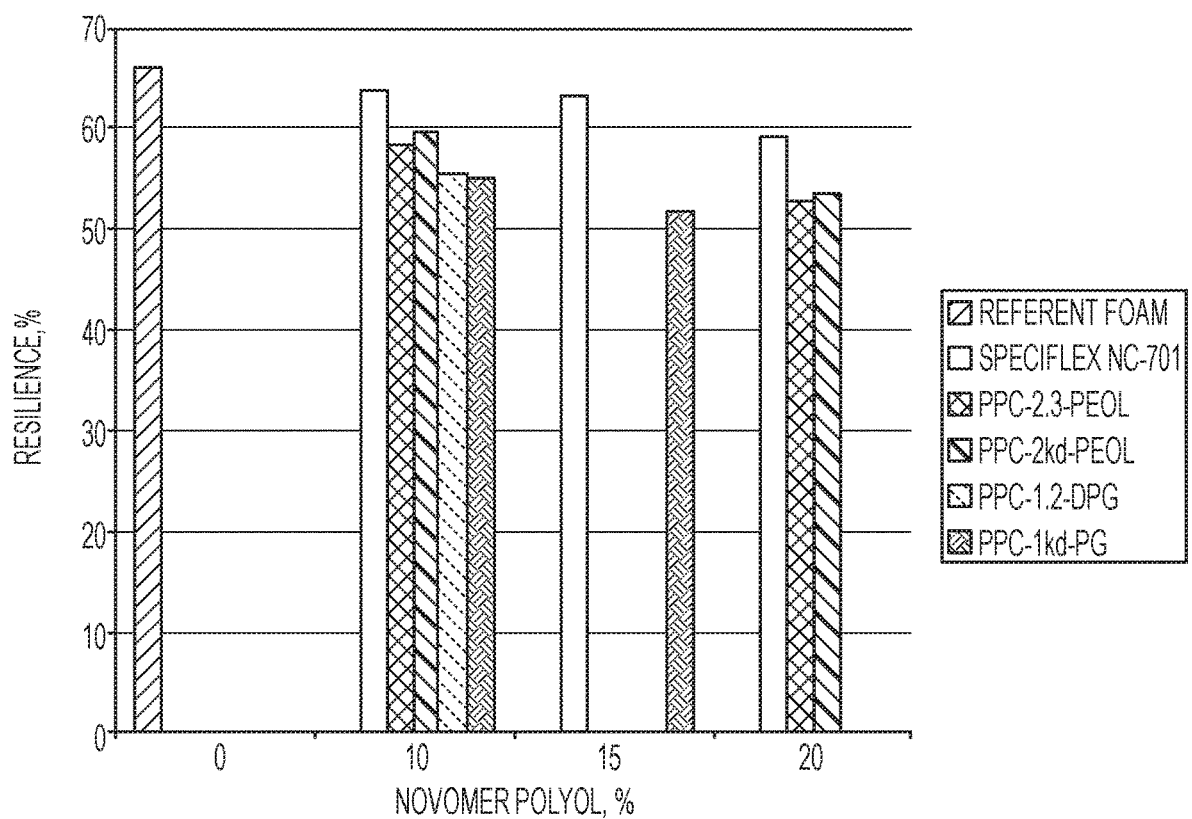

FIG. 24 Shows a chart of the resilience properties of PU foams based on Novomer and Commercial Polyols.

Figure 25:
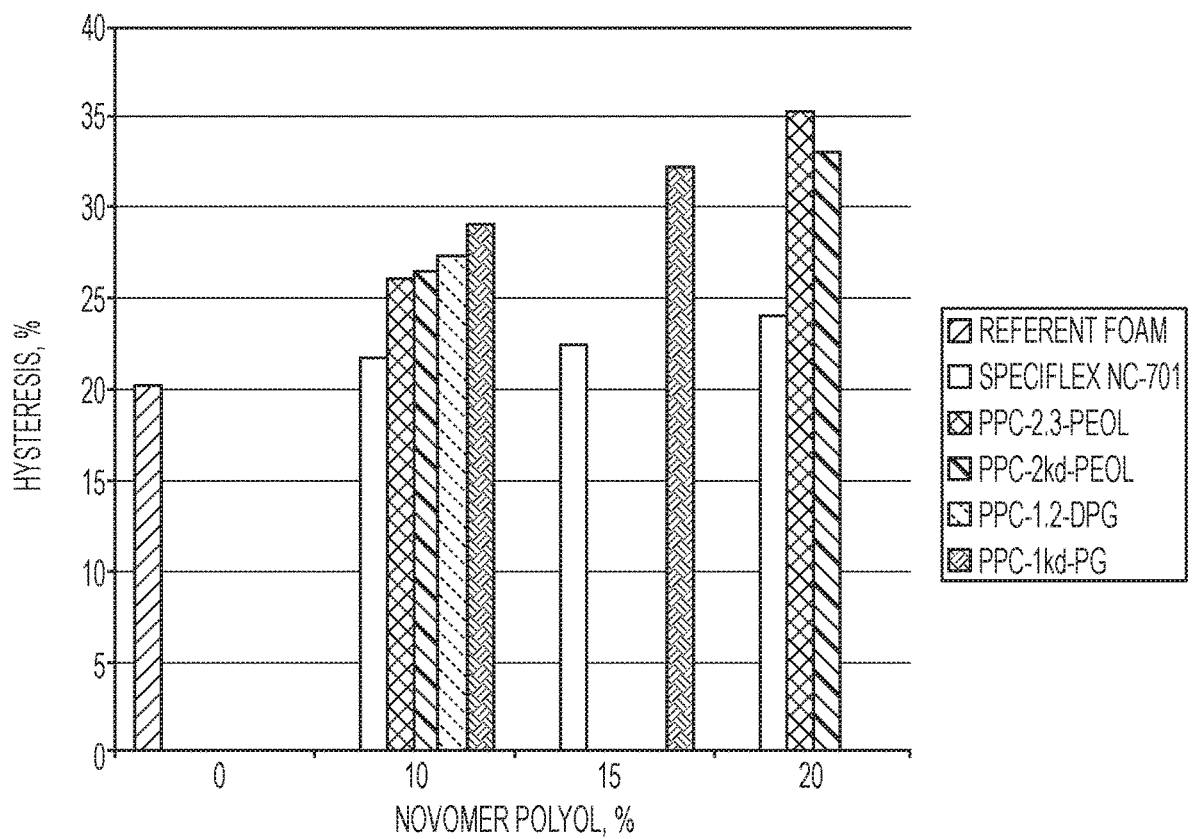

FIG. 25 Shows a chart of the hysteresis properties of PU foams based on Novomer and Commercial Polyols.

Figure 26:
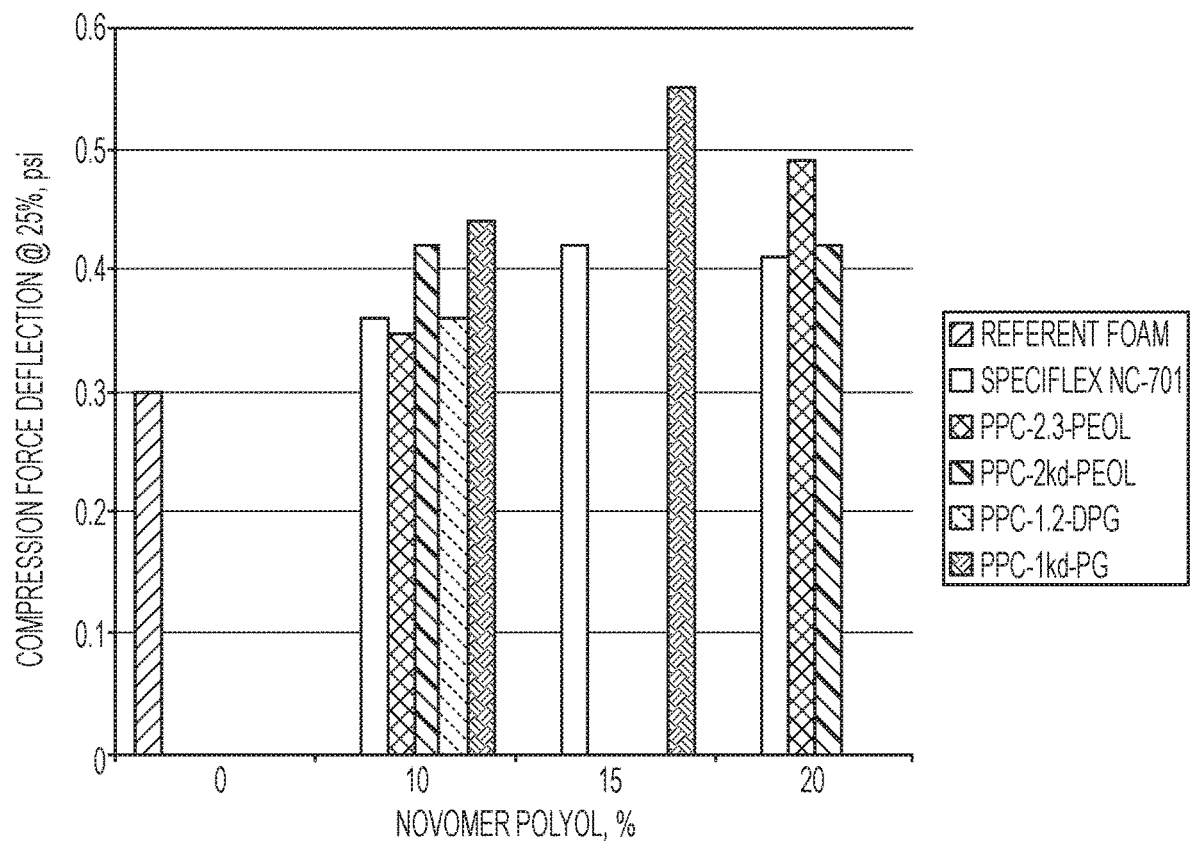

FIG. 26 Shows a chart of the load bearing properties of PU foams based on Novomer and Commercial Polyols.

Figure 27:
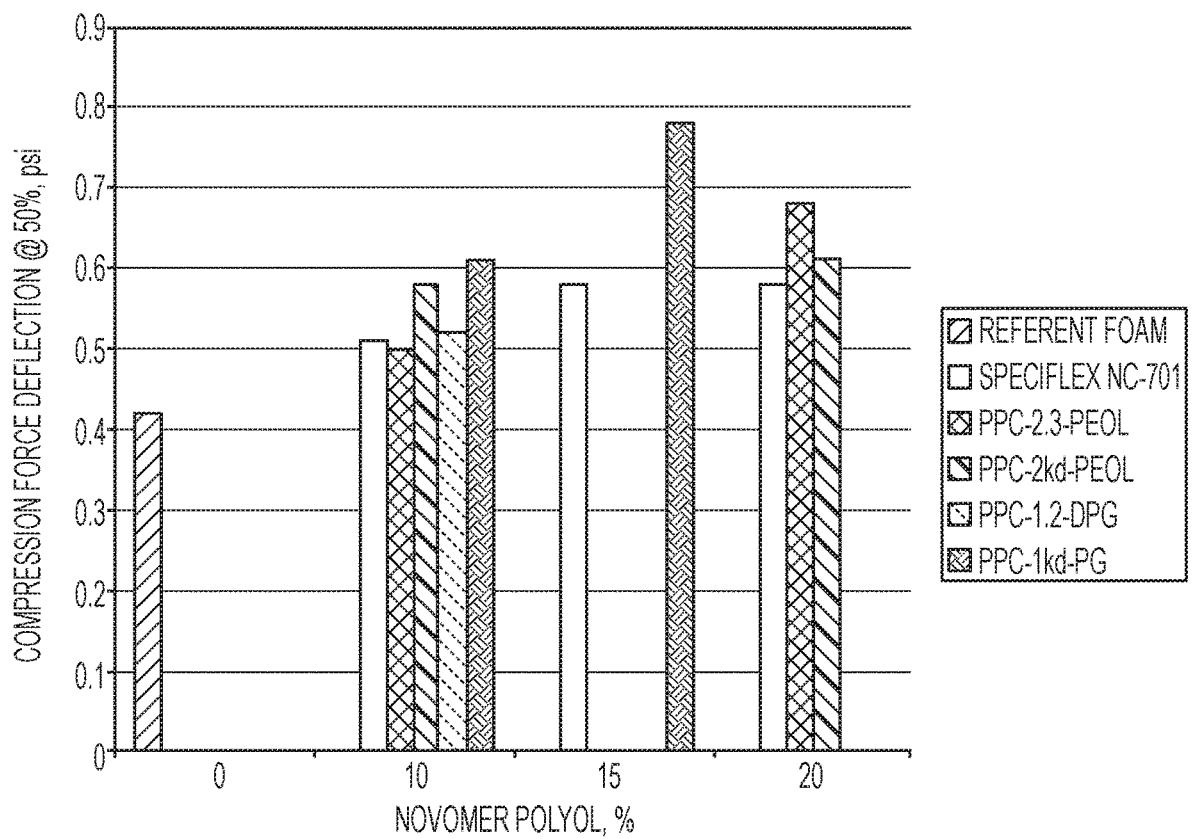

FIG. 27 Shows a chart of the load bearing properties of PU foams based on Novomer and Commercial Polyols.

Figure 28:
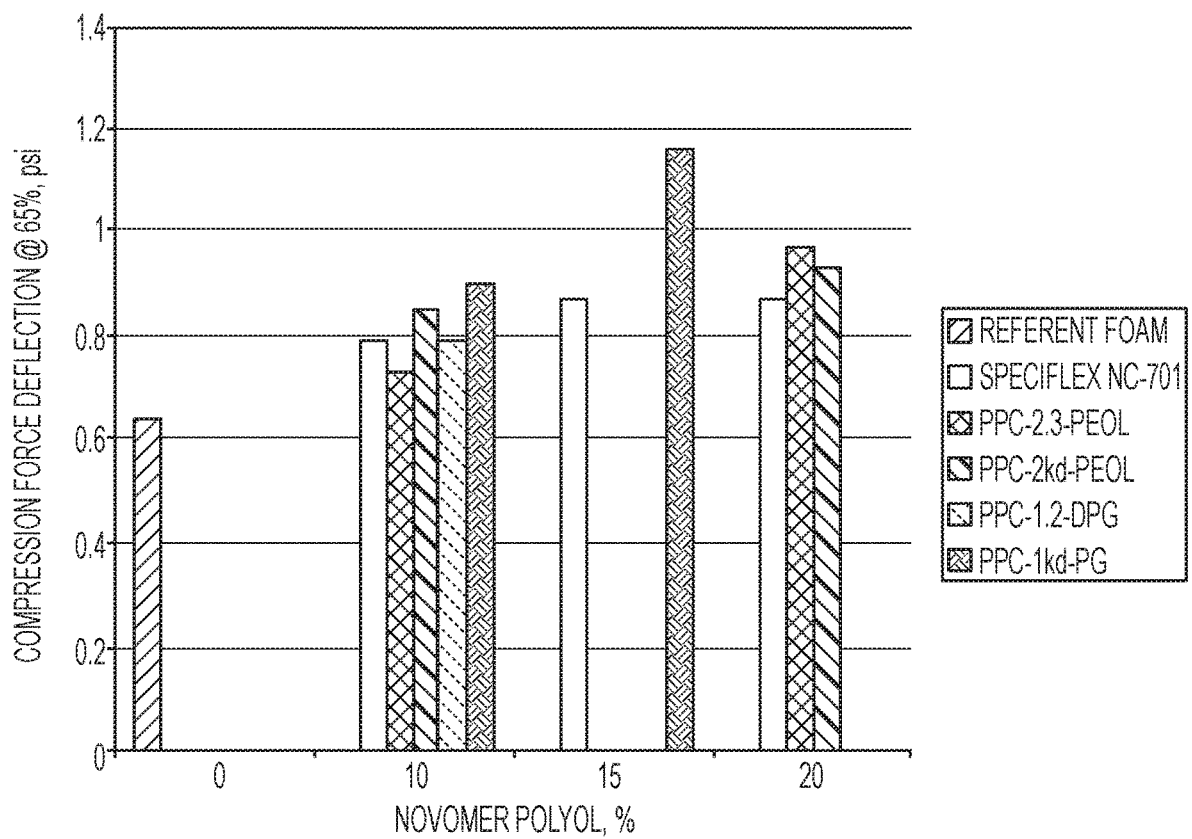

FIG. 28 Shows a chart of the load bearing properties of PU foams based on Novomer and Commercial Polyols.

Figure 29:
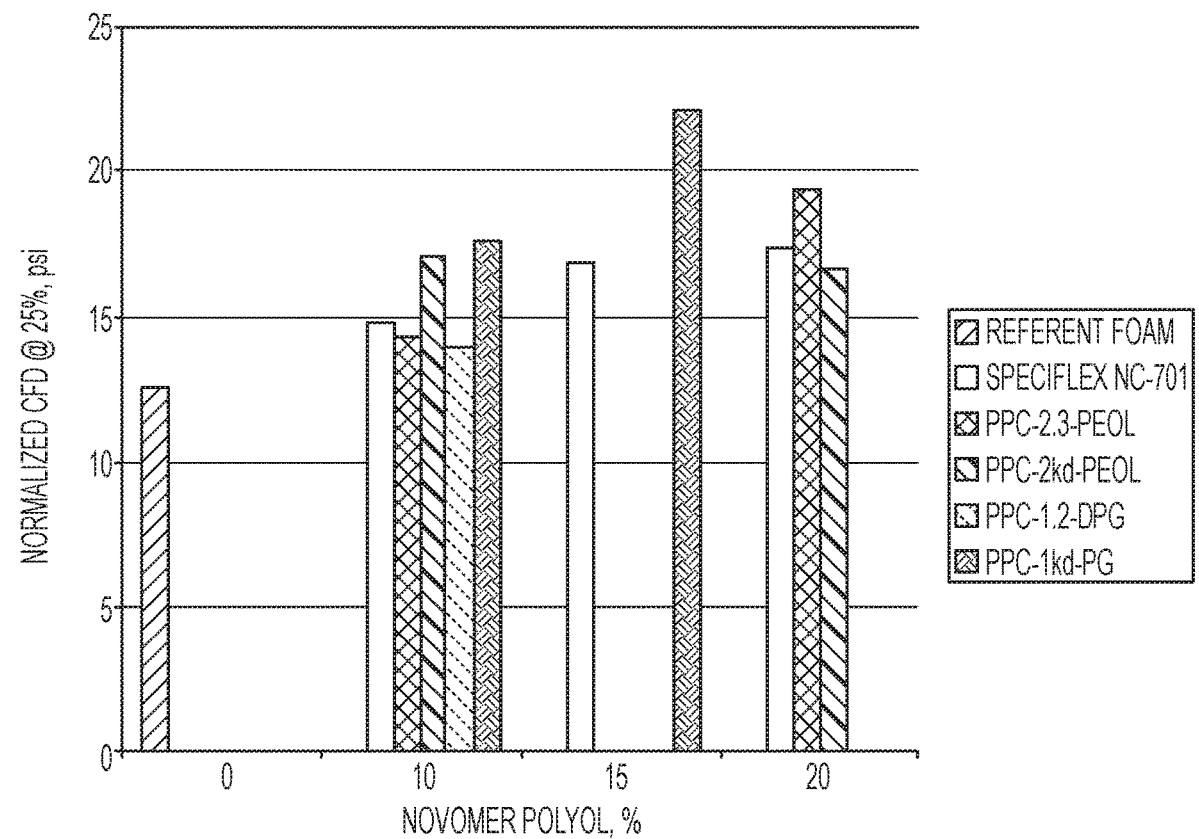

FIG. 29 Shows a chart of the Normalized load bearing properties of PU foams based on Novomer and Commercial Polyols.

Figure 30:
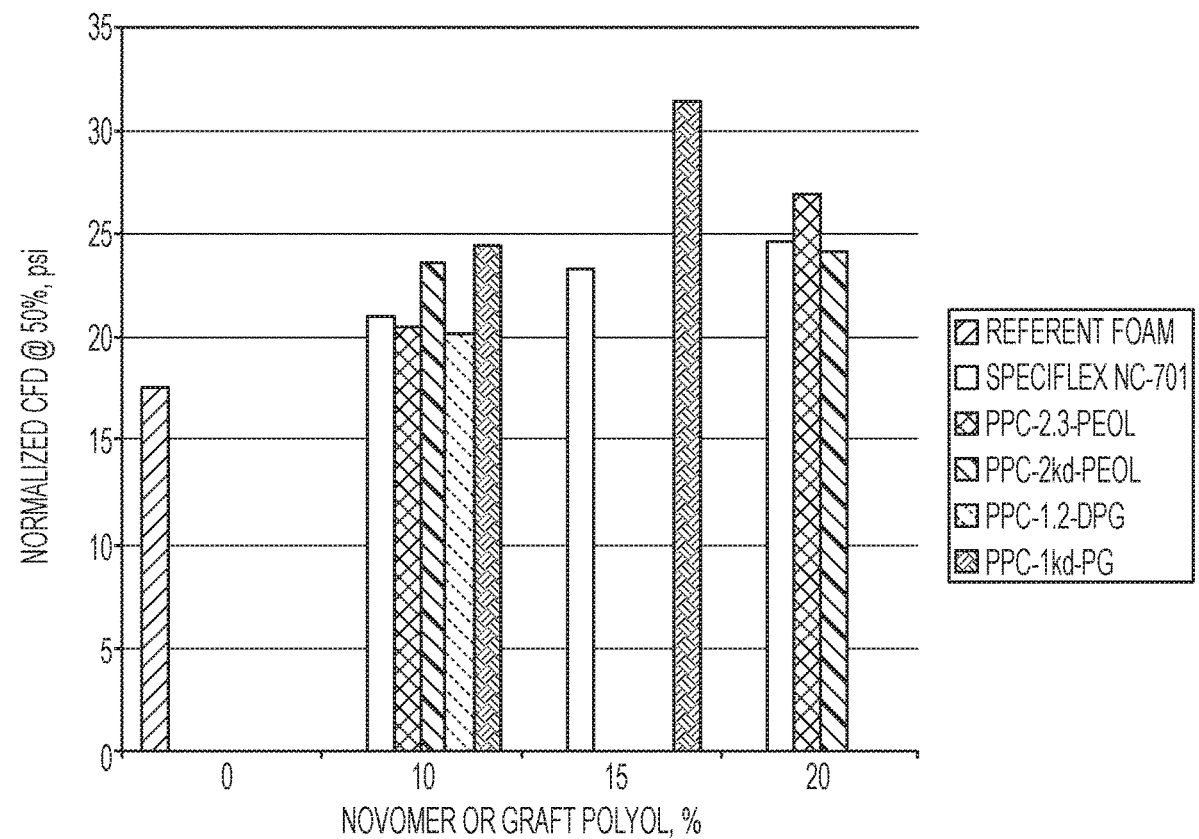

FIG. 30 Shows a chart of the Normalized load bearing properties of PU foams based on Novomer and Commercial Polyols.

Figure 31:
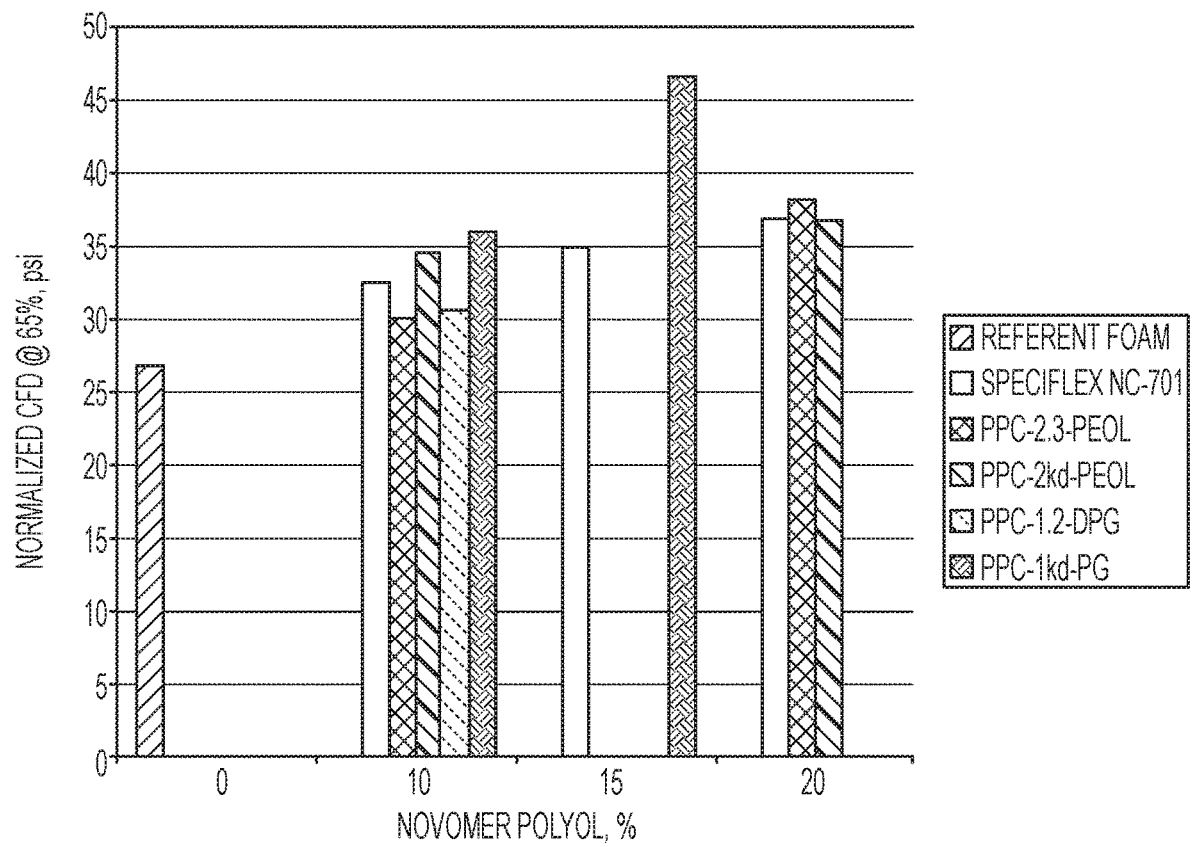

FIG. 31 Shows a chart of the Normalized load bearing properties of PU foams based on Novomer and Commercial Polyols.

Figure 32:
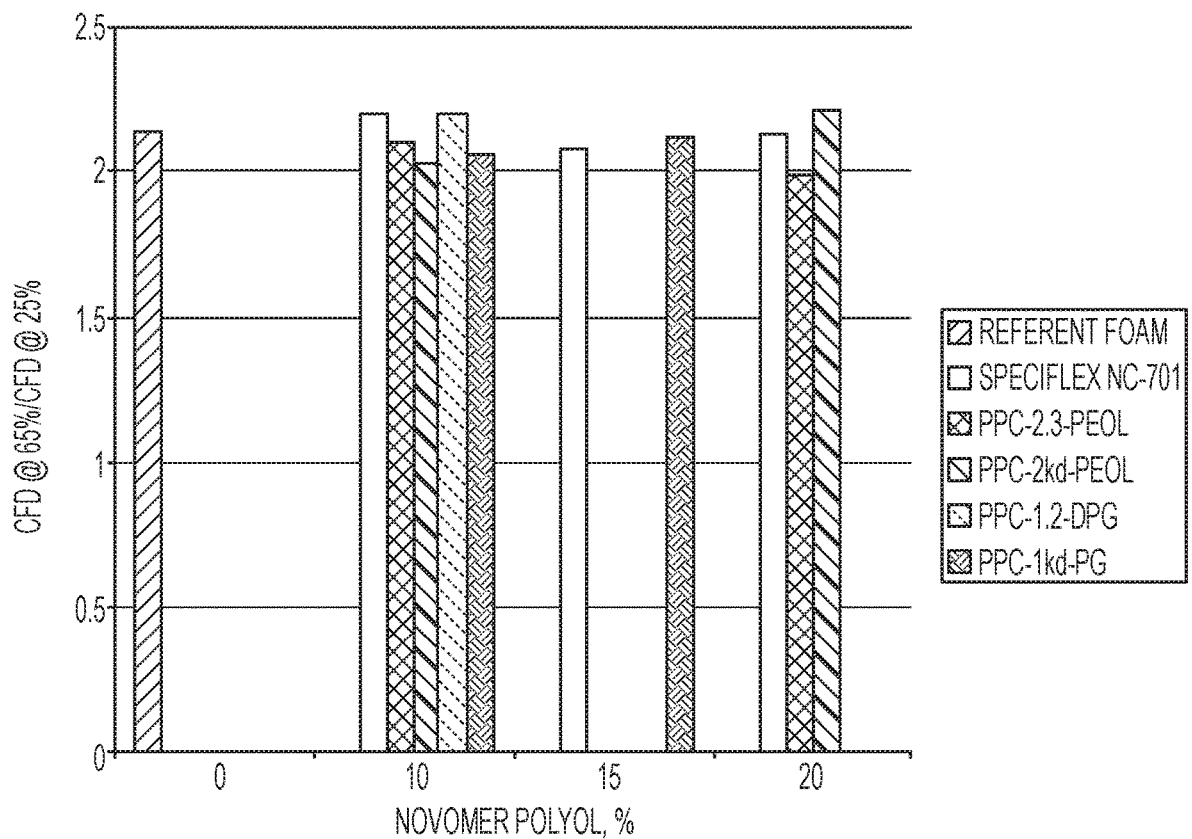

FIG. 32 Shows a chart of support factor data for PU foams based on Novomer and Commercial Polyols.

FIG. 33 Shows Chrysler Material Standard: MS-DC-649 for "Cellular, Molded Polyurethane High Resilient (HR) Type Seat Applications".

DETAILED DESCRIPTION OF CERTAIN EMBODIMENTS

The field of polyurethane manufacture and formulation is well advanced. In some embodiments, the novel materials presented herein are formulated, processed, and used according to methods well known in the art. Combining knowledge of the art, with the disclosure and teachings herein, the skilled artisan will readily apprehend variations, modifications and applications of the compositions and such variations are specifically encompassed herein. The following references contain information on the formulation, manufacture and uses of polyurethane foams and elastomers, the entire content of each of these references is incorporated herein by reference.

Vahid Sendijarevic, et al.; Polymeric Foams And Foam Technology, $2^{nd}$ edition, Hanser Gardner Publications; 2004 (ISBN 978-1569903360)

David Eaves; Handbook of Polymer Foams, Smithers Rapra Press; 2004 (ISBN 978-1859573884)

Shau-Tarng Lee et al.; Polymeric Foams: Science and Technology, CRC Press 2006 (ISBN 978-0849330759)

Kaneyoshi Ashida; Polyurethane and Related Foams: Chemistry and Technology, CRC Press; 2006 (ISBN 978-1587161599)

Handbook of Thermoplastic Elastomers, William Andrew Publishers, 2007 (ISBN 978-0815515494)

The Polyurethanes Book, J. Wiley & Sons, 2003(ISBN 978-0470850411)

I. Methods of Strengthening Polyurethane Foams

Commercial polyurethane foam compositions are typically manufactured by combining two components: an isocyanate component containing one or more polyisocyanate compounds optionally blended with additional materials such as diluents, solvents, coreactants and the like (often refered to in the art as an A-side mixture), and a polyol component comprising one or more polyols optionally blended with additional reactants, solvents, catalysts, or additives (typically refered to in the art as the B side mixture).

In certain embodiments, methods of the present invention include a step of substituting a portion of the polyol component of a polyurethane foam composition with a strength enhancing additive comprising an aliphatic polycarbonate polyol derived from the copolymerization of $CO_2$ and one or more epoxides.

In certain embodiments, the method entails replacing between about 1 weight and about 50 weight percent of the polyol content of a polyurethane foam formulation with an aliphatic polycarbonate polyol. In certain embodiments, the aliphatic polycarbonate polyol used for this purpose has a primary polymer repeat unit with the structure:

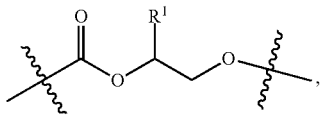

wherein $R^1$ is, at each occurrence in the polymer chain, independently —H, —CH$_3$, or —CH$_2$CH$_3$.

In certain embodiments, the present invention provides a method for increasing the load bearing properties of a polyurethane foam composition, the foam composition comprising the reaction product of a polyol component and a polyisocyanate component, the method comprising the step of incorporating into the polyol component a polycarbonate polyol derived from the copolymerization of one or more epoxides and carbon dioxide. In certain embodiments, the polycarbonate polyol is added in a quantity from about 1 weight percent to about 50 weight percent of all polyols present in the polyol component of the foam formulation. In certain embodiments, the added polycarbonate polyol is provided in a quantity from about 2 weight percent to about 50 weight percent of all polyols present in the polyol component of the foam formulation. In certain embodiments, the added polycarbonate polyol is provided in a quantity from about 5 weight percent, to about 25 weight percent of all polyol present in the polyol component. In certain embodiments, the added polycarbonate polyol is provided in a quantity from about 1 weight percent to about 2 weight percent of all polyol present in the polyol component. In certain embodiments, the added polycarbonate polyol is provided in a quantity from about 2 weight percent to about 5 weight percent of all polyol present in the polyol component. In certain embodiments, the added polycarbonate polyol is provided in a quantity from about 2 weight percent to about 10 weight percent of all polyol present in the polyol component. In certain embodiments, the added polycarbonate polyol is provided in a quantity from about 5 weight percent to about 10 weight percent of all polyol present in the polyol component. In certain embodiments, the added polycarbonate polyol is provided in a quantity from about 10 weight percent, to about 20 weight percent of all polyol present in the polyol component. In certain embodiments, the added polycarbonate polyol is provided in a quantity from about 20 weight percent, to about 30 weight percent of all polyol present in the polyol component. In certain embodiments, the added polycarbonate polyol is provided in a quantity from about 30 weight percent, to about 50 weight percent of all polyol present in the polyol component. In certain embodiments, the added polycarbonate polyol is provided in a quantity of about 1 weight percent of all polyol present in the polyol component. In certain embodiments, the added polycarbonate polyol is provided in a quantity of about 2 weight percent of all polyol present in the polyol component. In certain embodiments, the added polycarbonate polyol is provided in a quantity of about 3 weight percent of all polyol present in the polyol component. In certain embodiments, the added polycarbonate polyol is provided in a quantity of about 5 weight percent of all polyol present in the polyol component. In certain embodiments, the added polycarbonate polyol is provided in a quantity of about 10 weight percent of all polyol present in the polyol component. In certain embodiments, the added polycarbonate polyol is provided in a quantity of about 15 weight percent of all polyol present in the polyol component. In certain embodiments, the added polycarbonate polyol is provided in a quantity of about 20 weight percent of all polyol present in the polyol component. In certain embodiments, the added polycarbonate polyol is provided in a quantity of about 25 weight percent of all polyol present in the polyol component. In certain embodiments, the added polycarbonate polyol is provided in a quantity of about 30 weight percent of all polyol present in the polyol component. In certain embodiments, the added polycarbonate polyol is provided in a quantity of about 40 weight percent of all polyol present in the polyol component.

In certain embodiments, the other polyols present in the polyol component to which the aliphatic polycarbonate polyol is added are selected from the group consisting of: polyether polyols, polyester polyols, polybutadiene polyols, polysulfide polyols, natural oil polyols, fluorinated polyols, aliphatic polyols, polyethercarbonate polyols, polycarbonate polyols other than those derived from epoxide-CO$_2$ copolymerization, and mixtures of any two or more these. In certain embodiments, between about 50 percent and about 99 percent of the total weight of polyol present in the polyol component (i.e. exclusive of any other non-polyol components that may be present in a B-side composition for foams such as catalysts, cell openers, blowing agents, stabilizers, diluents, pigments and the like) comprises one or more polyols selected from the group consisting of polyether polyols, polyester polyols, polybutadiene polyols, polysulfide polyols, natural oil polyols, fluorinated polyols, aliphatic polyols, polycarbonate polyols other than those derived from epoxide-CO$_2$ copolymerization, and mixtures of any two or more these. In certain embodiments, the other polyol present in the polyol component to which the aliphatic polycarbonate polyol is added substantially comprises polyether polyol. In certain embodiments, the other polyol present in the polyol component to which the aliphatic polycarbonate polyol is added substantially comprises polyester polyol. In certain embodiments, the other polyols present in the polyol component to which the aliphatic polycarbonate polyol is added substantially comprise a mixture of polyether and polyester polyols.

In certain embodiments, methods of the present invention comprise formulating a high strength flexible polyurethane foam composition by providing a polycarbonate polyol derived from the copolymerization of one or more epoxides and carbon dioxide as a polyol component in a B-side composition comprising a polyether polyol. In certain embodiments the polycarbonate polyol is provided in such a quantity that the final B-side composition contains from about 1 part to about 100 parts by weight of polycarbonate polyol based on 100 parts of polyether polyol. In certain embodiments, the polycarbonate polyol is added in such a quantity that the polycarbonate polyol comprises about 5 parts, about 10 parts, about 20 parts, about 30 parts, about 40 parts, about 60 parts, about 80 parts, or about 100 parts, based on 100 parts of polyether polyol in the resulting B-side formulation. In certain embodiments, the aliphatic polycarbonate polyol comprises poly(propylene carbonate). In certain embodiments, the aliphatic polycarbonate polyol added comprises poly(ethylene carbonate). In certain embodiments, the aliphatic polycarbonate polyol added comprises poly(ethylene-co-propylene carbonate). In certain embodiments, the method comprises the additional steps of stirring and/or heating a mixture of the aliphatic polycarbonate polyol and the polyether polyol. In certain embodiments, the method comprising the step of stirring and/or heating is performed until a substantially homogenous mixture of the polycarbonate polyol and the polyether polyol is formed.

In certain embodiments, the methods of the present invention are characterized in that foams formulated using the methods have higher strength than corresponding foams formulated without the step of providing the polycarbonate polyol. In certain embodiments, the methods are characterized in that one or more properties selected from the group consisting of: Tensile Strength at Break (as measured by ASTM D3574-08 Test E); Tear Strength (as measured by ASTM D3574-08 Test F); Compression Force Deflection (CFD) (as measured by ASTM D3574-08 Test C); and Tensile strength and Elongation after Dry Heat Aging for 22 hours at 140° C. (as measured by ASTM D3574-08Test K) are enhanced relative to those of a corresponding reference foam formulated without the step of adding the polycarbonate polyol.

In certain embodiments, the inventive methods are characterized in that the foams produced have high compression force deflection. With the existing art, such CFDs can only be achieved for flexible foams with good comfort properties by incorporating filled polyols. The use of filled polyols can be undesirable from a cost perspective and raises concerns due to the presence of residual VOCs such as styrene. Residual VOCs cause nuisance odors in the finished foams, and may have negative health effects for those exposed to articles made from the foam. We have found that foams strengthened by addition of epoxide $CO_2$ copolymers have CFD values as measured by ASTM D3574-08 Test C that are uniquely high, meeting or exceeding those attained by addition of filled polyols but without the attendant problems associated with filled polyols. Thus in certain embodiments, the present invention encompasses methods of making high CFD foams.

In certain embodiments, the present invention provides methods of formulating high strength polyurethane foam compositions (denoted the Strengthened Foam formulation) comprising the step of adding a polycarbonate polyol derived from the copolymerization of one or more epoxides and carbon dioxide to a B-side formulation, the method characterized in that the load bearing capacity of the strengthened foam as indicated by its compression force deflection (CFD) value measured by ASTM D3574-08 Test C, is greater than the CFD value of the corresponding foam composition formulated without the added polycarbonate polyol denoted the Reference Foam formulation, (i.e. the comparison is between two foams formulated similarly but for the substitution of the polycarbonate polyol for a portion of the polyol present in the B-side of the reference foam; non-limiting examples of such comparisons are provided in the Examples section hereinbelow, importantly, for a valid comparison no other additions or substantial changes in the ratios or identities of the other foam components are made). In certain embodiments, the method comprises adding the aliphatic polycarbonate polyol to the B-side formulation by substituting a portion of one or more polyols in the reference formulation such that the —OH number of the B-side formulation for the strengthened foam is substantially the same as that of the B-side formulation of the reference foam formulation. In certain embodiments, the method is characterized in that the CFD value of the strengthened foam formulation is at least 10% greater than the CFD value of the reference foam formulation. In certain embodiments, the method is characterized in that the CFD value of the strengthened foam formulation is at least 10% greater, at least 20% greater, at least 30% greater, at least 40% greater, at least 50% greater, or at least 100% greater than the CFD value of the reference foam. In certain embodiments, the CFD values of the strengthened foam and the reference foam are normalized for the density of the foam prior to comparing them. In certain embodiments the method is characterized in that the strengthened foam composition and the reference foam composition have substantially the same density.

In certain embodiments, the present invention provides methods of formulating high strength polyurethane foam compositions (denoted the strengthened foam formulation) comprising the step of adding a polycarbonate polyol derived from the copolymerization of one or more epoxides and carbon dioxide to a B-side formulation, the method characterized in that the strengthened foam formulation has a lower density than the corresponding foam composition formulated without the added polycarbonate polyol (denoted the reference foam formulation) further characterized in that the load bearing properties (CFD) of the strengthened foam as determined by ASTM D3574-08 Test C, are equal to or greater than those of the reference foam. In certain embodiments, the method comprises adding the aliphatic polycarbonate polyol to the B-side formulation by substituting a portion of one or more polyols in the reference formulation such that the —OH number of the B-side formulation for the strengthened foam is substantially the same as that of the B-side formulation of the reference foam formulation. In certain embodiments, the method is characterized in that the density of the strengthened foam formulation is at least 10% lower than the density of the reference foam formulation. In certain embodiments, the method is characterized in that the density of the strengthened foam formulation is at least 10%, at least 20%, at least 30%, at least 40%, or at least 50%, less than the density of the reference foam. In certain embodiments, the method is characterized in that the density of the strengthened foam formulation is at least 10%, at least 20%, at least 30%, at least 40%, or at least 50%, less than the density of the reference foam while the CFD of the strengthened foam is at least equal to, at least 10% greater than, at least 20% greater than, at least 30% greater than, at least 40% greater than, at least 50% greater than, at least 75% greater than, or at least 100% greater than the CFD of the reference foam.

In certain embodiments, the method is characterized in that the Strengthened Foam formulation has the combination of a density of less than about 2.6 pounds/cubic foot (pcf) and a CFD as measured by ASTM D3574-08 Test C of at least 0.4 psi at 25% deflection. In certain embodiments, the method is characterized in that the CFD value is at least 0.45 psi at 25% deflection, at least 0.5 psi at 25% deflection, or at least 0.52 psi at 25% deflection. In certain embodiments, the method is characterized in that the CFD value of the strengthened foam formulation measured by ASTM D3574-08 Test C is at least 0.5 psi at 50% deflection. In certain embodiments, the method is characterized in that the CFD value of the strengthened foam formulation measured by ASTM D3574-08 Test C is at least 0.55 psi at 50% deflection, at least 0.60 psi at 50% deflection, at least 0.65 psi at 50% deflection, at least 0.7 psi at 50% deflection, or at least 0.75 psi at 50% deflection. In certain embodiments, the method is characterized in that the CFD value of the strengthened foam formulation measured by ASTM D3574-08 Test C is at least 0.7 psi at 65% deflection. In certain embodiments, the method is characterized in that the CFD value of the strengthened foam formulation measured by ASTM D3574-08 Test C is at least 0.75 psi at 65% deflection, at least 0.80 psi at 65% deflection, at least 0.85 psi at 65% deflection, at least 0.9 psi at 65% deflection, or at least 1 psi at 65% deflection. In certain embodiments, the CFD values above are for a foam composition having a density of between about 2 and 2.6 pcf. In certain embodiments, the CFD values above are for a foam composition having a density of between about 2.2 and 2.6 pcf, or a density of about 2.4 pcf. In certain embodiments, the CFD values above are for foams having a density between about 2 and 2.6 pcf and further characterized in that they contain less than 10% filled polyol, less than 5% filled polyol, less than 3% filled polyol, less than 2% filled polyol, less than 1% filled polyol, or characterized in that they are substantially free of filled polyol. In certain embodiments, the foam formulations above are characterized in that they have comfort properties suitable for use in seating foams.

In certain embodiments, the method is characterized in that the Strengthened Foam formulation has the combination of a density of less than about 4 pcf and a CFD as measured by ASTM D3574-08 Test C of at least 0.8 psi at 25% deflection. In certain embodiments, the method is characterized in that the CFD value of the strengthened foam formulation is at least 0.85 psi at 25% deflection, at least 0.9 psi at 25% deflection, at least 0.95 psi at 25% deflection, or at least 1 psi at 25% deflection. In certain embodiments, the method is characterized in that the CFD value of the strengthened foam formulation with a density of less than about 4 pcf as measured by ASTM D3574-08 Test C is at least 1 psi at 50% deflection. In certain embodiments, the method is characterized in that the CFD value is at least 1.1 psi at 50% deflection, at least 1.2 psi at 50% deflection, at least 1.3 psi at 50% deflection, or at least 1.4 psi at 50% deflection. In certain embodiments, the method is characterized in that the CFD value of the strengthened foam formulation with a density of less than about 4 pcf as measured by ASTM D3574-08 Test C is at least 1.4 psi at 65% deflection. In certain embodiments, the method is characterized in that the CFD value of the strengthened foam formulation is at least 1.5 psi at 65% deflection, at least 1.6 psi at 65% deflection, at least 1.7 psi at 65% deflection, at least 1.8 psi at 65% deflection, at least 1.9 psi at 65% deflection, or at least 2 psi at 65% deflection. In certain embodiments, the CFD values above are for a foam composition having a density of between about 3.2 and 3.8 pcf. In certain embodiments, the CFD values above are for a foam composition having a density of between about 3.3 and 3.7 pcf, or a density of about 3.5 pcf. In certain embodiments, the CFD values above are for foams having a density between about 3.2 and 3.8 pcf and further characterized in that they contain less than 10% filled polyol, less than 5% filled polyol, less than 3% filled polyol, less than 2% filled polyol, less than 1% filled polyol, or characterized in that they are substantially free of filled polyol. In certain embodiments, the foam formulations above are characterized in that they have comfort properties suitable for use in seating foams.In certain embodiments, the present invention provides methods of formulating high strength polyurethane foam compositions (denoted the strengthened foam formulation) comprising the step of adding a polycarbonate polyol derived from the copolymerization of one or more epoxides and carbon dioxide to a B-side formulation, the method characterized in that the tensile strength of the strengthened foam as measured by ASTM D 3574-08 Test E, is greater than the tensile strength of the corresponding foam composition formulated without the added polycarbonate polyol (denoted the reference foam formulation). In certain embodiments, the method comprises adding the aliphatic polycarbonate polyol to the B-side formulation by substituting a portion of one or more polyols in the reference formulation such that the —OH number of the B-side formulation for the strengthened foam is substantially the same as that of the B-side formulation of the reference foam formulation. In certain embodiments, the method is characterized in that the tensile strength of the strengthened foam formulation is at least 10% greater than the tensile strength of the reference foam formulation. In certain embodiments, the method is characterized in that the tensile strength of the strengthened foam formulation is at least 20%, at least 30%, at least 40%, at least 50%, or at least 100% greater than the tensile strength of the reference foam. In certain embodiments, the tensile strengths of the strengthened foam and the reference foam are normalized for the density of the foams prior to comparing them. In certain embodiments the method is characterized in that the strengthened foam composition and the reference foam composition have substantially the same density.

In certain embodiments, the present invention provides methods of formulating high strength polyurethane foam compositions (denoted the strengthened foam formulation) comprising the step of adding a polycarbonate polyol derived from the copolymerization of one or more epoxides and carbon dioxide to a B-side formulation, the method characterized in that the strengthened foam formulation has a lower density than the corresponding foam composition formulated without the added polycarbonate polyol (denoted the reference foam formulation) further characterized in that the tensile strength of the strengthened foam as determined by ASTM D3574-08 Test E is equal to or greater than that of the reference foam. In certain embodiments, the method comprises adding the aliphatic polycarbonate polyol to the B-side formulation by substituting a portion of one or more polyols in the reference formulation such that the —OH number of the B-side formulation for the strengthened foam is substantially the same as that of the B-side formulation of the reference foam formulation. In certain embodiments, the method is characterized in that the density of the strengthened foam formulation is at least 10% lower than the density of the reference foam formulation. In certain embodiments, the method is characterized in that the density of the strengthened foam formulation is at least 10%, at least 20%, at least 30%, at least 40%, or at least 50%, less than the density of the reference foam. In certain embodiments, the method is characterized in that the density of the strengthened foam formulation is at least 10%, at least 20%, at least 30%, at least 40%, or at least 50%, less than the density of the reference foam while the tensile strength of the strengthened foam is at least equal to, at least 10% greater than, at least 20% greater than, at least 30% greater than, at least 40% greater than, at least 50% greater than, at least 75% greater than, or at least 100% greater than the tensile strength of the reference foam.

In certain embodiments, the present invention provides methods of formulating high strength polyurethane foam compositions (denoted the strengthened foam formulation) comprising the step of adding a polycarbonate polyol derived from the copolymerization of one or more epoxides and carbon dioxide to a B-side formulation, the method characterized in that the tear strength of the strengthened foam as measured by ASTM D 3574-08 Test F is greater than the tear strength of the corresponding foam composition formulated without the added polycarbonate polyol (denoted the reference foam formulation). In certain embodiments, the method comprises adding the aliphatic polycarbonate polyol to the B-side formulation by substituting a portion of one or more polyols in the reference formulation such that the —OH number of the B-side formulation for the strengthened foam is substantially the same as that of the B-side formulation of the reference foam formulation. In certain embodiments, the method is characterized in that the tensile strength of the strengthened foam formulation is at least 10% greater than the tensile strength of the reference foam formulation. In certain embodiments, the method is characterized in that the tear strength of the strengthened foam formulation is at least 20%, at least 30%, at least 40%, at least 50%, or at least 100% greater than the tear strength of the reference foam. In certain embodiments, the tear strengths of the strengthened foam and the reference foam are normalized for the density of the foams prior to comparing them. In certain embodiments the method is characterized in that the strengthened foam composition and the reference foam composition have substantially the same density.

In certain embodiments, the present invention provides methods of formulating high strength polyurethane foam compositions (denoted the strengthened foam formulation) comprising the step of adding a polycarbonate polyol derived from the copolymerization of one or more epoxides and carbon dioxide to a B-side formulation, the method characterized in that the strengthened foam formulation has a lower density than the corresponding foam composition formulated without the added polycarbonate polyol (denoted the reference foam formulation) further characterized in that the tear strength of the strengthened foam as determined by ASTM D3574-08 Test F is equal to or greater than that of the reference foam. In certain embodiments, the method comprises adding the aliphatic polycarbonate polyol to the B-side formulation by substituting a portion of one or more polyols in the reference formulation such that the —OH number of the B-side formulation for the strengthened foam is substantially the same as that of the B-side formulation of the reference foam formulation. In certain embodiments, the method is characterized in that the density of the strengthened foam formulation is at least 10% lower than the density of the reference foam formulation. In certain embodiments, the method is characterized in that the density of the strengthened foam formulation is at least 10%, at least 20%, at least 30%, at least 40%, or at least 50%, less than the density of the reference foam. In certain embodiments, the method is characterized in that the density of the strengthened foam formulation is at least 10%, at least 20%, at least 30%, at least 40%, or at least 50%, less than the density of the reference foam while the tear strength of the strengthened foam is at least equal to, at least 10% greater than, at least 20% greater than, at least 30% greater than, at least 40% greater than, at least 50% greater than, at least 75% greater than, or at least 100% greater than the tear strength of the reference foam.

In certain embodiments, a strengthened foam composition made by the preceding methods comprises a flexible polyurethane foam. In certain embodiments, a strengthened foam composition made by the preceding methods comprises a viscoelastic polyurethane foam. In certain embodiments, a strengthened foam composition made by the preceding methods comprises a rigid polyurethane foam.

In certain embodiments, a polycarbonate polyol utilized in the methods described above has a primary repeating unit having a structure:

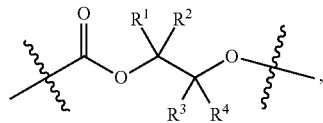

where $R^1$, $R^2$, $R^3$, and $R^4$ are, at each occurrence in the polymer chain, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of $R^1$, $R^2$, $R^3$, and $R^4$ may optionally be taken together with intervening atoms to form one or more optionally substituted rings optionally containing one or more heteroatoms.

In certain embodiments, the polycarbonate polyols utilized in the methods described above contain a primary repeating unit having a structure:

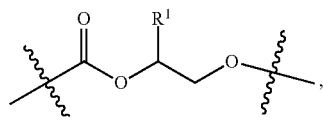

where $R^1$ is as defined above.

In certain embodiments, a polycarbonate polyol utilized in the methods described above contains a primary repeating unit having a structure:

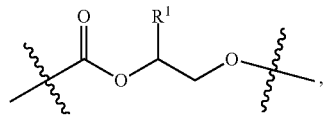

wherein $r^1$ is, at each occurrence in the polymer chain, independently —H, or —CH$_3$.

In certain embodiments, the polycarbonate polyol utilized in the methods described above is characterized in that it has a number average molecular weight (Mn) between about 500 g/mol and about 20,000 g/mol. In certain embodiments, the polycarbonate polyol is characterized in that it has an Mn between about 1,000 g/mol and about 5,000 g/mol. In certain embodiments, the polycarbonate polyol is characterized in that it has an Mn between about 1,000 g/mol and about 3,000 g/mol. In certain embodiments, the polycarbonate polyol is characterized in that it has an Mn of about 1,000 g/mol, about 1,200 g/mol, about 1,500 g/mol, about 2,000 g/mol, about 2,500 g/mol or about 3,000 g/mol.

In certain embodiments, the polycarbonate polyol utilized in the methods described above is characterized in that it has a high percentage of end groups reactive toward isocyanates. In certain embodiments, more than 98%, more than 99%, more than 99.5%, more than 99.8%, more than 99.9%, or essentially 100% of the chain ends are groups reactive toward isocyanates. In certain embodiments, the chain ends reactive toward isocyanates comprise —OH groups.

In certain embodiments, aliphatic polycarbonate polyols utilized in the methods described above are characterized in that they are substantially compatible with or soluble in the other polyols present in the polyol component of the foam formulations. Substantially compatible in this context means that the aliphatic polycarbonate can be mixed with the other polyol or polyols and provide a mixture that is homogenous or nearly homogenous. In certain embodiments, the mixture is largely homogenous at ambient temperature while in other embodiments, the mixture is homogenous at elevated temperatures (for example the mixture is homogenous at 30° C., at 40° C., at 80° C., at 100° C. or at 140° C.). In certain embodiments, the polyol component of the foam formulation containing the aliphatic polycarbonate polyol is characterized in that it is a substantially homogenous transparent mixture.

In certain embodiments, the structure of the aliphatic polycarbonate polyol used in the methods above is chosen to enhance its compatibility with other polyols in the polyol component of the foam formulation. In certain embodiments, a provided aliphatic polycarbonate polyol is characterized in that it has one or more ether linkages present in a chain transfer agent embedded within the polycarbonate chain. In certain embodiments, such ether linkages derive from the use of diethylene glycol, dipropylene glycol, triethylene glycol, tripropylene glycol, higher polyethylene glycols, higher polypropylene glycols, or polyethylene-co-propylene glycols as chain transfer agents in the preparation of the aliphatic polycarbonate polyol. In certain embodiments, such ether linkages are provided by utilizing ethoxylated or propolxylated diols, triols, or higher polyhydric alcohols having four or more —OH groups. In certain embodiments, such ether linkages are provided by utilizing isosorbide, or other carbohydrate-derived materials as chain transfer agents.

In certain embodiments, a provided aliphatic polycarbonate polyol is characterized in that it has a functional number of 2. In certain embodiments provided aliphatic polycarbonate polyols have a functional number greater than 2. In certain embodiments provided aliphatic polycarbonate polyols have a functional number between 2 and 4. In certain embodiments provided aliphatic polycarbonate polyols have a functional number between 2 and 3. In certain embodiments provided aliphatic polycarbonate polyols have a functional number between 2 and about 2.6, between 2 and about 2.5, or between 2 and about 2.4. In certain embodiments, the provided aliphatic polycarbonate polyol is characterized in that it comprises a mixture of diol (functional number 2) with a higher functional polyol (e.g. a polyol with a functional number of 3, 4, 5, or 6).

In certain embodiments, a provided aliphatic polycarbonate polyol is characterized in that it has a number average molecular weight (Mn) less than about 10,000 g/mol. In certain embodiments, a provided aliphatic polycarbonate polyol is characterized in that it has an Mn between 400 and about 10,000 g/mol. In certain embodiments, a provided aliphatic polycarbonate polyol is characterized in that it has an Mn between 400 and about 5,000 g/mol, between 500 and about 3,000 g/mol, between 700 and about 2,500 g/mol, between 1,000 and 3,000 g/mol, or between 700 and 1500 g/mol.

In certain embodiments, a provided aliphatic polycarbonate polyol is characterized in that it comprises a copolymer of carbon dioxide and one or both of ethylene oxide and propylene oxide having an Mn less than 10,000 g/mol, a functional number between 2 and 4, and having one or more ether linkages present in a chain transfer agent embedded within the polycarbonate chain. In certain embodiments, a provided polycarbonate polyol comprises comprises poly(propylene carbonate) containing an embedded chain transfer agent derived from diethylene glycol, dipropylene glycol, triethylene glycol, tripropylene glycol, higher polyethylene glycols, higher polypropylene glycols, polyethylene-co-propylene glycols, or alkoxylated polyhydric alcohols, characterized in that it has an Mn less than 5,000 g/mol, and a functional number between 2 and 3. In certain embodiments, a provided polycarbonate polyol comprises poly(propylene carbonate) containing an embedded chain transfer agent derived from diethylene glycol, dipropylene glycol, triethylene glycol, tripropylene glycol, higher polyethylene glycols, higher polypropylene glycols, polyethylene-co-propylene glycols, or alkoxylated polyhydric alcohols, characterized in that it has an Mn less than 3,000 g/mol, and a functional number between 2 and 2.5. In certain embodiments, a provided polycarbonate polyol comprises comprises poly(propylene carbonate) containing an embedded chain transfer agent derived from diethylene glycol, dipropylene glycol, triethylene glycol, tripropylene glycol, higher polyethylene glycols, higher polypropylene glycols, polyethylene-co-propylene glycols, or alkoxylated polyhydric alcohols, characterized in that it has an Mn between 500 and 2,500 g/mol, and a functional number between 2 and 2.5.

In certain embodiments, a provided polycarbonate polyol comprises poly(ethylene carbonate) containing an embedded chain transfer agent derived from diethylene glycol, dipropylene glycol, triethylene glycol, tripropylene glycol, higher polyethylene glycols, higher polypropylene glycols, polyethylene-co-propylene glycols, or alkoxylated polyhydric alcohols, characterized in that it has an Mn less than 5,000 g/mol, and a functional number between 2 and 3. In certain embodiments, a provided polycarbonate polyol comprises poly(ethylene carbonate) containing an embedded chain transfer agent derived from diethylene glycol, dipropylene glycol, triethylene glycol, tripropylene glycol, higher polyethylene glycols, higher polypropylene glycols, polyethylene-co-propylene glycols, or alkoxylated polyhydric alcohols, characterized in that it has an Mn less than 3,000 g/mol, and a functional number between 2 and 2.5. In certain embodiments, a provided polycarbonate polyol comprises poly(ethylene carbonate) containing an embedded chain transfer agent derived from diethylene glycol, dipropylene glycol, triethylene glycol, tripropylene glycol, higher polyethylene glycols, higher polypropylene glycols, polyethylene-co-propylene glycols, or alkoxylated polyhydric alcohols, characterized in that it has an Mn between 500 and 2,500 g/mol, and a functional number between 2 and 2.5.In certain embodiments, a provided polycarbonate polyol comprises poly(ethylene-co-propylene carbonate) containing an embedded chain transfer agent derived from diethylene glycol, dipropylene glycol, triethylene glycol, tripropylene glycol, higher polyethylene glycols, higher polypropylene glycols, polyethylene-co-propylene glycols, or alkoxylated polyhydric alcohols, characterized in that it has an Mn less than 5,000 g/mol, and a functional number between 2 and 3. In certain embodiments, a provided polycarbonate polyol comprises poly(ethylene-co-propylene carbonate) containing an embedded chain transfer agent derived from diethylene glycol, dipropylene glycol, triethylene glycol, tripropylene glycol, higher polyethylene glycols, higher polypropylene glycols, polyethylene-co-propylene glycols, or alkoxylated polyhydric alcohols, characterized in that it has an Mn less than 3,000 g/mol, and a functional number between 2 and 2.5. In certain embodiments, a provided polycarbonate polyol comprises poly(ethylene-co-propylene carbonate) containing an embedded chain transfer agent derived from diethylene glycol, dipropylene glycol, triethylene glycol, tripropylene glycol, higher polyethylene glycols, higher polypropylene glycols, polyethylene-co-propylene glycols, or alkoxylated polyhydric alcohols, characterized in that it has an Mn between 500 and 2,500 g/mol, and a functional number between 2 and 2.5.

The structures and properties of additional aliphatic polycarbonate polyols that have utility for methods of the present invention are described in Appendix A at the end of this spefication entitled "Aliphatic Polycarbonate Polyols". In certain embodiments, the present invention encompasses any of the methods described above, wherein the added polycarbonate polyol is selected from any one or more of those described in Appendix A.

In certain embodiments, methods of the present invention comprise the additional step of reacting any of the B-side mixtures containing aliphatic polycarbonate polyols described above with an A-side formulation comprising one or more polyisocyanates.

The art of polyurethane synthesis is well advanced and a very large number of isocyanates and related polyurethane precursors are known in the art and available commercially. It is to be understood that it is within the capabilities of one skilled in the art of polyurethane formulation to use such isocyanates along with the teachings of this disclosure to practice methods within the scope of the present invention. Descriptions of suitable isocyanate compounds and related methods can be found in: Chemistry and Technology of Polyols for Polyurethanes Ionescu, Mihail 2005 (ISBN 978-1-84735-035-0), and H. Ulrich, "Urethane Polymers," Kirk-Othmer Encyclopedia of Chemical Technology, 1997 the entirety of each of which is incorporated herein by reference.In certain embodiments, the A-side formulations contain one or more of the isocyanate reagents described in Appendix B entitled Isocyanate Reagents appearing at the end of this specification.

As an alternative to the methods above, another strategy encompassed by the present invention involves incorporating aliphatic polycarbonate polyols into a foam formulation by incorporating them not in the B-side polyol mixture, but as part of the A-side isocyanate component of the foam. This strategy can yield the same strength enhancing advantages described hereinabove. This variation of the invention can be accomplished by utilizing known methods to manufacture isocyanate terminated prepolymers from the epoxide $CO_2$ copolymeric polyols and adding these isocyanate-terminated materials to the A-side component of the foam formulation in place of a portion of the polyisocyanate used in a non-strengthened reference formulation. Methods of converting polyols to isocyanate-terminated prepolymers by reacting the polyol with a molar excess of a diisocyanate are well known in the art.

In certain embodiments, methods of the present invention include the step of providing in the polyisocyanate component of a polyurethane foam composition, a strength enhancing additive comprising an isocyanate-terminated aliphatic polycarbonate polyol derived from the copolymerization of $CO_2$ and one or more epoxides. Therefore, the invention encompasses all of the variations and embodiments described above for the production of high strength polyurethane foam compositions, but modified in that the step of strengthening the foam comprises the sub-steps of:
a) reacting a polycarbonate polyol comprising a copolymer of $CO_2$ and one or more epoxides with an excess of a polyisocyanate (or a reactive equivalent thereof), to provide an isocyanate terminated polycarbonate polyol, and
b) adding the isocyanate terminated polycarbonate polyol to the isocyanate component of a foam composition.

Further variations of the methods described above including the additional steps necessary to formulate a finished foam will be readily apparent to the skilled artisan. Therefore, while the present specification does not describe them, methods including additional steps typical of foam formulation are specifically encompassed by the present invention. Such additional steps may include, but are not limited to:
 addition of additional components to the A- and/or B-side formulations (e.g. catalysts, blowing agents, pigments, stabilizers, flame retardants, cell openers, surfactants, reactive diluents, antimicrobials, and the like);
 heating, cooling, mixing or combining the A-side and B-side components; and
 molding, extruding, blowing, spraying, heating, curing, aging, or otherwise treating the foam formulation;

II. High Strength Polyurethane Foam Compositions

In another aspect, the present invention encompasses high strength polyurethane foam compositions. In certain embodiments, the inventive compositions possess unexpected combinations of characteristics including enhanced strength at a given density, or higher compression force deflection in combination with good comfort characteristics. These foam compositions satisfy and an unmet need in the foam industry and it is anticipated that the compositions will have great value in applications where high strength or good wearing properties must currently be weighed against a desire for low density or low cost foams.

In certain embodiments, the present invention provides a polyurethane foam composition comprising the reaction product of a polyol component and a polyisocyanate component, where the polyol component comprises a polycarbonate polyol derived from the copolymerization of one or more epoxides and carbon dioxide. In certain embodiments, the polycarbonate polyol is present in a quantity from about 1 weight percent to about 50 weight percent of all polyols present in the polyol component. In certain embodiments, the foam compositions are characterized in that their load bearing properties are higher than corresponding foams formulated without the polycarbonate polyol.

In certain embodiments, foam compositions of the present invention comprise the reaction product of a polyol component and a polyisocyanate component, where the polyol component contains a polycarbonate polyol derived from the copolymerization of one or more epoxides and carbon dioxide. In certain embodiments, the polycarbonate polyol is present in a quantity from about 1 weight percent to about 50 weight percent of all polyols present in the polyol component of the foam formulation. In certain embodiments, the polycarbonate polyol is present in a quantity from about 2 weight percent to about 50 weight percent of all polyols present in the polyol component of the foam formulation. In certain embodiments, the polycarbonate polyol is present in a quantity from about 5 weight percent, to about 25 weight percent of all polyol present in the polyol component. In certain embodiments, the polycarbonate polyol is present in a quantity from about 1 weight percent to about 2 weight percent of all polyol present in the polyol component. In certain embodiments, the polycarbonate polyol is present in a quantity from about 2 weight percent to about 5 weight percent of all polyol present in the polyol component. In certain embodiments, the polycarbonate polyol is present in a quantity from about 2 weight percent to about 10 weight percent of all polyol present in the polyol component. In certain embodiments, the polycarbonate polyol is present in a quantity from about 5 weight percent to about 10 weight percent of all polyol present in the polyol component. In certain embodiments, the polycarbonate polyol is present in a quantity from about 10 weight percent, to about 20 weight percent of all polyol present in the polyol component. In certain embodiments, the polycarbonate polyol is present in a quantity from about 20 weight percent, to about 30 weight percent of all polyol present in the polyol component. In certain embodiments, the polycarbonate polyol is present in a quantity from about 30 weight percent, to about 50 weight percent of all polyol present in the polyol component. In certain embodiments, the polycarbonate polyol is present in a quantity of about 1 weight percent of all polyol present in the polyol component. In certain embodiments, the polycarbonate polyol is present in a quantity of about 1 weight percent of all polyol present in the polyol component. In certain embodiments, the polycarbonate polyol is present in a quantity of about 2 weight percent of all polyol present in the polyol component. In certain embodiments, the polycarbonate polyol is present in a quantity of about 3weight percent of all polyol present in the polyol component. In certain embodiments, the polycarbonate polyol is present in a quantity of about 5 weight percent of all polyol present in the polyol component. In certain embodiments, the polycarbonate polyol is present in a quantity of about 10 weight percent of all polyol present in the polyol component. In certain embodiments, the polycarbonate polyol is present in a quantity of about 15 weight percent of all polyol present in the polyol component. In certain embodiments, the polycarbonate polyol is present in a quantity of about 20 weight percent of all polyol present in the polyol component. In certain embodiments, the polycarbonate polyol is present in a quantity of about 25 weight percent of all polyol present in the polyol component. In certain embodiments, the polycarbonate polyol is present in a quantity of about 30 weight percent of all polyol present in the polyol component. In certain embodiments, the polycarbonate polyol is present in a quantity of about 40 weight percent of all polyol present in the polyol component. In certain embodiments, the polycarbonate polyol is present in a quantity of about 50 weight percent of all polyol present in the polyol component.

In certain embodiments, the other polyols present in the polyol component (i.e. the polyols other than the polycarbonate polyol derived from the copolymerization of one or more epoxides and carbon dioxide) are selected from the group consisting of: polyether polyols, polyester polyols, polybutadiene polyols, polysulfide polyols, natural oil polyols, fluorinated polyols, aliphatic polyols, polycarbonate polyols other than those derived from epoxide-$CO_2$ copolymerization, and mixtures of any two or more these. In certain embodiments, between about 50 percent and about 99 percent of the total weight of polyol present in the polyol component (i.e. exclusive of any other non-polyol components that may be present in a B-side composition for foams such as catalysts, cell openers, blowing agents, stabilizers, diluents and the like) comprises one or more polyols selected from the group consisting of polyether polyols, polyester polyols, polybutadiene polyols, polysulfide polyols, natural oil polyols, fluorinated polyols, aliphatic polyols, polycarbonate polyols other than those derived from epoxide-$CO_2$ copolymerization and mixtures of any two or more these. In certain embodiments, the other polyol present in the polyol component substantially comprises polyether polyol. In certain embodiments, the other polyol present in the polyol component substantially comprises polyester polyol. In certain embodiments, the other polyols present in the polyol component substantially comprise a mixture of polyether and polyester polyols.

In certain embodiments, a high strength foam composition of the present invention comprises a polyol having a primary repeating unit having a structure:

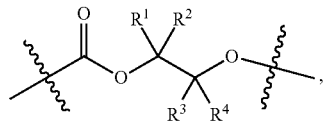

where $R^1$, $R^2$, $R^3$, and $R^4$ are, at each occurrence in the polymer chain, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of $R^1$, $R^2$, $R^3$, and $R^4$ may optionally be taken together with intervening atoms to form one or more optionally substituted rings optionally containing one or more heteroatoms.

In certain embodiments, a high strength foam composition of the present invention comprises a polyol having a primary repeating unit having a structure:

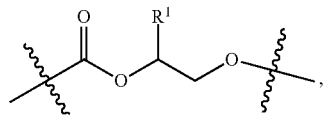

where le is as defined above.

In certain embodiments, a high strength foam composition of the present invention comprises a polyol having a primary repeating unit having a structure:

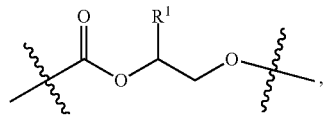

wherein $R^1$ is, at each occurrence in the polymer chain, independently —H, or —$CH_3$.

In certain embodiments, the high strength foam compositions described above are characterized in that the polycarbonate polyol derived from the copolymerization of one or more epoxides and carbon dioxide has a number average molecular weight (Mn) between about 500 g/mol and about 20,000 g/mol. In certain embodiments, the polycarbonate polyol has an Mn between about 1,000 g/mol and about 5,000 g/mol. In certain embodiments, the polycarbonate polyol has an Mn between about 1,000 g/mol and about 3,000 g/mol. In certain embodiments, the polycarbonate polyol has an Mn of about 1,000 g/mol, about 1,200 g/mol, about 1,500 g/mol, about 2,000 g/mol, about 2,500 g/mol or about 3,000 g/mol.

In certain embodiments, the high strength foam compositions described above are characterized in that the polycarbonate polyol incorporated as an additive has a high percentage of end groups reactive toward isocyanates. In certain embodiments, more than 98%, more than 99%, more than 99.5%, more than 99.8%, more than 99.9%, or essentially 100% of the polycarbonate polyol chain ends are groups reactive toward isocyanates. In certain embodiments, the chain ends reactive toward isocyanates comprise —OH groups.

In certain embodiments, the high strength foam compositions described above are characterized in that the polycarbonate polyols incorporated as additives are substantially compatible with or soluble in other polyols present in the polyol component of the foam formulations. Substantially compatible in this context means that the aliphatic polycarbonate can be mixed with the other polyol or polyols and provide a mixture that is homogenous or nearly homogenous. In certain embodiments, the mixture is largely homogenous at ambient temperature while in other embodiments, the mixture is homogenous at elevated temperatures (for example the mixture is homogenous at 30° C., at 40° C., at 80° C., at 100° C. or at 140° C.). In certain embodiments, the polyol component of the foam formulation containing the aliphatic polycarbonate polyol is a substantially homogenous transparent mixture.

In certain embodiments, the high strength foam compositions of the present invention are characterized in that the structure of the aliphatic polycarbonate polyol incorporated is chosen to enhance its compatibility with other polyols in the polyol component of the foam formulation. In certain embodiments, the aliphatic polycarbonate polyol is characterized in that it has one or more ether linkages present in a chain transfer agent embedded within the polycarbonate chain. In certain embodiments, such ether linkages derive from the use of diethylene glycol, dipropylene glycol, triethylene glycol, tripropylene glycol, higher polyethylene glycols, higher polypropylene glycols, or polyethylene-co-propylene glycols as chain transfer agents in the preparation of the aliphatic polycarbonate polyol. In certain embodiments, such ether linkages are provided by utilizing ethoxylated or propolxylated diols, triols, or higher polyhydric alcohols having four or more —OH groups. In certain embodiments, such ether linkages are provided by utilizing isosorbide, or other carbohydrate-derived materials as chain transfer agents.

In certain embodiments, the high strength foam compositions of the present invention are characterized in that the aliphatic polycarbonate polyol used in the compositions has a functional number of 2 or about 2. In certain embodiments the aliphatic polycarbonate polyols have a functional number greater than 2. In certain embodiments the aliphatic polycarbonate polyols have a functional number between 2 and 4. In certain embodiments the aliphatic polycarbonate polyols have a functional number between 2 and 3. In certain embodiments the aliphatic polycarbonate polyols have a functional number between 2 and about 2.6, between 2 and about 2.5, or between 2 and about 2.4. In certain embodiments, the aliphatic polycarbonate polyol is characterized in that it comprises a mixture of diol (functional number 2) with one or more higher functional polyols (e.g. a polyol with a functional number of 3, 4, 5, or 6).

In certain embodiments, the high strength foam compositions of the present invention are characterized in that they incorporate an aliphatic polycarbonate polyol having a number average molecular weight (Mn) less than about 10,000 g/mol. In certain embodiments, the incorporated aliphatic polycarbonate polyols have Mn between 400 and about 10,000 g/mol. In certain embodiments, the incorporated aliphatic polycarbonate polyols are characterized in that they have an Mn between 400 and about 5,000 g/mol, between 500 and about 3,000 g/mol, between 700 and about 2,500 g/mol, between 1,000 and 3,000 g/mol, or between 700 and 1500 g/mol.

In certain embodiments, the high strength foam compositions of the present invention are characterized in that they incorporate a copolymer of carbon dioxide and one or both of ethylene oxide and propylene oxide having an Mn less than 10,000 g/mol, a functional number between 2 and 4, and having one or more ether linkages present in a chain transfer agent embedded within the polycarbonate chain. In certain embodiments, the incorporated polycarbonate polyol comprises comprises poly(propylene carbonate) containing an embedded chain transfer agent derived from diethylene glycol, dipropylene glycol, triethylene glycol, tripropylene glycol, higher polyethylene glycols, higher polypropylene glycols, polyethylene-co-propylene glycols, or alkoxylated polyhydric alcohols, characterized in that it has an Mn less than 5,000 g/mol, and a functional number between 2 and 3. In certain embodiments, the incorporated polycarbonate polyol comprises poly(propylene carbonate) containing an embedded chain transfer agent derived from diethylene glycol, dipropylene glycol, triethylene glycol, tripropylene glycol, higher polyethylene glycols, higher polypropylene glycols, polyethylene-co-propylene glycols, or alkoxylated polyhydric alcohols, characterized in that it has an Mn less than 3,000 g/mol, and a functional number between 2 and 2.5. In certain embodiments, the incorporated polycarbonate polyol comprises poly(propylene carbonate) containing an embedded chain transfer agent derived from diethylene glycol, dipropylene glycol, triethylene glycol, tripropylene glycol, higher polyethylene glycols, higher polypropylene glycols, polyethylene-co-propylene glycols, or alkoxylated polyhydric alcohols, characterized in that it has an Mn between 500 and 2,500 g/mol, and a functional number between 2 and 2.5.

In certain embodiments, the incorporated polycarbonate polyol comprises poly(ethylene carbonate) containing an embedded chain transfer agent derived from diethylene glycol, dipropylene glycol, triethylene glycol, tripropylene glycol, higher polyethylene glycols, higher polypropylene glycols, polyethylene-co-propylene glycols, or alkoxylated polyhydric alcohols, characterized in that it has an Mn less than 5,000 g/mol, and a functional number between 2 and 3. In certain embodiments, the incorporated polycarbonate polyol comprises comprises poly(ethylene carbonate) containing an embedded chain transfer agent derived from diethylene glycol, dipropylene glycol, triethylene glycol, tripropylene glycol, higher polyethylene glycols, higher polypropylene glycols, polyethylene-co-propylene glycols, or alkoxylated polyhydric alcohols, characterized in that it has an Mn less than 3,000 g/mol, and a functional number between 2 and 2.5. In certain embodiments, the incorporated polycarbonate polyol comprises poly(ethylene carbonate) containing an embedded chain transfer agent derived from diethylene glycol, dipropylene glycol, triethylene glycol, tripropylene glycol, higher polyethylene glycols, higher polypropylene glycols, polyethylene-co-propylene glycols, or alkoxylated polyhydric alcohols, characterized in that it has an Mn between 500 and 2,500 g/mol, and a functional number between 2 and 2.5.

In certain embodiments, a provided polycarbonate polyol comprises poly(ethylene-co-propylene carbonate) containing an embedded chain transfer agent derived from diethylene glycol, dipropylene glycol, triethylene glycol, tripropylene glycol, higher polyethylene glycols, higher polypropylene glycols, polyethylene-co-propylene glycols, or alkoxylated polyhydric alcohols, characterized in that it has an Mn less than 5,000 g/mol, and a functional number between 2 and 3. In certain embodiments, the incorporated polycarbonate polyol comprises poly(ethylene-co-propylene carbonate) containing an embedded chain transfer agent derived from diethylene glycol, dipropylene glycol, triethylene glycol, tripropylene glycol, higher polyethylene glycols, higher polypropylene glycols, polyethylene-co-propylene glycols, or alkoxylated polyhydric alcohols, characterized in that it has an Mn less than 3,000 g/mol, and a functional number between 2 and 2.5. In certain embodiments, the incorporated polycarbonate polyol comprises poly(ethylene-co-propylene carbonate) containing an embedded chain transfer agent derived from diethylene glycol, dipropylene glycol, triethylene glycol, tripropylene glycol, higher polyethylene glycols, higher polypropylene glycols, polyethylene-co-propylene glycols, or alkoxylated polyhydric alcohols, characterized in that it has an Mn between 500 and 2,500 g/mol, and a functional number between 2 and 2.5.

The structures and properties of aliphatic polycarbonate polyols that may be incorporated in the high strength foam compositions of the present invention are more fully described in Appendix A at the end of this spefication entitled "Aliphatic Polycarbonate Polyols". In certain embodiments, the present invention encompasses any of the foam formulations described above, wherein the polycarbonate polyol used in their formulation is selected from any one or more of those described in Appendix A.

High strength foam compositions of the present invention comprise the reaction product of any of the B-side mixtures containing aliphatic polycarbonate polyols described above with an A-side formulation comprising one or more polyisocyanates. In certain embodiments, the high strength foam compositions of the present invention comprise MDI-based polyurethane foams. In certain embodiments, the high strength foam compositions of the present invention comprise TDI-based polyurethane foams.

The art of polyurethane synthesis is well advanced and a very large number of isocyanates and related polyurethane precursors are known in the art and available commercially. It is to be understood that it is within the capabilities of one skilled in the art of polyurethane formulation to select and use such isocyanates along with the teachings of this disclosure to produce high strength foams within the scope of the present invention. Descriptions of suitable isocyanate compounds and analogs can be found in: Chemistry and Technology of Polyols for Polyurethanes Ionescu, Mihail 2005 (ISBN 978-1-84735-035-0), and H. Ulrich, "Urethane Polymers," Kirk-Othmer Encyclopedia of Chemical Technology, 1997 the entirety of each of which is incorporated herein by reference. In certain embodiments, the inventive foams comprise the reaction product of any of the polyol formulations described above with A-side formulations containing one or more of the isocyanate reagents described in Appendix B entitled Isocyanate Reagents appearing at the end of this specification.

In certain embodiments, a high strength foam composition of the present invention comprises a flexible polyurethane foam. In certain embodiments, a high strength foam composition of the present invention comprises a viscoelastic polyurethane foam. In certain embodiments, a high strength foam composition of the present invention comprises a rigid polyurethane foam.

In certain embodiments, the inventive high strength foams described above comprise flexible foam compositions. In certain embodiments, the inventive high strength foams described above high resilience flexible foam compositions. In certain embodiments, the present invention provides articles manufactured from such flexible foam compositions. Such articles include, but are not limited to: slabstock foams, seating cushions for residential and office use, mattresses, personal protective gear, athletic equipment, office furniture, transportation seating, automotive interior components and surfaces such as dash boards, door panels, headliners and the like.

A. Flexible Foam Compositions

In certain embodiments, compositions of the present invention comprise high strength flexible polyurethane foam compositions derived from a B-side composition comprising a polyether polyol in combination with a polycarbonate polyol derived from the copolymerization of one or more epoxides and carbon dioxide. In certain embodiments the polycarbonate polyol is present in such a quantity that the final B-side composition contains from about 1 part to about 100 parts by weight of polycarbonate polyol based on 100 parts of polyether polyol. In certain embodiments, the polycarbonate polyol is present in such a quantity that the polycarbonate polyol comprises about 5 parts, about 10 parts, about 20 parts, about 30 parts, about 40 parts, about 60 parts, about 80 parts, or about 100 parts, based on 100 parts of polyether polyol in the resulting B-side formulation. In certain embodiments, the aliphatic polycarbonate polyol comprises poly(propylene carbonate). In certain embodiments, the aliphatic polycarbonate polyol present comprises poly(ethylene carbonate). In certain embodiments, the aliphatic polycarbonate polyol present comprises poly(ethylene-co-propylene carbonate).

In certain embodiments, high strength flexible foam compositions of the present invention are characterized in that foams have higher strength than corresponding foams formulated without the polycarbonate polyol. In certain embodiments, the inventive foams are characterized in that one or more properties selected from the group consisting of: Tensile Strength at Break (as measured by ASTM D3574-08 Test E); Tear Strength (as measured by ASTM D3574-08 Test F); Compression Force Deflection (CFD) (as measured by ASTM D3574-08 Test C); and Tensile strength and Elongation after Dry Heat Aging for 22 hours at 140° C. (as measured by ASTM D3574-08Test K) are enhanced relative to those of a corresponding reference foam formulated without the polycarbonate polyol additive.

In certain embodiments, the present invention provides high strength flexible polyurethane foam compositions (denoted the strengthened foam formulation) comprising a polycarbonate polyol derived from the copolymerization of one or more epoxides and carbon dioxide and characterized in that the load bearing capacity of the strengthened foam as indicated by its compression force deflection (CFD) value measured using ASTM D3574-08 Test C, is greater than the CFD value of the corresponding foam composition formulated without the added polycarbonate polyol (denoted the reference foam formulation). In certain embodiments, the aliphatic polycarbonate polyol is present in the B-side formulation in place of a portion of one or more polyols in the reference. Preferably, this is achieved such that the —OH number of the B-side formulation for the strengthened foam is substantially the same as that of the B-side formulation of the reference foam formulation. In certain embodiments, the inventive high strength foam is characterized in that the CFD value of the strengthened foam is at least 10% greater than the CFD value of the reference foam formulation. In certain embodiments, the high strength foam is characterized in that the CFD value of the strengthened foam is at least 10% greater, at least 20% greater, at least 30% greater, at least 40% greater, at least 50% greater, or at least 100% greater than the CFD value of the reference foam. In certain embodiments, the CFD values of the strengthened foam and the reference foam are normalized for the density of the foam prior to comparing them. In certain embodiments foam compositions of the present invention are characterized in that they have substantially the same density as the reference foam composition to which they are compared.

In certain embodiments, the present invention provides high strength flexible polyurethane foam compositions (denoted the strengthened foam formulation) containing an additive comprising a polycarbonate polyol derived from the copolymerization of one or more epoxides and carbon dioxide and characterized in that the strengthened foam formulation has a lower density than the corresponding foam composition formulated without the additive (denoted the reference foam formulation) further characterized in that the load bearing properties (CFD) of the strengthened foam as determined by ASTM D3574-08 Test C, are equal to or greater than those of the reference foam. In certain embodiments, the composition is characterized in that the additive is provided in the B-side formulation from which the foam is produced by substituting a portion of one or more polyols in the reference formulation such that the —OH number of the B-side formulation for the strengthened foam is substantially the same as that of the B-side formulation of the reference foam formulation. In certain embodiments, the inventive polyurethane foam composition is characterized in that the density of the strengthened foam formulation is at least 10% lower than the density of the reference foam formulation. In certain embodiments, the inventive strength polyurethane foam composition is characterized in that the density of the strengthened foam formulation is at least 10%, at least 20%, at least 30%, at least 40%, or at least 50%, less than the density of the reference foam. In certain embodiments, the inventive foam composition is characterized in that its density is at least 10%, at least 20%, at least 30%, at least 40%, or at least 50%, less than the density of the reference foam while the CFD of the strengthened foam is at least equal to, at least 10% greater than, at least 20% greater than, at least 30% greater than, at least 40% greater than, at least 50% greater than, at least 75% greater than, or at least 100% greater than the CFD of the reference foam.

In certain embodiments, the present invention provides high strength flexible TDI-based polyurethane foam compositions having the combination of a density of less than about 2.6 pounds/cubic foot (pcf) and a CFD as measured by ASTM D3574-08 Test C of at least 0.4 psi at 25% deflection. In certain embodiments, the method is characterized in that the CFD value is at least 0.45 psi at 25% deflection, at least 0.5 psi at 25% deflection, or at least 0.52 psi at 25% deflection. In certain embodiments, the high strength flexible TDI-based polyurethane foam is characterized in that the CFD value of the foam measured by ASTM D3574-08 Test C is at least 0.5 psi at 50% deflection. In certain embodiments, high strength flexible TDI-based polyurethane foam is characterized in that the CFD value of the strengthened foam measured by ASTM D3574-08 Test C is at least 0.55 psi at 50% deflection, at least 0.60 psi at 50% deflection, at least 0.65 psi at 50% deflection, at least 0.7 psi at 50% deflection, or at least 0.75 psi at 50% deflection. In certain embodiments, the high strength flexible TDI-based polyurethane foam is characterized in that the CFD value of the foam measured by ASTM D3574-08 Test C is at least 0.7 psi at 65% deflection. In certain embodiments, high strength flexible TDI-based polyurethane foam is characterized in that the CFD value of the strengthened foam measured by ASTM D3574-08 Test C is at least 0.75 psi at 65% deflection, at least 0.80 psi at 65% deflection, at least 0.85 psi at 65% deflection, at least 0.9 psi at 65% deflection, or at least 1 psi at 65% deflection. In certain embodiments, the CFD values above are for a foam composition having a density of between about 2 and 2.6 pcf. In certain embodiments, the high strength flexible TDI-based polyurethane foam has a density of between about 2.2 and 2.6 pcf, or a density of about 2.4 pcf. In certain embodiments, the high strength flexible TDI-based polyurethane foam has a density between about 2 and 2.6 pcf and is further characterized in that it contains less than 10% filled polyol, less than 5% filled polyol, less than 3% filled polyol, less than 2% filled polyol, less than 1% filled polyol, or characterized in that it is substantially free of filled polyol. In certain embodiments, the foam formulations above are characterized in that they have comfort properties suitable for use in seating foams.

In certain embodiments, the present invention provides high strength flexible TDI-based polyurethane foam compositions having the combination of a density of less than about 4 pcf and a CFD as measured by ASTM D3574-08 Test C of at least 0.8 psi at 25% deflection. In certain embodiments, the method is characterized in that the CFD value of the strengthened foam formulation is at least 0.85 psi at 25% deflection, at least 0.9 psi at 25% deflection, at least 0.95 psi at 25% deflection, or at least 1 psi at 25% deflection. In certain embodiments, the method is characterized in that the CFD value of the strengthened foam with a density of less than about 4 pcf as measured by ASTM D3574-08 Test C is at least 1 psi at 50% deflection. In certain embodiments, the high strength foam composition is characterized in that its CFD value is at least 1.1 psi at 50% deflection, at least 1.15 psi at 50% deflection, at least 1.2 psi at 50% deflection, at least 1.3 psi at 50% deflection, or at least 1.4 psi at 50% deflection.

In certain embodiments, the high strength TDI-based foam composition is characterized in that the foam has a combination of a density of less than about 4 pcf and a CFD as measured by ASTM D3574-08 Test C of at least 1.4 psi at 65% deflection. In certain embodiments, the high strength foam composition is characterized in that the CFD value of the foam is at least 1.5 psi at 65% deflection, at least 1.6 psi at 65% deflection, at least 1.7 psi at 65% deflection, at least 1.8 psi at 65% deflection, at least 1.9 psi at 65% deflection, or at least 2 psi at 65% deflection. In certain embodiments, the high strength TDI-based foam composition has a density of between about 3.2 and 3.8 pcf. In certain embodiments, the high strength TDI-based foam composition has a density of between about 3.3 and 3.7 pcf, or a density of about 3.5 pcf. In certain embodiments, the high strength TDI-based foam composition has a density between about 3.2 and 3.8 pcf and is further characterized in that it contains less than 10% filled polyol, less than 5% filled polyol, less than 3% filled polyol, less than 2% filled polyol, less than 1% filled polyol, or characterized in that it is substantially free of filled polyol. In certain embodiments, the foam formulations above are characterized in that they have comfort properties suitable for use in seating foams.

In certain embodiments, the present invention provides high strength flexible MDI-based polyurethane foam compositions having the combination of a density of less than about 2.5 pounds/cubic foot (pcf) and a CFD as measured by ASTM D3574-08 Test C of at least 0.35 psi at 25% deflection. In certain embodiments, the method is characterized in that the CFD value is at least 0.4 psi at 25% deflection, at least 0.45 psi at 25% deflection, or at least 0.5 psi at 25% deflection. In certain embodiments, the high strength flexible MDI-based polyurethane foam is characterized in that the CFD value of the foam measured by ASTM D3574-08 Test C is at least 0.4 psi at 50% deflection. In certain embodiments, high strength flexible MDI-based polyurethane foam is characterized in that the CFD value of the strengthened foam measured by ASTM D3574-08 Test C is at least 0.45 psi at 50% deflection, at least 0.50 psi at 50% deflection, at least 0.55 psi at 50% deflection, at least 0.6 psi at 50% deflection, or at least 0.65 psi at 50% deflection. In certain embodiments, the high strength flexible MDI-based polyurethane foam is characterized in that the CFD value of the foam measured by ASTM D3574-08 Test C is at least 0.7 psi at 65% deflection. In certain embodiments, high strength flexible MDI-based polyurethane foam is characterized in that the CFD value of the strengthened foam measured by ASTM D3574-08 Test C is at least 0.75 psi at 65% deflection, at least 0.80 psi at 65% deflection, at least 0.85 psi at 65% deflection, at least 0.9 psi at 65% deflection, or at least 1 psi at 65% deflection. In certain embodiments, the high strength MDI-based foams have a density of between about 2 and 2.6 pcf. In certain embodiments the high strength MDI-based foams have a density of between about 2.2 and 2.6 pcf, or a density of about 2.4 pcf. In certain embodiments, the high strength MDI-based foams have a density between about 2 and 2.6 pcf and are further characterized in that they contain less than 10% filled polyol, less than 5% filled polyol, less than 3% filled polyol, less than 2% filled polyol, less than 1% filled polyol, or are characterized in that they are substantially free of filled polyol. In certain embodiments, the foam formulations above are characterized in that they have comfort properties suitable for use in seating foams.

In certain embodiments, the present invention provides high strength flexible MDI-based polyurethane foam compositions having the combination of a density of less than about 4 pcf and a CFD as measured by ASTM D3574-08 Test C of at least 0.8 psi at 25% deflection. In certain embodiments, the method is characterized in that the CFD value of the strengthened foam formulation is at least 0.85 psi at 25% deflection, at least 0.9 psi at 25% deflection, at least 0.95 psi at 25% deflection, or at least 1 psi at 25% deflection. In certain embodiments, the method is characterized in that the CFD value of the strengthened foam with a density of less than about 4 pcf as measured by ASTM D3574-08 Test C is at least 1 psi at 50% deflection. In certain embodiments, the high strength foam composition is characterized in that its CFD value is at least 1.1 psi at 50% deflection, at least 1.2 psi at 50% deflection, at least 1.4 psi at 50% deflection, at least 1.5 psi at 50% deflection, or at least 1.8 psi at 50% deflection.

In certain embodiments, the high strength MDI-based foam composition is characterized in that the foam has a combination of a density of less than about 4 pcf and a CFD as measured by ASTM D3574-08 Test C of at least 1.4 psi at 65% deflection. In certain embodiments, the high strength foam composition is characterized in that the CFD value of the foam is at least 1.5 psi at 65% deflection, at least 1.6 psi at 65% deflection, at least 1.7 psi at 65% deflection, at least 1.8 psi at 65% deflection, at least 1.9 psi at 65% deflection, at least 2 psi at 65% deflection, or at least 3 psi at 65% deflection. In certain embodiments, the high strength MDI-based foam composition has a density of between about 3.2 and 3.8 pcf. In certain embodiments, the high strength MDI-based foam composition has a density of between about 3.3 and 3.7 pcf, or a density of about 3.5 pcf. In certain embodiments, the high strength MDI-based foam composition has a density between about 3.2 and 3.8 pcf and is further characterized in that it contains less than 10% filled polyol, less than 5% filled polyol, less than 3% filled polyol, less than 2% filled polyol, less than 1% filled polyol, or characterized in that it is substantially free of filled polyol. In certain embodiments, the foam formulations above are characterized in that they have comfort properties suitable for use in seating foams.

In certain embodiments, the present invention provides high strength flexible polyurethane foam compositions (denoted the strengthened foam formulation) containing an additive comprising a polycarbonate polyol derived from the copolymerization of one or more epoxides and carbon dioxide, and characterized in that the tensile strength of the strengthened foam as measured by ASTM D 3574-08 Test E, is greater than the tensile strength of a corresponding foam composition formulated without the added polycarbonate polyol (denoted the reference foam formulation). In certain embodiments, the aliphatic polycarbonate polyol is present in the B-side formulation in place of a portion of one or more polyols in the reference. Preferably, this is achieved such that the —OH number of the B-side formulation for the strengthened foam is substantially the same as that of the B-side formulation of the reference foam formulation. In certain embodiments, the inventive high strength foam is characterized in that the tensile strength of the strengthened foam is at least 10% greater than the tensile strength of the reference foam formulation. In certain embodiments, the high strength foam is characterized in that the tensile strength of the strengthened foam is at least 10% greater, at least 20% greater, at least 30% greater, at least 40% greater, at least 50% greater, or at least 100% greater than the tensile strength of the reference foam. In certain embodiments, the tensile strengths of the strengthened foam and the reference foam are normalized for the density of the foam prior to comparing them. In certain embodiments foam compositions of the present invention are characterized in that they have substantially the same density as the reference foam composition to which they are compared.

In certain embodiments, the present invention provides high strength flexible polyurethane foam compositions containing an additive comprising a polycarbonate polyol derived from the copolymerization of one or more epoxides and carbon dioxide. In certain embodiments, the inventive foam compositions are characterized in that they have a lower density than a corresponding foam composition formulated without the polycarbonate polyol additive (denoted the reference foam formulation) and further characterized in that the tensile strength of the strengthened foam as determined by ASTM D3574-08 Test E is equal to or greater than that of the reference foam. In certain embodiments, the composition is characterized in that the additive is provided in the B-side formulation from which the foam is produced by substituting a portion of one or more polyols in the reference formulation such that the —OH number of the B-side formulation for the strengthened foam is substantially the same as that of the B-side formulation of the reference foam formulation. In certain embodiments, the inventive polyurethane foam composition is characterized in that the density of the strengthened foam formulation is at least 10% lower than the density of the reference foam formulation. In certain embodiments, the inventive strength polyurethane foam composition is characterized in that the density of the strengthened foam formulation is at least 10%, at least 20%, at least 30%, at least 40%, or at least 50%, less than the density of the reference foam. In certain embodiments, the inventive foam composition is characterized in that its density is at least 10%, at least 20%, at least 30%, at least 40%, or at least 50%, less than the density of the reference foam while the tensile strength of the strengthened foam is at least equal to, at least 10% greater than, at least 20% greater than, at least 30% greater than, at least 40% greater than, at least 50% greater than, at least 75% greater than, or at least 100% greater than the tensile strength of the reference foam.

In certain embodiments, the present invention provides high strength flexible polyurethane foam compositions (denoted the strengthened foam formulation) containing an additive comprising a polycarbonate polyol derived from the copolymerization of one or more epoxides and carbon dioxide, and characterized in that the tear strength of the strengthened foam as measured by ASTM D 3574-08 Test E, is greater than the tensile strength of a corresponding foam composition formulated without the added polycarbonate polyol (denoted the reference foam formulation). In certain embodiments, the aliphatic polycarbonate polyol is present in the B-side formulation in place of a portion of one or more polyols in the reference. Preferably, this is achieved such that the —OH number of the B-side formulation for the strengthened foam is substantially the same as that of the B-side formulation of the reference foam formulation. In certain embodiments, the inventive high strength foam is characterized in that the tensile strength of the strengthened foam is at least 10% greater than the tensile strength of the reference foam formulation. In certain embodiments, the high strength foam is characterized in that the tensile strength of the strengthened foam is at least 10% greater, at least 20% greater, at least 30% greater, at least 40% greater, at least 50% greater, or at least 100% greater than the tensile strength of the reference foam. In certain embodiments, the tensile strengths of the strengthened foam and the reference foam are normalized for the density of the foam prior to comparing them. In certain embodiments foam compositions of the present invention are characterized in that they have substantially the same density as the reference foam composition to which they are compared.

In certain embodiments, the present invention provides high strength flexible polyurethane foam compositions containing an additive comprising a polycarbonate polyol derived from the copolymerization of one or more epoxides and carbon dioxide. In certain embodiments, the inventive foam compositions are characterized in that they have a lower density than a corresponding foam composition formulated without the polycarbonate polyol additive (denoted the reference foam formulation) and further characterized in that the tear strength of the strengthened foam as determined by ASTM D 3574-08 Test F is equal to or greater than that of the reference foam. In certain embodiments, the composition is characterized in that the additive is provided in the B-side formulation from which the foam is produced by substituting a portion of one or more polyols in the reference formulation such that the —OH number of the B-side formulation for the strengthened foam is substantially the same as that of the B-side formulation of the reference foam formulation. In certain embodiments, the inventive polyurethane foam composition is characterized in that the density of the strengthened foam formulation is at least 10% lower than the density of the reference foam formulation. In certain embodiments, the inventive strength polyurethane foam composition is characterized in that the density of the strengthened foam formulation is at least 10%, at least 20%, at least 30%, at least 40%, or at least 50%, less than the density of the reference foam. In certain embodiments, the inventive foam composition is characterized in that its density is at least 10%, at least 20%, at least 30%, at least 40%, or at least 50%, less than the density of the reference foam while the tear strength of the strengthened foam is at least equal to, at least 10% greater than, at least 20% greater than, at least 30% greater than, at least 40% greater than, at least 50% greater than, at least 75% greater than, or at least 100% greater than the tensile strength of the reference foam.

B. Viscoelastic Foam Compositions

Viscoelastic (VE) foams are typically water blown foams produced using a mixture of low molecular weight hydrophobic polyols, high molecular weight polyols produced from propylene oxide and ethylene oxide and short molecular weight chain extenders. These foams are usually produced at relatively low isocyanate indexes which facilitate an open cell structure. In order to balance foaming rate and open cell morphology, polyols with high levels of hydrophilic oxyethylene groups are used in preparation of these foams as well as a variety of surfactants. In order to produce soft (compliant) foams, isocyanates such as TDI or mixtures of 4,4'- and 2,4'-MDI are typically used in production of VE foams. Calcium carbonate or other fillers can also be added to these formulations to increase density (and load bearing properties) and to reduce tackiness.

In certain embodiments, the present invention provides novel VE foams characterized in that at least a portion of one or more of the polyols in the B-side formulation is replaced with a polycarbonate polyol derived from copolymerization of $CO_2$ and one or more epoxides. In certain embodiments, the VE foam compositions are further characterized in that they contain less or no inorganic filler than a comparative foam having similar viscoelastic properties but lacking the polycarbonate polyol additive. In certain embodiments the polycarbonate polyol is present in such a quantity that the final B-side composition contains from about 1 part to about 100 parts by weight of polycarbonate polyol based on 100 parts of polyether polyol. In certain embodiments, the polycarbonate polyol is present in such a quantity that the polycarbonate polyol comprises about 5 parts, about 10 parts, about 20 parts, about 30 parts, about 40 parts, about 60 parts, about 80 parts, or about 100 parts, based on 100 parts of polyether polyol in the resulting B-side formulation. In certain embodiments, the aliphatic polycarbonate polyol comprises poly(propylene carbonate). In certain embodiments, the aliphatic polycarbonate polyol present comprises poly(ethylene carbonate). In certain embodiments, the aliphatic polycarbonate polyol present comprises poly(ethylene-co-propylene carbonate).

In certain embodiments, high strength VE foam compositions of the present invention are characterized in that foams have higher strength than corresponding foams formulated without the polycarbonate polyol additive. In certain embodiments, the inventive foams are characterized in that one or more properties selected from the group consisting of: Tensile Strength at Break (as measured by ASTM D3574-08 Test E); Tear Strength (as measured by ASTM D3574-08 Test F); Compression Force Deflection (CFD) (as measured by ASTM D3574-08 Test C); and Tensile strength and Elongation after Dry Heat Aging for 22 hours at 140° C. (as measured by ASTM D3574-08Test K) are enhanced relative to those of a corresponding reference foam formulated without the polycarbonate polyol additive.

In certain embodiments, the present invention provides high strength VE foam compositions (denoted the strengthened foam formulation) comprising a polycarbonate polyol derived from the copolymerization of one or more epoxides and carbon dioxide and characterized in that the load bearing capacity of the strengthened foam as indicated by its compression force deflection (CFD) value measured using ASTM D3574-08 Test C, is greater than the CFD value of a corresponding VE foam composition formulated without the added polycarbonate polyol (denoted the reference foam formulation). In certain embodiments, the aliphatic polycarbonate polyol is present in the B-side formulation in place of a portion of one or more polyols in the reference foam.

Preferably, this is achieved such that the —OH number of the B-side formulation for the strengthened foam is substantially the same as that of the B-side formulation of the reference foam formulation. In certain embodiments, the inventive high strength foam is characterized in that the CFD value of the strengthened foam is at least 10% greater than the CFD value of the reference foam formulation. In certain embodiments, the high strength foam is characterized in that the CFD value of the strengthened foam is at least 10% greater, at least 20% greater, at least 30% greater, at least 40% greater, at least 50% greater, or at least 100% greater than the CFD value of the reference foam. In certain embodiments, the CFD values of the strengthened foam and the reference foam are normalized for the density of the foam prior to comparing them. In certain embodiments foam compositions of the present invention are characterized in that they have substantially the same density as the reference foam composition to which they are compared.

In certain embodiments, the present invention provides high strength VE foam compositions (denoted the strengthened foam formulation) containing an additive comprising a polycarbonate polyol derived from the copolymerization of one or more epoxides and carbon dioxide, and characterized in that the tensile strength of the strengthened foam as measured by ASTM D 3574-08 Test E, is greater than the tensile strength of a corresponding foam composition formulated without the added polycarbonate polyol (denoted the reference foam formulation). In certain embodiments, the aliphatic polycarbonate polyol is present in the B-side formulation in place of a portion of one or more polyols in the reference. Preferably, this is achieved such that the —OH number of the B-side formulation for the strengthened foam is substantially the same as that of the B-side formulation of the reference foam formulation. In certain embodiments, the inventive high strength foam is characterized in that the tensile strength of the strengthened foam is at least 10% greater than the tensile strength of the reference foam formulation. In certain embodiments, the high strength foam is characterized in that the tensile strength of the strengthened foam is at least 10% greater, at least 20% greater, at least 30% greater, at least 40% greater, at least 50% greater, or at least 100% greater than the tensile strength of the reference foam. In certain embodiments, the tensile strengths of the strengthened foam and the reference foam are normalized for the density of the foam prior to comparing them. In certain embodiments foam compositions of the present invention are characterized in that they have substantially the same density as the reference foam composition to which they are compared.

In certain embodiments, the present invention provides high strength VE foam compositions (denoted the strengthened foam formulation) containing an additive comprising a polycarbonate polyol derived from the copolymerization of one or more epoxides and carbon dioxide, and characterized in that the tear strength of the strengthened foam as measured by ASTM D 3574-08 Test E, is greater than the tensile strength of a corresponding foam composition formulated without the added polycarbonate polyol (denoted the reference foam formulation). In certain embodiments, the aliphatic polycarbonate polyol is present in the B-side formulation in place of a portion of one or more polyols in the reference foam. Preferably, this is achieved such that the —OH number of the B-side formulation for the strengthened foam is substantially the same as that of the B-side formulation of the reference foam formulation. In certain embodiments, the inventive high strength foam is characterized in that the tensile strength of the strengthened foam is at least 10% greater than the tensile strength of the reference foam formulation. In certain embodiments, the high strength foam is characterized in that the tensile strength of the strengthened foam is at least 10% greater, at least 20% greater, at least 30% greater, at least 40% greater, at least 50% greater, or at least 100% greater than the tensile strength of the reference foam. In certain embodiments, the tensile strengths of the strengthened foam and the reference foam are normalized for the density of the foam prior to comparing them. In certain embodiments foam compositions of the present invention are characterized in that they have substantially the same density as the reference foam composition to which they are compared.

In certain embodiments, the present invention provides high strength VE foam compositions (denoted the strengthened foam formulation) containing an additive comprising a polycarbonate polyol derived from the copolymerization of one or more epoxides and carbon dioxide, and characterized in that the energy absorbing properties of the foam are increased. In certain embodiments this increase in energy absorption indicated by an increase in hysteresis loss according to ASTM 3574-08, Hysteresis Procedure B. In certain embodiments, the hysteresis loss is greater in the inventive VE foam than that of a corresponding foam composition formulated without the added polycarbonate polyol (denoted the reference foam formulation). In certain embodiments, the inventive high strength foam is characterized in that its hysteresis loss is at least 10% greater than that of the reference foam formulation. In certain embodiments, the inventive high strength foam is characterized in that its hysteresis loss is at least 20% greater, at least 30% greater, at least 40% greater, at least 50% greater, or at least 100% greater than the hysteresis loss of the reference foam under identical conditions.

In certain embodiments, viscoelastic foam compositions of the present invention are characterized in that they have a reduced quanitity of inorganic filler.

C. Foams with Novel Physical Properties

In another aspect, the present invention encompasses foam compositions having a novel combination of physical properties. In certain embodiments, the invention provides a flexible polyurethane foam comprising the reaction product of a B-side mixture substantially comprising polyether polyol and an A-side mixture comprising one or more of MDI or TDI characterized in that the foam has the combination of:
  a density less than 40 $kg/m^3$ by ASTM D 3574-08, Test A;
  a CFD at 65% of greater than 1 psi (or 3 kPa) by ASTM D 3574-08, Test C; and
  a SAG factor of between 2.0 and 3.0 (obtained from ASTM D 3574-08, Test C by dividing the CFD @ 65% compression by the CFD at 25% compression).

In certain embodiments, the inventive foam is characterized in that it has the combination of: a density by ASTM D 3574-08, Test A, of less than 38, less than 36, less than 34, less than 32 or less than 30 $kg/m^3$ and a CFD by ASTM D 3574-08, Test C greater than 1.6 psi at 65% and a SAG factor of about 2.

In certain embodiments, the inventive foam is characterized in that it has the combination of: A CFD at 65% by ASTM D 3574-08, Test C of greater than 0.8 psi, greater than 1.0 psi, greater than 1.2 psi, greater than 1.4 psi, or greater than 1.6 psi, greater than 1.8 psi, or greater than 2 psi, with a density less than 40 $kg/m^3$, and a comfort factor between 2 and 3.

In certain embodiments, the inventive foam is characterized in that it has the combination of: A CFD at 65% by ASTM D 3574-08, Test C of greater than 1 psi, greater than 1.2 psi, greater than 1.4 psi, greater than 1.5 psi, or greater than 1.75 psi, or greater than 2 psi; with a density less than 38, less than 36, less than 34, less than 32 or less than 30 kg/m³ by ASTM D 3574-08, Test A, and a comfort factor between 2 and 3.

One approach used in the field of polyurethane foams today to increase the strength or CFD of flexible foams is the addition of graft polyols to the B-side formulation. Graft polyols (also called filled polyols or polymer polyols) contain finely dispersed styrene-acrylonitrile, acrylonitrile, or polyurea (PHD) polymer solids chemically grafted to a polyether backbone. They are used to increase the load-bearing properties of low-density high-resiliency (HR) foam, as well as to add toughness to microcellular foams and cast elastomers. However, these materials increase the cost of the foams and sometimes result in a dimunition of other foam properties or an increase in the density of the foam, or as mentioned above, incroduce undesirable VOCs into the finished products. In certain embodiments, the inventive foams are characterized in that, in addition to the combinations of physical properties described above, they contain little or no graft polyol.

In certain embodiments, the inventive foam compositions described above are further characterized in that they contain less than 20% graft-type polyol additives. In certain embodiments, the inventive foam compositions described above are further characterized in that they contain less than 10% graft-type polyol additives. In certain embodiments, the inventive foam compositions described above are further characterized in that they contain less than 5% graft-type polyol additives. In certain embodiments, the inventive seating foam compositions described above are further characterized in that they contain less than 3% graft-type polyol additives. In certain embodiments, the inventive seating foam compositions described above are further characterized in that they contain less than 2% graft-type polyol additives. In certain embodiments, the inventive seating foam compositions described above are further characterized in that they contain less than 1% graft-type polyol additives. In certain embodiments, the inventive seating foam composition described above are further characterized in that they do not contain graft-type polyol additives.

In certain embodiments, such filled polyols are selected from: polyurea dispersion polyols (i.e. Poly Harnststoff Dispersion (PHD) polyols); Polyurethane dispersion polyols (i.e. Polyisocyanate poly addition polyols (PIPA); Epoxy dispersion polyols; Aminoplast dispersions, acrylic polyols and the like. They are used to increase the load-bearing properties of low-density high-resiliency (HR) foam, as well as add toughness to microcellular foams and cast elastomers. However, these materials increase the cost of the foams and sometimes result in a dimunition of other foam properties such as resilience or an increase in the density of the foam. In certain embodiments, the inventive foams are characterized in that in addition to the combinations of physical properties described above, they contain little or no filled polyol.

In certain embodiments, the inventive foam compositions described above are further characterized in that they contain less than 5% filled polyol additives. In certain embodiments, the inventive seating foam compositions described above are further characterized in that they contain less than 3% filled polyol additives. In certain WO 2014/074706 58 PCT/US2013/068932 embodiments, the inventive seating foam compositions described above are further characterized in that they contain less than 2% filled polyol additives. In certain embodiments, the inventive seating foam compositions described above are further characterized in that they contain less than 1% filled polyol additives. In certain embodiments, the inventive seating foam compositions described above are further characterized in that they do not contain graft-type, filled, or acrylic polyol additives.

While not necessarily explicitly described, further variations of the foam compositions described above comprising the additional components typical in the formulation of a finished foam are encompassed by the present invention. These compositions will be readily apparent to the skilled artisan based on the teachings and disclosure herein in combination with common knowledge in the field of polyurethane foam formulation. Therefore, though the present specification may not describe them in detail, compositions comprising additional reaction components or additives in the A- and/or B-side formulations (e.g. catalysts, blowing agents, pigments, stabilizers, flame retardants, cell openers, surfactants, reactive diluents, antimicrobials, solvents, and the like); are contemplated and encompassed by the present invention. Non-limiting examples of additives that can be utilized in the A-side and/or B-side mixtures of the inventive foams are described in Appendix C, entitled "Additives" appearing at the end of this specification.

III. Isocyanate-Terminated Prepolymers with Utility as Foam Additives

In another aspect, the present invention encompasses isocyanate-terminated polyols derived by reaction of an excess of a polyisocyanate with any of the aliphatic polycarbonate polyols described above. Such compositions can be incorporated into the A-side formulation of a polyurethane foam formulation to provide enhanced strength. Scheme 1 shows a representative example how such materials can be made:

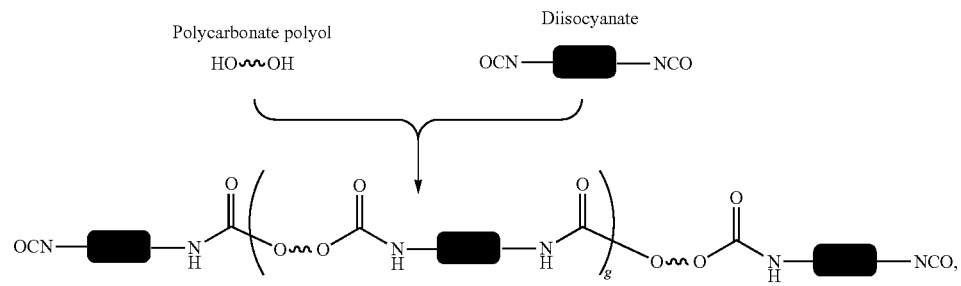

as add toughness to microcellular foams and cast elastomers. However, these materials increase the cost of the foams and where the polycarbonate polyol represents any of those described above, in Appendix A, or in the classes and subclasses herein, the diisocyanate represents any reagent capable or reacting with two alcohols to form two urethane linkages, and where g is 0, or an integer up to about 10.

Preferably, g is small so that the Mn of the prepolymer remains relatively low and the material can be dissolved in a typical polyurethane A-side mixture without making it overly viscous. In certain embodiments, the average value of g in the propolymer composition is less than 10, less than 5, less than 4, less than 3, less than 2, or less than 1.

Prepolymers of the present invention may also derive from higher functional polyols and/or higher functional isocyanates including those described in appendices A and B appended hereto.

In another aspect, the present invention encompasses comprising the reaction product between an isocyanate component and a polyol component wherein the isocyanate component comprises from about 1% to about 20% weight percent of an isocyanate-terminated prepolymer comprising a polyol derived from the copolymerization of $CO_2$ with one or more epoxides.

EXAMPLES

The present invention is illustrated by the following examples. It is to be understood that the particular examples, materials, amounts, and procedures are to be interpreted broadly in accordance with the scope and spirit of the invention as set forth herein.

Example 1

High Strength Flexible Foams

Presented below are the formulations of high strength flexible polyurethane foams according to the principles of the present invention. These materials were made using aliphatic polycarbonate polyol additives as defined herein. Specifically, the aliphatic polycarbonate polyols hereinafter also refered to as "Novomer Polyols" used in the formulations below have the following properties:

| Property | 58-103-C | 74-276 |
|---|---|---|
| Acid Value, mg KOH/g | 0.28 | 0.51 |
| Hydroxyl Value, mg KOH/g | 119 | 61.1 |
| Mn (GPC) | 1,270 | 2,213 |
| Mw (GPC) | 1,370 | 2,443 |
| Polydispersity, Mw/Mn | 1.07 | 1.06 |
| Glass Transition Temp. (DSC), Tg | −5° C. | −5.5° C. |
| Viscosity, cPs | 4,990 @ 80° C. | — |

Polyol 58-103-C is a linear 1270 g/mol poly(propylene carbonate) polyol initiated with dipolypropylene glycol (a mixture of isomers) having a PDI of 1.06, greater than 99% —OH end groups and greater than 99% carbonate linkages (exclusive of the ether bonds in the dipropylene glycol). This polyol conforms to the formula:

[chemical structure]

where n is, on average in the composition, approximately 5.6.

Polyol 74-276 is a linear 2200 g/mol poly(propylene carbonate) polyol initiated with 425 g/mol polypropylene glycol (mixture of isomers) having a PDI of 1.06, greater than 99% —OH end groups and greater than 99% carbonate linkages (exclusive of the ether bonds in the polypropylene glycol). This polyol conforms to the formula:

[chemical structure]

where k is on average about 6.8, and n is on average in the composition approximately 8.7.

The objective of this study was to determine the effect of $CO_2$-based poly(propylene-carbonate) diols (PPC diols) as additives in a model high resilient (HR) flexible polyurethane foam.

The effect of these PPC diols on load bearing and other properties of free-rise and molded flexible foams were evaluated in comparison to HR flexible foams formulated with and without a commercial graft polyol.

Experimental:

Raw Materials

A list of raw materials used in this evaluation is shown in Table 1. All materials were used as received from suppliers including Novomer polyols.

In foaming experiments, a formulation targeting high resilient flexible foams was used as reference. This formulation is based on Poly-G 85-29 ethylene oxide tipped polyether triol (polyol). Lumulse POE 26 (ethoxylated glycerol) was used as reactive cell opener. Diethanol amine was used as a co-catalyst and cross-linker.

Preparation and Testing of Foams

Free rise water-blown foams were prepared with 5%, 10%, 15%, 20%, and 25% Novomer 58-103C and Novomer 74-276 polyols, respectively, which were compatible with Poly-G 85-29 polyol (Tables 2-4). All foams were prepared at 90 Isocyanate Index with Mondur MRS-2, which is a 2,4'-MDI rich isocyanate (Tables 3-5).

Molded foams were prepared with 10% and 20% Novomer 58-103 C. Reference molded foams were also prepared with and without graft polyol Speciflex NC-701.

Free-rise foams were prepared using a standard laboratory hand-mixing procedure. Foaming profiles, including cream time, gel time, and rise time were measured on all foams. After the rise time, the foams were immediately placed in an air-circulating oven preheated at 80° C. for 30 minutes to complete the cure.

Molded foams were prepared using an aluminum mold with 12×12×2 inch dimensions preheated at 69° C. Demolding time was 4.5 minutes.

All foams were aged under room conditions for minimum one week before testing. The following properties were measured according to ASTM D 3574-08:

Foam Density (Test A)
Resilience via Ball Rebound (Test H)
Tensile Strength at Break (Test E)
Elongation at Break (Test E)
Tear Strength (Test F)
CFD, Compression Force Deflection (Test C)
Hysteresis (Procedure B-CFD Hysteresis Loss)
Dry Constant Deflection Compression Set (Test D)
Wet Constant Deflection Compression Set (Test D & Wet Heat Aging, Test L)
Tensile strength and Elongation after Dry Heat Aging for 22 hours at 140° C. (Modified Heat Aging Test K)

TABLE 1

Materials

| Designation | Type | Supplier |
|---|---|---|
| POLYOLS | | |
| Poly-G 85-29 | Ethylene oxide caped polyether polyol (triol) Hydroxyl Value = 27.4 mg KOH/g; Eq. wt. = 2047.445 Viscosity @ 25° C. = 1150 cPs | Arch Chemicals |
| Speciflex NC-701 | Grafted polyether polyol containing copolymerized styrene and acrylonitrile Hydroxyl Value = 23.0 mg KOH/g; Eq. wt. = 2439.13 Viscosity @ 25° C. = 5070 mPa · s | DOW |
| Novomer 58-103-C | Novomer Poly(Propylene Carbonate) Hydroxyl Value = 119 mg KOH/g; Eq. wt. = 471.43 Acidity Value = 0.28 mg KOH/g Viscosity @ 25° C. = $1.25 \times 10^6$ cPs Viscosity @ 80° C. = 4990 cPs | NOVOMER |
| Novomer 74-245 | Novomer Poly(Propylene Carbonate) Hydroxyl Value = 34.8 mg KOH/g; Eq. wt. = 1612.07 Viscosity @ 80° C. = 49,650 cPs | NOVOMER |
| Novomer 74-266 | Novomer Poly(Propylene Carbonate) Hydroxyl Value = 63 mg KOH/g; Eq. wt. = 890.47 Acidity Value = 0.24 mg KOH/g Viscosity @ 80° C. = 27,240 cPs | NOVOMER |
| Novomer 74-276 | Novomer Poly(Propylene Carbonate) polyol initiated with PPG 600 MW Hydroxyl Value = 61.1 mg KOH/g; Acidity Value = 0.51 mg KOH/g Eq. wt. = 918.47 | NOVOMER |
| SURFACTANTS | | |
| Tegostab B 4690 | Polyether/Silicone Oil Mix Eq. Wt. = 1335.7 | Evonik |
| CELL OPENER | | |
| Lumulse POE 26 | Hydroxyl Value = 134.8 mg KOH/g Eq. Wt. = 416.2 | Lambent |
| CHAIN EXTENDERS | | |
| Diethanolamine | Diethanolamine (Eq. Wt. = 35.04) | Aldrich |
| CATALYSTS | | |
| Dabco 33LV | 33% Triethylene diamine in dipropylene glycol | Air Products |
| Niax A1 | bis(2-dimethylaminoethyl) ether | Momentive |
| ISOCYANATES | | |
| Mondur MRS-2 | 2,4' rich diphenylmethane diisocyanate (F = 2.2; Eq. wt. = 130.03; % NCO = 32.30%) | Bayer |

Results

Polyol Reactivity

Polyurethane foams were prepared at 5%, 10%, 15%, 20% and 25% as replacement for conventional polyol Poly-G 85-29 in model HR flexible foam formulation. Introduction of PPC polyol 58-103-C polyol into reference foam formulation as drop-in replacement for Poly-G 85-29 did not significantly affect the reaction profile (foaming profile) measured as cream time, gel time, and rise time. However, foams exhibited closed cell structure and shrank after preparation (Table 3A). Stable foams with open cell structure were obtained after adjustment in catalysis and after increasing the amount of diethanolamine (reactive catalyst/cross-linker) from 1 to 2 parts by weight (Tables 3A and 3B).

Foams based on PPC polyol 74-276 polyol were prepared using the same catalytic package as that used for foams based on Novomer 58-103C polyol. No significant difference in reactivity between these two polyols was observed (Tables 3and 4).

Apparent Foam Cell Structure and Density

Free-rise foams based on Novomer polyols exhibited similar white color to the reference foams prepared with Poly-G 85-29 polyol as sole polyol and reference foams prepared with 10% and 25% graft polyol Speciflex NC-701. The apparent cell structure of foams with Novomer polyols was uniform and similar to the reference foams.

Density of the free-rise foams did not change significantly with replacement of the reference polyol with 5%-25% Novomer polyols (Tables 3and 4).

TABLE 3A

Formulation screening of PU foams based on 58-103-C Polyol

| Designation | F | Eqv. Weight | 1 | 2 | 3 | 4 | 5 |
|---|---|---|---|---|---|---|---|
| Sample designation | | | REF-1 | 10%-58-103-C-1 | 10%-58-103-C-2 | 10%-58-103-C-3 | 10%-58-103-C-4 |
| Polyol system | | | | | | | |
| Poly-G 85-29 | 3 | 2047.5 | 97 | 87.3 | 87.3 | 87.3 | 87.3 |
| Novomer 58-103-C | | 471.43 | 0 | 9.7 | 9.7 | 9.7 | 9.7 |
| Water | 2 | 9 | 3.6 | 3.6 | 3.6 | 3.6 | 3.6 |
| Lumulse POE 26 | | 416.2 | 3 | 3 | 3 | 3 | 3 |
| Tegostab B 4690 | | 1335.7 | 1 | 1 | 1 | 1 | 1 |
| Dabco 33LV | | 105 | 0.8 | 0.8 | 0.8 | 0.8 | 0.8 |
| Diethanolamine | | 35.04 | 1 | 1 | 0.6 | 0.4 | 0.4 |
| Niax A-1 | | 233.7 | 0.1 | 0.1 | 0.1 | 0.1 | 0.15 |
| Isocyanate System | | | | | | | |
| Mondur MRS-2 | | 130.03 | 57.12 | 59.42 | 58.09 | 57.42 | 57.44 |
| Isocyanate Index | | | 90 | 90 | 90 | 90 | 90 |
| % Novomer polyol on total polyols | | | 0% | 10% | 10% | 10% | 10% |
| Reaction Profile of Free-rise | | | | | | | |
| Mix time, sec. | | | 7 | 7 | 7 | 7 | 7 |
| Cream time, sec. | | | 10 ± 0.6 | 9 | 12 | 13 | 10 |
| Gel time, sec. | | | 49 ± 1.0 | 39 | 51 | 51 | 48 |
| Rise time, sec. | | | 83 ± 1.5 | 68 | 99 | 106 | 107 |
| Post curing time & temperature | | | 30 min @ 80° C. | 30 min @ 80° C. | 30 min @ 80° C. | 30 min @ 80° C. | 30 min @ 80° C. |
| Properties | | | | | | | |
| Free-rise density, pcf | | | 2.26 | — | — | — | — |
| Resilience, % | | | 60.55 ± 0.73 | — | — | — | — |
| Tensile Strength, psi | | | 14.31 ± 1.06 | — | — | — | — |
| Elongation at Break, % | | | 104.53 ± 7.92 | — | — | — | — |
| Tear Strength, lbf/in | | | 2.70 ± 0.05 | — | — | — | — |
| CFD @ 25%, psi | | | 0.20 ± 0.02 | — | — | — | — |
| CFD @ 50%, psi | | | 0.34 ± 0.03 | — | — | — | — |
| CFD @ 65%, psi | | | 0.59 ± 0.05 | — | — | — | — |
| Hysteresis | | | 31.08 ± 1.16 | — | — | — | — |
| Tensile Strength (Dry Heat Aged), psi | | | 13.26 ± 0.58 | — | — | — | — |
| Elongation at Break (Dry Heat Aged), % | | | 128.05 ± 10.50 | — | — | — | — |
| Dry Compression Set, % | | | 5.3 ± 0.68 | — | — | — | — |
| Wet Compression Set, % | | | 7.9 ± 0.73 | — | — | — | — |
| SAG factor (65/25)** | | | 2.95 | — | — | — | — |
| SAG factor (50/25)** | | | 1.7 | — | — | — | — |
| Comments | | | No shrinkage, open cells; | Shrinkage, closed cells; | Shrinkage, closed cells; | Shrinkage, closed cells; | Shrinkage, closed cells; |

*Samples were placed in an oven, for post-curing, after rise time. Samples were cut & crushed after the first 10 minutes of curing.
**SAG factor CFD@65%/CFD25% and CFD@50%/CFD25%

TABLE 3B

Formulation screening of PU foams based on Novomer 58-103-C Polyol

| Designation | F | Eqv Weight | 1 | 2 | 3 | 4 | 5 | 6 |
|---|---|---|---|---|---|---|---|---|
| Sample designation | | | 5%-58-103-C-1 | 10%-58-103-C-5 | 15%-58-103-C-1 | 20%-58-103-C-1 | 25%-58-103-C-1 | 25%-58-103-C-2 |
| Polyol system | | | | | | | | |
| Poly-G 85-29 | 3 | 2047.5 | 92.15 | 87.3 | 82.45 | 77.6 | 72.75 | 72.25 |
| Novomer 58-103-C | | 471.43 | 4.85 | 9.7 | 14.55 | 19.4 | 24.25 | 24.25 |
| Water | 2 | 9 | 3.6 | 3.6 | 3.6 | 3.6 | 3.6 | 3.6 |
| Lumulse POE 26 | | 416.2 | 3 | 3 | 3 | 3 | 3 | 3 |
| Tegostab B 4690 | | 1335.7 | 1 | 1 | 1 | 1 | 1 | 1 |
| Dabco 33LV | | 105 | 0.5 | 0.5 | 0.5 | 0.5 | 0.8 | 0.5 |
| Diethanolamine | | 35.04 | 2 | 2 | 2 | 2 | 0.6 | 2 |
| Niax A-1 | | 233.7 | 0.1 | 0.1 | 0.1 | 0.1 | 0.1 | 0.10 |
| Isocyanate System | | | | | | | | |
| Mondur MRS-2 | | 130.03 | 61.50 | 62.43 | 63.35 | 64.28 | 60.87 | 65.21 |
| Isocyanate Index | | | 90 | 90 | 90 | 90 | 90 | 90 |
| % Novomer polyol on total polyols | | | 5% | 10% | 15% | 20% | 25% | 25% |

TABLE 3B-continued

Formulation screening of PU foams based on Novomer 58-103-C Polyol

| Reaction Profile of Free-rise | | | | | | |
|---|---|---|---|---|---|---|
| Mix time, sec. | 7 | 7 | 7 | 7 | 7 | 7 |
| Cream time, sec. | 11 | 13 ± 0.6 | 12 ± 0.6 | 12 ± 0.6 | 9 | 11 ± 0.6 |
| Gel time sec. | 44 | 52 ± 1.2 | 52 ± 1.7 | 50 ± 0.6 | 45 | 49 ± 2.6 |
| Rise time, sec. | 87 | 87 ± 2.5 | 103 ± 8.7 | 98 ± 1.5 | 100 | 84 ± 1.7 |
| Post-curing time & temperature* | 30 min @ 80° C. | 30 min @ 80° C. | 30 min @ 80° C. | 30 min @ 80°C. | 30 min @ 80° C. | 30 min @ 80°C. |
| Properties | | | | | | |
| Free-rise density, pcf | 2.41 | 2.16 | 2.19 | 2.07 | — | 2.13 |
| Resilience, % | 55.05 ± 1.47 | 42.80 ± 1.90 | 38.96 ± 1.50 | 36.0 ± 0.70 | — | 31.8 ± 1.30 |
| Tensile Strength, psi | 13.24 ± 0.77 | 15.68 ± 1.89 | 18.14 ± 1.85 | 18.93 ± 1.94 | — | 18.99 ± 2.5 |
| Elongation at Break, % | 105.23 ± 7.70 | 113.32 ± 14.06 | 105.75 ± 7.91 | 130.54 ± 13.35 | — | 99.68 ± 13.02 |
| Tear Strength lbf/in | 3.29 ± 0.18 | 3.73 ± 0.29 | 3.82 ± 0.25 | 4.45 ± 0.36 | — | 4.80 ± 0.20 |
| CFD @ 25%, psi | 0.27 ± 0.05 | 0.32 ± 0.04 | 0.38 ± 0.03 | 0.45 ± 0.04 | — | 0.70 ± 0.05 |
| CFD @ 50%, psi | 0.44 ± 0.08 | 0.53 ± 0.11 | 0.65 ± 0.07 | 0.74 ± 0.07 | — | 1.13 ± 0.09 |
| CFD @ 65%, psi | 0.78 ± 0.15 | 0.94 ± 0.21 | 1.15 ± 0.17 | 1.28 ± 0.15 | — | 1.99 ± 0.20 |
| Hysteresis | 39.21 ± 0.15 | 44.83 ± 2.94 | 51.41 ± 0.08 | 62.09 ± 2.31 | — | 68.55 ± 3.08 |
| Tensile Strength (Dry Heat Aged), psi | — | 15.03 ± 1.66 | — | — | — | — |
| Elongation at Break (Dry Heat Aged) % | — | 112.25 ± 12.55 | — | — | — | — |
| Dry Compression Set, % | — | 14.0 ± 3.14 | — | — | — | — |
| Wet Compression Set, % | — | 18.4 ± 0.93 | — | — | — | — |
| SAG factor (65/25) | 2.89 | 2.94 | 3.03 | 2.84 | — | 2.84 |
| SAG factor (50/25) | 1.63 | 1.66 | 1.71 | 1.64 | — | 1.61 |
| Comments | No shrinkage, open cells; | No shrinkage, open cells; | No shrinkage, open cells; | No shrinkage, open cells; | Shrinkage, closed cells; | No shrinkage, open cells; |

*Samples were placed in an oven, for post-curing, after rise time. Samples were cut & crushed after the first 10 minutes of curing.
** SAG factor: CFD@65%/CFD25% and CFD@50%/CFD25%

TABLE 4

Formulation screening of PU foams based on 74-276 Polyol

| Designation | F | Eqv. Weight | 1 | 2 | 3 | 4 | 5 |
|---|---|---|---|---|---|---|---|
| Sample designation | | | 5%-74-276-1 | 10%-74-276-1 | 15%-74-276-1 | 20%-74-276-1 | 25%-74-276-1 |
| Polyol system | | | | | | | |
| Poly-G 85-29 | 3 | 2047.5 | 92.15 | 87.3 | 82.45 | 77.6 | 72.75 |
| Novomer 74-276 | | 918.46 | 4.85 | 9.7 | 14.55 | 19.4 | 24.25 |
| Water | 2 | 9 | 3.6 | 3.6 | 3.6 | 3.6 | 3.6 |
| Lumulse POE 26 | | 416.2 | 3 | 3 | 3 | 3 | 3 |
| Tegostab B 4690 | | 1335.7 | 1 | 1 | 1 | 1 | 1 |
| Dabco 33LV | | 105 | 0.5 | 0.5 | 0.5 | 0.5 | 0.5 |
| Diethanolamine | | 35.04 | 2 | 2 | 2 | 2 | 2 |
| Niax A-1 | | 233.7 | 0.1 | 0.1 | 0.1 | 0.1 | 0.1 |
| Isocyanate System | | | | | | | |
| Mondur MRS-2 | | 130.03 | 60.91 | 61.26 | 61.60 | 61.94 | 62.28 |
| Isocyanate Index | | | 90 | 90 | 90 | 90 | 90 |
| % Novomer polyol on total polyols | | | 5% | 10% | 15% | 20% | 25% |
| Reaction Profile of Free-rise | | | | | | | |
| Mix time, sec. | | | 7 | 7 | 7 | 7 | 7 |
| Cream time, sec. | | | 11 | 10 ± 1 | 10 | 11 | 11 |
| Gel time, sec. | | | 49 | 47 ± 1.0 | 44 | 45 | 46 |
| Rise time, sec. | | | 88 | 87 ± 1.3 | 83 | 90 | 92 |
| Post-curing time & temperature* | | | 30 min @ 80° C. | 30 min @ 80° C. | 30 min @ 80° C. | 30 min @ 80° C. | 30 min @ 80° C. |
| Properties | | | | | | | |
| Free-rise density, pcf | | | 2.27 | 2.38 | 2.24 | 2.28 | 2.35 |
| Resilience, % | | | 55.10 ± 1.40 | 49.12 ± 1.47 | 44.46 ± 1.27 | 38.53 ± 0.73 | 36.42 ± 1.27 |
| Tensile Strength, psi | | | 13.24 ± 0.77 | 15.34 ± 1.26 | — | — | — |
| Elongation at Break, % | | | 105.23 ± 7.70 | 100.19 ± 6.15 | — | — | — |
| Tear Strength, lbf/in | | | 3.29 ± 0.18 | 3.21 ± 0.17 | — | — | — |
| CFD @ 25%, psi | | | 0.28 ± 0.03 | 0.36 ± 0.05 | 0.35 ± 0.05 | 0.45 ± 0.07 | 0.53 ± 0.08 |

TABLE 4-continued

Formulation screening of PU foams based on 74-276 Polyol

| | | | | | |
|---|---|---|---|---|---|
| CFD @ 50%, psi | 0.47 ± 0.05 | 0.59 ± 0.09 | 0.56 ± 0.07 | 0.75 ± 0.11 | 0.87 ± 0.13 |
| CFD @ 65%, psi | 0.86 ± 0.11 | 1.05 ± 0.18 | 0.96 ± 0.11 | 1.35 ± 0.18 | 1.57 ± 0.23 |
| Hysteresis | 35.10 ± 2.5 | 41.96 ± 1.87 | 46.15 ± 2.89 | 54.59 ± 1.06 | 56.45 ± 1.72 |
| Tensile Strength (Dry Heat Aged), psi | 12.27 ± 1.02 | 13.95 ± 0.81 | — | — | — |
| Elongation at Break (Dry Heat Aged), % | 93.45 ± 7.49 | 105.67 ± 5.20 | — | — | — |
| Dry Compression Set, % | 6.7 ± 1.71 | 8.2 ± 2.61 | — | — | — |
| Wet Compression Set, % | 12.7 ± 0.83 | 14.7 ± 2.94 | — | — | — |
| SAG factor (65/25) | 3.07 | 2.92 | 2.74 | 3.00 | 2.96 |
| SAG factor (50/25) | 1.68 | 1.64 | 1.60 | 1.67 | 1.64 |
| Comments | No shrinkage, open cells; | No shrinkage, open cells; | No shrinkage, open cells; | No shrinkage, open cells; | No shrinkage, open cells; |

*Samples were placed in an oven, for post-curing, after rise time. Samples were cut & crushed after the first 10 minutes of curing.
** SAG factor: CFD@65%/CFD25% and CFD@50%/CFD25%

TABLE 5

Formulation screening of PU foams based on Speciflex NC-701 Polyol

| Designation | F | Eqv. Weight | 1 | 2 | 3 4 5 |
|---|---|---|---|---|---|
| Sample designation | | | 10%-NC-701-1 | 25%- NC-701-1 | |
| Polyol system | | | | | |
| Poly-G 85-29 | 3 | 2047.5 | 87.3 | 72.75 | |
| Speciflex NC-701 | | 2244 | 9.7 | 24.25 | |
| Water | 2 | 9 | 3.6 | 3.6 | |
| Lumulse POE 26 | | 416.2 | 3 | 3 | |
| Tegostab B 4690 | | 1335.7 | 1 | 1 | |
| Dabco 33LV | | 105 | 0.8 | 0.8 | |
| Diethanolamine | | 35.04 | 1 | 1 | |
| Niax A-1 | | 233.7 | 0.1 | 0.1 | |
| Isocyanate System | | | | | |
| Mondur MRS-2 | | 130.03 | 57.01 | 56.18 | |
| Isocyanate Index | | | 90 | 90 | |
| % Novomer polyol on total polyols | | | 10% | 25% | |
| Reaction Profile of Free-rise | | | | | |
| Mix time, sec. | | | 7 | 7 | |
| Cream time sec | | | 11 | 10 | |
| Gel time, sec. | | | 42 | 33 | |
| Rise time, sec. | | | 64 | 47 | |
| Post-curing time & temperature* | | | 30 min @ 80° C. | 30 min @ 80° C. | |
| Properties | | | | | |
| Free-rise density, pcf | | | 2.26 | 2.29 | |
| Resilience % | | | 54.20 ± 1.47 | 51.24 ± 1.94 | |
| Tensile Strength, psi | | | 13.65 ± 2.07 | 14.79 ± 0.98 | |
| Elongation at Break, % | | | 109.16 ± 9.65 | 91.96 ± 11.29 | |
| Tear Strength, lbf/in | | | 3.10 ± 0.20 | 3.08 ± 0.75 | |
| CFD @ 25%, psi | | | 0.30 ± 0.03 | 0.41 ± 0.05 | |
| CFD @ 50%, psi | | | 0.51 ± 0.05 | 0.69 ± 0.06 | |
| CFD @ 65%, psi | | | 0.91 ± 0.11 | 1.22 ± 0.11 | |
| Hysteresis | | | 33.86 ± 3.17 | 37.78 ± 3.16 | |
| Tensile Strength (Dry HeatAged), psi | | | 12.65 ± 0.88 | — | |
| Elongation at Break (Dry Heat Aged), % | | | 125.92 ± 7.77 | — | |
| Dry Compression Set, % | | | 7.3 ± 1.31 | — | |
| Wet Compression Set, % | | | 8.7 ± 1.64 | — | |
| SAG factor (65/25) | | | 3.03 | 2.97 | |
| SAG factor (50/25) | | | 1.70 | 1.68 | |
| Comments | | | No shrinkage, open cells; | No shrinkage, open cells; | |

*Samples were placed in an oven, for post-curing, after rise time. Samples were cut & crushed after the first 10 minutes of curing.
** SAG factor: CFD@65%/CFD25% and CFD@50%/CFD25%

TABLE 6

| Designation | F | Eqv. Weight | 1 | 2 | 3 | 4 |
|---|---|---|---|---|---|---|
| Sample designation | | | REF-1 | NC-701 | 10%-58-103-C-5 | 20%-58-103-C-1 |
| Polyol system* | | | | | | |
| Poly-G 85-29 | 3 | 2047.5 | 97 | 37.3 | 37.3 | 77.6 |
| Novomer 53-103-C | | 471.43 | 0 | — | 9.7 | 19.4 |
| Speciflex NC-701 | | 2244 | | 9.7 | | |
| Water | 2 | 9 | 3.6 | 3.6 | 3.6 | 3.6 |
| Lumulse POE 26 | | 416.2 | 3 | 3 | 3 | 3 |
| Tegostab B 4690 | | 1335.7 | 1 | 1 | 1 | 1 |
| Dabco 33LV | | 105 | 0.3 | 0.3 | 0.5 | 0.5 |
| Diethanolamine | | 35.04 | 1 | 1 | 2 | 2 |
| Niax A-1 | | 233.7 | 0.1 | 0.1 | 0.1 | 0.1 |
| Isocyanate System | | | | | | |
| Mondur MRS-2 | | 130.03 | 57.12 | 57.01 | 62.43 | 64.23 |
| Isocyanate Index | | | 90 | 90 | 90 | 90 |
| % Novomer polyol on total polyols | | | 0% | 0% | 10% | 20% |
| Reaction Profile | | | 7 | | | |
| Mix time, sec. | | | 7 | 7 | 7 | 7 |
| De-molding time & temperature** | | | 4:30 min @ 70° C. | 4:30 min @ 70° C. | 4:30 min @ 70° C. | 4:30 min @ 70° C. |
| Properties | | | | | | |
| Molded foam density, pcf | | | 3.30 | 3.31 | 3.43 | 3.14 |
| Resilience, % | | | 55.05 ± 1.4 | 52.93 ± 0.73 | 33.95 ± 1.5 | 36.0 ± 0.73 |
| CFD @ 25%, psi | | | 0.55 ± 0.03 | 0.57 ± 0.06 | 0.36 ± 0.03 | 1.01 ± 0.06 |
| CFD @ 50%, psi | | | 0.33 ± 0.04 | 0.37 ± 0.10 | 1.40 ± 0.04 | 1.59 ± 0.15 |
| CFD @ 65%, psi | | | 1.53 ± 0.22 | 1.43 ± 0.20 | 2.45 ± 0.05 | 2.74 ± 0.32 |
| SAG factor (65/25) | | | 2.37 | 2.51 | 2.35 | 2.71 |
| SAG factor (50/25) | | | 1.60 | 1.53 | 1.63 | 1.57 |

*The amount used for preparation of molded foams was twice the amount shown in the table
*Mold was heated at 70° C.; De-molding time was 270 sec.

The apparent cell structure of molded foams prepared with 10% and 20% 58-103C PPC polyol was uniform and similar to the reference foams prepared with Poly-G 85-29 polyol as sole polyol and reference foams prepared with 10% graft polyol Speciflex NC-701.

Foam Physical Properties

Reference free-rise foams prepared with a graft polyol (Speciflex NC-701) also exhibited somewhat lower resilience and somewhat higher hysteresis in comparison to the reference foam prepared with base polyol (Poly-G 85-29) as sole polyol (Tables 3A and 5). In comparison to the foams based on graft polyols, foams based on Novomer poloyols exhibited somewhat lower resilience and somewhat higher hysteresis at the same load (Tables 3B, 4, and 5).

All foams prepared with Novomer polyols, included molded foams, exhibited relatively high resilience and can be classified as High Resilient (HR) PU foams.

In general, the tensile strength increased with introduction of Novomer polyols. With introduction of Novomer polyol the elongation did not change significantly (Tables 3and 4). Tensile strength and elongation of foams based on Novomer polyols was similar to those based on graft polyol at the same load (Tables 3-5). These results indicate that the foam strength (toughness) increases by introduction of the Novomer polyols.

The tear strength measured on foams prepared with Novomer polyols was significantly higher in comparison to the reference foam prepared with base polyol as sole polyol (Tables 3and 4). The tear strength of foams based on Novomer polyols were somewhat higher in comparison to the reference foams prepared with graft polyol (Tables 3-5).

These results also indicate that the foam strength (toughness) increases by introduction of the Novomer polyols.

Figure 1:
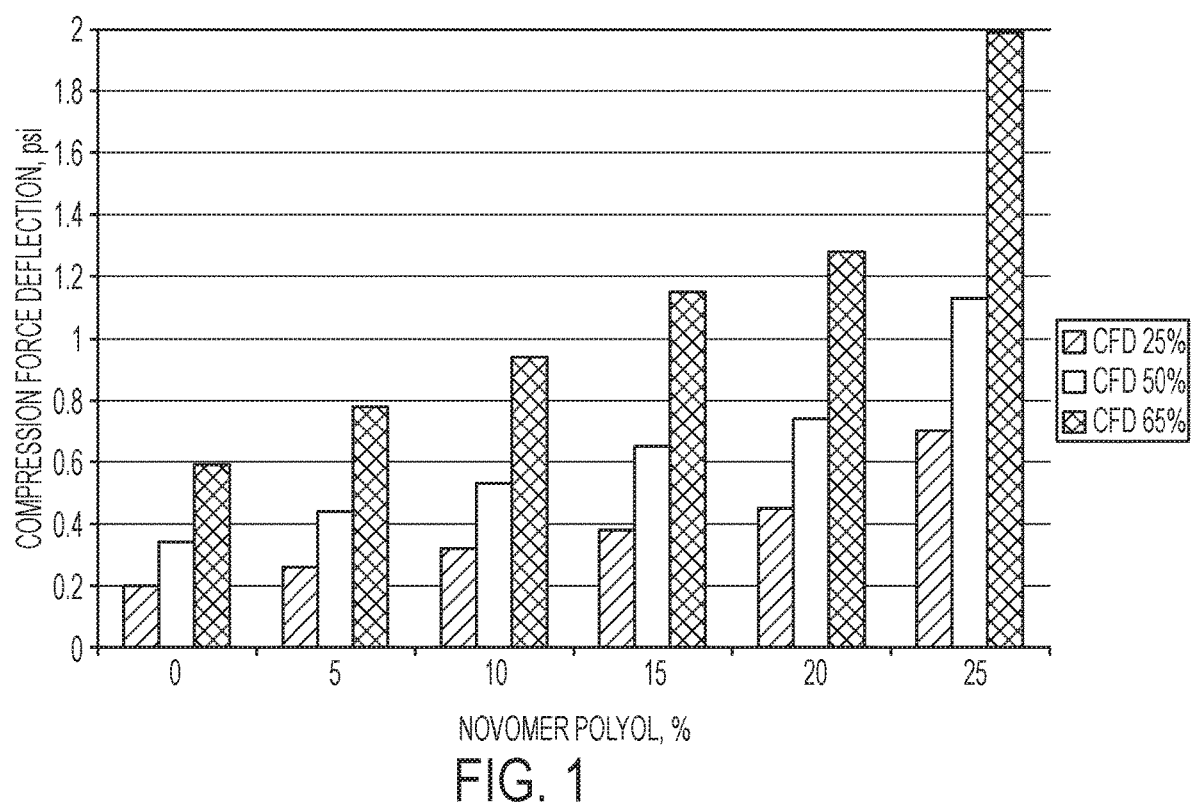
FIG. 1 Shows a chart of the load bearing (CFD) data from PU foams with and without 58-103-C Polyol. Load-Bearing Properties of PU foams based on Novomer 58-103-C Polyol (Tables 3A and 3B).
Figure 2:
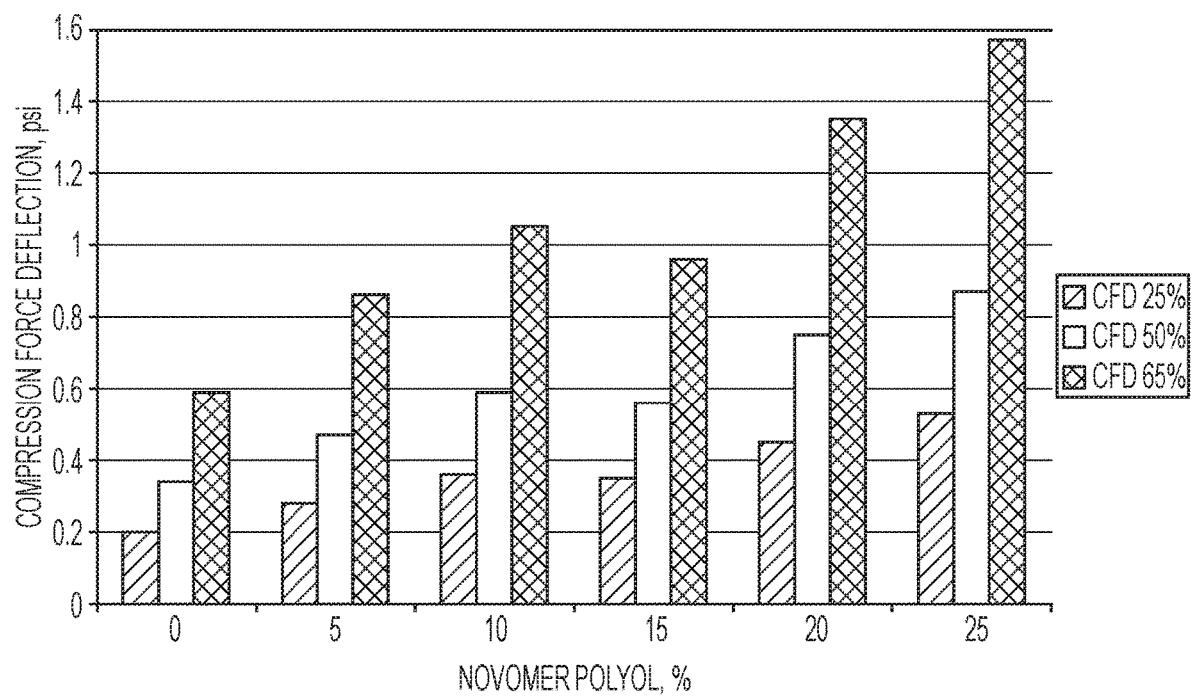
FIG. 2 Shows a chart of the load bearing (CFD) data from PU foams with and without 74-276 Polyol. Load Bearing Properties of PU foams based on Novomer 74-276 Polyol (Table 4).
Figure 3:
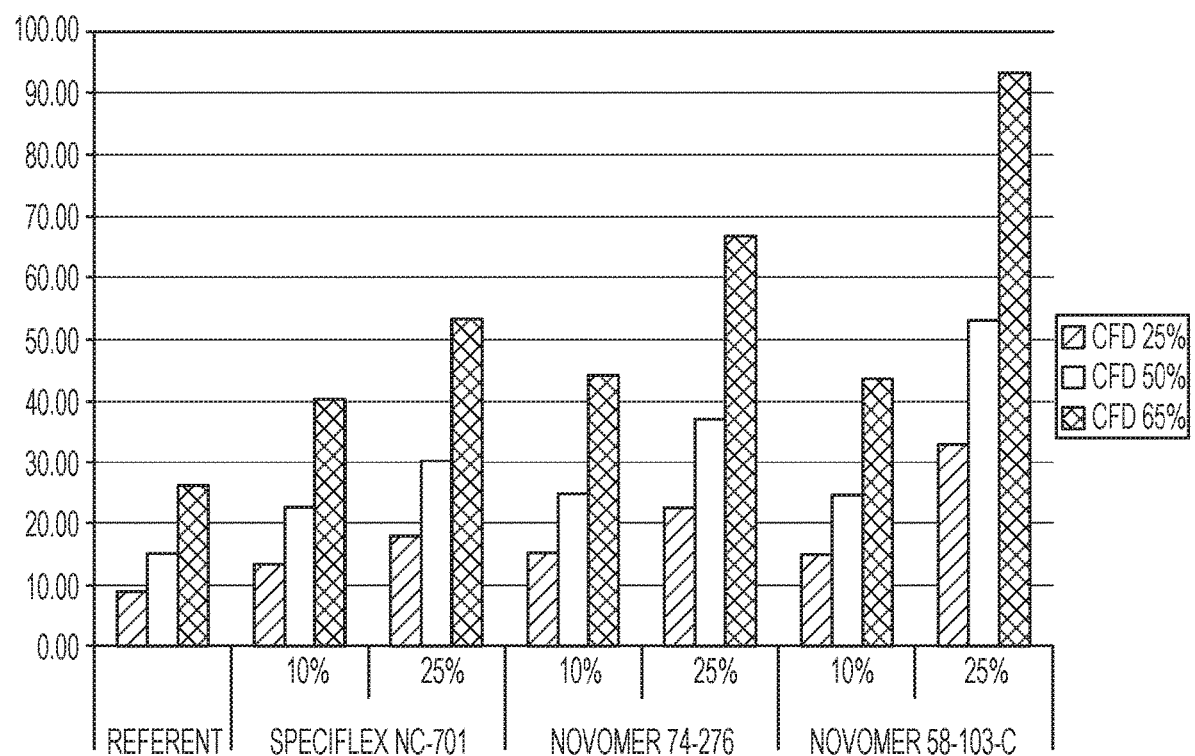
FIG. 3 Shows a chart of the density-normalized load bearing data from PU foams with and without additives of the present invention and with other additives. Load-Bearing Properties (Normalized Values) of PU foams based on commericial and Novomer polyols (Tables 3-5).
Figure 4:
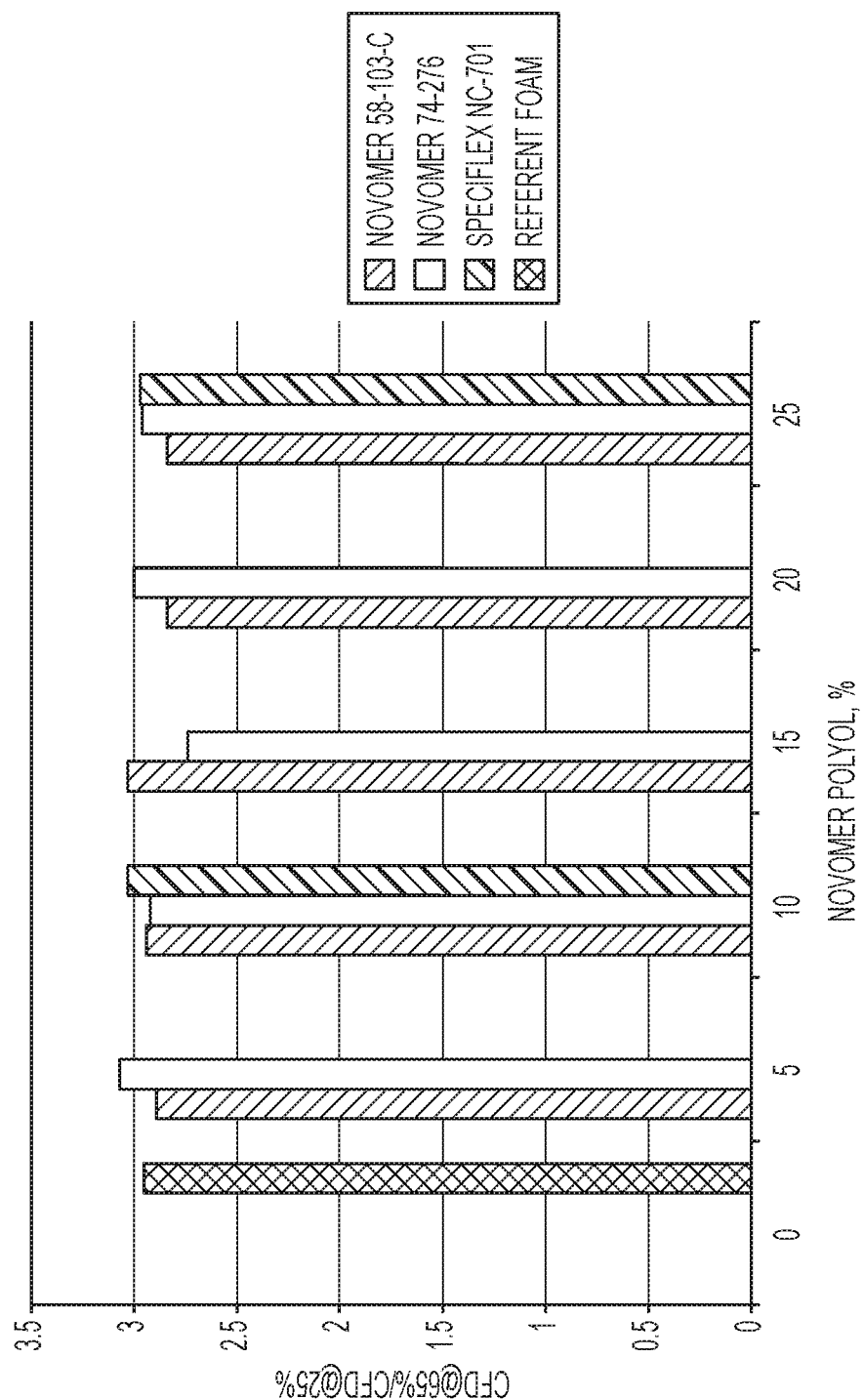
FIG. 4 Shows a chart of the comfort factor data (SAG value) for PU foams with and without additives of the present invention and with other additives. SAG factor of PU foams based on Novomer and commercial polyols (Tables 3-5).
Figure 5:
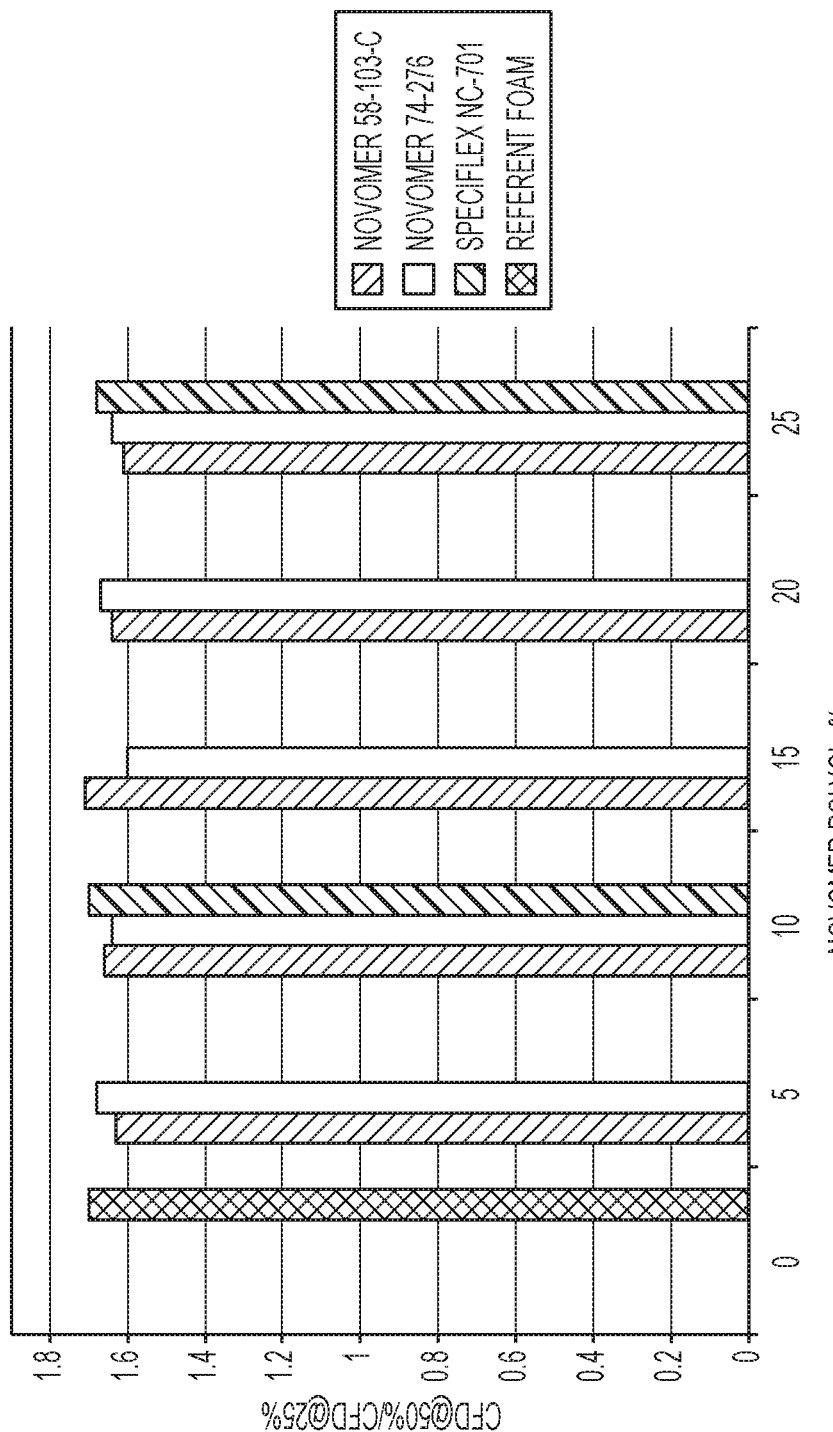
FIG. 5 Shows a chart of the comfort factor data (SAG value) for PU foams with and without additives of the present invention and with other additives. SAG factor of PU foams based on Novomer and commercial polyols (Tables 3-5).
Figure 6:
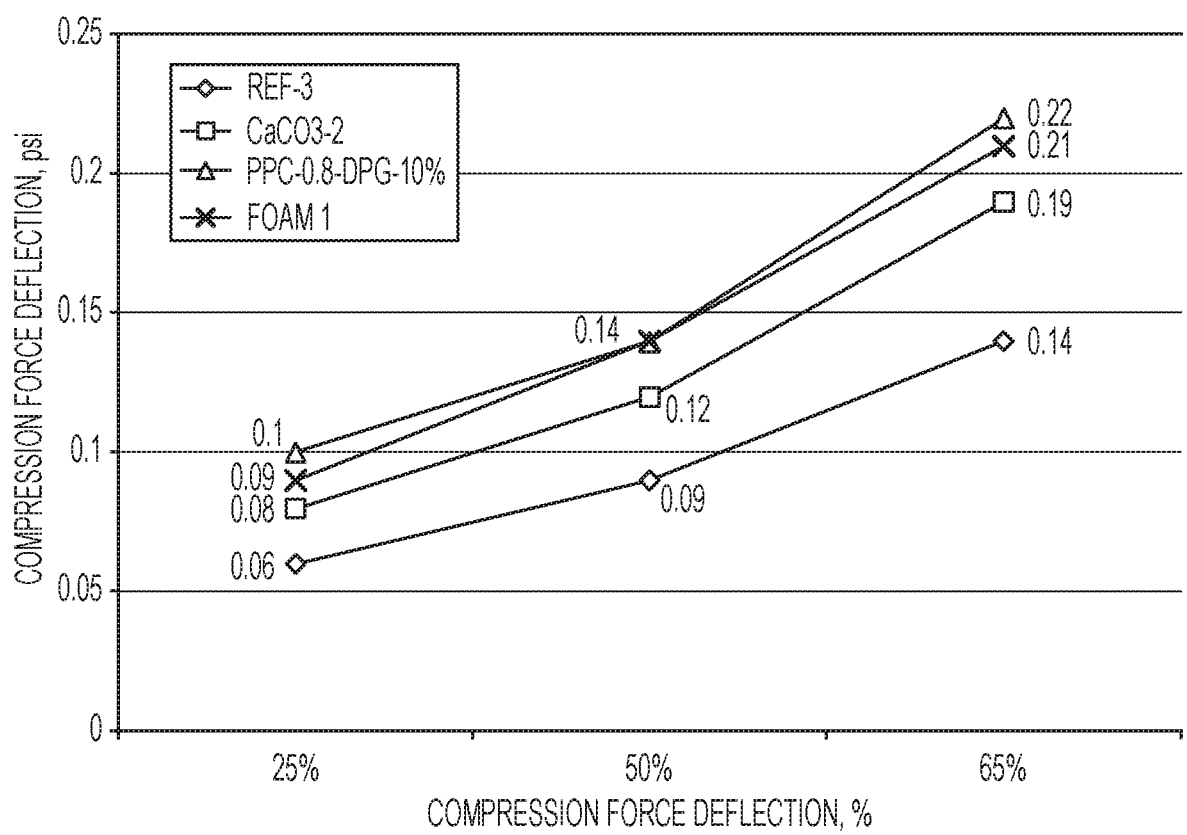
FIG. 6 Shows a graph comparing CFD values for certain viscoelastic (VE) foams of the present invention with reference foams. Effect of Novomer PPC-0.8-DPG (polyol 74-217) on CFD of viscoelastic foams: REF-3—Reference foam (#1 in Tables 2B-5B); CaCO₃-2—Reference foam prepared with CaCO₃ as filler (#2 in Tables 2B-5B); PPC-0.8-DPG-10%—Foam prepared with 10% Novomer polyol (#3in Table 3B); Foam 1—Foam prepared with 10% Novomer polyol and CaCO₃ as filler (#5 in Table 3B).
Figure 7:
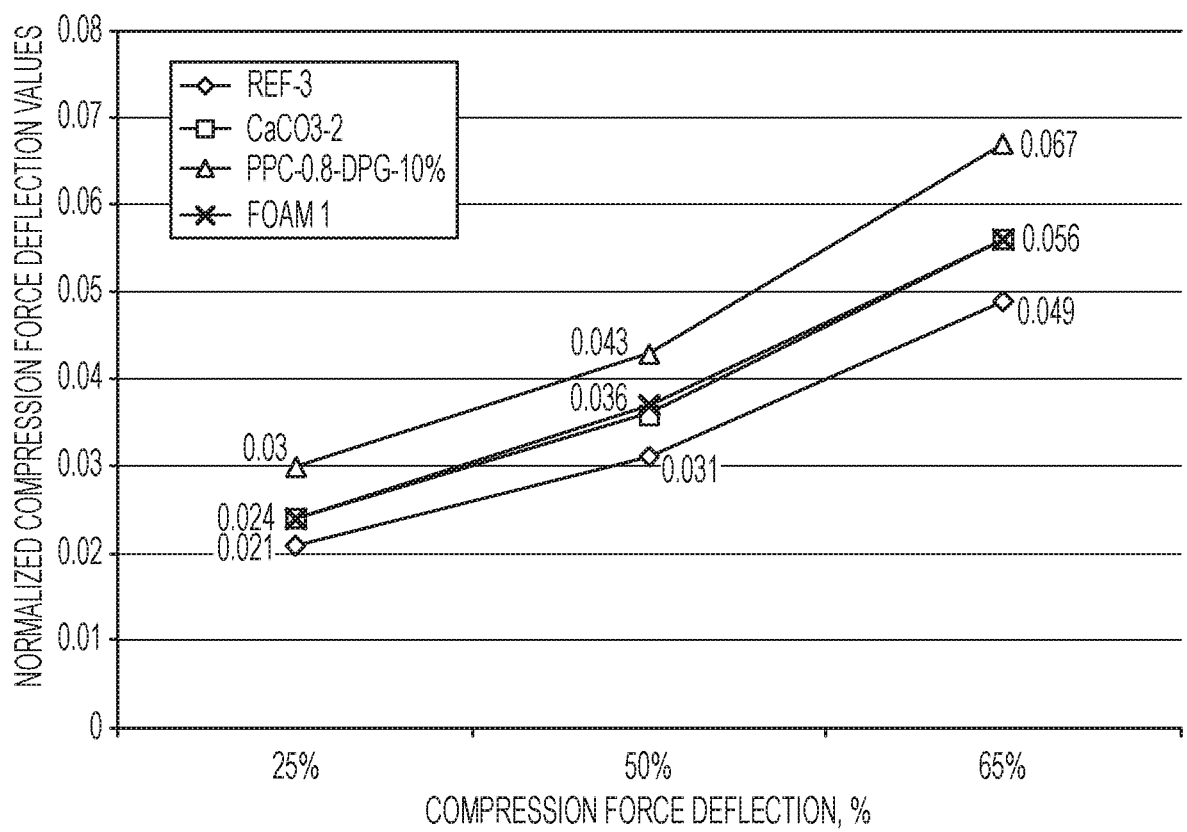
FIG. 7 Shows a graph comparing CFD values for certain VE foams of the present invention with reference foams. Normalized CFD values for reference visco-elastic foams and visco-elastic foams based on PPC-0.8-DPG Novomer polyol (74-217): REF-3—Reference foam (#1 in Tables 2B-5B); CaCO₃-2—Reference foam prepared with CaCO₃ as filler (#2 in Tables 2B-5B); PPC-0.8-DPG-10%—Foam prepared with 10% Novomer polyol (#3in Table 3B); Foam 1—Foam prepared with 10% Novomer polyol and CaCO₃ as filler (#5 in Table 3B).
Figure 8:
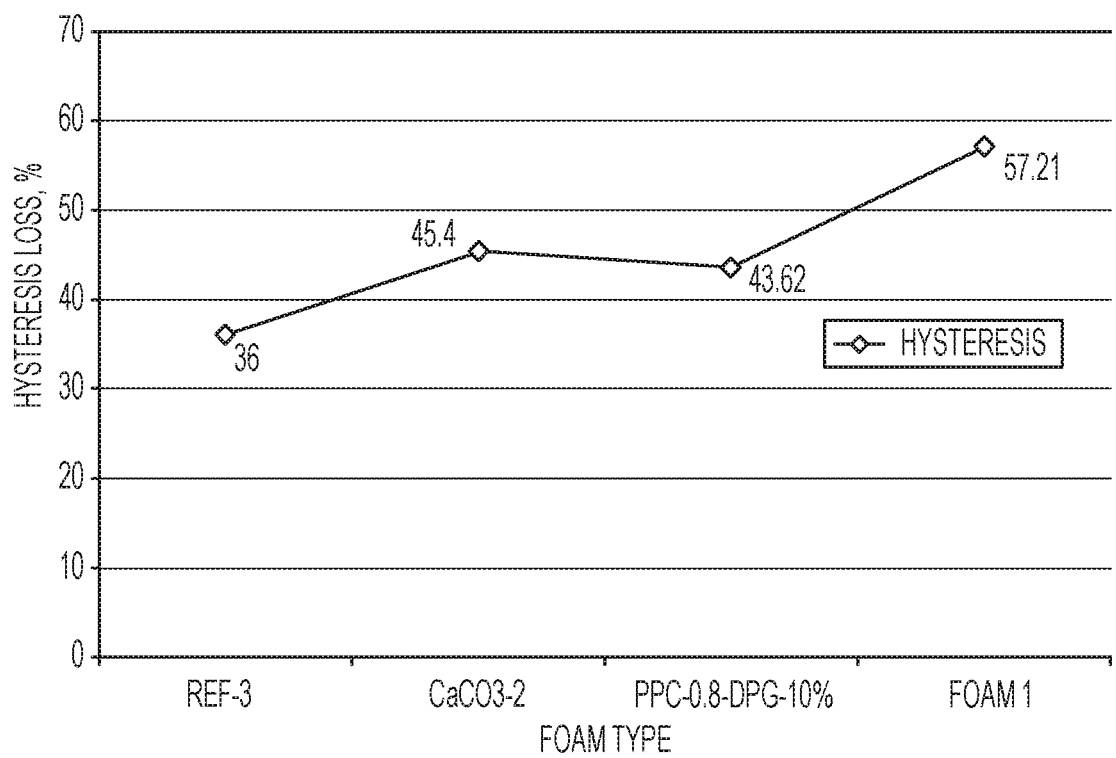
FIG. 8 Shows a graph comparing hysteresis of certain VE foams of the present invention with reference foams. Effect of Novomer PPC-0.8-DPG polyol (74-217) on Hysteresis of viscoelastic foams: REF-3—Reference foam (#1 in Tables 2B-5B); CaCO₃-2—Reference foam prepared with CaCO₃ as filler (#2 in Tables 2B-5B); PPC-0.8-DPG-10%—Foam prepared with 10% Novomer polyol 74-217 (#3in Table 3B); Foam 1—Foam prepared with 10% Novomer polyol 74-217 and CaCO₃ as filler (#5 in Table 3B).
Figure 9:
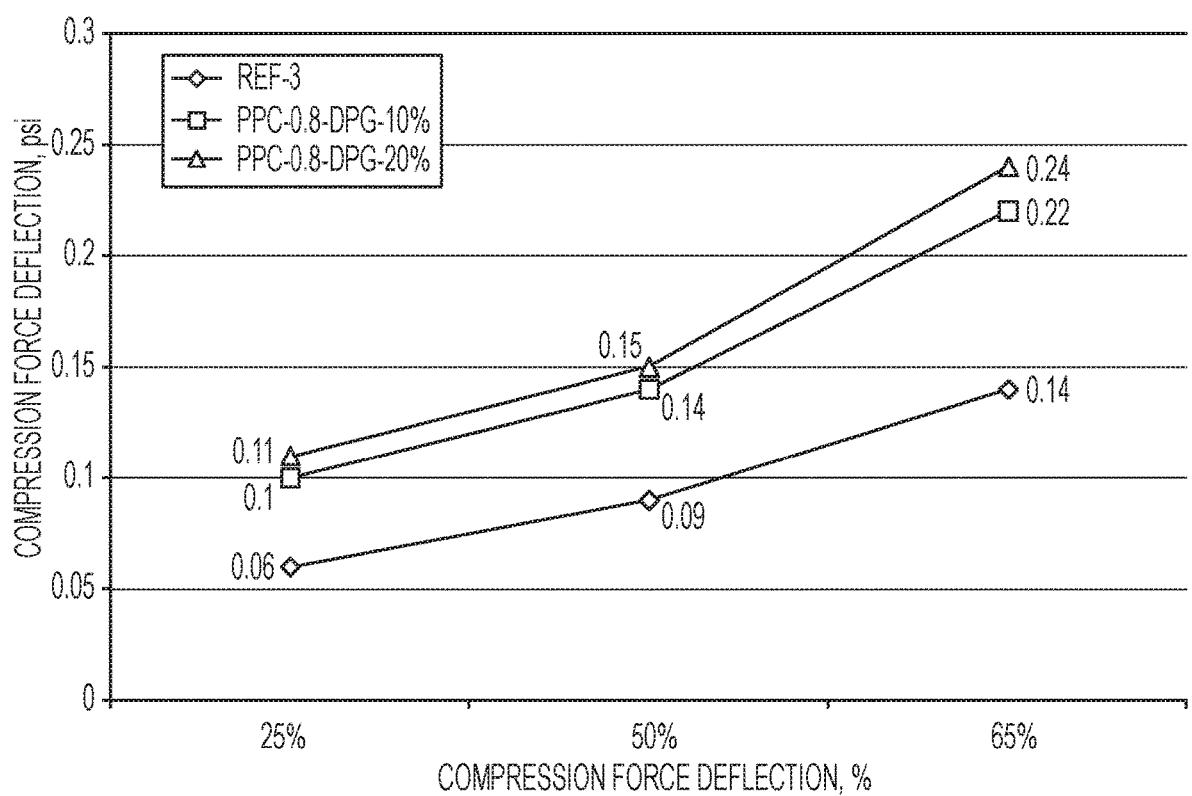
FIG. 9 Shows a graph comparing CFD values for certain VE foams of the present invention with reference foams. Effect of Novomer PPC-0.9-DPG (74-217) polyol on CFD of viscoelastic foams: REF-3—Reference foam (#1 in Tables 2B-5B); PPC-0.8-DPG-10%—Foam prepared with 10% Novomer polyol 74-217 (#3in Table 3B); PPC-0.8-DPG-20%—Foam prepared with 20% Novomer polyol 74-217 (#4 in Table 3B).
Figure 10:
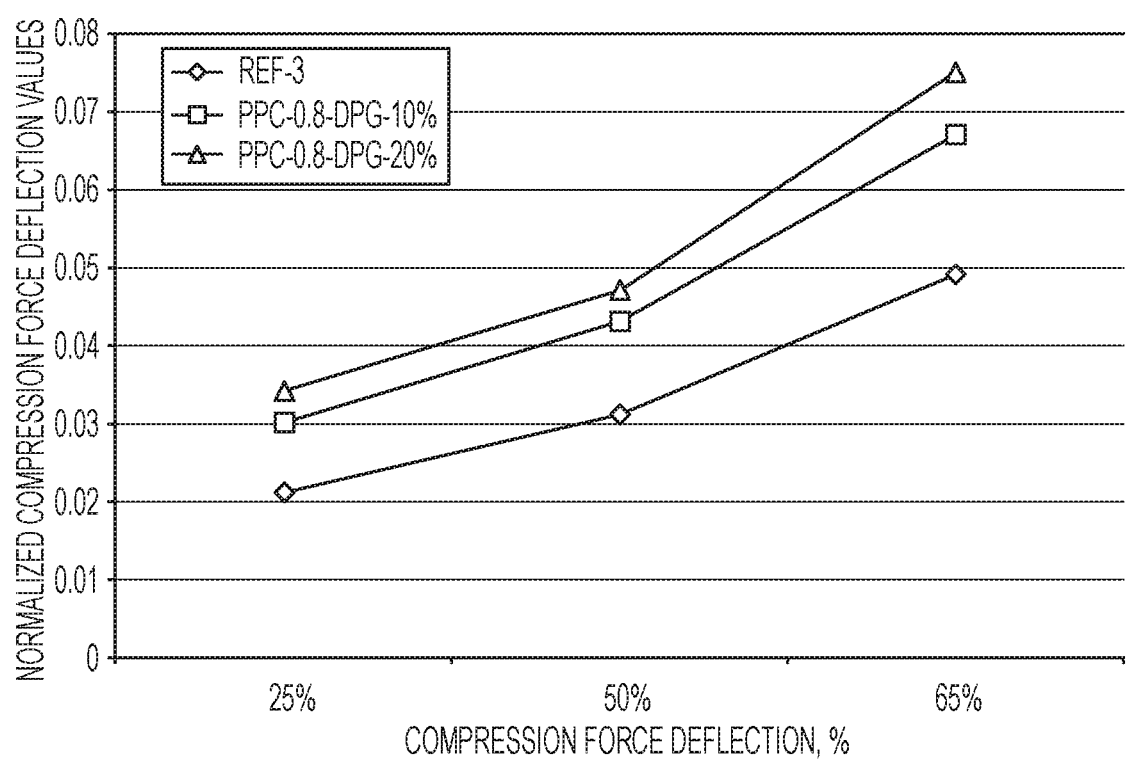
FIG. 10 Shows a graph comparing CFD values for certain VE foams of the present invention with reference foams. Normalized CFD values for reference foams and foams based on Novomer PPC-0.8-DPG polyol (74-217): REF-3—Reference foam (#1 in Tables 2-5); PPC-0.8-DPG-10%—Foam prepared with 10% Novomer polyol 74-217 (#3in Table 3).
Figure 11:
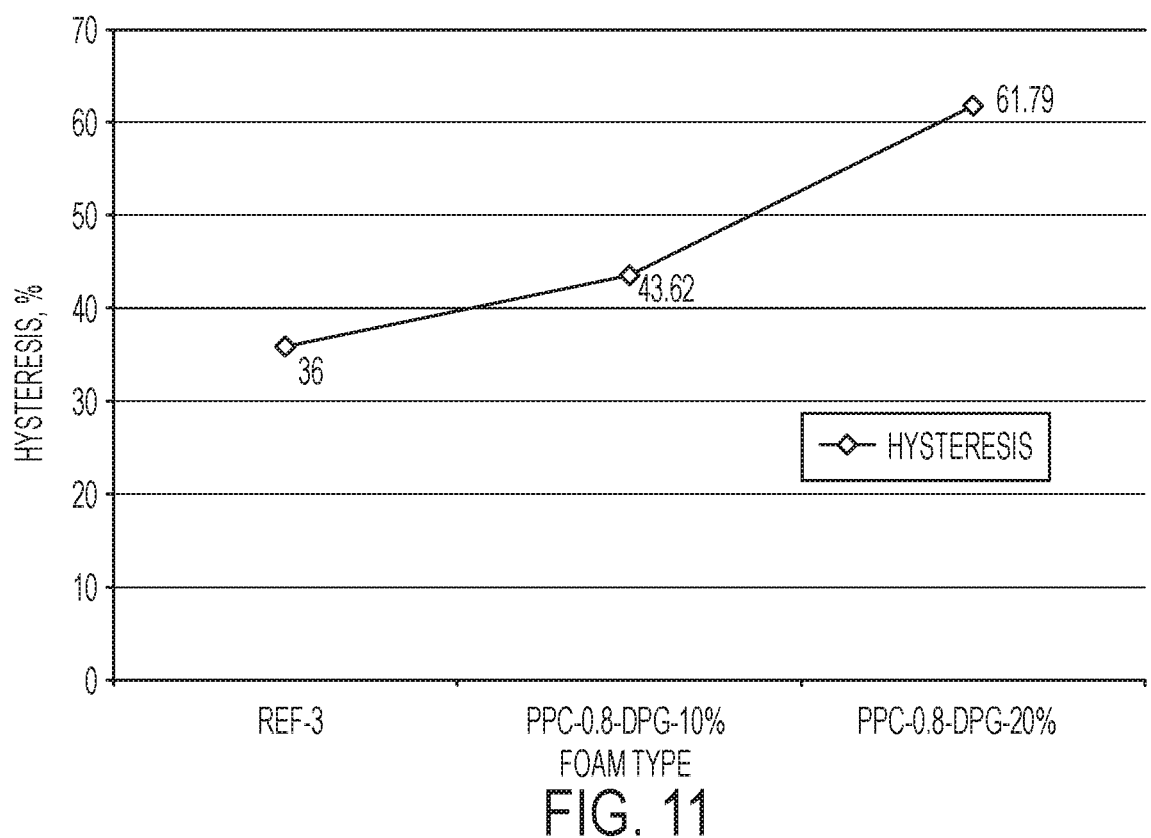
FIG. 11 Shows a graph comparing hysteresis of certain VE foams of the present invention with reference foams. Effect of Novomer PPC-0.8-DPG (74-217) polyol on Hysteresis of viscoelastic foams: REF-3—Reference foam (#1 in Tables 2B-5B); PPC-0.8-DPG-10%—Foam prepared with 10% Novomer polyol 74-217 (#3in Table 3B); PPC-0.8-DPG-20%—Foam prepared with 20% Novomer polyol 74-217 (#4 in Table 3B).
Figure 12:
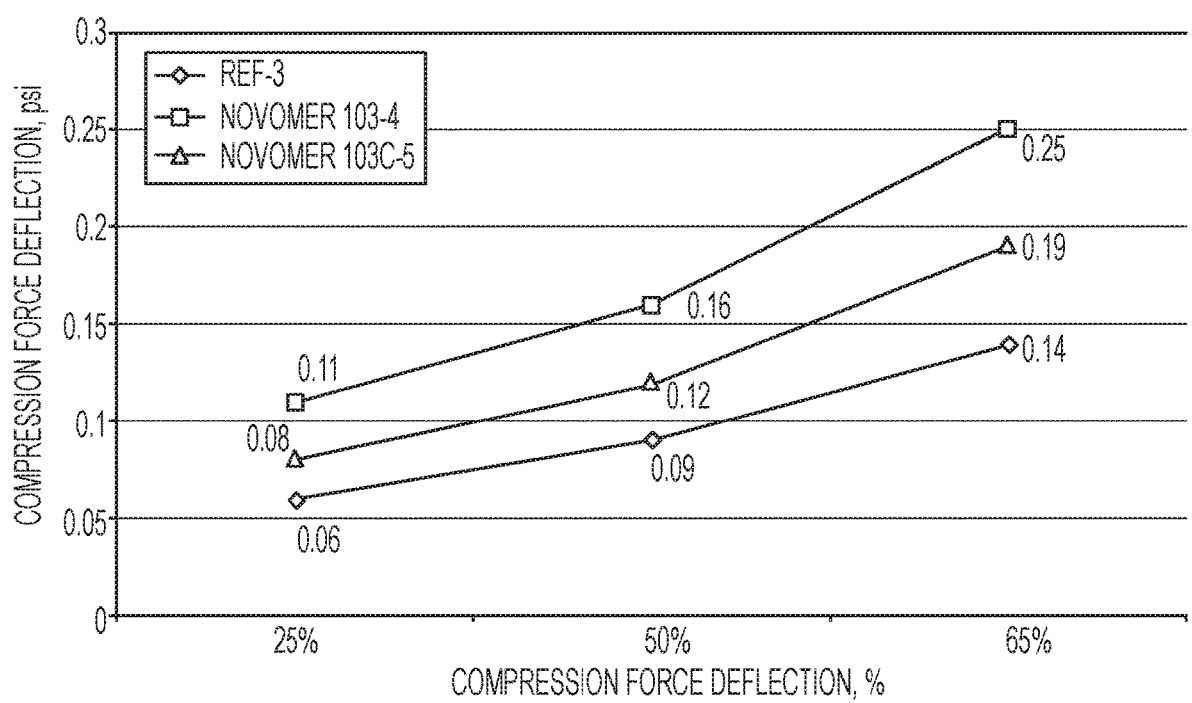
FIG. 12 Shows a graph comparing CFD values for certain VE foams of the present invention with reference foams. Effect of Novomer PPC-1.2-DPG polyol (58-103-C) on CFD viscoelastic foams: REF-3—Reference foam (#1 in Tables 2B-5B); Novomer 103C-4—Foam prepared with 10% Novomer polyol 58-103-C (#6 in Table 2B-1); Novomer 103C-5—Foam prepared with 18% Novomer polyol 58-103-C (#3in Table 2B-2).
Figure 13:
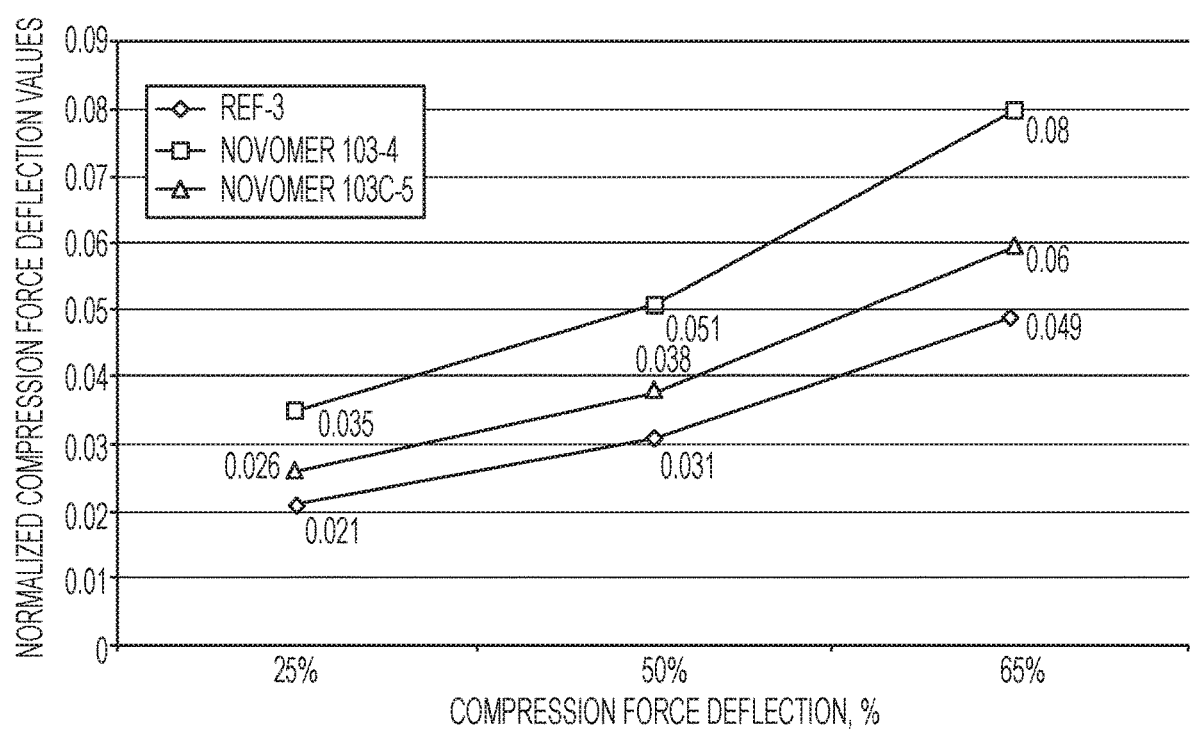
FIG. 13 Shows a graph comparing CFD values for certain VE foams of the present invention with reference foams. Normalized CFD values for reference VE foams and VE foams based on Novomer PPC-1.2-DPG (58-103-C) polyol: REF-3—Reference foam (#1 in Tables 2B-5B); Novomer 103C-4—Foam prepared with 10% Novomer polyol 58-103C (#6 in Table 2B-1); Novomer 103C-5—Foam prepared with 18% Novomer polyol 58-103-C (#3in Table 2B-2).
Figure 14:
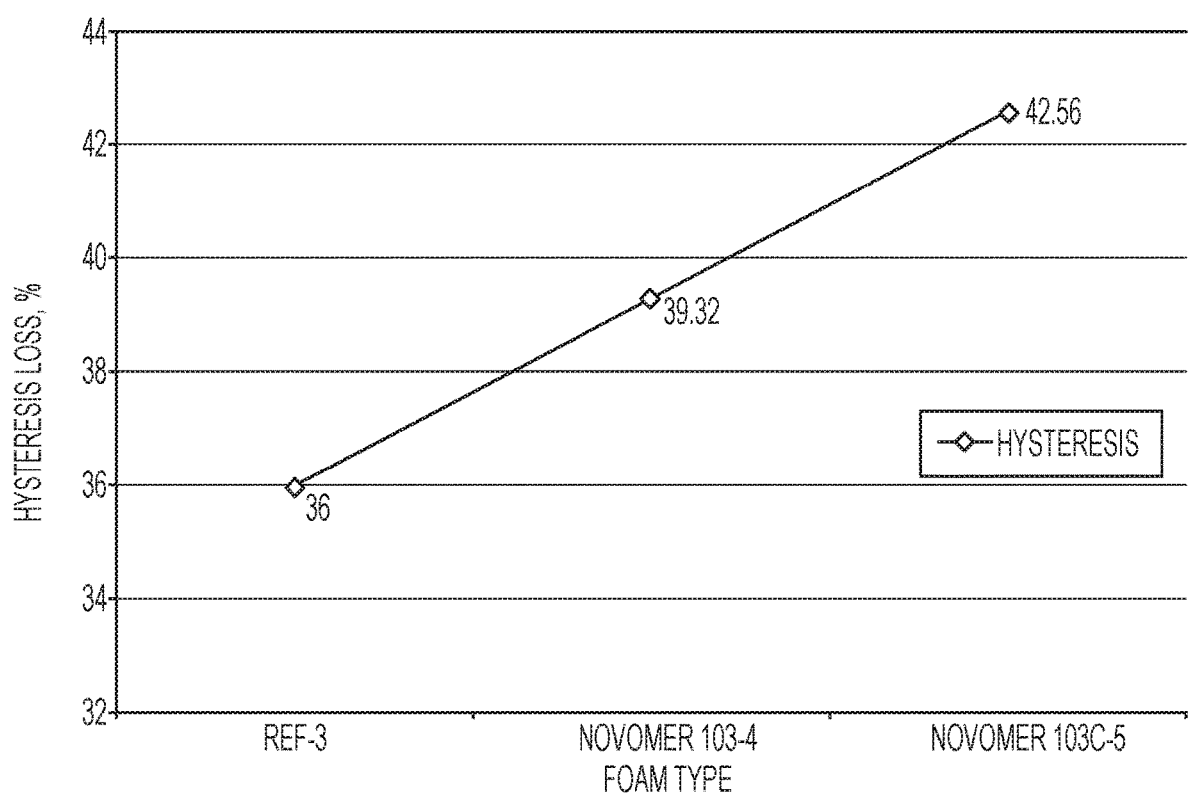
FIG. 14 Shows a graph comparing hysteresis of certain VE foams of the present invention with reference foams. Effect of Novomer PPC-1.2-DPG polyol (58-103-C) on Hysteresis of viscoelastic foams: REF-3—Reference foam (#1 in Tables 2B-5B); Novomer 103-4—Foam prepared with 10% Novomer polyol 58-103-C (#6 in Table 2B-1); Novomer 103C-5—Foam prepared with 18% Novomer polyol 58-103-C (#3in Table 2B-2).
Figure 15:
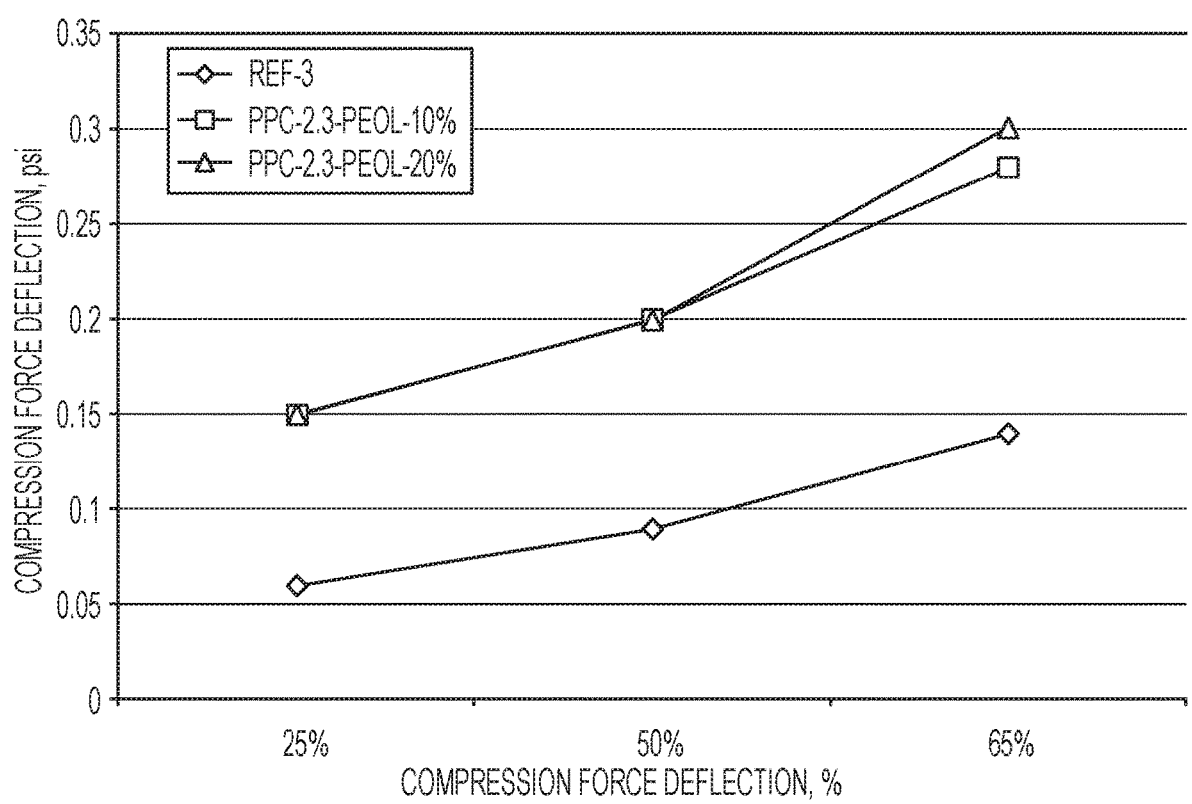
FIG. 15 Shows a graph comparing CFD values for certain VE foams of the present invention with reference foams. Effect of Novomer PPC-2.3-PEOL polyol (74-277) on CFD of viscoelastic foams: REF-3—Reference foam (#1 in Tables 2B-5B); PPC-2.3-PEOL-10%—Foam prepared with 10% of Novomer polyol 74-277 (#3in Tables 4B); PPC-2.3-PEOL-20%—Foam prepared with 20% Novomer polyol 74-277 (#4 in Table 4B).
Figure 16:
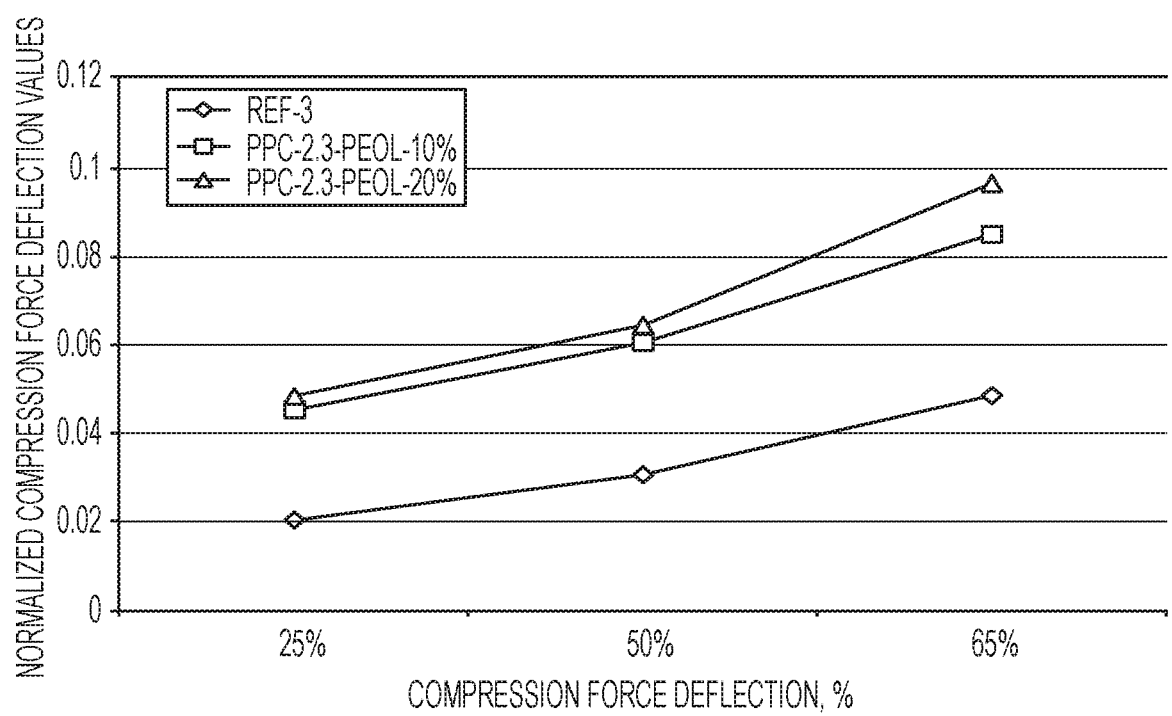
FIG. 16 Shows a graph comparing CFD values for certain VE foams of the present invention with reference foams.

Free-rise foams based on Novomer polyols exhibited significantly higher Compression Force Deflection (CFD) at 25%, 50%, and 65% deflections in comparison to the reference foam prepared with base polyol as sole polyol (Tables 3and 4; FIGS. 1-2) and slightly higher in comparison to the reference foams based on graft polyol (Tables 3-5; FIG. 3). These results clearly indicate that Novomer polyols improve the load bearing properties of the flexible foams. More importantly, the SAG factor was not affected by the introduction of Novomer polyols into foam formulations (Tables 3-5; FIGS. 4 and 5). Similar effect of Novomer polyol on CFD properties was observed in the case of molded foams (Table 6).

Slight decrease in tensile strength was observed in all foams that were tested for resistance to dry aging for 22 hours at 140° C. However, no major difference in retention of properties was observed between reference foams with and without graft polyol and foams prepared with Novomer polyols (Tables 3-5).

Conclusions

Reactivity of Novomer polyols was comparable to the reactivity of the reference polyol Poly-G 85-29 and graft polyol Speciflex NC-701. However, in order to get open cell structure some adjustments in catalysis and amount of diethanolamine (reactive catalyst/cross-linker) was required.

Freer-rise foams prepared with 5%-25% Novomer polyols exhibited uniform cell structure. Both the density and apparent cell structure of these foams were comparable to the reference foams prepared with and without graft polyol.

All foams prepared with 5%-25% Novomer polyols exhibited relatively high resilience and can be classified as High Resilient (HR) PU foams. All these foams exhibited comparable properties to the reference foams which meets most of the properties specified by Chrysler Material Standard: MS-DC-649 for "Cellular, Molded Polyurethane High Resilient (HR) Type Seat Applications".

The tensile strength and tear strength properties of foams prepared with Novomer polyols were better in comparison to the reference foams. The retention of stress-strain properties with heat aging was not affected by introduction of Novomer polyols.

Results of CFD measurements clearly indicate an increase in load bearing properties of free-rise and molded foams based on Novomer polyols without affecting the SAG (comfort) factor.

Example 2

Viscoelastic Foam Compositions

Presented below are the formulations of viscoelastic polyurethane foams according to the principles of the present invention. These materials were made using aliphatic polycarbonate polyol additives as defined herein. Specifically, the aliphatic polycarbonate polyols hereinafter also refered to as "Novomer Polyols" used in the formulations below have the following properties:

|  | 58-103-C | 74-217 | 74-277 |
|---|---|---|---|
| Acid Value, mg KOH/g | 0.28 | 0.02 | 0.01 |
| Hydroxyl Value, mg KOH/g | 119 | 169.95 | 67.07 |
| Mn (GPC) | 1,270 | 810 | 2290 |
| Mw (GPC) | 1,370 | 920 | 2400 |
| Polydispersity, Mw/Mn | 1.07 | 1.13 | 1.05 |
| Glass Transition Temp. (DSC), Tg | -5° C. | -20° C. | -5° C. |
| Viscosity, cPs | 4,990 @ 80° C. | 330 @ 75° C.- | 3700 @ 75° C. |

Polyol 58-103-C is a linear 1270 g/mol poly(propylene carbonate) polyol initiated with dipolypropylene glycol (a mixture of isomers) having a PDI of 1.06, greater than 99% —OH end groups and greater than 99% carbonate linkages (exclusive of the ether bond in the dipropylene glycol). This polyol conforms to the formula:

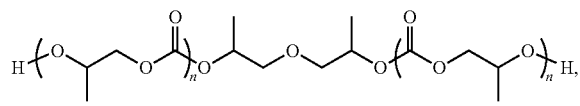

where n is, on average in the composition, approximately 5.6.

Polyol 74-217 is a linear 810 g/mol poly(propylene carbonate) polyol initiated with dipolypropylene glycol (a mixture of isomers) having a PDI of 1.13, greater than 99% —OH end groups and greater than 99% carbonate linkages (exclusive of the ether bond in the dipropylene glycol). This polyol conforms to the formula:

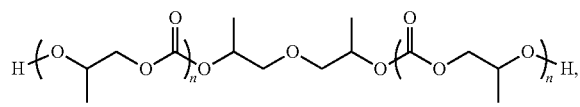

where n is, on average in the composition, approximately 3.3.

Polyol 74-277 is a linear 2400 g/mol poly(propylene carbonate) polyol initiated with 600 g/mol polypropylene glycol (mixture of isomers) having a PDI of 1.05, greater than 99% —OH end groups and greater than 99% carbonate linkages (exclusive of the ether bonds in the polypropylene glycol). This polyol conforms to the formula:

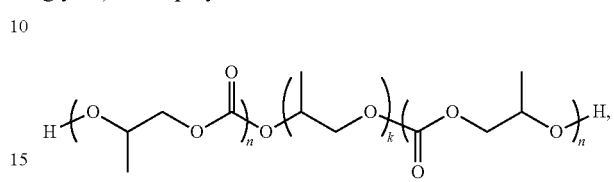

where k is on average about 10, and n is on average in the composition approximately 9.

The effect of PPC diols on load bearing (CFD) and other properties of visco-elastic polyurethane foams were evaluated in this study. Foams were also prepared using a mixture of Novomer PPC polyols. Mondur MRS-2 with high content of 2,4'-MDI was used as an isocyanate in preparation of foams. Properties of visco-elastic foams prepared with NOVOMER polyols were compared to properties of reference model formulation prepared with conventional polyols.

Raw Materials

A list of raw materials used in this evaluation is shown in Table 1B. All materials were used as received including Novomer polyols.

TABLE 1B

Materials

| Designation | Type | Supplier |
|---|---|---|
| POLYOLS | | |
| Novomer Polyol Batch # 58-103-C | Novomer Poly(Propylene Carbonate) Hydroxyl Value = 119 mg KOH/g; Eq. wt. = 471.43 Acidity Value = 0.28 mg KOH/g | Novomer |
| Novomer Polyol Batch # 74-217 | Hydroxyl Value = 169.95 mg KOH/g; Eq. wt. = 330.1 Acidity Value = 0.02 mg KOH/g | Novomer |
| Novomer Polyol Batch # 74-277 | Hydroxyl Value = 67.07 mg KOH/g; Eq. wt. = 836.4 Acidity Value = 0.01 mg KOH/g | Novomer |
| Poly G 30-240 | Oxypropylated polyether triol Hydroxyl Value = 238 mg KOH/g; Eq. wt. = 235.7 | Arch |
| Poly G-76-120 | Ethylene oxide capped polyether triol Hydroxyl Value = 119.3 mg KOH/g; Eq. wt. = 467.5 | Arch |
| Poly G-85-34 | Ethylene oxide capped polyether triol Hydroxyl Value = 35 mg KOH/g; Eq. wt. = 1602.9 | Arch |
| SURFACTANTS | | |
| Tegostab B 4690 | Polyether/Silicone Oil Mix Eq. Wt. = 1335.7 | Evonik |
| CELL OPENER | | |
| Lumulse POE 26 | Hydroxyl Value = 134.8 mg KOH/g Eq. Wt = 416.2 | Lambent |
| CHAIN EXTENDER | | |
| DEG | Diethylene glycol | Interstate Chem. Com. |

TABLE 1B-continued

Materials

| Designation | Type | Supplier |
|---|---|---|
| CATALYSTS | | |
| Dabco 33LV | 33% Triethylene diamine in dipropylene glycol | Air Products |
| Niax A1 | bis(2-dimethylaminoethyl) ether | Momentive |
| ISOCYANATES | | |
| Mondur MRS-2 | 2,4' rich diphenylmethane diisocyanate (F = 2.2; Eq. wt. = 129.9; % NCO = 32.35) | Bayer |
| FILLER | | |
| Calcium carbonate | Calcium carbonate, Powder-Technical | Spectrum |

Preparation and Testing of Foams

Free rise water-blown foams were prepared with 0%, 10%, and 20% Novomer 58-103-C, Novomer 74-217, and Novomer 74-277 polyols as replacements for petroleum based commercial polyols. VE foams were also prepared using a mixture of the three Novomer polyols up to 30% and 45% levels as replacements for the petroleum based commercial polyols (Tables 2B-5B). Reference VE foams and VE foams based on Novomer polyols were also prepared with $CaCO_3$ as filler (Tables 2B-5B).

Most of the VE foams in this Example were prepared at an Isocyanate Index of 70 with Mondur™ MRS-2, which is a 2,4'-MDI rich isocyanate (Tables 2B-5B). Foams based on 30% and 45% mixture of the three Novomer polyols were also prepared at an Isocyanate Index of 80 (Table 5B).

Free-rise foams were prepared using a standard laboratory hand-mixing procedure. Foaming profiles, including cream time, gel time, and rise time were measured on all foams. After the rise time, the foams were immediately placed in an air-circulating oven preheated at 70° C. for 60 minutes to complete the cure.

The full characterization was carried out on selected foams after aging for a minim 7 days according to ASTM D 3574-08 as follows:
  Foam Density (Test A),
  Resilience via Ball Rebound (Test H),
  Tensile Strength at Break (Test E),
  Elongation at Break (Test E),
  Tear Strength (Test F),
  CFD, Compression Force Deflection (Test C),
  Hysteresis (Procedure B-CFD Hysteresis Loss),
  Dry Constant Deflection Compression Set (Test D),
  Wet Constant Deflection Compression Set (Test D & Wet Heat Aging, Test L)

Recovery Time was measured on Instron Tester using in-house protocol. The following measurement parameters were employed:
  Sample dimensions: 2"×2"×1"
  Indentor Foot Area: 64 $mm^2$
  Speed: 500 mm/min
  Indentation: 80%
  Hold Time: 60 sec.

The recovery time was measured according to the following protocol: Place the test specimen on the supporting plate. Bring the indentor foot into contact with the specimen. Immediately indent the specimen 80% of its initial thickness at a speed of 500 mm/min and hold for 60 seconds. After 60 seconds dwell time, return the indentor to 0% deflection at 500 mm/min, starting the stopwatch immediately upon initiating the upward movement of the indentor. Stop the watch as soon as the imprint of the indentor foot is not visible, and record the time. Repeat the process on 2 additional specimens and calculate the average time.

Glass transition temperature was measured via the following methods:
  DSC (DSC Q10 from TA instrument) under nitrogen at heating rate of 20° C. per minute in a temperature rate between −80° and +200° C.
  DMA (DMA 2980 from TA Instrument) under nitrogen at heating rate of 3° C. per minute in a temperature rate between −0° and +130° C.

Results

A model VE foam formulation was based on three different commercial polyether triols: Poly-G 30-240, Poly-G 76-120, and Poly-G 85-34 with equivalent weights of ~236, ~468, and ~1603, respectively (Tables 1B-5B). Ethoxylated glycerol Lumulse POE 26 with equivalent weight of ~416 was used as a cell opening polyol (Tables 1B-5B). Diethylene glycol (DEG) was used as a chain extender. Dabco 33LV and Niax A-1 were used as catalysts. Dabco 33LV catalyst promotes gelling reaction (reaction of isocyanate with polyol) and blowing reaction (reaction of isocyanate with water). Niax A-1 is a blowing catalyst.

The reactivity of the PU systems was not affected significantly after 10% and 20% drop-in replacement of any of commercial polyols (Tables 2B-4B) including the cell opening polyol (Table Table 2B) with Novomer polyls. The reactivity of the PU system was not significantly affected after 30% and 45% drop-in replacement of commercial polyols with a mixture of the three Novomer polyols (Table 5B). No adjustment in catalysis was required to obtain open cell foams with Novomer polyols (Tables 2B-5B).

VE foams based on Novomer polyols exhibited a white color similar to the reference foams. The apparent cell structure of foams with Novomer polyols was uniform and similar to the reference foams.

Foam Physical Properties

Compression Force Deflection (CFD) at 25%, 50%, and 65% deflection was increased by introduction of Novomer polyols (Tables 2B-5B and FIGS. 6, 10, 12, and 15). CFD values normalized for the density clearly indicate that foams with Novomer polyol have higher CFD (better load bearing properties) in comparison to the reference foams (Tables 2B-5B and FIGS. 7, 10, 13, and 16). CFD graphs are shown in FIGS. 6-19.

Hysteresis Loss, which is independent of foam density, also increased with introduction of Novomer polyols (Tables 2B-5B and FIGS. 8, 11, 14, and 17) which indicates that foams based on Novomer polyols are more energy absorbing than the reference foams. In general, Hysteresis Loss is a more reliable measure of energy absorption than resilience measured via the Ball Rebound Method. All foams prepared in this study exhibited very low resilience of 1% or less (Tables 2B-5B).

The tensile strength (FIGS. 6-20) and tear strength (FIGS. 20-23) of the VE foams was increased by introduction of Novomer polyol 58-103-C as a replacement for Poly-G 76-120 polyols of similar equivalent weight, both with and without calcium carbonate filler (compare formulations 1 and 2 with formulations 4 and 5 in Table 2B). The tensile and tear strengths measured are consistent with the CFD properties of these foams.

The increase in tensile strength and tear strength properties was especially high in foams prepared with a proportional mixture of the three Novomer polyols at 30% and 45% replacement of the three commercial base polyols (compare formulations 1 and 2 with formulations 3 and 4 in Table 5B).

As expected, with an increase in isocyanate index from 70 to 80 the tensile strength and tear strength increased even more in the foams based on a mixture of Novomer polyols (compare formulations 3 and 4 with formulations 5 and 6 in Table 5B).

In most foams tested, the elongation at break was much higher than the elongation (% strain) at maximum load. In order to be consistent, the elongation at maximum load was reported as the elongation. Without exception, all foams exhibited elongation greater than 100% (Tables 2B-5B).

Recovery time after indentation to 80% of its initial thickness was not significantly affected in foams prepared using just one of Novomer polyols (Tables 2B-4B). However, foams prepared with a proportional mixture of the three Novomer polyols at 30% and 45% levels as replacement for base commercial polyols exhibited huge increase in the recovery time in comparison to the reference foam (Table 5). This is consistent with the hysteresis values of these foams (Table 5B).

Dray and wet compression set was measured on selected number of foams. In all foams containing up to 30% Novomer polyols based on total polyols both dry and wet compression sets were relatively low and comparable to the reference foam (Tables 2B-5B).

DMA and DSC Results

DMA and DSC graphs of selected foams are shown in FIGS. 18-23. Transitions in DMA and DSC graphs are summarized in table on the next page.

Reference foam (REF-3, Formulation #1 in Tables 2-5) exhibited Tg at −46° C. which corresponds to first maximum in loss modulus as measured via DMA (FIG. 18a; see Table 1C). Tan delta peak was broad and exhibited low height with maximum at 35° C. In general, the area under Tan Delta peak relates to energy absorbing properties; larger area should relate to higher energy absorbing properties. The foam that has low Tg and high area under Tan delta curve is considered desirable for memory foams.

Foam based on 20% Novomer 74-217 polyol (Formulation #4 in Table 3B) exhibited a Tg similar to the reference foam, as measured by DMA (See Table 1C). The Tg measured via DSC was also similar to the reference foam (Table 1C). Tan delta max measured on the foam incorporating 20% Novomer 74-217 polyol was at slightly higher temperature in comparison to the reference foam. However, the tan delta peak was significantly higher and area under the peak was significantly larger in comparison to the reference foam which indicates that the energy absorbing capacity is higher. These data correlate very well with hysteresis measurements. Hysteresis Loss of Novomer foam was 62% and that of the reference foam 36% (Formulations #1 and #4 in Table 3B).

TABLE 1C

Transitions Measured via DMA and DSC

| Foam designation | Formulation # (Table #) | DMA transitions Loss Modulus, ° C. | DMA transitions Tan delta max., ° C. | DSC transitions |
|---|---|---|---|---|
| Reference foam | F#1 (T#2B-5B) | −46.4 (Tg); −1.96; +26.1 | 35.25 (broad and low height) | 3.28 (Tg) |
| PPC-0.8-DPG-20% | F#4 (T#3B) | −43.9 (Tg); 3.08; 29.6 (weak) | 39.35 (broad and high) | 6.82 (Tg) |
| Novomer 103C-5 | F#3 (T#2B) | 3.08 (Tg); 29.3 | 30.2 (broad and medium high) | −2.48 (Tg); 112 (weak) |
| PPC-2.3-PEOL-20% | F#4 (T#4B) | −33.49 (Tg); 0.88; 29.28 | ~40 (broad and high) | 6.19 (Tg); 114.31 (weak); 159.8 (weak) |
| ISO 80% | F#5 (T#5B) | −41.38 (Tg); 13.81 | 49.75 (broad and high) | 13.36 (Tg); 108.74 (weak) |
| ISO 80%-15 | F#6 (T#5B) | 28.00 (Tg) | 55.74 (broad and high) | 17.37 (Tg); 110.08 (weak) |

Foam based on 18% Novomer 58-103-C polyol (Formulation #3 in Table 2B-2) exhibited significantly higher Tg than reference foam, as measured by DMA (FIGS. 18a and 19; see also table above). This shift in Tg measured via DMA can be ascribed to the fact that polyether polyol with high equivalent weight of 1603 was replaced with Novomer polyol of relatively low equivalent weight (471) (Formulations #1 and #3 in Table 2B-2). However, Tg as measured via DSC was detected at slightly lower temperature in the case of Novomer foam in comparison to the reference foam (FIGS. 21 and 22; see also table above).

Tan delta max of this Novomer foam was at 30° C., close to the reference foam. The area under the tan delta peak was higher in comparison to the reference foam which indicates that the energy absorbing capacity is higher (FIGS. 18 and 19). These results are also consistent with hysteresis measured on these two foams (Formulations #1 and #3 in Table 2B).

Foam based on 20% Novomer 74-277 polyol (Formulation #4 in Table 4B) exhibited relatively low Tg (−33.49° C.) as measured via DMA and Tan delta peak is at 40° C., which is broad and high. Both Tg and Tan delta max are slightly shifted to higher temperatures as compared to reference foam (FIGS. 18 and 19, Table 1C). Energy absorbing properties as measured by DMA correlate very well with hysteresis results. This foam exhibited significantly higher hysteresis in comparison to the reference foam (Formulation #1 and #4 in Table 4).

Foam prepared by using 30% mixture of 3 different Novomer polyols (Formulation #5 in Table 5B) exhibited low Tg close to the reference foam as determined via DMA. Tan delta peak was broad and high with maximum at 50° C., indicating significantly higher energy absorbing capacity in comparison to the reference foam (FIGS. 18 and 20a; Table 1C). Hysteresis value for this foam was high, (73%) while that of the reference foam was 36% (Formulations #1 and #5 in Table 5B).

Foam prepared by using 45% mixture of 3 different Novomer polyols (Formulation #6 in Table 5B) exhibited relatively high Tg in comparison to the reference foam and other foams prepared with Novomer polyols (FIGS. 18-20, Table 1C). Tan delta maximum was at 56° C., which is significantly higher in comparison to other foams. Tan delta peak was high indicating large energy absorbing capacity, which is consistent with the hysteresis loss of 83% (Formulation #6 in Table 5B).

Based on DMA measurements it can be concluded that Novomer polyols impart energy improved absorbing properties to the foam which is a desirable property viso-elastic foams.

TABLE 2B-1

Visco-elastic foams formulated with Novomer 58-103-C polyol

| Designation | Eqv. Weight | 1 | 2 | 3 | 4 | 6 |
|---|---|---|---|---|---|---|
| Sample designation | | REF-3 | CaCO3-2 | Novomer 103C 1* | Novomer 103C-2* | Novomer 103C-4 |
| Total Novomer polyols, % | | 0 | 0 | 10 | 10 | 10 |
| Polyol system | | | | | | |
| Novomer 58-103-C | 471.4 | 0 | 0 | 10 | 10 | 10 |
| Poly G 30-240 | 235.7 | 21 | 21 | 17 | 21 | 21 |
| Poly G 76-120 | 467.5 | 21 | 21 | 17 | 21 | 21 |
| Poly G 85-34 | 1602.9 | 18 | 18 | 16 | 18 | 8 |
| Lumulse POE 26 | 416.2 | 40 | 40 | 40 | 30 | 40 |
| CaCO3 | | 0 | 26 | 0 | 0 | 0 |
| DEG | 53.1 | 2.25 | 2.25 | 2.25 | 2.25 | 2.25 |
| Water | 9 | 2.3 | 2.3 | 2.3 | 2.3 | 2.3 |
| Tegostab B 4690 | 1335.7 | 1.5 | 1.5 | 1.5 | 1.5 | 1.5 |
| Dabco 33LV | 105 | 0.1 | 0.1 | 0.1 | 0.1 | 0.1 |
| Niax A-1 | 233.7 | 0.2 | 0.2 | 0.2 | 0.2 | 0.2 |
| Isocyanate System | | | | | | |
| Mondure MRS-2 | 129.9 | 49.45 | 49.45 | 48.94 | 49.19 | 50.81 |
| Isocyanate Index | | 70 | 70 | 70 | 70 | 70 |
| Reaction Profile of Free-rise | | | | | | |
| Mix time, sec. | | 10 | 10 | 10 | 10 | 10 |
| Cream time, sec. | | 15.33 | 14 | 13 | 16 | 14 |
| Gel time, sec. | | 63.33 | 52 | 45 | 66 | 56 |
| Rise time, sec. | | 137.33 | 136 | 98 | 152 | 83 |
| Post-curing time & temperature* | | 60 min @70° | 60 min @70° | 60 min @70° | 60 min @70° | 60 min @70° |
| Properties | | | | | | |
| Free-rise density, pcf | | 2.87 ± 0.10 | 3.37 ± 0.14 | 2.56 ± 0.17 | 3.11 ± 0.16 | 3.15 ± 0.11 |
| Resilience, % | | 0.86 ± 0.23 | 0.76 ± 0.31 | 0.25 ± 0.00 | 0.66 ± 0.14 | 0.56 ± 0.11 |
| CFD @ 25%, psi | | 0.06 ± 0.01 | 0.08 ± 0.01 | 0.06 ± 0.02 | 0.15 ± 0.03 | 0.11 ± 0.01 |
| CFD @ 50%, psi | | 0.09 ± 0.01 | 0.12 ± 0.01 | 0.09 ± 0.02 | 0.19 ± 0.04 | 0.16 ± 0.02 |
| CFD @ 65%, psi | | 0.14 ± 0.02 | 0.19 ± 0.02 | 0.15 ± 0.04 | 0.28 ± 0.07 | 0.25 ± 0.03 |
| Hysteresis | | 36 ± 3.22 | 45.40 ± 1.98 | 53.86 ± 1.36 | 68.66 ± 3.41 | 39.32 ± 2.51 |
| Tensile Strength, psi | | 11.33 ± 1.89 | 9.83 ± 0.52 | 10.89 ± 1.84 | 17.13 ± 3.97 | 5.57 ± 1.65 |
| Elongation at Maximum Load, % | | 192 ± 34 | 163 ± 17 | 169 ± 66 | 180 ± 14 | 108 ± 23 |
| Tear Strength, lbf/in | | 2.04 ± 0.07 | 2.45 ± 0.25 | 2.05 ± 0.24 | 3.00 ± 0.47 | 1.94 ± 0.03 |
| Recovery Time, sec | | 3.91 ± 1.08 | — | — | — | — |
| Dry Compression Set @ 70° C, % | | 2.7 ± 0.42 | — | — | — | — |
| Wet Compression Set @ 50° C, % | | 2.2 ± 1.16 | — | — | — | — |
| Comments | | | | | | |

*After rise time, samples were placed in an oven for post-curing.

TABLE 2B-2

Visco-elastic foams formulated with Novomer 58-103-C polyol

| Designation | Eqv. Weight | 1 | 2 | 3 | 4 | 5 | 6 |
|---|---|---|---|---|---|---|---|
| Sample designation | | REF-3 | CaCO3-2 | Novomer 58-103C | FOAM #3 | FOAM#4 | FOAM #5 |
| Total Novomer polyols, % | | 0 | 0 | 18 | 10 | 10 | 20 |
| Polyol system | | | | | | | |
| Novomer 58-103-C | 471.4 | 0 | 0 | 18 | 10 | 10 | 20 |
| Poly G 30-240 | 235.7 | 21 | 21 | 21 | 21 | 21 | 21 |
| Poly G 76-120 | 467.5 | 21 | 21 | 21 | 11 | 11 | 1 |
| Poly G 85-34 | 1602.9 | 18 | 18 | 0 | 18 | 18 | 18 |
| Lumulse POE 26 | 416.2 | 40 | 40 | 40 | 40 | 40 | 40 |
| CaCO3 | | 0 | 26 | 0 | 0 | 26 | 0 |
| DEG | 53.1 | 2.25 | 2.25 | 2.25 | 2.25 | 2.25 | 2.25 |
| Water | 9 | 2.3 | 2.3 | 2.3 | 2.3 | 2.3 | 2.3 |
| Tegostab B 4690 | 1335.7 | 1.5 | 1.5 | 1.5 | 1.5 | 1.5 | 1.5 |
| Dabco 33LV | 105 | 0.1 | 0.1 | 0.1 | 0.1 | 0.1 | 0.1 |
| Niax A-1 | 233.7 | 0.2 | 0.2 | 0.2 | 0.2 | 0.2 | 0.2 |
| Isocyanate System | | | | | | | |
| Mondure MRS-2 | 129.9 | 49.45 | 49.45 | 51.90 | 49.43 | 49.43 | 49.41 |
| Isocyanate Index | | 70 | 70 | 70 | 70 | 70 | 70 |
| Reaction Profile of Free-rise | | | | | | | |
| Mix time, sec. | | 10 | 10 | 10 | 10 | 10 | 10 |
| Cream time, sec. | | 15.33 | 14 | 14 | 17 | 14 | 14 |
| Gel time, sec. | | 63.33 | 52 | 58 | 63 | 48 | 56 |
| Rise time, sec. | | 137.33 | 136 | 83 | 156 | 129 | 131 |
| Post-curing time & temperature* | | 60 min @70° | 60 min @70° | 60 min @70° | 60 min @70° | 60 min @70° | 60 min @70° |
| Properties | | | | | | | |
| Free-rise density, pcf | | 2.87 ± 0.10 | 3.37 ± 0.14 | 3.18 ± 0.17 | 3.07 ± 0.04 | 3.53 ± 0.31 | 3.18 ± 0.11 |
| Resilience, % | | 0.86 ± 0.23 | 0.76 ± 0.31 | 0.56 ± 0.11 | 2.54 ± 0.00 | 0.51 ± 0.00 | 2.54 ± 0.00 |
| CFD @ 25%, psi | | 0.06 ± 0.01 | 0.08 ± 0.01 | 0.08 ± 0.02 | 0.08 ± 0.01 | 0.14 ± 0.02 | 0.14 ± 0.03 |
| CFD @ 50%, psi | | 0.09 ± 0.01 | 0.12 ± 0.01 | 0.12 ± 0.02 | 0.12 ± 0.01 | 0.20 ± 0.04 | 0.19 ± 0.02 |
| CFD @ 65%, psi | | 0.14 ± 0.02 | 0.19 ± 0.02 | 0.19 ± 0.03 | 0.19 ± 0.03 | 0.29 ± 0.03 | 0.33 ± 0.07 |
| Hysteresis | | 36 ± 3.22 | 45.40 ± 1.98 | 42.56 ± 1.14 | 59.10 ± 0.69 | 61.70 ± 1.08 | 67.42 ± 1.66 |
| Tensile Strength, psi | | 11.33 ± 1.89 | 9.83 ± 0.52 | 5.20 ± 0.63 | 13.83 ± 1.63 | 16.15 ± 1.62 | 21.37 ± 0.81 |
| Elongation at Maximum Load, % | | 192 ± 34 | 163 ± 17 | 124 ± 22 | 187 ± 5 | 176 ± 10 | 213 ± 33 |
| Tear Strength, lbf/in | | 2.04 ± 0.07 | 2.45 ± 0.25 | 1.62 ± 0.25 | 2.82 ± 0.39 | 3.14 ± 0.32 | 3.59 ± 0.28 |
| Recovery Time, sec | | 3.91 ± 1.08 | — | 3.30 ± 0.95 | — | — | — |
| Dry Compression Set @ 70° C., % | | 2.7 ± 0.42 | — | 2.9 ± 2.78 | — | — | — |
| Wet Compression Set @ 50° C., % | | 2.2 ± 1.16 | — | 0.8 ± 0.38 | — | — | — |

*After rise time, samples were placed in an oven for post-curing.

TABLE 3B

Visco-elastic foams formulated with Novomer PPC-0.8-DPG polyol

| Designation | Eqv. Weight | 1 | 2 | 3 | 4 | 5 |
|---|---|---|---|---|---|---|
| Sample designation | | REF-3 | CaCO3-2 | PPC 74-217-10% | PPC 74-217-20% | FOAM #1 |
| Total Novomer polyols, % | | 0 | 0 | 10 | 20 | 10 |
| Polyol system | | | | | | |
| Novomer PPC 74-217 | 330.1 | 0 | 0 | 10 | 20 | 10 |
| Poly G 30-240 | 235.7 | 21 | 21 | 16 | 11 | 16 |
| Poly G 76-120 | 467.5 | 21 | 21 | 16 | 11 | 16 |
| Poly G 85-34 | 1602.9 | 18 | 18 | 18 | 18 | 18 |
| Lumulse POE 26 | 416.2 | 40 | 40 | 40 | 40 | 40 |
| CaCO3 | | 0 | 26 | 0 | 0 | 26 |
| DEG | 53.1 | 2.25 | 2.25 | 2.25 | 2.25 | 2.25 |
| Water | 9 | 2.3 | 2.3 | 2.3 | 2.3 | 2.3 |
| Tegostab B 4690 | 1335.7 | 1.5 | 1.5 | 1.5 | 1.5 | 1.5 |
| Dabco 33LV | 105 | 0.1 | 0.1 | 0.1 | 0.1 | 0.1 |
| Niax A-1 | 233.7 | 0.2 | 0.2 | 0.2 | 0.2 | 0.2 |
| Isocyanate System | | | | | | |
| Mondure MRS-2 | 129.9 | 49.45 | 49.45 | 49.30 | 49.15 | 49.30 |
| Isocyanate Index | | 70 | 70 | 70 | 70 | 70 |

TABLE 3B-continued

Visco-elastic foams formulated with Novomer PPC-0.8-DPG polyol

Reaction Profile of Free-rise

| | | | | | |
|---|---|---|---|---|---|
| Mix time, sec. | 10 | 10 | 10 | 10 | 10 |
| Cream time, sec. | 15.33 | 14 | 16 | 16 | 14 |
| Gel time, sec. | 63.33 | 52 | 48 | 48 | 43 |
| Rise time, sec. | 137.33 | 136 | 168 | 147 | 128 |
| Post-curing time & temperature* | 60 min @70° | 60 min @70° | 60 min @70° | 60 min @70° | 60 min @70° |

Properties

| | | | | | |
|---|---|---|---|---|---|
| Free-rise density, pcf | 2.87 ± 0.10 | 3.37 ± 0.14 | 3.29 ± 0.11 | 3.22 ± 0.18 | 3.76 ± 0.22 |
| Resilience, % | 0.86 ± 0.23 | 0.76 ± 0.31 | 0.50 ± 0.00 | 0.13 ± 0.03 | 1.27 ± 0.00 |
| CFD @ 25%, psi | 0.06 ± 0.01 | 0.08 ± 0.01 | 0.10 ± 0.02 | 0.11 ± 0.03 | 0.09 ± 0.01 |
| CFD @ 50%, psi | 0.09 ± 0.01 | 0.12 ± 0.01 | 0.14 ± 0.03 | 0.15 ± 0.04 | 0.14 ± 0.02 |
| CFD @ 65%, psi | 0.14 ± 0.02 | 0.19 ± 0.02 | 0.22 ± 0.05 | 0.24 ± 0.08 | 0.21 ± 0.04 |
| Hysteresis | 36 ± 3.22 | 45.40 ± 1.98 | 43.62 ± 1.51 | 61.79 ± 1.81 | 57.21 ± 1.96 |
| Tensile Strength, psi | 11.33 ± 1.89 | 9.83 ± 0.52 | 11.55 ± 1.60 | 10.91 ± 0.37 | 9.59 ± 0.83 |
| Elongation at Maximum Load, % | 192 ± 34 | 163 ± 17 | 202 ± 16 | 213 ± 11 | 153 ± 15 |
| Tear Strength, lbf/in | 2.04 ± 0.07 | 2.45 ± 0.25 | 1.90 ± 0.15 | 2.16 ± 0.16 | 2.39 ± 0.30 |
| Recovery Time, sec | 3.91 ± 1.08 | — | — | 10.48 ± 0.42 | — |
| Dry Compression Set @ 70° C., % | 2.7 ± 0.42 | — | — | 3.3 ± 1.88 | — |
| Wet Compression Set @ 50° C., % | 2.2 ± 1.16 | — | — | 1.5 ± 0.99 | — |

*After rise time, samples were placed in an oven for post-curing.

TABLE 4B

Visco-elastic foams formulated with Novomer 74-277 polyol

| Designation | Eqv. Weight | 1 | 2 | 3 | 4 | 5 |
|---|---|---|---|---|---|---|
| Sample designation | | REF-3 | CaCO3-2 | 74-277-10% | 74-277-20% | FOAM #2 |
| Total Novomer polyols, % | | 0 | 0 | 10 | 20 | 10 |
| Polyol system | | | | | | |
| Novomer 74-277 | 836.4 | 0 | 0 | 10 | 20 | 10 |
| Poly G 30-240 | 235.7 | 21 | 21 | 21 | 21 | 21 |
| Poly G 76-120 | 467.5 | 21 | 21 | 16 | 11 | 16 |
| Poly G 85-34 | 1602.9 | 18 | 18 | 13 | 8 | 13 |
| Lumulse POE 26 | 416.2 | 40 | 40 | 40 | 40 | 40 |
| CaCO3 | | 0 | 26 | 0 | 0 | 26 |
| DEG | 53.1 | 2.25 | 2.25 | 2.25 | 2.25 | 2.25 |
| Water | 9 | 2.3 | 2.3 | 2.3 | 2.3 | 2.3 |
| Tegostab B 4690 | 1335.7 | 1.5 | 1.5 | 1.5 | 1.5 | 1.5 |
| Dabco 33LV | 105 | 0.1 | 0.1 | 0.1 | 0.1 | 0.1 |
| Niax A-1 | 233.7 | 0.2 | 0.2 | 0.2 | 0.2 | 0.2 |
| Isocyanate System | | | | | | |
| Mondure MRS-2 | 129.9 | 49.45 | 49.45 | 49.28 | 49.11 | 49.28 |
| Isocyanate Index | | 70 | 70 | 70 | 70 | 70 |
| Reaction Profile of Free-rise | | | | | | |
| Mix time, sec. | | 10 | 10 | 10 | 10 | 10 |
| Cream time, sec. | | 15.33 | 14 | 14 | 11 | 13 |
| Gel time sec. | | 63.33 | 52 | 63 | 47 | 46 |
| Rise time, sec. | | 137.33 | 136 | 132 | 129 | 115 |
| Post-curing time & temperature* | | 60 min @70° | 60 min @70° | 60 min @70° | 60 min @70° | 60 min @70° |
| Properties | | | | | | |
| Free-rise density pcf | | 2.87 ± 0.10 | 3.37 ± 0.14 | 3.30 ± 0.17 | 3.09 ± 0.07 | 3.60 ± 0.16 |
| Resilience, % | | 0.86 ± 0.23 | 0.76 ± 0.31 | 0.50 ± 0.00 | 0.23 ± 0.03 | 3.05 ± 0.70 |
| CFD @ 25%, psi | | 0.06 ± 0.01 | 0.08 ± 0.01 | 0.15 ± 0.02 | 0.15 ± 0.01 | 0.14 ± 0.02 |
| CFD @ 50%, psi | | 0.09 ± 0.01 | 0.12 ± 0.01 | 0.20 ± 0.03 | 0.20 ± 0.01 | 0.20 ± 0.03 |
| CFD @ 65%, psi | | 0.14 ± 0.02 | 0.19 ± 0.02 | 0.28 ± 0.05 | 0.30 ± 0.02 | 0.31 ± 0.05 |
| Hysteresis | | 36 ± 3.22 | 45.40 ± 1.98 | 62.25 ± 3.67 | 60.96 ± 2.45 | 55.22 ± 1.41 |
| Tensile Strength, psi | | 11.33 ± 1.89 | 9.83 ± 0.52 | 13.05 ± 1.36 | 7.79 ± 1.16 | 16.49 ± 2.24 |
| Elongation at Maximum Load, % | | 192 ± 34 | 163 ± 17 | 192 ± 14 | 196 ± 36 | 184 ± 4 |
| Tear Strength, lbf/in | | 2.04 ± 0.07 | 2.45 ± 0.25 | 2.25 ± 0.16 | 2.47 ± 0.22 | 2.85 ± 0.17 |
| Recovery Time, sec | | 3.91 ± 1.08 | — | 15.74 ± 0.61 | — | — |
| Dry Compression Set @ 70° C., % | | 2.7 ± 0.42 | — | — | 3.8 ± 1.09 | — |
| Wet Compression Set @ 50° C., % | | 2.2 ± 1.16 | — | — | — | — |

*After rise time, samples were placed in an oven for post-curing.

TABLE 5B

Visco-elastic foams formulated with a mixture of three different Novomer polyols

| Designation | Eqv. Weight | 1 | 2 | 3 | 4 | 5 | 6 |
|---|---|---|---|---|---|---|---|
| Sample designation | | REF-3 | CaCO3-2 | ISO 70%-10 | ISO-70%-15 | ISO 80% | ISO 80%-15 |
| Total Novomer polyols, % | | 0 | 0 | 30 | 45 | 30 | 45 |
| Polyol system | | | | | | | |
| Novomer 58-103-C | 471.4 | 0 | 0 | 10 | 15 | 10 | 15 |
| Novomer 74-217 | 330.1 | 0 | 0 | 10 | 15 | 10 | 15 |
| Novomer 74-277 | 836.4 | 0 | 0 | 10 | 15 | 10 | 15 |
| Poly G 30-240 | 235.7 | 21 | 21 | 11 | 6 | 11 | 6 |
| Poly G 76-120 | 467.5 | 21 | 21 | 11 | 6 | 11 | 6 |
| Poly G 85-34 | 1602.9 | 18 | 18 | 8 | 3 | 8 | 3 |
| Lumulse POE 26 | 416.2 | 40 | 40 | 40 | 40 | 40 | 40 |
| CaCO3 | | 0 | 26 | 0 | 0 | 0 | 0 |
| DEG | 53.1 | 2.25 | 2.25 | 2.25 | 2.25 | 2.25 | 2.25 |
| Water | 9 | 2.3 | 2.3 | 2.3 | 2.3 | 2.3 | 2.3 |
| Tegostab B 4690 | 1335.7 | 1.5 | 1.5 | 1.5 | 1.5 | 1.5 | 1.5 |
| Dabco 33LV | 105 | 0.1 | 0.1 | 0.1 | 0.1 | 0.1 | 0.1 |
| Niax A-1 | 233.7 | 0.2 | 0.2 | 0.2 | 0.2 | 0.2 | 0.2 |
| Isocyanate System | | | | | | | |
| Mondure MRS-2 | 129.9 | 49.45 | 49.45 | 48.85 | 48.55 | 55.83 | 55.48 |
| Isocyanate Index | | 70 | 70 | 70 | 70 | 80 | 80 |
| Reaction Profile of Free-rise | | | | | | | |
| Mix time, sec. | | 10 | 10 | 10 | 10 | 10 | 10 |
| Cream time, sec. | | 15.33 | 14 | 14 | 14 | 15 | 15.5 |
| Gel time, sec. | | 63.33 | 52 | 49 | 45 | 48 | 47 |
| Rise time, sec. | | 137.33 | 136 | 137 | 131 | 137 | 124 |
| Post-curing time & temperature* | | 60 min @70° | 60 min @70° | 60 min @70° | 60 min @70° | 60 min @70° | 60 min @70° |
| Properties | | | | | | | |
| Free-rise density, pcf, | | 2.87 ± 0.10 | 3.37 ± 0.14 | 3.28 ± 0.19 | 3.31 ± 0.14 | 3.15 ± 0.13 | 3.02 ± 0.14 |
| Resilience, % | | 0.86 ± 0.23 | 0.76 ± 0.31 | 0.86 ± 0.14 | 0.66 ± 0.14 | 1.47 ± 0.11 | — |
| CFD @ 25%, psi | | 0.06 ± 0.01 | 0.08 ± 0.01 | 0.13 ± 0.02 | 0.23 ± 0.03 | 0.36 ± 0.03 | 0.49 ± 0.07 |
| CFD @ 50%, psi | | 0.09 ± 0.01 | 0.12 ± 0.01 | 0.17 ± 0.02 | 0.29 ± 0.04 | 0.49 ± 0.05 | 0.62 ± 0.09 |
| CFD @ 65%, psi | | 0.14 ± 0.02 | 0.19 ± 0.02 | 0.24 ± 0.01 | 0.41 ± 0.07 | 0.75 ± 0.10 | 0.79 ± 0.13 |
| Hysteresis | | 36 ± 3.22 | 45.40 ± 1.98 | 77.40 ± 3.37 | 89.87 ± 0.45 | 72.62 ± 0.97 | 83.23 ± 1.64 |
| Tensile Strength, psi | | 11.33 ± 1.89 | 9.83 ± 0.52 | 14.70 ± 5.31 | 21.67 ± 13.00 | 28.77 ± 5.78 | 29.32 ± 3.54 |
| Elongation at Maximum Load, % | | 192 ± 34 | 163 ± 17 | 201 ± 20 | 186 ± 49 | 192 ± 15 | 156 ± 14 |
| Tear Strength, lbf/in | | 2.04 ± 0.07 | 2.45 ± 0.25 | 2.49 ± 0.17 | 3.34 ± 0.22 | 5.96 ± 0.64 | 6.44 ± 0.50 |
| Recovery Time, sec | | 3.91 ± 1.08 | 89 ± 13.45 | 524 ± 109.5 | 39 ± 7.55 | 177.7 ± 9.29 | |
| Dry Compression Set @ 70° C., % | | 2.7 ± 0.42 | — | 6.0 ± 3.70 | 25.2 ± 9.13 | 2.4 ± 1.82 | — |
| Wet Compression Set @ 50° C., % | | 2.2 ± 1.16 | — | 3.6 ± 2.12 | 8.0 ± 3.51 | 3.2 ± 2.02 | — |

Conclusions

Reactivity of Novomer polyols in VE formulations was comparable to the reactivity of the reference polyols used in this study. The reactivity of the PU system was not affected significantly after 10% and 20% drop-in replacement of any of commercial polyols used in this study including the cell opening polyol. The reactivity of the PU system was not significantly affected after 30% and 45% drop-in replacement of commercial polyols with a mixture of the three Novomer polyols. No adjustment in catalysis was required to obtain open cell foams with Novomer polyols.

VE foams based on Novomer polyols exhibited similar white color to the reference foams. The apparent cell structure of foams with Novomer polyols was uniform and similar to the reference foams.

Compression Force Deflection (CFD) at 25%, 50%, and 65% deflection of VE foams was increased by introduction of Novomer polyols. CFD values normalized for the density clearly indicate that foams with Novomer polyol have higher CFD (better load bearing properties) in comparison to the reference foams.

Hysteresis Loss, which is independent of foam density, also increased with introduction of Novomer polyols which indicates that foams based on Novomer polyols are more energy absorbing than reference VE foams. All foams prepared in this study exhibited very low resilience around 1% or less.

The tensile and tear strength of VE foams increased by introduction of Novomer 58-103-C polyol as replacement for Poly-G 76-120 polyols of similar equivalent weight, with and without calcium carbonate as filler. An increase in tensile strength and tear strength properties is especially high in foams prepared with a proportional mixture of the three Novomer polyols at 30% and 45% replacement of the three commercial polyols.

An increase in isocyanate index from 70 to 80 the tensile strength and tear strength increased in the VE foams based on a mixture of Novomer polyols.

Elongation at break was much higher than the elongation (% strain) at maximum load. In order to be consistent, the elongation at maximum load was reported as the elongation. Without exception, all VE foams exhibited elongation higher than 100%.

VE foams prepared with a proportional mixture of the three Novomer polyols at 30% and 45% levels as replacement for base commercial polyols exhibited huge increase in the recovery time in comparison to the reference foam. This is consistent with the hysteresis values of these foams.

Dray and wet compression set was measured on selected number of VE foams. In all foams containing up to 30% Novomer polyols based on total polyols both dry and wet compression sets were relatively low and comparable to the reference foam.

Based on DMA measurements it can be concluded that Novomer polyols impart improved energy absorbing properties to the VE foam formulations which are consistent with the hysteresis loss results. Higher energy absorption is a desirable characteristic in visco-elastic foams.

Example 3

TDI-Based Seating Foams

Presented below are the formulations and properties of high strength TDI-based polyurethane foams prepared according to the principles of the present invention. These materials were made to evaluate their suitability for seating foam applications. The TDI foams were made using aliphatic polycarbonate polyol additives as defined herein. Specifically, the aliphatic polycarbonate polyols hereinafter also refered to as "Novomer Polyols" used in the formulations below have the following properties:

| Polyol Batch No. | 58-103-C | 74-276 | 80-148 | 80-163 |
|---|---|---|---|---|
| Acid Value, mg KOH/g | 0.28 | 0.51 | 2.68 | 2.09 |
| Hydroxyl Value, mg KOH/g | 119 | 61.1 | 111.7 | 64.9 |
| Mn (GPC) | 1,270 | 2,213 | 1337 | 2205 |
| Mw (GPC) | 1,370 | 2,443 | 1453 | 2345 |
| Polydispersity, Mw/Mn | 1.07 | 1.06 | 1.09 | 1.06 |
| Glass Transition Temp. (DSC), Tg | −5° C. | −5.5° C. | 6.0° C. | −9.9° C. |

The structures of polyols 58-103-C and 74-276 are shown above in previous examples.

Polyol 80-163 is a linear 2250 g/mol poly(propylene carbonate) polyol initiated with 600 g/mol polypropylene glycol (mixture of isomers) having a PDI of 1.05, greater than 99% —OH end groups and greater than 99% carbonate linkages (exclusive of the ether bonds in the polypropylene glycol). This polyol conforms to the formula:

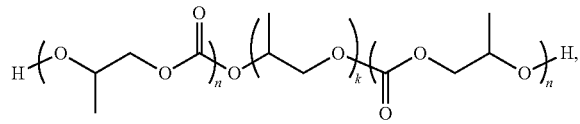

where k is on average about 9, and n is on average in the composition approximately 7.

Polyol 80-148 is a linear poly(propylene carbonate) polyol initiated with propylene glycol and having an Mn of 1340 g/mol, a PDI of 1.09, greater than 99% —OH end groups and greater than 99% carbonate linkages. This polyol conforms to the formula:

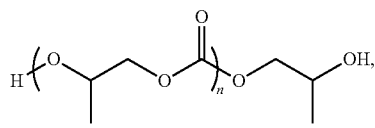

where n is, on average in the composition, approximately 13.

Raw Materials

A list of raw materials used in this evaluation is shown in Tables Ex3-1a and Ex3-1b.

All materials were used as received from suppliers including Novomer polyols.

TABLE Ex3-1a

Materials

| Designation | Type | Supplier |
|---|---|---|
| POLYOLS | | |
| Poly-G 85-29 | Ethylene oxide caped polyether polyol (triol) Hydroxyl Value = 27.4 mg KOH/g; Eq. wt. = 2047.445 Viscosity @ 25° C. = 1150 cPs | Arch Chemicals |
| Voranol-Voractiv 6340 | A catalytically Active, High-functionality EO Caped Polyether Polyol; OH # 32 mg KOH/g; Eq. wt. = 1753.13 Water content = 0.031% | DOW |
| Speciflex NC-701 | Grafted polyether polyol containing copolymerized styrene and acrylonitrile Hydroxyl Value = 23.0 mg KOH/g; Eq. wt. = 2439.13 Viscosity @ 25° C. = 5070 mPa · s | DOW |
| Novomer PPC-1.2-DPG Batch 58-103-C | Novomer Poly(Propylene Carbonate) Hydroxyl Value = 119 mg KOH/g; Eq. wt. = 471.43 Acidity Value = 0.28 mg KOH/g Viscosity @ 25° C. = 1.25 × 10⁶ cPs Viscosity @ 80° C. = 4990 cPs | NOVOMER |
| Novomer PPC-1kd-PG Batch 80-148 | Novomer Poly(Propylene Carbonate) Hydroxyl Value = 111.72 mg KOH/g; Eq. wt. = 502.15 Acidity Value = 2.68 mg KOH/g | NOVOMER |
| Novomer PPC-2kd-PEOL Batch 80-163 | Novomer Poly(Propylene Carbonate) Hydroxyl Value = 64.94 mg KOH/g; Eq. wt. = 863.87 Acidity Value = 2.09 mg KOH/g | NOVOMER |
| Novomer PPC-2.3-PEOL Batch 74-276 | Novomer Poly(Propylene Carbonate) Hydroxyl Value = 61.1 mg KOH/g; Eq. wt. = 918.47 | NOVOMER |

TABLE Ex3-1b

Materials

| Designation | Type | Supplier |
|---|---|---|
| SURFACTANTS | | |
| Tegostab B 4690 | Polyether/Silicone Oil Mix Eq. Wt. = 1335.7 | Evonik |
| CELL OPENER | | |
| Lumulse POE 26 | Hydroxyl Value = 134.8 mg KOH/g Eq. Wt. = 416.2 | Lambent |
| CHAIN EXTENDERS | | |
| Diethanolamine | Eq. Wt. = 35.04 | Aldrich |
| CATALYSTS | | |
| Dabco 33LV | 33% Triethylenediamine in dipropylene glycol | Air Products |
| Niax A1 | bis(2-dimethylaminoethyl) ether | Momentive |

TABLE Ex3-1b-continued

Materials

| Designation | Type | Supplier |
|---|---|---|
| ISOCYANATES | | |
| Lupranate ® T80 Type 1 | Toluene Disocyanate Eq. Wt. = 87.54 | BASF |

Solubility/Compatibility of Novomer Polyols with Commercial Polyether Polyols

In foaming experiments, a formulation targeting high resilient flexible foams was used as reference. This formulation is based on a mixture of Poly-G 85-29 ethylene oxide tipped polyether triol (polyol) and Voranol-Voractiv 6340 which is a catalytically active, high functional EO caped polyether polyol. Speciflex NC-701 was used as grafted polyether polyol. Lumulse POE 26 (ethoxylated glycerol) was used as a reactive cell opener. Diethanol amine was used as a co-catalyst and cross-linker.

Preparation and Testing of Foams

Reference free rise water-blown foams were prepared with 0%, 10%, and 20% Speciflex NC-701 graft polyol at 90 Isoctanate Index (Tables Ex3-2 to Ex3-5). Reference molded foams were prepared with 0%, 10%, 15%, 20%, and 25% Speciflex NC-701 graft polyol (Tables Ex3-6 to Ex3-10).

Both free-rise and molded foams were prepared with 10% and 20% Novomer PPC-2kd-PEOL polyol (Table Ex3-3and Ex3-8). At 20% 80-163polyol-containing molded foams were prepared targeting 2.5 and 3.5 pcf foam density (Table 8A).

Due to the limited compatibility with commercial polyols, free-rise foams were prepared with 10% and molded foams with 10% and 15% of polyol 80-148 (Table Ex3-5 and Ex3-10). Molded foams containing 15% 80-148 polyol were prepared targeting 2.5 and 3.5 pcf foam density (Table Ex3-10).

Free-rise foams were prepared with 10%, 12.5% and 26.9% polyol 74-276 (Table Ex3-2) and 10%, 12.5% and 16.7% 58-103C polyol (Table Ex3-4). Molded foams were prepared with 10% of each of these two polyols (Tables Ex3-7 and Ex3-9) and 20% polyol 74-276 (Table Ex3-7).

In some cases, free-rise and molded foams were prepared with a mixture of Speciflex NC-701 graft polyether polyol and Novomer polyols (Tables Ex3-2 to Ex3-4, Ex3-7, Ex3-8B, and Ex3-9).

Free-rise foams were prepared using a standard laboratory hand-mixing procedure. Foaming profiles, including cream time, gel time, and rise time were measured on all foams. After the rise time, the foams were immediately placed in an air-circulating oven preheated at 80° C. for 30 minutes to complete the cure.

Molded foams were prepared using an aluminum mold with 12×12×2 inch dimensions preheated at 70° C. Demolding time was 4.5 minutes.

All foams were aged under room conditions for minimum one week before testing. Full evaluation was carried out on molded foams. The following properties were measured according to ASTM D 3574-08:
  Foam Density (Test A)
  Resilience via Ball Rebound (Test H)
  Tensile Strength at Break (Test E)
  Elongation at Break (Test E)
  Tear Strength (Test F)
  CFD, Compression Force Deflection (Test C)
  Hysteresis (Procedure B—CFD Hysteresis Loss)
  Dry Constant Deflection Compression Set (Test D)
  Wet Constant Deflection Compression Set (Test D & Wet Heat Aging, Test L)
  Tensile strength and Elongation after Dry Heat Aging for 22 hours at 140° C. (Modified Heat Aging Test K)

Flammability was measured as Horizontal Burning Rate according to the in-house method, which was modified from ASTM D 5132-04.

IV. Results

Polyol Compatibility

After 24 hours, Novomer PPC-2kd-PEOL polyol was compatible up-to 25% levels with a 50/50 mixture of Poly-G 85-29 polyol and Voranol 6340 polyol.

Novomer polyol 80-148 was compatible with a mixture of the two commercial polyols up to 15% levels immediately after blending. After 24 hours, the blend separated into a two phase system.

Polyol Reactivity

Introduction of the four different Novomer polyols into reference foam formulation as drop-in replacement for Poly-G 85-29 and Voranol Voractiv 6340 did not significantly affect the reaction profile (foaming profile) measured as cream time, gel time, and rise time (Tables Ex3-2 to Ex3-5). No adjustment in catalyst was need.

Apparent Foam Cell Structure and Density

Free-rise foams based on Novomer polyols exhibited similar white color to the reference foams prepared with or without graft polyol Speciflex NC-701. The apparent cell structure of foams with Novomer polyols was uniform and similar to the reference foams.

Density of the free-rise foams did not change significantly with a drop-in replacement of Poly-G 85-29 and Voranol Voractiv 6340 polyols with Novomer polyols (Tables Ex3-2 to Ex3-5).

The apparent cell structure of molded foams prepared with Novomer polyols was uniform and similar to the reference foams prepared with a mixture of Poly-G 85-29 and Voranol Voractiv 6340 polyols and reference foams prepared with graft polyol Speciflex NC-701.

Foam Physical Properties

In this study, free-rise foams were prepared mostly to evaluate reactivity of epoxide-$CO_2$ based polyols and their effect on foaming profile. Free-rise TDI foams exhibited significantly higher resilience in comparison to the MDI-based HR foams prepared at the same levels of Novomer polyols (Example 1). MDI-Based foams prepared with 10% and 25% Novomer polyol 74-276 exhibited resilience of 49% and 36%, respectively. TDI foams based on 10% and 26.9% of the same polyol exhibited resilience of 53and 42%. TDI foams prepared with 10% and 16.7% Novomer polyol 58-103exhibited resilience of 55% and 45%, respectively, and MDI foams prepared with 10% and 15% of the same polyol exhibited resilience of 43% and 39%.

Reference free-rise foams prepared with a graft polyol (Speciflex NC-701) also exhibited lower resilience in comparison to the reference foam prepared with base polyether polyols.

The same effect of the graft polyol and Novomer polyols on the resilience was observed in the molded foams (Tables Ex3-6 to Ex3-10). In all cases, the resilience of the molded foams somewhat decreased and hysteresis somewhat increased with introduction of the graft polyol and Novomer polyols (Tables Ex3-6 to Ex3-10). However, the resilience was significantly higher and hysteresis significantly lower, regardless of the type of Novomer polyol (Tables Ex3-6 to Ex3-10), in comparison to the MDI-based foams at the same levels.

All molded TDI foams based on Novomer polyols exhibited hysteresis lower than 35% (Tables 7-10, FIGS. 24 and 25), which is a maximum specified by Chrysler Material standard for Type IV foams with a minimum density requirement of 2 pcf (32 kg/m$^3$) (FIG. 33), with one exception; the foam with 20% polyol 74-276 exhibited hysteresis of 35.3% (Table Ex3-7). The density of all molded foams was around 2.4 pcf (38 kg/m$^3$).

Based on hysteresis results, all foams prepared with Novomer polyols can be classified as High Resilient (HR) PU foams.

In general, the tensile strength increased with introduction of Novomer polyols. With introduction of Novomer polyol the elongation did not change significantly (Tables Ex3-7 to Ex3-10). These results indicate that the foam strength (toughness) increases by introduction of the Novomer polyols.

The tear strength measured on foams prepared with Novomer polyols was significantly higher in comparison to the reference foam prepared with the base polyether polyols Poly-G 85-29 and Voranol Voractiv 6340 (Tables Ex3-7 to Ex3-9). The tear strengths of foams based on polyol 75-276, 80-163, and 58-103-C polyols were similar in comparison to the reference foams prepared with the graft polyol (Tables Ex3-7 to Ex3-9). These results also indicate that the foam strength (toughness) increases by introduction of the Novomer polyols.

All molded foams based on Novomer polyols exhibited significantly higher Compression Force Deflection (CFD) at 25%, 50%, and 65% deflections in comparison to the reference foam prepared with the base polyols as sole polyols and similar or slightly higher CFD in comparison to the reference foams based on graft polyol (Tables Ex3-7 to Ex3-10, FIGS. 26-31). These results clearly indicate that Novomer polyols improve the load bearing properties of the flexible foams. More importantly, the SAG factor was not affected significantly by the introduction of Novomer polyols into foam formulations (Tables Ex3-7 to Ex3-10, FIG. 32).

The dry and wet compression set of molded foams based on Novomer polyols was somewhat higher in comparison to the reference foams (Tables Ex3-7 to Ex3-10). Molded foams prepared with the graft polyol also exhibited slightly higher compression set values in comparison to the reference foams prepared with the based polyether polyol (Table Ex3-6). However, all molded foams prepared with Novomer polyols meet the wet compression set requirements of 25% maximum defined by the Chrysler Material Standard for Type IV foams (FIG. 33).

Practically all molded foams based on Novomer polyols met the hysteresis loss, tear resistance, and wet compression requirements of the Chrysler Material Standard for Type IV foams.

The flammability of molded foams was not affected by addition of Novomer polyols. The burning rate of all molded foams based on Novomer polyols was around 100 mm/min which is in the range of reference foams prepared with and without the graft polyol (Tables Ex3-6, Ex3-7, Ex3-8A, Ex3-9, and Ex3-10. If needed, the flammability of the foams can easily be adjusted by addition of small amount of flame retardants.

Retention of tensile strength properties was excellent in all measured foams after dry aging for 22 hours at 140° C. (Tables Ex3-6, Ex3-7, Ex3-8A, Ex3-9, and Ex3-10). In some cases, the stress-strain properties improved with dry heat aging which was not observed in MDI foams (Example 1). This might be ascribed to the annealing effect under elevated temperature of TDI-based polymer network.

Properties of Foams Prepared with NOVOMER Polyols Targeting Density of 3.5 pcf

The density of the molded foams described above was around 2.4 pcf (~38 kg/m$^3$) which is in a range of Type IV HR foams for seat applications according to Chrysler Material Standard MS-DC-649 (FIG. 33). Two types of molded foams were also prepared targeting density of 3.5 pcf (~56 kg/m$^3$). Both foams based on 20% polyol 74-176 (Designation 6B in Table Ex3-8A) and 15% polyol 80-148 (Designation 7B in Table Ex3-10) exhibited higher CFD properties and higher tensile and tear strength in comparison to the foams prepared at lower densities. More importantly, both foams exhibited lower hysteresis loss and lower wet and dry compression set (Tables Ex3-8A and Ex3-10).

TABLE Ex3-2

Formulations of Free-Rise Foams Based on Polyol 74276

| Designation | F | Eqv Weight | 1 | 2 | 3 | 4 | 5 | 6 | 7 |
|---|---|---|---|---|---|---|---|---|---|
| Sample designation | | | Reference (R-9) | R-10%-NC-701 | R-20%-NC-701 | 74-276-1 | 74-276-2 | 74-276-3 | 74-276-4 |
| % Novomerpolyol on total polyols | | | 0 | 0 | 0 | 12.5 | 26.9 | 10 | 10 |
| % Graft polyol on total polyols | | | 0 | 10 | 20 | 0 | 0 | 0 | 10 |
| Polyol system | | | | | | | | | |
| Poly-G 85-29 | 3 | 2047.5 | 48.5 | 38.8 | 38.8 | 48.5 | 48.5 | 38.8 | 38.8 |
| DVV 6340 | | 1753.13 | 48.5 | 48.5 | 38.8 | 36.37 | 22.39 | 48.5 | 38.8 |
| Speciflex NC-701 | | 2244 | — | 9.7 | 19.4 | — | — | — | 9.7 |
| Novomer PPC-2.3-PEOL #74-276 | | 918.47 | — | — | — | 12.126 | 26.11 | 9.7 | 9.7 |
| Water | 2 | 9 | 3.6 | 3.6 | 3.6 | 3.6 | 3.6 | 3.6 | 3.6 |
| Lumulse POE 26 | | 416.2 | 3 | 3 | 3 | 3 | 3 | 3 | 3 |
| Teaostab B 4690 | | 1335.7 | 1 | 1 | 1 | 1 | 1 | 1 | 1 |
| Dabco 33LV | | 105 | 0.5 | 0.5 | 0.5 | 0.5 | 0.5 | 0.5 | 0.5 |
| Diethanolamine | | 35.04 | 1 | 1 | 1 | 1 | 1 | 1 | 1 |
| Niax A-1 | | 233.7 | 0.05 | 0.05 | 0.05 | 0.05 | 0.05 | 0.5 | 0.5 |
| Isocyanate System | | | | | | | | | |
| Lupranate TD80 | | 87.54 | 38.83 | 38.79 | 38.70 | 39.32 | 39.89 | 39.28 | 38.85 |
| Isocyanate Index | | | 90 | 90 | 90 | 90 | 90 | 90 | 90 |

TABLE Ex3-2-continued

Formulations of Free-Rise Foams Based on Polyol 74276

| Reaction Profile of Free-rise | | | | | | | |
|---|---|---|---|---|---|---|---|
| Number of foaming experiments | 3 | 1 | 1 | 1 | 1 | 1 | 1 |
| Mix time, sec. | 5 | 5 | 5 | 5 | 5 | 5 | 5 |
| Cream time, sec. | 10 ± 1 | 9 | 9 | 9 | 8 | 8 | 8 |
| Gel time, sec. | 47 ± 1 | 48 | 51 | 51 | 55 | 51 | 49 |
| Rise time, sec. | 79 ± 4 | 86 | 77 | 88 | 80 | 79 | 81 |
| Post-curing time & temperature | 30 min @ 80° C. | 30 min @ 80° C. | 30 min @ 80° C. | 30 min @ 80° C. | 30 min @ 80° C. | 30 min @ 80° C. | 30 min @ 80° C. |
| Properties | | | | | | | |
| Free-rise density, pcf | 1.68 ± 0.04 | 1.64 ± 0.05 | 1.78 ± 0.04 | 1.77 ± 0.06 | 1.88 ± 0.09 | 1.75 ± 0.01 | 1.72 ± 0.02 |
| Resilience, % | 66.57 ± 0.7 | 60.98 ± 2.01 | 57.16 ± 2.38 | 53.35 ± 2.38 | 41.92 ± 1.27 | 52.85 ± 1.45 | 55.39 ± 2.13 |
| CFD @ 25%, psi | 0.12 ± 0.01 | — | — | — | — | — | — |
| CFD @ 50%, psi | 0.19 ± 0.02 | — | — | — | — | — | — |
| CFD @ 65%, psi | 0.32 ± 0.03 | — | — | — | — | — | — |
| Comments | | | | | | | |

TABLE Ex3-3

Formulations of Free-Rise Foams Based on Polyol 80463

| Designation | F | Edv. Weight | 1 | 2 | 3 | 4 | 5 | 6 |
|---|---|---|---|---|---|---|---|---|
| Sample designation | | | Reference (R-9) | R-10%-NC-701 | R-20%-NC-701 | PPC-80-163 10% | PPC-80-163-10%-S | PPC-80-163 20% |
| % Novomerpoiyol on total polyols | | | 0 | 0 | 0 | 10 | 10 | 20 |
| % Graft polyol on total polyols | | | 0 | 10 | 20 | 0 | 10 | 0 |
| Polyol system | | | | | | | | |
| Poly-G 85-29 | 3 | 2047.5 | 48.5 | 38.8 | 38.8 | 38.8 | 38.8 | 29.1 |
| DVV 6340 | | 1753.13 | 48.5 | 48.5 | 38.8 | 48.5 | 38.8 | 48.5 |
| Speciflex NC-701 | | 2244 | — | 9.7 | 19.4 | — | 9.7 | — |
| Novomer PPC-2kd-PEOL #80-163 | | 863.87 | — | — | — | 9.7 | 9.7 | 19.4 |
| Water | 2 | 9 | 3.6 | 3.6 | 3.6 | 3.6 | 3.6 | 3.6 |
| Lumulse POE 26 | | 416.2 | 3 | 3 | 3 | 3 | 3 | |
| Tegostab B 4690 | | 1335.7 | 1 | 1 | 1 | 1 | 1 | 1 |
| Dabco 33LV | | 105 | 0.5 | 0.5 | 0.5 | 0.5 | 0.5 | 0.5 |
| Diethanolamine | | 35.04 | 1 | 1 | 1 | 1 | 1 | 1 |
| Niax A-1 | | 233.7 | 0.05 | 0.05 | 0.05 | 0.05 | 0.05 | 0.05 |
| Isocyanate System | | | | | | | | |
| Lupranate TD80 | | 87.54 | 38.83 | 38.79 | 38.70 | 39.97 | 39.54 | 41.12 |
| Isocyanate Index | | | 90 | 90 | 90 | 91 | 91 | 93 |
| Reaction Profile of Free-rise | | | | | | | | |
| Number of foaming experiments | | | 3 | 1 | 1 | 1 | 1 | 1 |
| Mix time, sec. | | | 5 | 5 | 5 | 5 | 5 | 5 |
| Cream firm, sec. | | | 10 ± 1 | 9 | 9 | 8 | 8 | 8 |
| Gel time, sec. | | | 47 ± 1 | 48 | 51 | 48 | 49 | 47 |
| Rise time, sec. | | | 79 ± 4 | 86 | 77 | 81 | 86 | 81 |
| Post-curing time & temperature | | | 30 min @ 80° C. | 30 min @ 80° C. | 30 min @ 80° C. | 30 min @ 80° C. | 30 min @ 80° C. | 30 min @ 80° C. |
| Properties | | | | | | | | |
| Free-rise density, pcf | | | 1.68 ± 0.04 | 1.64 ± 0.05 | 1.78 ± 0.04 | 1.84 ± 0.08 | 1.66 ± 0.07 | 1.70 ± 0.06 |
| Resilience, % | | | 66.57 ± 0.7 | 60.98 ± 2.01 | 57.16 ± 2.38 | 60.47 ± 1.45 | 57.67 ± 1.14 | 47.51 ± 1.14 |
| CFD @ 25%, psi | | | 0.12 ± 0.01 | — | — | — | — | — |
| CFD @ 50%, psi | | | 0.19 ± 0.02 | — | — | — | — | — |
| CFD @ 65%, psi | | | 0.32 ± 0.03 | — | — | — | — | — |
| Comments | | | | | | | | |

TABLE Ex-3-4

Formulations of Free-RiseFoams Based on Polyol 58403-C

| Designation | F | Eqv. Weight | 1 | 2 | 3 | 4 | 5 | 6 | 7 |
|---|---|---|---|---|---|---|---|---|---|
| Sample designation | | | Reference (R-9) | R-10%-NC-701 | R-20%-NC-701 | 58-103-C-1 | 58-103-C-2 | 58-103-C-3 | 58-103-C-4 |
| % Novomerpolyol on total polyols | | | 0 | 0 | 0 | 12.5 | 16.7 | 10 | 10 |
| % Graft polyol on total polyols | | | 0 | 10 | 20 | 0 | 0 | 0 | 10 |
| Polyol system | | | | | | | | | |
| Poly-G 85-29 | 3 | 2047.5 | 48.5 | 38.8 | 38.8 | 48.5 | 48.5 | 38.8 | 38.8 |
| DVV 6340 | | 1753.13 | 48.5 | 48.5 | 38.8 | 36.37 | 32.33 | 48.5 | 38.8 |
| Speciflex NC-701 | | 2244 | — | 9.7 | 19.4 | — | — | — | 9.7 |
| Novomer PPC-1.2-DPG #58-103 | | 471.43 | — | — | — | 12.13 | 16.17 | 9.7 | 9.7 |
| Water | 2 | 9 | 3.6 | 3.6 | 3.6 | 3.6 | 3.6 | 3.6 | 3.6 |
| Lumulse POE 26 | | 416.2 | 3 | 3 | 3 | 3 | 3 | 3 | 3 |
| Tegostab B 4690 | | 1335.7 | 1 | 1 | 1 | 1 | 1 | 1 | 1 |
| Dabco 33LV | | 105 | 0.5 | 0.5 | 0.5 | 0.5 | 0.5 | 0.5 | 0.5 |
| Diethanolamine | | 35.04 | 1 | 1 | 1 | 1 | 1 | 1 | 1 |
| Niax A-1 | | 233.7 | 0.05 | 0.05 | 0.05 | 0.05 | 0.05 | 0.05 | 0.05 |
| Isocyanate System | | | | | | | | | |
| Lupranate TD80 | | 87.54 | 38.83 | 38.79 | 38.70 | 39.32 | 40.80 | 40.07 | 39.64 |
| Isocyanate Index | | | 90 | 90 | 90 | 90 | 90 | 90 | 90 |
| Reaction Profile of Free-rise | | | | | | | | | |
| Number of foaming experiments | | | 3 | 1 | 1 | 1 | 1 | 1 | 1 |
| Mix time, sec. | | | 5 | 5 | 5 | 5 | 5 | 5 | 5 |
| Cream time, sec. | | | 10 ± 1 | 9 | 9 | 9 | 8 | 9 | 9 |
| Gel time, sec. | | | 47 ± 1 | 48 | 51 | 50 | 53 | 52 | 49 |
| Rise time, sec. | | | 79 ± 4 | 86 | 77 | 83 | 91 | 85 | 81 |
| Post-curing time & temperature | | | 30 min @ 80° C. | 30 min @ 80° C. | 30 min @ 80° C. | 30 min @ 80° C. | 30 min @ 80° C. | 30 min @ 80° C. | 30 min @ 80° C. |
| Properties | | | | | | | | | |
| Free-rise density, pcf | | | 1.68 ± 0.04 | 1.64 ± 0.05 | 1.78 ± 0.04 | 1.74 ± 0.05 | 1.74 ± 0.08 | 1.70 ± 0.03 | 1.66 ± 0.04 |
| Resilience, % | | | 66.57 ± 0.7 | 60.98 ± 2.01 | 57.16 ± 2.38 | 49.29 ± 1.06 | 44.72 ± 1.06 | 54.62 ± 2.01 | 52.59 ± 1.70 |
| CFD @ 25%, psi | | | 0.12 ± 0.01 | — | — | — | — | — | — |
| CFD @ 50%, psi | | | 0.19 ± 0.02 | — | — | — | — | — | — |
| CFD @ 65%, psi | | | 0.32 ± 0.03 | — | — | — | — | — | — |
| Comments | | | | | | | | | |

TABLE Ex3-5

Formulations of Free-Rise Foams Based on Polyol 80-148

| Designation | F | Eqv. Weight | 1 | 2 | 3 | 4 | 5 | 6 | 7 |
|---|---|---|---|---|---|---|---|---|---|
| Sample designation | | | Reference (R-9) | R-10%-NC-701 | R-20%-NC401 | PPC-80-148 | | | |
| % Novomerpolyol on total polyols | | | 0 | 0 | 0 | 10 | | | |
| % Graft polyol on total poiyols | | | 0 | 10 | 20 | 0 | | | |
| Polyol system | | | | | | | | | |
| Poly-G 85-29 | 3 | 2047.5 | 48.5 | 38.8 | 38.8 | 38.8 | | | |
| DVV 6340 | | 1753.13 | 48.5 | 48.5 | 38.8 | 48.5 | | | |
| Speciflex NC-701 | | 2244 | — | 9.7 | 19.4 | — | | | |
| Novomer PPC-1kd-PG #80 148 | | 502.15 | — | — | — | 9.7 | | | |
| Water | 2 | 9 | 3.6 | 3.6 | 3.6 | 3.6 | | | |
| Lurnulse POE 26 | | 416.2 | 3 | 3 | 3 | 3 | | | |
| Tegostab B 4690 | | 1335.7 | 1 | 1 | 1 | | | | |
| Dabco 33LV | | 105 | 0.5 | 0.5 | 0.5 | 0.5 | | | |
| Diethanolamine | | 35.04 | 1 | 1 | 1 | | | | |
| Niax A-1 | | 233.7 | 0.05 | 0.05 | 0.05 | 0.05 | | | |
| Isocyanate System | | | | | | | | | |
| Lupranate TD80 | | 87.54 | 38.83 | 38.79 | 38.70 | 39.34 | | | |
| Isocyanate Index | | | 90 | 90 | 90 | 89 | | | |
| Reaction Profile of Free-rise | | | | | | | | | |
| Number of foaming experiments | | | 3 | 1 | 1 | 1 | | | |
| Mix time, sec. | | | 5 | 5 | 5 | 5 | | | |
| Cream time, sec. | | | 10 ± 1 | 9 | 9 | 8 | | | |

TABLE Ex3-5-continued

Formulations of Free-Rise Foams Based on Polyol 80-148

| | | | | |
|---|---|---|---|---|
| Gel time, sec. | 47 ± 1 | 48 | 51 | 48 |
| Rise time, sec, | 79 ± 4 | 86 | 77 | 82 |
| Post-curing time & temperature | 30 min @ 80° C. | 30 min @ 80° C. | 30 min @ 80° C. | 30 min @ 80° C. |
| Properties | | | | |
| Free-rise density, pcf | 1.68 ± 0.04 | 1.64 ± 0.05 | 1.78 ± 0.04 | 1.70 ± 0.04 |
| Resilience, % | 66.57 ± 0.7 | 60.98 ± 2.01 | 57.16 ± 2.38 | 56.66 ± 1.70 |
| CFD @ 25%, psi | 0.12 ± 0.01 | — | — | — |
| CFD @ 50%, psi | 0.19 ± 0.02 | — | — | — |
| CFD @ 65%, psi | 0.32 ± 0.03 | — | — | — |
| Comments | | | | |

TABLE Ex3-6

Formulations of Molded Reference Foams and Foams based on Graft Polyol

| Designation | F | Eqv. Weight | 1 | 2 | 3 | 4 | 5 |
|---|---|---|---|---|---|---|---|
| Sample designation | | | Ref. (R-9) | R-10%-NC-701 | R-15%-NC-701 | R-20%-NC-701 | R-25%-NC-701 |
| % Novomerpolyol on total polyols | | | 0 | 0 | 0 | 0 | 0 |
| % Graft polyol on total polyols | | | 0 | 10 | 15 | 20 | 25 |
| Polyol system | | | | | | | |
| Poly-G 85-29 | 3 | 2047.5 | 48.5 | 38.8 | 41.23 | 388 | 36.38 |
| DW 6340 | | 1753.13 | 48.5 | 48.5 | 41.23 | 33.8 | 36.38 |
| Specitlex NC-701 | | 2244 | — | 9.7 | 14.55 | 19.4 | 24.25 |
| Water | 2 | 9 | 3.6 | 3.6 | 3.6 | 3.6 | 3.6 |
| Lumulse POE 26 | | 416.2 | 3 | 3 | 3 | 3 | ,) |
| Tegostab B 4690 | | 13357 | 1 | 1 | 1 | 1 | 1 |
| Dabco 33LV | | 105 | 0.5 | 0.5 | 0.5 | 0.5 | 0.5 |
| Diethanolamine | | 35.04 | 1 | 1 | 1 | 1 | |
| Niax A-1 | | 233.7 | 0.05 | 0.05 | 0.05 | 0.05 | 0.05 |
| Isocyanate System | | | | | | | |
| Lupranate TD80 | | 87.54 | 38.83 | 38.79 | 38.22 | 3810 | 38.67 |
| Isocyanate Index | | | 90 | 90 | 90 | 90 | 90 |
| Reaction Profile of Free-rise | | | | | | | |
| Mix time, sec. | | | 5 | 5 | 5 | 5 | |
| Component temperature, | | | RT | RT | RT | RT | RT |
| Dernolding time, sec. | | | 270 | 270 | 270 | 270 | 270 |
| Mold temperature, °C. | | | 70 | 70 | 70 | 70 | 70 |
| Properties | | | | | | | |
| Density, pet | | | 2.39 ± 0.02 | 2.43 ± 0 | 249 ± 0.03 | 2.36 ± 0.03 | 2.37 ± 0.03 |
| Resilience, % | | | 66.06 ± 0.90 | 63.77 ± 2.09 | 63.26 ± 0.57 | 59.20 ± 2.31 | 59.96 ± 1.66 |
| CFD @ 25%, psi | | | 0.30 ± 0 | 0.36 ± 0.01 | 0.42 ± 0.02 | 0.41 ± 0.01 | 0.47 ± 0.01 |
| CFD @ 50%, psi | | | 0.42 ± 0.01 | 0.51 ± 0.02 | 0.58 ± 0.03 | 0.58 ± 0.02 | 0.67 ± 0.01 |
| CFD @ 65%, psi | | | 0.64 ± 0.02 | 0.79 ± 0.04 | 0.87 ± 0.06 | 0.87 ± 0.05 | 1.00 ± 0.05 |
| Hysteresis, % | | | 20.17 ± 0.54 | 21.75 ± 0.13 | 22.46 ± 0.37 | 24.06 ± 0.20 | — |
| Wet Compression, % | | | 12.1 ± 0.6 | 16.1 ± 1.5 | 15.5 ± 0.9 | 15.4 ± 0.7 | 20.0 ± 1.2 |
| Dry Compression, % | | | 5.8 ± 0 | 7.6 ± 1.2 | 5.8 ± 0.8 | 7.2 ± 1.5 | 6.4 ± 1.7 |
| Tensile Strength, psi | | | 12.57 ± 1.30 | 16.07 ± 0.73 | — | 18.28 ± 1.17 | — |
| Elongation at Break, % | | | 142 ± 14 | 143 ± 7 | — | 142 ± 10 | — |
| Tear Strength, N/m | | | 605.9 ± 49.8 | 741.2 ± 41.9 | — | 898.2 ± 78.3 | — |
| Burning Rate, mm/min | | | 103 ± 5 | — | — | 98 ± 3 | — |
| Tensile Strength after Dry Heat Aging, psi | | | 20 ± 1 | — | — | 25 ± 2 | — |
| Elongation Strength after Dry Heat Aging, % | | | 244 ± 4 | — | — | 210 ± 16 | — |
| Comments | | | | | | | |

TABLE Ex3-7

Formulations of Reference and Molded Foams Based on Polyol 74276

| Designation | F | Edv. Weight | 1 | 2 | 3 | 4 | 5 | 6 |
|---|---|---|---|---|---|---|---|---|
| Sample designation | | | Ref. (R-9) | R-10%-NC-701 | R-20%-NC-701 | 74-2764 | 74-2764 | 74-276-7 |
| % Novoinerpolyol on total polyols | | | 0 | 0 | 0 | 10 | 10 | 20 |
| % Graft polyol on total polyols | | | 0 | 10 | 20 | 0 | 10 | |

TABLE Ex3-7-continued

Formulations of Reference and Molded Foams Based on Polyol 74276

Polyol system

| | | | | | | | | |
|---|---|---|---|---|---|---|---|---|
| Poly-G 85-29 | 3 | 2047.5 | 48.5 | 38.8 | 38.8 | 38.8 | 38.8 | 38.8 |
| DVV 6340 | | 1753.13 | 48.5 | 48.5 | 38.8 | 48.5 | 38.8 | 38.8 |
| Speciflex NC-701 | | 2244 | — | 9.7 | 19.4 | — | 9.7 | — |
| Noyomer PPC-2.3-PEOL #74-276 | | 918.47 | — | — | — | 9.7 | 9.7 | 19.4 |
| Water | 2 | 9 | 3.6 | 3.6 | 3.6 | 3.6 | 3.6 | 3.6 |
| Lumulse POE 26 | | 416.2 | 3 | 3 | 3 | 3 | 3 | 3 |
| Tegostab B 4690 | | 1335.7 | 1 | 1 | 1 | 1 | 1 | 1 |
| Dabco 33LV | | 105 | 0.5 | 0.5 | 0.5 | 0.5 | 0.5 | 0.5 |
| Diethanolamine | | 35.04 | 1 | 1 | 1 | 1 | 1 | 1 |
| Niax A-1 | | 233.7 | 0.05 | 0.05 | 0.05 | 0.5 | 0.5 | 0.5 |

Isocyanate System

| | | | | | | | |
|---|---|---|---|---|---|---|---|
| Lupranate TD80 | | 87.54 | 38.83 | 38.79 | 38.70 | 39.28 | 38.85 | 39.68 |
| Isocyanate Index | | | 90 | 90 | 90 | 90 | 90 | 90 |

Reaction Profile of Free-rise

| | | | | | | |
|---|---|---|---|---|---|---|
| Mix time, sec. | | 5 | 5 | 5 | 5 | 5 | 5 |
| Component temperature, | | RT | RT | RT | RT | RT | RT |
| Demolding time, sec. | | 270 | 270 | 270 | 270 | 270 | 270 |
| Mold temperature, ° C. | | 70 | 70 | 70 | 70 | 70 | 70 |

Properties

| | | | | | | |
|---|---|---|---|---|---|---|
| Density, pct | | 2.39 ± 0.02 | 2.43 ± 0 | 2.36 ± 0.03 | 2.44 ± 0.05 | 2.44 ± 0.04 | 2.53 ± 0.03 |
| Resilience, % | | 66.06 ± 0.90 | 63.77 ± 2.09 | 59.20 ± 2.31 | 58.43 ± 0.90 | 56.40 ± 1.93 | 52.85 ± 0.70 |
| CFD @ 25%, psi | | 0.30 ± 0 | 0.36 ± 0.01 | 0.41 ± 0.01 | 0.35 ± 0.01 | 0.42 ± 0.01 | 0.49 ± 0.02 |
| CFD @ 50%, psi | | 0.42 ± 0.01 | 0.51 ± 0.02 | 0.58 ± 0.02 | 0.50 ± 0.01 | 0.60 ± 0.01 | 0.68 ± 0.02 |
| CFD @ 65%. psi | | 0.64 +0.02 | 0.79 ± 0.04 | 0.87 ± 0.05 | 0.73 ± 0.03 | 0.92 ± 0.04 | 0.97 ± 0.05 |
| Hysteresis, % | | 20.17 ± 0.54 | 21.75 ± 0.13 | 24.06 ± 0.20 | 26.17 ± 0.99 | 27.98 ± 0.85 | 35.32 ± 0.26 |
| Wet Compression, % | | 12.1 ± 0.6 | 16.1 ± 1.6 | 15.4 ± 0.7 | 17.9 ± 1.1 | 24.4 ± 0.9 | 24.9 ± 1.1 |
| Dry Compression, % | | 5.8 ± 0.0 | 7.6 ± 1.2 | 7.2 ± 1.5 | 7.2 ± 2.1 | 6.6 ± 1.2 | 7.9 ± 0.4 |
| Tensile Strength, psi | | 12.57 ± 1.30 | 16.07 ± 0.73 | 18.28 ± 1.77 | 15.53 ± 1.06 | — | 15.99 ± 2.28 |
| Elongation at Break, % | | 142 ± 14 | 143 ± 7 | 142 ± 10 | 149 ± 9 | — | 165 ± 12 |
| Tear Strength, N/m | | 605.9 ± 49.8 | 741.2 ± 41.9 | 898.2 ± 78.3 | 749.8 ± 65.2 | — | 838.5 ± 65.4 |
| Burning Rate, mm/min | | — | — | — | — | — | 96 ± 4 |
| Tensile Strength after Dry Heat Aging, psi | | — | — | — | — | — | 15.7 ± 0.9 |
| Elongation Strength after Dry Heat Aging, % | | — | — | — | — | — | 187 ± 1 |
| Comments | | | | | | | |

TABLE Ex34A

Formulations of reference and Molded Foams Based on Polyol 80463

| Designation | 1 | 2 | 3 | 4 | 5 | 6A | 6B Target higher density | 7 |
|---|---|---|---|---|---|---|---|---|
| Sample designation | Ref. (R-9) | R-10%-NC-701 | R-20%-NC-701 | R-25%-NC-701 | PPC-80-163 -10%-90II | PPC-80-163 -20% | PPC-80-163 -20% | PPC-80-163 -25% |
| % Noyomerpolyol on total polyols | 0 | 0 | 0 | 0 | 10 | 20 | 20 | 25 |
| % Graft polyol on total polyols | 0 | 10 | 20 | 26 | 0 | 0 | 0 | 9 |

Polyol system

| | | | | | | | | |
|---|---|---|---|---|---|---|---|---|
| Poiy-G 85-29 | 48.5 | 38.8 | 38.8 | 36.38 | 38.8 | 38.8 | 38.8 | 36.38 |
| MN 6340 | 48.5 | 48.5 | 38.8 | 36.38 | 48.5 | 38.8 | 38.8 | 36.38 |
| Speciflex NC-701 | — | 9.7 | 19.4 | 24.25 | — | — | — | — |
| Novomer PPC-2kd-PEOL #80-163 | — | — | — | — | 9.7 | 19.4 | 19.4 | 24.25 |
| Water | 3.6 | 3.6 | 3.6 | 3.6 | 3.6 | 3.6 | 3.6 | 3.6 |
| Lumulse POE 26 | 3 | 3 | 3 | 3 | 3 | 3 | 3 | 3 |
| Tegostab B 4690 | 1 | 1 | 1 | 1 | 1 | 1 | 1 | 1 |
| Da boo 33LV | 0.5 | 0.5 | 0.5 | 0.5 | 0.5 | 0.5 | 0.5 | 0.5 |
| Diethanclamine | 1 | 1 | 1 | 1 | 1 | 1 | 1 | 1 |
| Niax A-1 | 0.05 | 0.05 | 0.05 | 0.05 | 0.05 | 0.05 | 0.05 | 0.05 |

Isocyanate System

| | | | | | | | | |
|---|---|---|---|---|---|---|---|---|
| Lupranate TD80 | 38.83 | 38.79 | 38.70 | 38.67 | 39.34 | 39.79 | 39.79 | 40.03 |
| Isocyanate Index | 90 | 90 | 90 | 90 | 90 | 90 | 90 | 99 |

TABLE Ex34A-continued

Formulations of reference and Molded Foams Based on Polyol 80463

| Reaction Profile of Free-rise | | | | | | | | |
|---|---|---|---|---|---|---|---|---|
| Mix time, sec. | 5 | 5 | 5 | 5 | 5 | 5 | 5 | 5 |
| Component temperature, °C. | RT | RT | RT | RT | RT | RT | RT | RT |
| Demolding time, sec. | 270 | 270 | 270 | 270 | 270 | 270 | 270 | 270 |
| Mold temperature, C. | 70 | 70 | 70 | 70 | 70 | 70 | 70 | 70 |
| Properties | | | | | | | | |
| Density, pcf | 2.39 ± 0.02 | 2.43 ± 0 | 2.36 ± 0.03 | 2.37 ± 0.03 | 2.46 ± 0.03 | 2.53 ± 0.08 | 3.52 ± 0.08 | 2.37 ± 0.07 |
| Resilience, % | 66.06 ± 0.90 | 63.77 ± 2.09 | 59.20 ± 2.31 | 59.96 ± 1.66 | 59.71 ± 1.27 | 53.61 ± 1.06 | 44.21 ± 2.44 | — |
| CFD @ 25%, psi | 0.30 ± 0 | 0.36 ± 0.01 | 0.41 ± 0.01 | 0.47 ± 0.01 | 0.42 ± 0.02 | 0.42 ± 0.01 | 0.83 ± 0.03 | — |
| CFD @ 50%, psi | 0.42 ± 0.01 | 0.51 ± 0.02 | 0.58 ± 0.02 | 0.67 ± 0.01 | 0.58 ± 0.03 | 0.61 ± 0.01 | 1.16 ± 0.04 | — |
| CFD @ 65%, psi | 0.54 ± 0.02 | 0.79 ± 0.04 | 0.87 ± 0.05 | 1.00 ± 0.05 | 0.85 ± 0.07 | 0.93 ± 0.01 | 1.74 ± 0.11 | — |
| Hysteresis, % | 20.17 ± 0.54 | 21.75 ± 0.13 | 24.06 ± 0.20 | — | 26.49 ± 0.69 | 33.07 ± 0.68 | 27.15 ± 2.36 | — |
| Wet Compression, % | 12.1 ± 0.6 | 16.1 ± 1.5 | 15.4 ± 0.7 | 20.0 ± 1.2 | 20.1 ± 0.5 | 24.8 ± 1.3 | 20.2 ± 2.1 | — |
| Dry Compression, % | 5.8 ± 0 | 7.6 ± 1.2 | 7.2 ± 1.5 | 6.4 ± 1.7 | 6.8 ± 1.9 | 9.1 ± 1.3 | 7.9 ± 1.3 | — |
| Tensile Strength, psi | 12.57 ± 1.30 | 16.07 ± 0.73 | 18.28 ± 1.77 | — | 16.92 ± 1.11 | 15.54 ± 0.69 | 26.34 ± 1.29 | — |
| Elongation at Break, % | 142 ± 14 | 143 ± 7 | 142 ± 10 | — | 141 ± 9 | 158 ± 19 | 152.24 ± 5.56 | — |
| Tear Strength, N/m | 605.9 ± 49.8 | 741.2 ± 41.9 | 898.2 ± 78.3 | — | 829.0 ± 76.0 | 877.7 ± 36.2 | 1231.0 ± 106.7 | — |
| Burning Rate, mm/min | — | — | — | — | — | 98 ± 5 | 97 ± 11 | — |
| Tensile Strength after Dry Heat Aging, psi | | | | | | 14.3 ± 0.9 | 29.65 ± 2.07 | |
| Elongation Strength after Dry Heat Aging, % | | | | | | 184 ± 14 | 252.75 ± 7.20 | |
| Comments | | | | | | | | Coarse |

TABLE Ex3-8B

Formulations of Reference and Molded Foams Based on Polyol 80-163

| Designation | F | Eqv. Weight | 1 | 2 | 3 | 4 |
|---|---|---|---|---|---|---|
| Sample designation | | | Ref. (R-9) | R-10%-NC-701 | PPC-80-163-10% | PPC-80-163-10%-S |
| % Novomerpolyol on total polyols | | | 0 | 0 | 10 | 10 |
| % Graft polyol on total polyols | | | 0 | 10 | 0 | 10 |
| Polyol system | | | | | | |
| Poly-G 85-29 | 3 | 2047.5 | 48.5 | 38.8 | 38.8 | 38.8 |
| DVV 6340 | | 1753.13 | 48.5 | 48.5 | 48.5 | 38.8 |
| Speciflex NC-701 | | 2244 | — | 9.7 | — | 9.7 |
| Novomer PPC-2kd-PEOL #80-163 | | 863.87 | — | — | 9.7 | 9.7 |
| Water | 2 | 9 | 3.6 | 3.6 | 3.6 | 3.6 |
| Lumulse POE 26 | | 416.2 | 3 | 3 | 3 | 3 |
| Tegostab B 4690 | | 1335.7 | 1 | 1 | 1 | 1 |
| Dabco 33LV | | 105 | 0.5 | 0.5 | 0.5 | 0.5 |
| Diethanolamine | | 35.04 | 1 | 1 | 1 | 1 |
| Niax A-1 | | 233.7 | 0.05 | 0.05 | 0.05 | 0.05 |
| Isocyanate System | | | | | | |
| Lupranate TD80 | | 37.54 | 38.83 | 38.79 | 39.97 | 39.54 |
| isocyanate index | | | 90 | 90 | 91 | 91 |
| Reaction Profile of Free-rise | | | | | | |
| Number of foaming experiments | | | 2 | 2 | 2 | 2 |
| Mix time, sec. | | | 5 | 5 | 5 | 5 |
| Component temperature, °C. | | | RT | RT | RT | RT |
| Demoldng time, sec. | | | 270 | 270 | 270 | 270 |
| Mold temperature, °C. | | | 70 | 70 | 70 | 70 |
| Properties | | | | | | |
| Density, pcf | | | 2.39 ± 0.02 | 2.43 ± 0 | 2.36 ± 0.03 | 2.38 ± 0.04 |
| Resilience, | | | 66.06 ± 0.90 | 63.77 ± 2.09 | 58.43 ± 2.69 | 55.89 ± 2.01 |
| CFD @ 25%, psi | | | 0.30 ± 0 | 0.36 ± 0.01 | 0.37 ± 0.01 | 0.41 ± 0.01 |
| CFD @ 50%, psi | | | 0.42 ± 0.01 | 0.51 ± 0.02 | 0.54 ± 0.01 | 0.59 ± 0.01 |
| CFD @ 65%, psi | | | 0.64 ± 0.02 | 0.79 ± 0.04 | 0.82 ± 0.03 | 0.92 ± 0.03 |
| Hysteresis, % | | | 20.17 ± 0.54 | 21.75 ± 0.13 | 27.10 ± 0.29 | 28.04 ± 0.73 |
| Wet Compression, % | | | 12.1 ± 0.6 | 16.1 ± 1.5 | 16.4 ± 1.1 | 19.6 ± 1.4 |
| Dry Compression, % | | | 5.8 ± 0 | 7.6 ± 1.2 | 7.9 ± 2.4 | 6.6 ± 1.4 |
| Tensile Strength, psi | | | 12.57 ± 1.30 | 16.07 ± 0.73 | — | — |
| Elongation at Break, % | | | 142 ± 14 | 143 ± 7 | — | — |
| Tear Strength, N/m | | | 605.9 ± 49.8 | 741.2 ± 41.9 | — | — |
| Comments | | | | | | |

TABLE Ex3-9

Formulations of Reference and Molded Foams Based on Polyol 58-103C

| Designation | F | Eqv. Weight | 1 | 2 | 3 | 4 | 5 |
|---|---|---|---|---|---|---|---|
| Sample designation | | | Ref. (R-9) | R-10%-NC-701 | R-20%-NC-701 | 58-103-C-3 | 58-103-C-4 |
| % Novornerpolyol on total polyols | | | 0 | 0 | 0 | 10 | 10 |
| % Graft polyol on total polyols | | | 0 | 10 | 20 | 0 | 10 |
| Polyol system | | | | | | | |
| Poly-G 85-29 | 3 | 2047.5 | 48.5 | 38,8 | 38.8 | 38.8 | 38.8 |
| DVV 6340 | | 1753.13 | 48.5 | 48,5 | 38.8 | 48.5 | 38.8 |
| Speciflex NC-701 | | 2244 | — | 9.7 | 19.4 | — | 9.7 |
| Novorner PPC-1.2-DPG #58-103 | | 471.43 | — | — | — | 9.7 | 9.7 |
| Water | 2 | 9 | 3.6 | 3.6 | 3.6 | 3.6 | 3.6 |
| Lumulse POE 26 | | 416.2 | 3 | 3 | 3 | 3 | 3 |
| Teciostab B 4690 | | 1335.7 | 1 | 1 | 1 | 1 | 1 |
| Dabco 33LV | | 105 | 0.5 | 0.5 | 0.5 | 0.5 | 0.5 |
| Diethanolamine | | 35.04 | 1 | 1 | 1 | 1 | 1 |
| Niax A-1 | | 233.7 | 0.05 | 0.05 | 0.05 | 0.05 | 0.05 |
| Isocyanate System | | | | | | | |
| Lupranate TD80 | | 87.54 | 38.83 | 38.79 | 38.70 | 40.07 | 39.64 |
| Isocyanate Index | | | 90 | 90 | 90 | 90 | 90 |
| Reaction Profile of Free-rise | | | | | | | |
| Number of foaming experiments | | | 2 | 2 | 2 | 2 | 2 |
| Mix time, sec. | | | 5 | 5 | 5 | 5 | 5 |
| Component temperature, ° C. | | | RT | RT | RT | RT | RT |
| Demolding time, sec. | | | 270 | 270 | 270 | 270 | 270 |
| Mold temperature, ° C. | | | 70 | 70 | 70 | 70 | 70 |
| Properties | | | | | | | |
| Density, pcf | | | 2.39 ± 0.02 | 2.43 ± 0 | 2.36 ± 0.03 | 2.58 ± 0.03 | 2.42 ± 0.05 |
| Resilience, % | | | 66.06 ± 0.90 | 63.77 ± 2.09 | 59.20 ± 2.31 | 55.64 ± 1.39 | 51.83 ± 1.06 |
| CFD @ 25%, psi | | | 0.30 ± 0 | 0.36 ± 0.01 | 0.41 ± 0.01 | 0.36 ± 0.01 | 0.44 ± 0.02 |
| CFD @ 50%, psi | | | 0.42 ± 0.01 | 0.51 ± 0.02 | 0.58 ± 0.02 | 0.52 ± 0.02 | 0.63 ± 0.01 |
| CFD @ 65%, psi | | | 0.64 ± 0.02 | 0.79 ± 0.04 | 0.87 ± 0.05 | 0.79 ± 0.04 | 0.95 ± 0.04 |
| Hysteresis, % | | | 20.17 ± 0.54 | 21.75 ± 0.13 | 24.06 ± 0.20 | 27.34 ± 0.71 | 30.40 ± 0.76 |
| Wet Compression, % | | | 12.1 ± 0.6 | 16.1 ± 1.5 | 15.4 ± 0.7 | 22.1 ± 1.4 | 24.2 ± 0.8 |
| Dry Compression,% | | | 5.8 ± 0 | 7.6 ± 1.2 | 7.2 ± 1.5 | 9.1 ± 1.8 | 8.9 ± 0.5 |
| Tensile Strength, psi | | | 12.57 ± 1.30 | 16.07 ± 0.73 | 18.28 ± 1.77 | 15.50 ± 1.89 | — |
| Elongation at Break, % | | | 142 ± 14 | 143 ± 7 | 142 ± 10 | 165 ± 17 | — |
| Tear Strength, NMI | | | 605.9 ± 49.8 | 741.2 ± 41.9 | 898.2 ± 78.3 | 898.7 ± 68.0 | — |
| Burning Rate, mm/min | | | — | — | — | 102 ± 5 | |
| Tensile Strength after Dry eat Aging psi | | | | | | 26.4 ± 1.1 | |
| Elongation Strength after Dry Heat Aging, % | | | | | | 265 ± 23 | |
| Comments | | | | | | | |

TABLE Ex3-10

Formulations of Reference and Molded Foams Based on Polyol 80448

| Designation | 1 | 2 | 3 | 4 | 5 | 6 | 7A | 7B Target Higher Density |
|---|---|---|---|---|---|---|---|---|
| Sample designation | Ref. (R-9) | R-10%-NC-701 | R-16%-NC-701R | -20%-NC-701 | PPC-1kd-PG-10% | PPC-80-148-10%-90II | PPC-80-148 16% | PPC-80-148 15% |
| % Noyornerpolyol on total polyols | 0 | 0 | 0 | 0 | 10 | 10 | 15 | 15 |
| % Graft polyol on total polyols | 0 | 10 | 15 | 20 | 0 | 0 | 0 | 0 |
| Polyol system | | | | | | | | |
| Poly-G 85-29 | 48.5 | 33.8 | 41.23 | 38.8 | 38.8 | 38.8 | 41.23 | 41.23 |
| DVV 6340 | 48.5 | 48.5 | 41.23 | 38.8 | 48.5 | 48.5 | 41.23 | 41.23 |
| Speciflex NC-701 | — | 9.7 | 14.55 | 19.4 | — | — | — | — |
| Noyomer PPC-1kd-PG #80-143 | — | — | — | — | 9.7 | 9.7 | 14.55 | 14.55 |
| Water | 3.6 | 3.6 | 3.6 | 3.6 | 3.6 | 3.6 | 3.6 | 3.6 |
| Lumulse POE 26 | 3 | 3 | 3 | 3 | 3 | 3 | 3 | 3 |
| Tegostab B 4690 | 1 | 1 | 1 | 1 | 1 | 1 | 1 | 1 |
| Dabco 33LV | 0.5 | 0.5 | 0.5 | 0.5 | 0.5 | 0.5 | 0.5 | 0.5 |

TABLE Ex3-10-continued

Formulations of Reference and Molded Foams Based on Polyol 80448

| | | | | | | | | |
|---|---|---|---|---|---|---|---|---|
| Diethanolamine | 1 | 1 | 1 | 1 | 1 | 1 | 1 | 1 |
| Niax A-1 | 0.05 | 0.05 | 0.05 | 0.05 | 0.05 | 0.05 | 0.05 | 0.05 |
| Isocyanate System | | | | | | | | |
| Lupranate TD80 | 38.83 | 38.79 | 38.22 | 38.70 | 39.34 | 39.97 | 40.50 | 40.50 |
| Isocyanate IndeK | 90 | 90 | 90 | 90 | 89 | 90 | 90 | 90 |
| Reaction Profile of Free-rise | | | | | | | | |
| Number of foaming experiments | 2 | 2 | 1 | 2 | 1 | 1 | 1 | 1 |
| Mix time, sec. | 5 | 5 | 5 | 5 | 5 | 5 | 5 | 5 |
| Component temperature, ° C. | RT | RT | RT | RT | RT | RT | RT | RT |
| Demolding time, sec. | 270 | 270 | 270 | 270 | 270 | 270 | 270 | 270 |
| Mold temperature, C. | 70 | 70 | 70 | 70 | 70 | 70 | 70 | 70 |
| Properties | | | | | | | | |
| Density, pcf | 2.39 ± 0.02 | 2.43 ± 0 | 2.49 ± 0.03 | 2.36 ± 0.03 | 2.45 ± 0.03 | 2.50 ± 0.04 | 2.49 ± 0.05 | 3.60 ± 0.01 |
| Resilience, % | 66.06 ± 0.90 | 63.77 ± 2.09 | 63.26 ± 0.57 | 59.20 ± 2.31 | 56.15 ± 1.66 | 55.13 ± 1.45 | 51.83 ± 1.06 | 49.03 ± 1.70 |
| CFD @ 25%, psi | 0.30 ± 0 | 0.36 ± 0.01 | 0.42 ± 0.02 | 0.41 ± 0.01 | 0.40 ± 0.02 | 0.44 ± 0.01 | 0.55 ± 0.02 | 1.03 ± 0.03 |
| CFD @ 50%, psi | 0.42 ± 0.01 | 0.51 ± 0.02 | 0.58 ± 0.03 | 0.58 ± 0.02 | 0.57 ± 0.02 | 0.61 ± 0.01 | 0.73 ± 0.03 | 1.43 ± 0.04 |
| CFD @ 65%, psi | 0.64 ± 0.02 | 0.79 ± 0.04 | 0.87 ± 0.06 | 0.87 ± 0.05 | 0.86 ± 0.06 | 0.90 ± 0.04 | 1.16 ± 0.06 | 2.06 ± 0.07 |
| Hysteresis, % | 20.17 ± 0.54 | 21.75 ± 0.13 | 22.46 ± 0.37 | 24.06 ± 0.20 | 27.69 ± 0.29 | 29.08 ± 0.15 | 32.28 ± 0.38 | 29.37 ± 6.42 |
| Wet Compresson, % | 12.1 ± 0.6 | 16.1 ± 1.5 | 15.8 ± 0.9 | 15.4 ± 0.7 | 20.8 ± 0.7 | 24.1 ± 1.5 | 22.6 ± 02.1 | 18.2 ± 3.6 |
| Dry Compression, % | 5.8 ± 0 | 7.6 ± 1.2 | 5.8 ± 0.8 | 7.2 ± 1.5 | 10.8 ± 0.8 | 8.8 ± 0.3 | 8.9 ± 0.3 | 5.2 ± 0.4 |
| Tensile Strength, psi | 12.57 ± 1.30 | 16.07 ± 0.73 | — | 18.28 ± 1.77 | — | 14.47 ± 1.01 | 13.29 ± 1.43 | 14.73 ± 2.17 |
| Elonaation at Break, % | 142 ± 14 | 143 ± 7 | — | 142 ± 10 | — | 160 ± 24 | 109 ± 14 | 96 ± 22 |
| Tear Strength, N/m | 605.9 ± 49.8 | 741.2 ± 41.9 | — | 898.2 ± 78.3 | 699.0 ± 37.8 | 619.7 ± 74.4 | 811.7 ± 49.9 | |
| Burning Rate. mm/min | — | — | — | — | — | — | 110 ± 5 | 104 ± 9 |
| Tensile Strength after Dry Heat Aging, psi | | | | | | | 13.0 ± 0.4 | 19.16 ± 1.90 |
| Elongation Strength after Dry Heat Aging, % | | | | | | | 159 ± 9 | 172.17 ± 24.13 |

V. Conclusions

Introduction of the four different Novomer polyols into reference foam formulation as drop-in replacement for Poly-G 85-29 and Voranol Voractiv 6340 did not significantly affect the reaction profile (foaming profile) measured as cream time, gel time, and rise time.

The density and apparent cell structure of the free-rise foams did not change significantly with a drop-in replacement of Poly-G 85-29 and Voranol Voractiv 6340 polyols with Novomer polyols.

The apparent cell structure of molded foams prepared with Novomer polyols was uniform and similar to the reference foams prepared with and without the graft polyol.

All foams prepared with Novomer polyols exhibited relatively high resilience and relatively low hysteresis loss and thus can be classified as High Resilient (HR) PU foams.

The tensile strength and tear strength properties of foams prepared with Novomer polyols were somewhat better in comparison to the reference foams.

Results of CFD measurements clearly indicate an increase in load bearing properties of molded foams based on Novomer polyols without significant effect on the SAG (comfort) factor.

Foams based on Novomer polyols exhibited some increase in wet and dry compression set in comparison to the reference foams. However, all molded foams prepared with Novomer polyols met the wet compression set requirements of 25% maximum defined by the Chrysler Material Standard for Type IV foams.

Practically all molded foams based on Novomer polyols met the hysteresis loss, tear resistance, and wet compression requirements specified by the Chrysler Material Standard: MS-DC-649 for "Cellular, Molded Polyurethane High Resilient (HR) Type Seat Applications" (FIG. 33).

The flammability of molded foams was not affected by addition of Novomer polyols.

Other Embodiments

The foregoing has been a description of certain non-limiting embodiments of the invention. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

Appendix A Aliphatic Polycarbonate Polyols

This section describes some of the aliphatic polycarbonate polyols that have utility in methods and compositions of the present invention. Aliphatic polycarbonate polyols refered to herein are derived from the copolymerization of one or more epoxides and carbon dioxide. Examples of suitable polyols, as well as methods of making them are disclosed in PCT publication WO2010/028362 the entirety of which is incorporated herein by reference.

It is advantageous for many of the embodiments described herein that the aliphatic polycarbonate polyols used have a high percentage of reactive end groups. Such reactive end-groups are typically hydroxyl groups, but other reactive functional groups may be present if the polyols are treated to modify the chemistry of the end groups. Such modified materials may terminate in amino groups, thiol groups, alkene groups, carboxylate groups, silanes, phosphate derivatives, isocyanate groups and the like. For purposes of this invention, the term 'aliphatic polycarbonate polyol' typically refers to —erminated materials, but the incorporation of end-group modified compositions is not excluded, unless otherwise specified.

In certain embodiments, at least 90% of the end groups of the polycarbonate polyol used are reactive groups. In certain embodiments, at least 95%, at least 96%, at least 97% or at least 98% of the end groups of the polycarbonate polyol used are reactive groups. In certain embodiments, more than 99%, more than 99.5%, more than 99.7%, or more than 99.8% of the end groups of the polycarbonate polyol used are reactive groups. In certain embodiments, more than 99.9% of the end groups of the polycarbonate polyol used are reactive groups.

In certain embodiments, at least 90% of the end groups of the polycarbonate polyol used are —OH groups. In certain embodiments, at least 95%, at least 96%, at least 97% or at least 98% of the end groups of the polycarbonate polyol used are —groups. In certain embodiments, more than 99%, more than 99.5%, more than 99.7%, or more than 99.8% of the end groups of the polycarbonate polyol used are —groups. In certain embodiments, more than 99.9% of the end groups of the polycarbonate polyol used are —OH groups.

Another way of expressing the —OH end-group content of a polyol composition is by reporting its OH #which is measured using methods well known in the art. In certain embodiments, the aliphatic polycarbonate polyols utilized in the present invention have an OH #greater than about 40. In certain embodiments, the aliphatic polycarbonate polyols have an OH #greater than about 50, greater than about 75, greater than about 100, or greater than about 120.

In certain embodiments, it is advantageous if the aliphatic polycarbonate polyol compositions have a substantial proportion of primary hydroxyl end groups. These are the norm for compositions comprising poly(ethylene carbonate), but for polyols derived copolymerization of substituted epoxides, it is common for some or most of the chain ends to consist of secondary hydroxyl groups. Poly(propylene carbonate) polyol is one example of a polyol that may have mostly secondary hydroxyl end groups. In certain embodiments, such polyols are treated to increase the proportion of primary —OH end groups. This may be accomplished by methods known in the art such as by reacting the secondary hydroxyl groups with reagents such as ethylene oxide, reactive lactones, and the like. In certain embodiments, the aliphatic polycarbonate polyols are treated with beta lactones, caprolactone and the like to introduce primary hydroxyl end groups. In certain embodiments, the aliphatic polycarbonate polyols are treated with ethylene oxide to introduce primary hydroxyl end groups.

In certain embodiments, polycarbonate polyols with utility for the present invention contain a primary repeating unit having a structure:

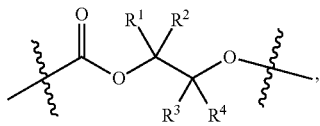

where $R^1$, $R^2$, $R^3$, and $R^4$ are, at each occurrence in the polymer chain, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of $R^1$, $R^2$, $R^3$, and $R^4$ may optionally be taken together with intervening atoms to form one or more optionally substituted rings optionally containing one or more heteroatoms.

In certain embodiments, polycarbonate polyols with utility for the present invention contain a primary repeating unit having a structure:

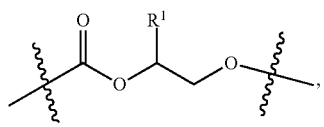

where $R^1$ is as defined above and in the classes, subclasses and examples herein.

In certain embodiments, aliphatic polycarbonate chains comprise a copolymer of carbon dioxide and ethylene oxide. In certain embodiments, aliphatic polycarbonate chains comprise a copolymer of carbon dioxide and propylene oxide. In certain embodiments, aliphatic polycarbonate chains comprise a copolymer of carbon dioxide and cyclohexene oxide. In certain embodiments, aliphatic polycarbonate chains comprise a copolymer of carbon dioxide and cyclopentene oxide. In certain embodiments, aliphatic polycarbonate chains comprise a copolymer of carbon dioxide and 3-vinyl cyclohexane oxide.

In certain embodiments, aliphatic polycarbonate chains comprise a terpolymer of carbon dioxide and ethylene oxide along with one or more additional epoxides selected from the group consisting of propylene oxide, 1,2-butene oxide, 2,3-butene oxide, cyclohexene oxide, 3-vinyl cyclohexene oxide, epichlorohydrin, glicydyl esters, glycidyl ethers, styrene oxides, and epoxides of higher alpha olefins. In certain embodiments, such terpolymers contain a majority of repeat units derived from ethylene oxide with lesser amounts of repeat units derived from one or more additional epoxides. In certain embodiments, terpolymers contain about 50% to about 99.5% ethylene oxide-derived repeat units. In certain embodiments, terpolymers contain greater than about 60% ethylene oxide-derived repeat units. In certain embodiments, terpolymers contain greater than 75% ethylene oxide-derived repeat units. In certain embodiments, terpolymers contain greater than 80% ethylene oxide-derived repeat units. In certain embodiments, terpolymers contain greater than 85% ethylene oxide-derived repeat units. In certain embodiments, terpolymers contain greater than 90% ethylene oxide-derived repeat units. In certain embodiments, terpolymers contain greater than 95% ethylene oxide-derived repeat units.

In some embodiments, aliphatic polycarbonate chains comprise a copolymer of carbon dioxide and propylene oxide along with one or more additional epoxides selected from the group consisting of ethylene oxide, 1,2-butene oxide, 2,3-butene oxide, cyclohexene oxide, 3-vinyl cyclohexene oxide, epichlorohydrin, glicydyl esters, glycidyl ethers, styrene oxides, and epoxides of higher alpha olefins. In certain embodiments, such terpolymers contain a majority of repeat units derived from propylene oxide with lesser amounts of repeat units derived from one or more additional epoxides. In certain embodiments, terpolymers contain about 50% to about 99.5% propylene oxide-derived repeat units. In certain embodiments, terpolymers contain greater than 60% propylene oxide-derived repeat units. In certain embodiments, terpolymers contain greater than 75% propylene oxide-derived repeat units. In certain embodiments, terpolymers contain greater than 80% propylene oxide-derived repeat units. In certain embodiments, terpolymers contain greater than 85% propylene oxide-derived repeat units. In certain embodiments, terpolymers contain greater than 90% propylene oxide-derived repeat units. In certain embodiments, terpolymers contain greater than 95% propylene oxide-derived repeat units.

In certain embodiments, aliphatic polycarbonate compositions with utility in the present invention have a number average molecular weight ($M_n$) in the range of about 500 g/mol to about 25,000 g/mol.

In certain embodiments, aliphatic polycarbonate chains have an $M_n$ less than about 25,000 g/mol. In certain embodiments, aliphatic polycarbonate chains have an $M_n$ less than about 10,000 g/mol. In certain embodiments, aliphatic polycarbonate chains have an $M_n$ less than about 5,000 g/mol. In certain embodiments, aliphatic polycarbonate chains have an $M_n$ between about 500 g/mol and about 15,000 g/mol. In certain embodiments, aliphatic polycarbonate chains have an $M_n$ between about 500 g/mol and about 10,000 g/mol. In certain embodiments, aliphatic polycarbonate chains have an $M_n$ between about 500 g/mol and about 5,000 g/mol. In certain embodiments, aliphatic polycarbonate chains have an $M_n$ between about 500 g/mol and about 3,000 g/mol. In certain embodiments, aliphatic polycarbonate chains have an $M_n$ between about 500 g/mol and about 2,500 g/mol. In certain embodiments, aliphatic polycarbonate chains have an $M_n$ between about 500 g/mol and about 2,000 g/mol. In certain embodiments, aliphatic polycarbonate chains have an $M_n$ between about 500 g/mol and about 1,500 g/mol. In certain embodiments, aliphatic polycarbonate chains have an $M_n$ between about 500 g/mol and about 1,000 g/mol. In certain embodiments, aliphatic polycarbonate chains have an $M_n$ between about 1,000 g/mol and about 5,000 g/mol. In certain embodiments, aliphatic polycarbonate chains have an $M_n$ between about 1,000 g/mol and about 3,000 g/mol. In certain embodiments, aliphatic polycarbonate chains have an $M_n$ between about 5,000 g/mol and about 10,000 g/mol. In certain embodiments, aliphatic polycarbonate chains have an $M_n$ of about 5,000 g/mol. In certain embodiments, aliphatic polycarbonate chains have an $M_n$ of about 4,000 g/mol. In certain embodiments, aliphatic polycarbonate chains have an $M_n$ of about 3,000 g/mol. In certain embodiments, aliphatic polycarbonate chains have an $M_n$ of about 2,500 g/mol. In certain embodiments, aliphatic polycarbonate chains have an $M_n$ of about 2,000 g/mol. In certain embodiments, aliphatic polycarbonate chains have an $M_n$ of about 1,500 g/mol. In certain embodiments, aliphatic polycarbonate chains have an $M_n$ of about 1,000 g/mol. In certain embodiments, aliphatic polycarbonate chains have an $M_n$ of about 850 g/mol. In certain embodiments, aliphatic polycarbonate chains have an $M_n$ of about 750 g/mol. In certain embodiments, aliphatic polycarbonate chains have an $M_n$ of about 500 g/mol.

In certain embodiments, the aliphatic polycarbonate polyols used are characterized in that they have a narrow molecular weight distribution. This can be indicated by the polydispersity indices (PDI) of the aliphatic polycarbonate polymers. In certain embodiments, aliphatic polycarbonate compositions have a PDI less than 2. In certain embodiments, aliphatic polycarbonate compositions have a PDI less than 1.8. In certain embodiments, aliphatic polycarbonate compositions have a PDI less than 1.5. In certain embodiments, aliphatic polycarbonate compositions have a PDI less than 1.4. In certain embodiments, aliphatic polycarbonate compositions have a PDI between about 1.0 and 1.2. In certain embodiments, aliphatic polycarbonate compositions have a PDI between about 1.0 and 1.1.

In certain embodiments aliphatic polycarbonate compositions of the present invention comprise substantially alternating polymers containing a high percentage of carbonate linkages and a low content of ether linkages. In certain embodiments, aliphatic polycarbonate compositions of the present invention are characterized in that, on average in the composition, the percentage of carbonate linkages is 85% or greater. In certain embodiments, aliphatic polycarbonate compositions of the present invention are characterized in that, on average in the composition, the percentage of carbonate linkages is 90% or greater. In certain embodiments, aliphatic polycarbonate compositions of the present invention are characterized in that, on average in the composition, the percentage of carbonate linkages is 91% or greater. In certain embodiments, aliphatic polycarbonate compositions of the present invention are characterized in that, on average in the composition, the percentage of carbonate linkages is 92% or greater. In certain embodiments, aliphatic polycarbonate compositions of the present invention are characterized in that, on average in the composition, the percentage of carbonate linkages is 93% or greater. In certain embodiments, aliphatic polycarbonate compositions of the present invention are characterized in that, on average in the composition, the percentage of carbonate linkages is 94% or greater. In certain embodiments, aliphatic polycarbonate compositions of the present invention are characterized in that, on average in the composition, the percentage of carbonate linkages is 95% or greater. In certain embodiments, aliphatic polycarbonate compositions of the present invention are characterized in that, on average in the composition, the percentage of carbonate linkages is 96% or greater. In certain embodiments, aliphatic polycarbonate compositions of the present invention are characterized in that, on average in the composition, the percentage of carbonate linkages is 97% or greater. In certain embodiments, aliphatic polycarbonate compositions of the present invention are characterized in that, on average in the composition, the percentage of carbonate linkages is 98% or greater. In certain embodiments, aliphatic polycarbonate compositions of the present invention are characterized in that, on average in the composition, the percentage of carbonate linkages is 99% or greater. In certain embodiments, aliphatic polycarbonate compositions of the present invention are characterized in that, on average in the composition, the percentage of carbonate linkages is 99.5% or greater. In certain embodiments, the percentages above exclude ether linkages present in polymerization initiators or chain transfer agents and refer only to the linkages formed during epoxide $CO_2$ copolymerization.

In certain embodiments, aliphatic polycarbonate compositions of the present invention are characterized in that they contain essentially no ether linkages either within the polymer chains derived from epoxide $CO_2$ copolymerization or within any polymerization intiators, chain transfer agents or end groups that may be present in the polymer. In certain embodiments, aliphatic polycarbonate compositions of the present invention are characterized in that they contain, on average, less than one ether linkage per polymer chain within the composition. In certain embodiments, aliphatic polycarbonate compositions of the present invention are characterized in that they contain essentially no ether linkages, In certain embodiments where an aliphatic polycarbonate is derived from mono-substituted epoxides (e.g. such as propylene oxide, 1,2-butylene oxide, epichlorohydrin, epoxidized alpha olefins, or a glycidol derivative), the aliphatic polycarbonate is characterized in that it is regioregular. Regioregularity may be expressed as the percentage of adjacent monomer units that are oriented in a head-to-tail arrangement within the polymer chain. In certain embodiments, aliphatic polycarbonate chains in the inventive polymer compositions have a head-to-tail content higher than about 80%. In certain embodiments, the head-to-tail content is higher than about 85%. In certain embodiments, the head-to-tail content is higher than about 90%. In certain embodiments, the head-to-tail content is greater than about 91%, greater than about 92%, greater than about 93%, greater than about 94%, or greater than about 95%. In certain embodiments, the head-to-tail content of the polymer is as determined by proton or carbon-13NMR spectroscopy.

In certain embodiments, aliphatic polycarbonate polyols useful for the present invention have a viscosity controlled to be within a particular range. The preferred range may depend upon a particular application and may be controlled to be within the normal range for a particular application.

In certain embodiments, where the aliphatic polycarbonate polyol is used in the formulation of a rigid foam or a thermoplastic composition, the polyol has a viscosity, as measured at a temperature of at least 20° C. but less than 70° C., of less than about 30,000 cps. In certain embodiments, such polyols have a viscosity less than about 20,000 cps, less than about 15,000 cps, less than about 12,000 cps, or less than about 10,000 cps. In certain embodiments, such polyols have a viscosity between about 600 and about 30,000 cps. In certain embodiments, such polyols have a viscosity between about 2,000 and about 20,000 cps. In certain embodiments, such polyols have a viscosity between about 5,000 and about 15,000 cps.

In other embodiments, where the aliphatic polycarbonate polyol is used in the formulation of a flexible foam, the polyol has a viscosity, as measured at a temperature of at least 20° C. but less than 70° C., of less than about 10,000 cps. In certain embodiments, such polyols have a viscosity less than about 8,000 cps, less than about 6,000 cps, less than about 3,000 cps, or less than about 2,000 cps. In certain embodiments, such polyols have a viscosity between about 1,000 and about 10,000 cps. In certain embodiments, such polyols have a viscosity between about 1,000 and about 6,000 cps.

In certain embodiments, the polyol viscosity values described above represent the viscosity as measured at 25° C. In certain embodiments, the viscosity values above represent the viscosity as measured at 30° C., 40° C., 50° C., 60° C. or 70° C.

In certain embodiments, aliphatic polycarbonate polyols useful for the present invention have a Tg within a particular range. The desired Tg will vary with the application and may be controlled to be within the known normal range for a particular application. In certain embodiments, where the polyol is used in the formulation of a flexible foam composition, the polyol has a Tg less than about 20° C. In certain embodiments, such polyols have Tg less than about 15° C., less than about 10° C., less than about 5° C., less than about 0° C., less than about −10° C., less than about −20° C., or less than about 40° C. In certain embodiments, such polyols have a Tg between about −30° C. and about −20° C. In certain embodiments, such polyols have a Tg between about −30° C. and about −20° C.

In certain embodiments, where the aliphatic polycarbonate polyol is used in the formulation of a rigid foam composition, the polyol has a Tg greater than about −30° C. In certain embodiments, such polyols have Tg greater than about −20° C., greater than about −10° C., greater than about 0° C., greater than about 10° C., greater than about 15° C., or greater than about 25° C. In certain embodiments, such polyols have a Tg between about −10° C. and about 30° C.

In certain embodiments, such polyols have a Tg between about 0° C. and about 20° C.

In certain embodiments, compositions of the present invention comprise aliphatic polycarbonate polyols having a structure P1:

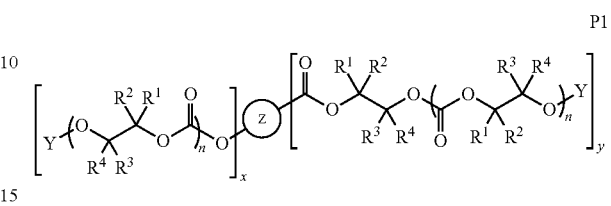

wherein, $R^1$, $R^2$, $R^3$, and $R^4$ are, at each occurrence in the polymer chain, independently selected from the group consisting of —H, fluorine, an optionally substituted $C_{1-30}$ aliphatic group, and an optionally substituted $C_{1-20}$ heteroaliphatic group, and an optionally substituted $C_{6-10}$ aryl group, where any two or more of $R^1$, $R^2$, $R^3$, and $R^4$ may optionally be taken together with intervening atoms to form one or more optionally substituted rings optionally containing one or more heteroatoms;

Y is, at each occurrence, independently —H or the site of attachment of a moiety containing another reactive end group such as those described hereinabove;

n is at each occurrence, independently an integer from about 2 to about 100;

is a multivalent moiety; and x and y are each independently an integer from 0 to 6, where the sum of x and y is between 2 and 6.

In certain embodiments, the multivalent moiety

embedded within the aliphatic polycarbonate chain is derived from a polyfunctional chain transfer agent having two or more sites from which epoxide/$CO_2$ copolymerization can occur. In certain embodiments, such copolymerizations are performed in the presence of polyfunctional chain transfer agents as exemplified in PCT publication WO/2010/028362.

In certain embodiments, a polyfunctional chain transfer agent has a formula:

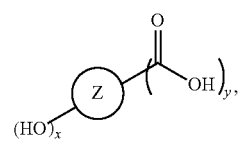

wherein each of

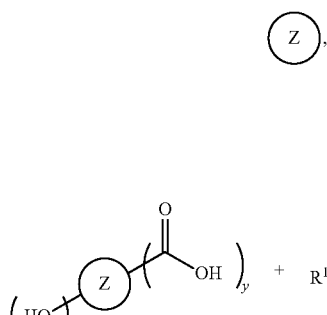, x, and y is as defined above and described in classes and subclasses herein.

In certain embodiments, aliphatic polycarbonate chains in the inventive polymer compositions are derived from the copolymerization of one or more epoxides with carbon dioxide in the presence of such polyfunctional chain transfer agents as shown in Scheme 2:

Scheme 2

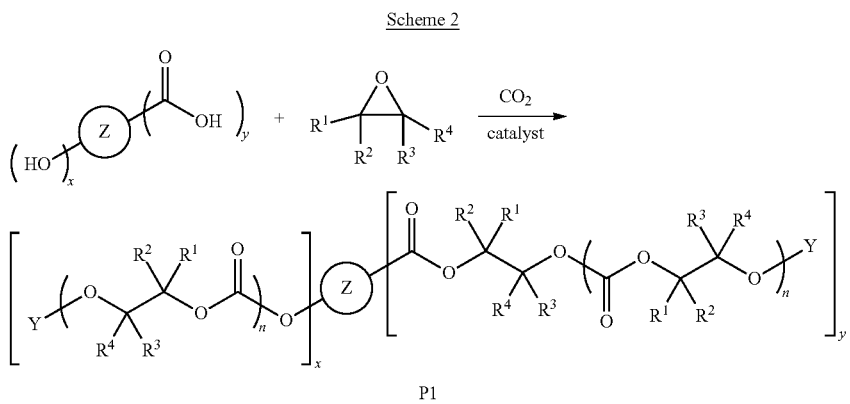

In certain embodiments, aliphatic polycarbonate chains in polymer compositions of the present invention comprise chains with a structure P2:

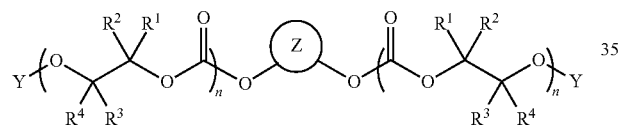

wherein each of $R^1$, $R^2$, $R^3$, $R^4$, Y,

and n is as defined above and described in the classes and subclasses herein.

In certain embodiments where aliphatic polycarbonate chains have a structure P2,

is derived from a dihydric alcohol. In such instances

represents the carbon-containing backbone of the dihydric alcohol, while the two oxygen atoms adjacent to

are derived from the —OH groups of the diol. For example, if the polyfunctional chain transfer agent were ethylene glycol, then

would be —CH$_2$CH$_2$— and P2 would have the following structure:

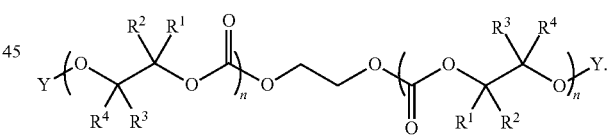

It will be apparent to the skilled artisan, that this is the case for the other polyfunctional chain transfer agents described herein—there is a nexus between the structure of the chain transfer agent employed and the structure of

in the resulting polyol.

In certain embodiments, where

is derived from a dihydric alcohol, the dihydric alcohol comprises a $C_{2\text{-}40}$ diol. In certain embodiments, the dihydric alcohol is selected from the group consisting of: 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 2-methyl-2,4-pentanediol, 2-ethyl-1,3-hexanediol, 2-methyl-1,3-propanediol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, isosorbide, glycerol monoesters, glycerol monoethers, trimethylolpropane monoesters, trimethylolpropane monoethers, pentaerythritol diesters, pentaerythritol diethers, and alkoxylated derivatives of any of these.

In certain embodiments, where

ⓩ is derived from a dihydric alcohol, the dihydric alcohol is selected from the group consisting of: diethylene glycol, triethylene glycol, tetraethylene glycol, higher poly(ethylene glycol), such as those having number average molecular weights of from 220 to about 2000 g/mol, dipropylene glycol, tripropylene glycol, and higher poly(propylene glycols) such as those having number average molecular weights of from 234 to about 2000 g/mol.

In certain embodiments, where

ⓩ is derived from a dihydric alcohol, the dihydric alcohol comprises an alkoxylated derivative of a compound selected from the group consisting of: a diacid, a diol, or a hydroxy acid. In certain embodiments, the alkoxylated derivatives comprise ethoxylated or propoxylated compounds.

In certain embodiments, where

ⓩ is derived from a dihydric alcohol, the dihydric alcohol comprises a polymeric diol. In certain embodiments, a polymeric diol is selected from the group consisting of polyethers, polyesters, hydroxy-terminated polyolefins, polycarbonate polyols derived from diols and phosgene (or its reactive equivalents); polyether-copolyesters, polyether polycarbonates, polycarbonate-copolyesters, polyoxymethylene polymers, and alkoxylated analogs of any of these. In certain embodiments, the polymeric diol has an average molecular weight less than about 2000 g/mol.

In certain embodiments,

ⓩ is derived from a polyhydric alcohol with more than two hydroxy groups. In certain embodiments, the aliphatic polycarbonate chains in polymer compositions of the present invention comprise aliphatic polycarbonate chains where the moiety

ⓩ is derived from a triol. In certain embodiments, such aliphatic polycarbonate chains have the structure P3:

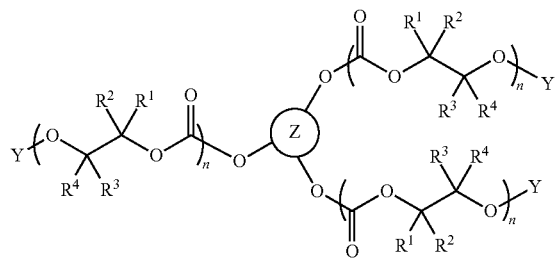

P3 wherein each of $R^1$, $R^2$, $R^3$, $R^4$, Y,

ⓩ and n is as defined above and described in classes and subclasses herein.

In certain embodiments where

ⓩ is derived from a triol, the triol is selected from the group consisting of: glycerol, 1,2,4-butanetriol, 2-(hydroxymethyl)-1,3-propanediol; hexane triols, trimethylol propane, trimethylol ethane, trimethylolhexane, 1,4-cyclohexanetrimethanol, pentaerythritol mono esters, pentaerythritol mono ethers, and alkoxylated analogs of any of these. In certain embodiments, alkoxylated derivatives comprise ethoxylated or propoxylated compounds.

In certain embodiments,

ⓩ is derived from an alkoxylated derivative of a trifunctional carboxylic acid or trifunctional hydroxy acid. In certain embodiments, alkoxylated derivatives comprise ethoxylated or propoxylated compounds.

In certain embodiments, where

Ⓩ is derived from a polymeric triol, the polymeric triol is selected from the group consisting of polyethers, polyesters, hydroxy-terminated polyolefins, polyether-copolyesters, polyether polycarbonates, polyoxymethylene polymers, polycarbonate-copolyesters, and alkoxylated analogs of any of these. In certain embodiments, the alkoxylated polymeric triols comprise ethoxylated or propoxylated compounds.

In certain embodiments,

Ⓩ is derived from a polyhydric alcohol with four hydroxy groups. In certain embodiments, aliphatic polycarbonate chains in polymer compositions of the present invention comprise aliphatic polycarbonate chains where the moiety

Ⓩ is derived from a tetraol. In certain embodiments, aliphatic polycarbonate chains in polymer compositions of the present invention comprise chains with the structure P4:

P4

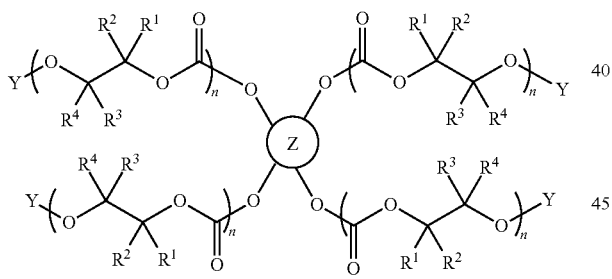

wherein each of $R^1$, $R^2$, $R^3$, $R^4$, Y,

Ⓩ and n is as defined above and described in classes and subclasses herein.

In certain embodiments,

Ⓩ is derived from a polyhydric alcohol with more than four hydroxy groups. In certain embodiments,

Ⓩ is derived from a polyhydric alcohol with six hydroxy groups. In certain embodiments, a polyhydric alcohol is dipentaerithrotol or an alkoxylated analog thereof. In certain embodiments, a polyhydric alcohol is sorbitol or an alkoxylated analog thereof. In certain embodiments, aliphatic polycarbonate chains in polymer compositions of the present invention comprise chains with the structure P5:

P5

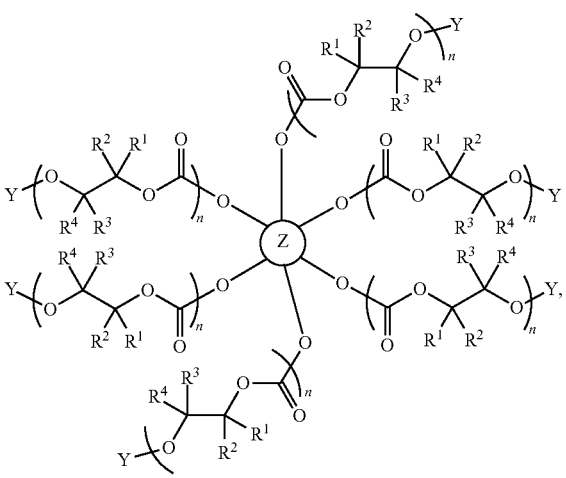

wherein each of $R^1$, $R^2$, $R^3$, $R^4$, Y,

Ⓩ and n is as defined above and described in classes and subclasses herein.

In certain embodiments, aliphatic polycarbonates of the present invention comprise a combination of bifunctional chains (e.g. polycarbonates of formula P2) in combination with higher functional chains (e.g. one or more polycarbonates of formulae P3 to P5).

In certain embodiments,

Ⓩ is derived from a hydroxy acid. In certain embodiments, aliphatic polycarbonate chains in polymer compositions of the present invention comprise chains with the structure P6:

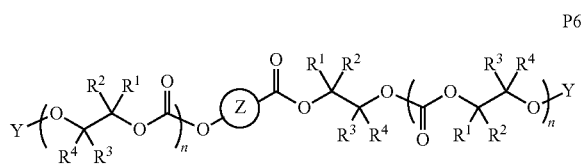

wherein each of $R^1$, $R^2$, $R^3$, $R^4$, Y,

Ⓩ and n is as defined above and described in classes and subclasses herein. In such instances,

Ⓩ represents the carbon-containing backbone backbone of the hydroxy acid, while the ester and carbonate linkages adjacent to

Ⓩ are derived from the —$CO_2H$ group and the hydroxy group of the hydroxy acid. For example, if

Ⓩ were derived from 3-hydroxy propanoic acid, then

Ⓩ would be —$CH_2CH_2$— and P6 would have the following structure:

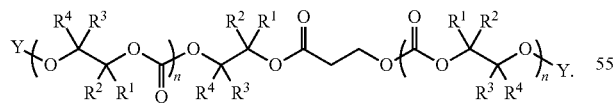

In certain embodiments,

Ⓩ is derived from an optionally substituted $C_{2-40}$ hydroxy acid. In certain embodiments,

Ⓩ is derived from a polyester. In certain embodiments, such polyesters have a molecular weight less than about 2000 g/mol.

In certain embodiments, a hydroxy acid is an alpha-hydroxy acid. In certain embodiments, a hydroxy acid is selected from the group consisting of: glycolic acid, DL-lactic acid, D-lactic acid, L-lactic, citric acid, and mandelic acid.

In certain embodiments, a hydroxy acid is a beta-hydroxy acid. In certain embodiments, a hydroxy acid is selected from the group consisting of: 3-hydroxypropionic acid, DL 3-hydroxybutryic acid, D-3hydroxybutryic acid, L-3-hydroxybutyric acid, DL-3-hydroxy valeric acid, D-3-hydroxy valeric acid, L-3-hydroxy valeric acid, salicylic acid, and derivatives of salicylic acid.

In certain embodiments, a hydroxy acid is a a-w hydroxy acid. In certain embodiments, a hydroxy acid is selected from the group consisting of: of optionally substituted $C_{3-20}$ aliphatic a-w hydroxy acids and oligomeric esters.

In certain embodiments, a hydroxy acid is selected from the group consisting of:

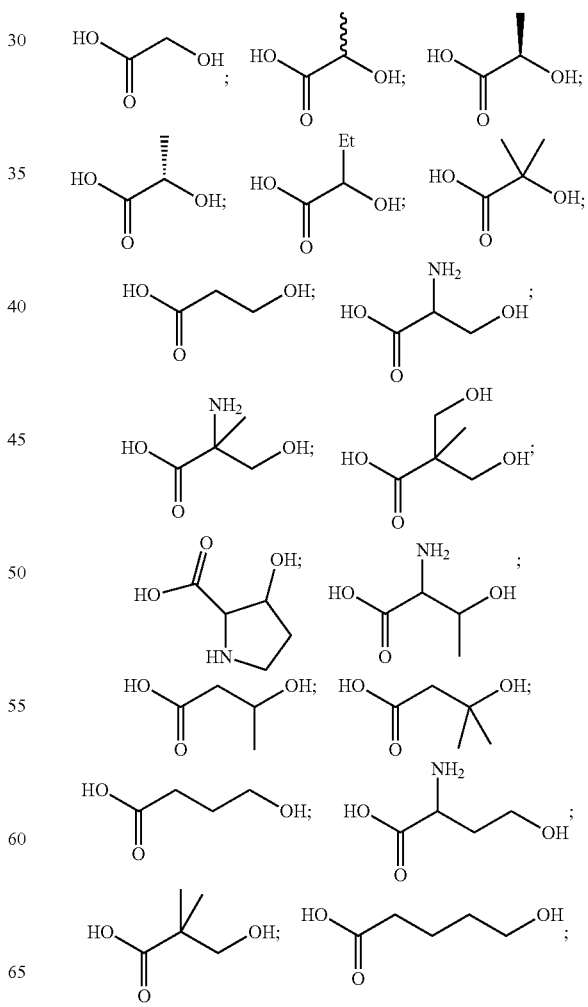

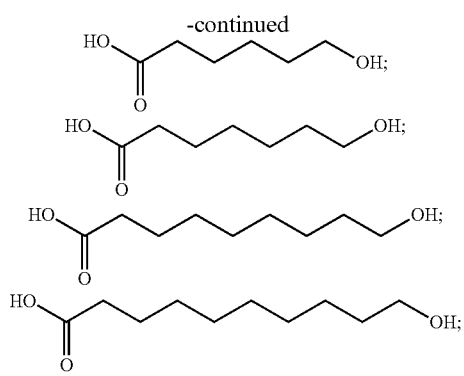

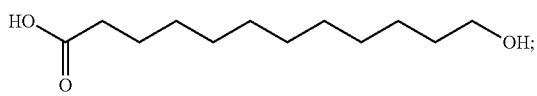

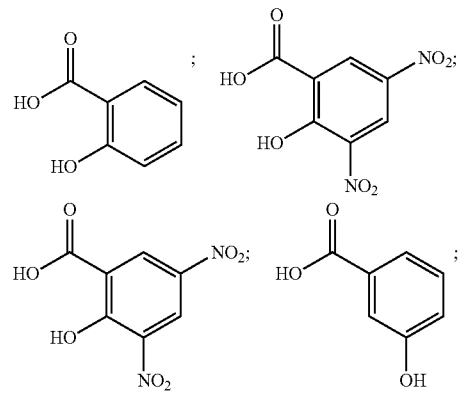

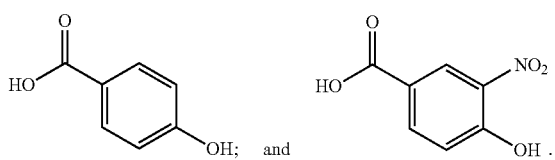

In certain embodiments, $$Z$$

is derived from a polycarboxylic acid. In certain embodiments, aliphatic polycarbonate chains in polymer compositions of the present invention comprise chains with the structure P7:

wherein each of $R^1$, $R^2$, $R^3$, $R^4$, Y, $$Z$$

and n is as defined above and described in classes and subclasses herein, and y′ is an integer from 1 to 5 inclusive.

In embodiments where the aliphatic polycarbonate chains have a structure P7, $$Z$$

represents the carbon-containing backbone (or a covalent bond in the case of oxalic acid) of a polycarboxylic acid, while ester groups adjacent to $$Z$$

are derived from —$CO_2H$ groups of the polycarboxylic acid. For example, if $$Z$$

were derived from succinic acid ($HO_2CCH_2CH_2CO_2H$), then $$Z$$

would be —$CH_2CH_2$— and P7 would have the following structure:

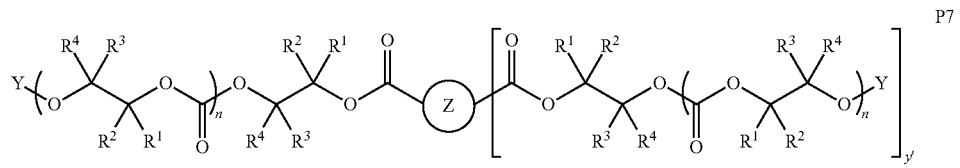

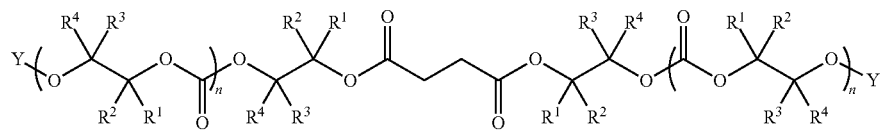

wherein each of $R^1$, $R^2$, $R^3$, $R^4$, Y, and n is as defined above and described in classes and subclasses herein.

In certain embodiments,

is derived from a dicarboxylic acid. In certain embodiments, aliphatic polycarbonate chains in polymer compositions of the present invention comprise chains with the structure P8:

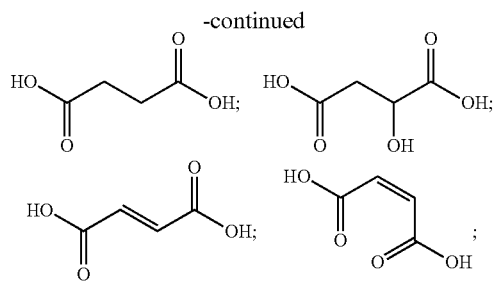

In certain embodiments,

is selected from the group consisting of: phthalic acid, isophthalic acid, terephthalic acid, maleic acid, succinic acid, malonic acid, glutaric acid, adipic acid, pimelic acid, suberic acid, and azelaic acid.

In certain embodiments,

is selected from the group consisting of:

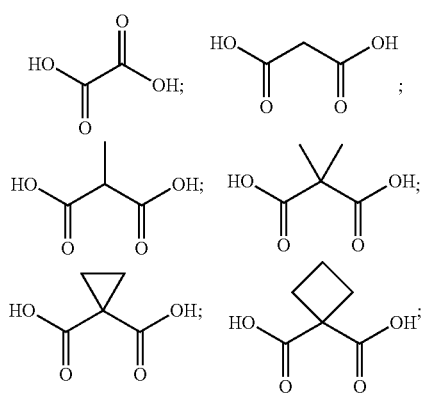

-continued

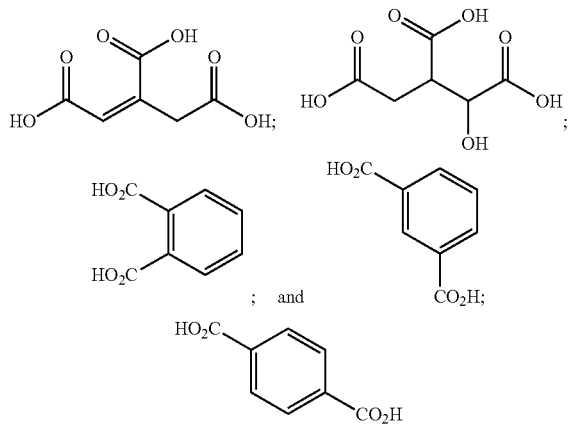

; and

In certain embodiments, each

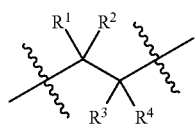

in the structures herein is independently selected from the group consisting of:

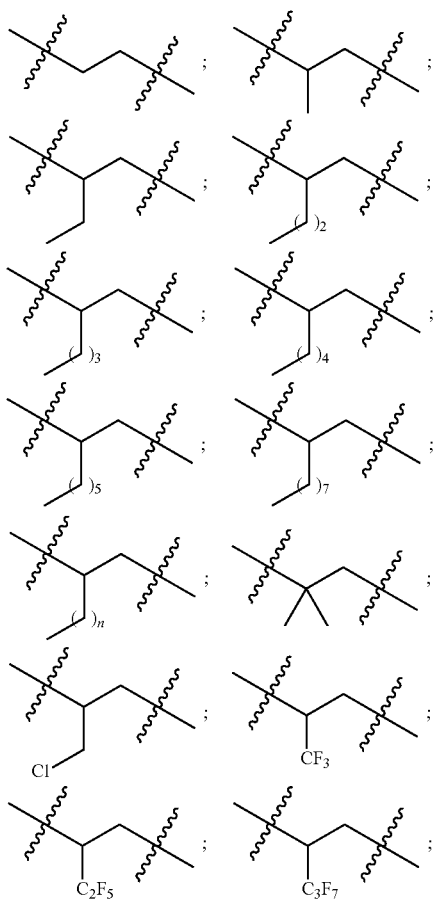

-continued

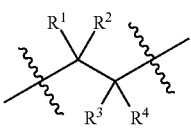

n = 9-30 wherein each $R^x$ is independently an optionally substituted group selected from the group consisting of $C_{2-20}$ aliphatic, $C_{2-20}$ heteroaliphatic, 3- to 14-membered carbocyclic, 6- to 10-membered aryl, 5- to 10-membered heteroaryl, and 3- to 12-membered heterocyclic.

In certain embodiments, each

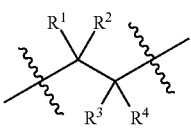

in the structures herein is independently selected from the group consisting of:

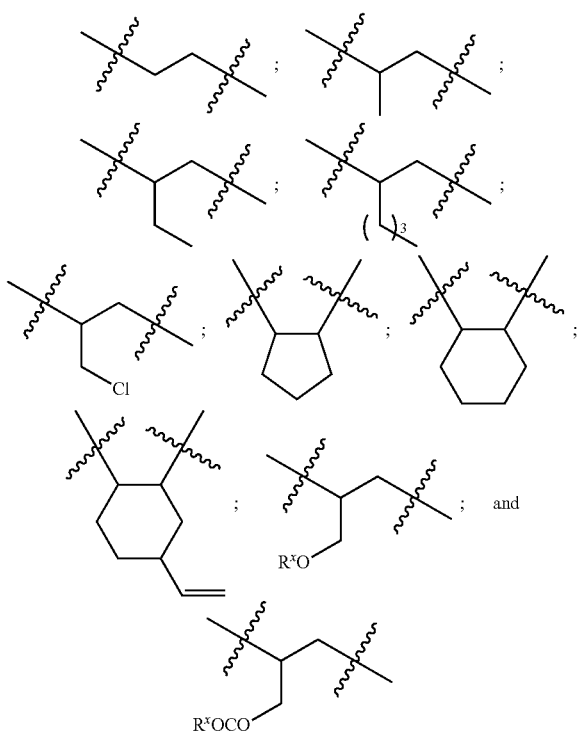

wherein $R^x$ is as defined above and described in classes and subclasses herein.

In certain embodiments, aliphatic polycarbonate chains comprise:

P2a

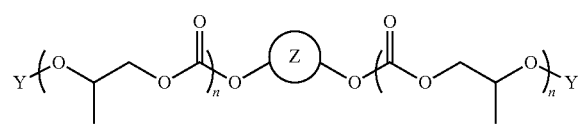

wherein each of

—Y, and n is as defined above and described in classes and subclasses herein.

In certain embodiments, aliphatic polycarbonate chains comprise

P2b

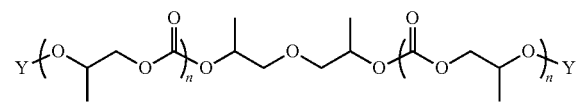

wherein each of —Y and n is as defined above and described in classes and subclasses herein.

In certain embodiments, aliphatic polycarbonate chains comprise

P2b′

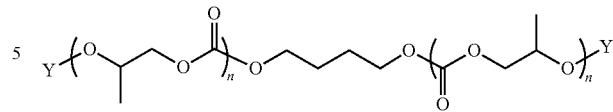

wherein each of —Y and n is as defined above and described in classes and subclasses herein.

In certain embodiments, aliphatic polycarbonate chains comprise

P2b″

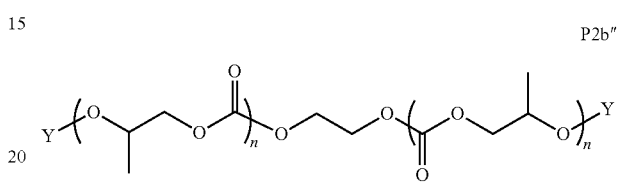

wherein each of —Y and n is as defined above and described in classes and subclasses herein.

In certain embodiments, aliphatic polycarbonate chains comprise

P2b‴

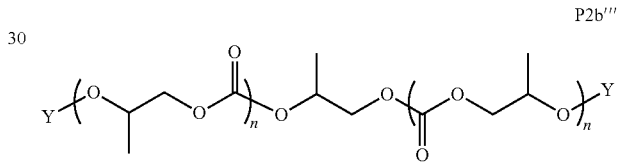

wherein each of —Y and n is as defined above and described in classes and subclasses herein.

In certain embodiments, aliphatic polycarbonate chains comprise

P2c

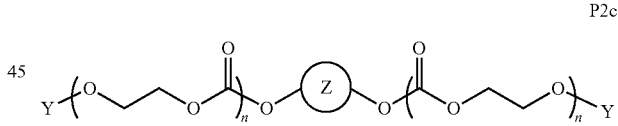

wherein each of

—Y, and n is as defined above and described in classes and subclasses herein.

In certain embodiments, aliphatic polycarbonate chains comprise

P2c′

wherein each of —Y and n is as defined above and described in classes and subclasses herein.

In certain embodiments, aliphatic polycarbonate chains comprise

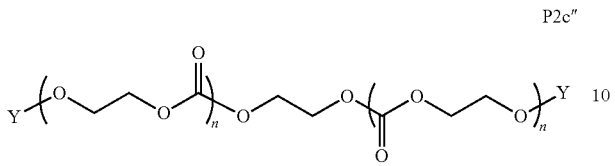

P2c″ wherein each of —Y and n is as defined above and described in classes and subclasses herein.

In certain embodiments, aliphatic polycarbonate chains comprise

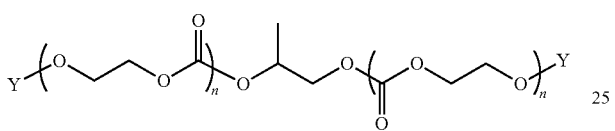

P2c‴ wherein each of —Y and n is as defined above and described in classes and subclasses herein.

In certain embodiments, aliphatic polycarbonate chains comprise

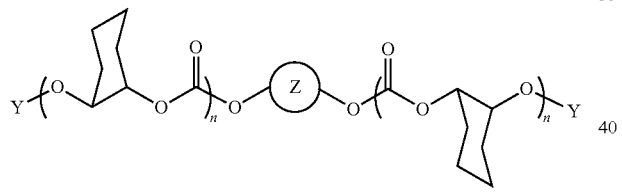

P2d

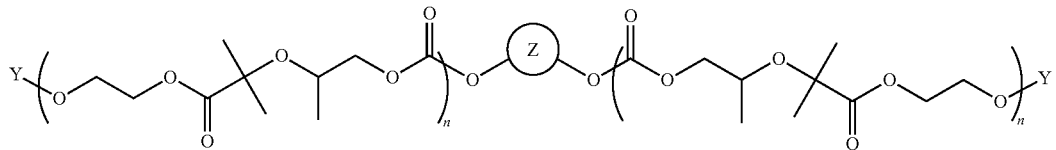

P2f wherein each of

Z,

—Y, and n is as defined above and described in classes and subclasses herein.

In certain embodiments, aliphatic polycarbonate chains comprise

P2e wherein each of —Y and n are is as defined above and described in classes and subclasses herein.

In certain embodiments, aliphatic polycarbonate chains comprise wherein each of

Z,

—Y, and n is as defined above and described in classes and subclasses herein.

In certain embodiments, aliphatic polycarbonate chains comprise

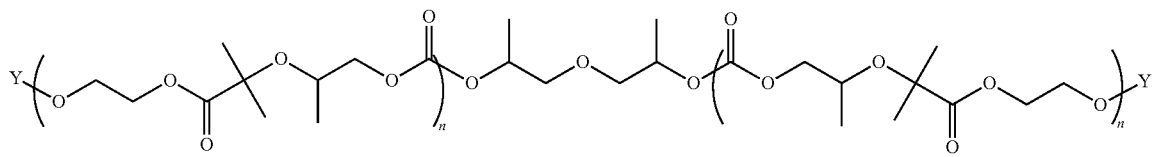
P2g wherein each of —Y and n is as defined above and described in classes and subclasses herein.

In certain embodiments, aliphatic polycarbonate chains comprise

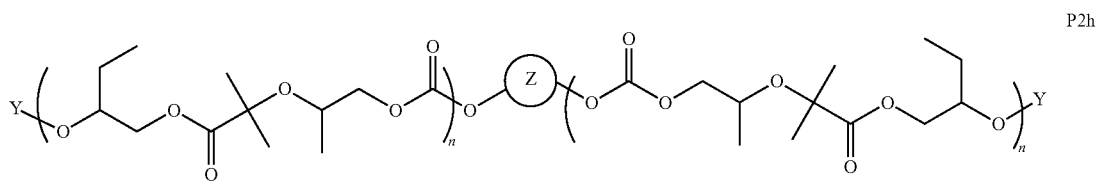
P2h wherein each of

,

—Y, ana n is as aennea above and described in classes and subclasses herein.

In certain embodiments, aliphatic polycarbonate chains comprise

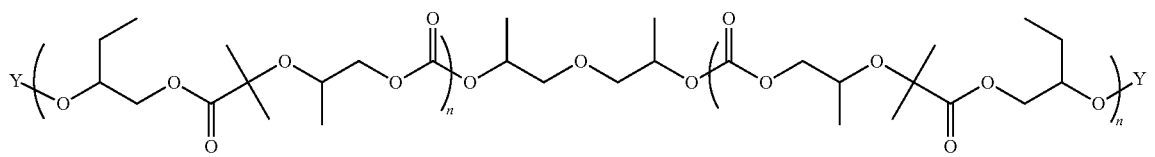
P2i wherein each of —Y and n is as defined above and described in classes and subclasses herein.

In certain embodiments, aliphatic polycarbonate chains comprise

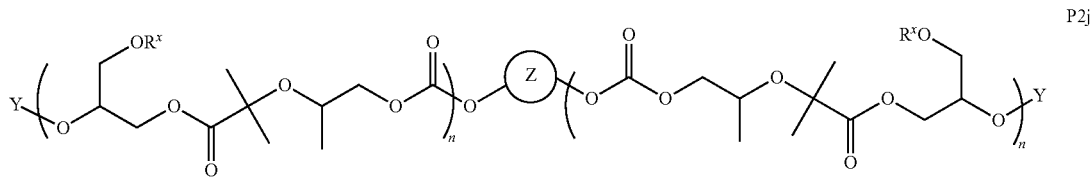
P2j wherein each of

,

—Y, $R^x$, and n is as defined above and described in classes and subclasses herein.

In certain embodiments, aliphatic polycarbonate chains comprise

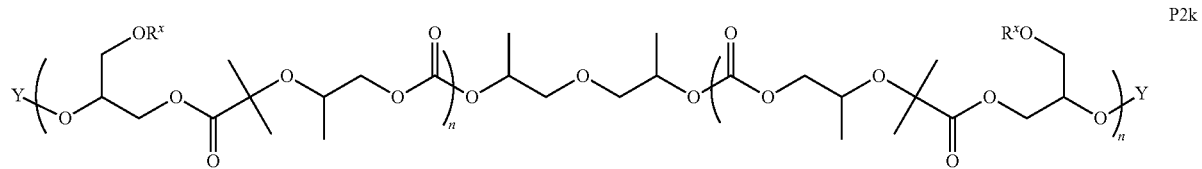

wherein each of —Y, R$^x$, and n is as defined above and described in classes and subclasses herein.

In certain embodiments, aliphatic polycarbonate chains comprise

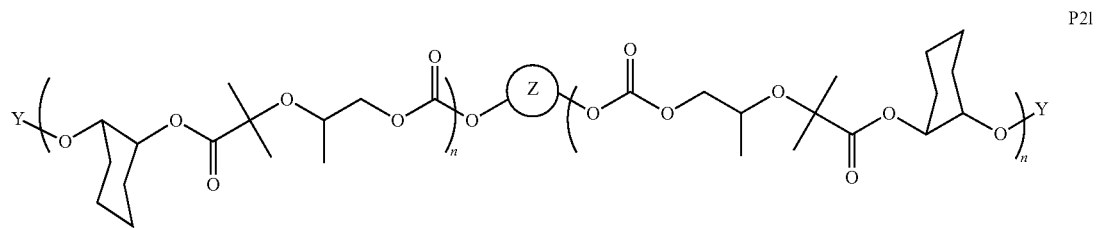

wherein each of

—Y, ana n is as defined above and described in classes and subclasses herein.

In certain embodiments, aliphatic polycarbonate chains comprise

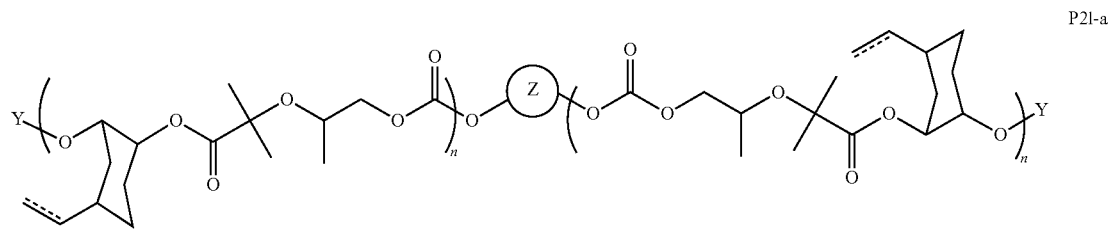

wherein each of

—Y, and n are is as defined above and described in classes and subclasses herein; and each ===== independently represents a single or double bond.

In certain embodiments, aliphatic polycarbonate chains comprise

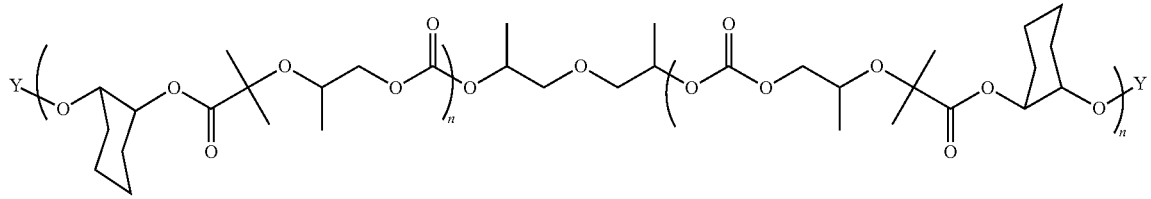
P2m wherein each of —Y and n is as defined above and described in classes and subclasses herein.

In certain embodiments, aliphatic polycarbonate chains comprise

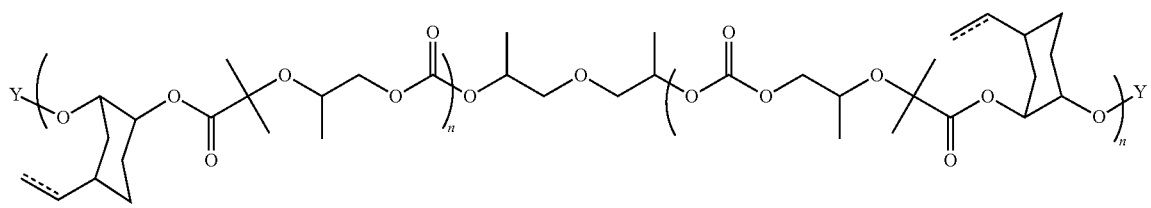
P2m-a wherein each of —Y, ===== and n is as defined above and described in classes and subclasses herein.

In certain embodiments, aliphatic polycarbonate chains comprise

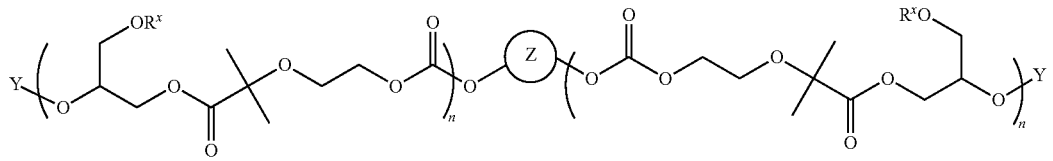
P2n wherein each of

, $R^x$, —Y and n is as defined above and described in classes and subclasses herein.

In certain embodiments, aliphatic polycarbonate chains comprise

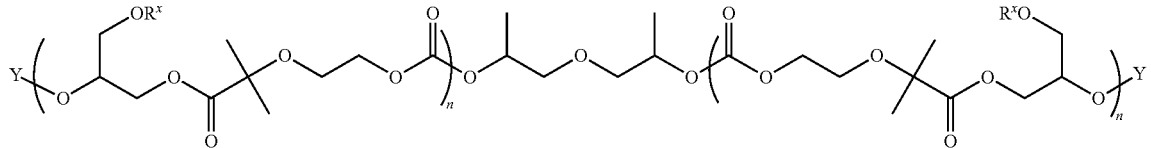
P2o wherein each of —Y, $R^x$, and n is as defined above and described in classes and subclasses herein.

In certain embodiments, aliphatic polycarbonate chains comprise

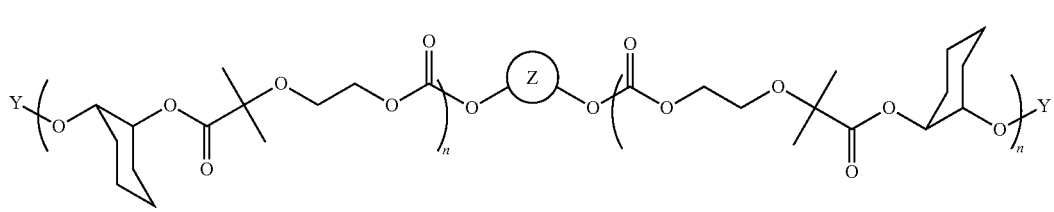
P2p wherein each of

,

—Y, and n is as defined above and described in classes and subclasses herein.

In certain embodiments, aliphatic polycarbonate chains comprise

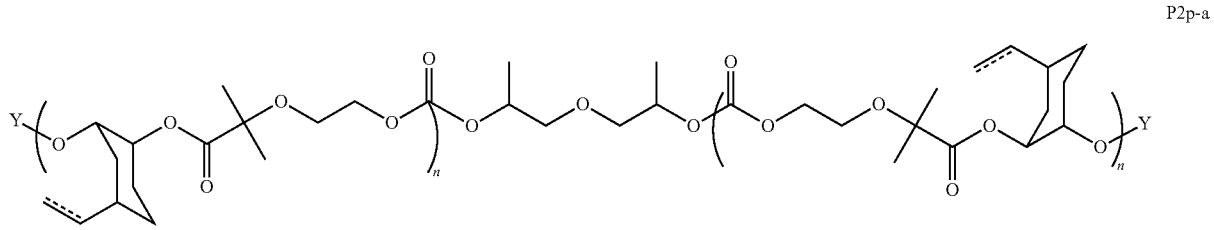
P2p-a wherein each of —Y,  and n is as defined above and described in classes and subclasses herein.

In certain embodiments, aliphatic polycarbonate chains comprise

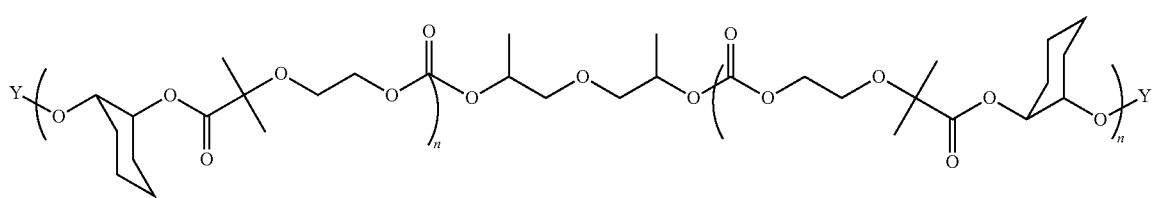
P2q wherein each of —Y and n is as defined above and described in classes and subclasses herein.

In certain embodiments, aliphatic polycarbonate chains comprise

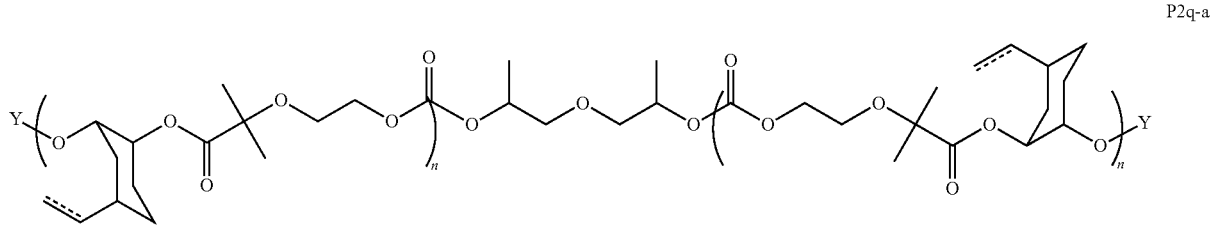
P2q-a wherein each of —Y, ===== and n is as defined above and described in classes and subclasses herein.

In certain embodiments, aliphatic polycarbonate chains comprise

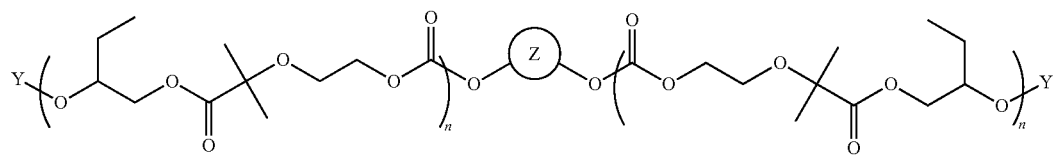

P2r wherein each of

,

—Y, and n is as defined above and described in classes and subclasses herein.

In certain embodiments, aliphatic polycarbonate chains comprise

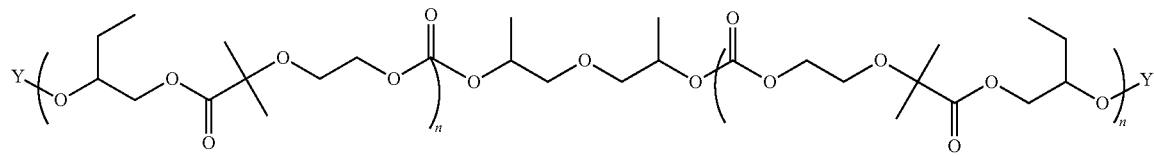

P2r-a wherein each of —Y and n is as defined above and described in classes and subclasses herein.

In certain embodiments, in polycarbonates of structures P2a, P2c, P2d, P2f, P2h, P2j, P2l, P2l-a, P2n, P2p, and P2r,

is selected from the group consisting of: ethylene glycol; diethylene glycol, triethylene glycol, 1,3propane diol; 1,4 butane diol, hexylene glycol, 1,6 hexane diol, propylene glycol, dipropylene glycol, tripopylene glycol, and alkoxylated derivatives of any of these.

For polycarbonates comprising repeat units derived from two or more epoxides, such as those represented by structures P2f through P2r, depicted above, it is to be understood that the structures drawn may represent mixtures of positional isomers or regioisomers that are not explicitly depicted. For example, the polymer repeat unit adjacent to either end group of the polycarbonate chains can be derived from either one of the two epoxides comprising the copolymers, or from only one of the two epoxides. Thus, while the polymers may be drawn with a particular repeat unit attached to an end group, the terminal repeat units might be derived from either of the two epoxides and a given polymer composition might comprise a mixture of all of the possibilities in varying ratios. The ratio of these end-groups can be influenced by several factors including the ratio of the different epoxides used in the polymerization, the structure of the catalyst used, the reaction conditions used (i.e temperature, $CO_2$ pressure, etc.) as well as by the timing of addition of reaction components. Similarly, while the drawings above may show a defined regiochemistry for repeat units derived from substituted epoxides, the polymer compositions will, in some cases, contain mixtures of regioisomers. The regioselectivity of a given polymerization can be influenced by numerous factors including the structure of the catalyst used and the reaction conditions employed. To clarify, this means that the composition represented by structure P2r above, may contain a mixture of several compounds as shown in the diagram below. This diagram shows the isomers graphically for polymer P2r, where the structures below the depiction of the chain show each regio- and positional isomer possible for the monomer unit adjacent to the chain transfer agent and the end groups on each side of the main polymer chain. Each end group on the polymer may be independently selected from the groups shown on the left or right while the central portion of the polymer including the chain transfer agent and its two adjacent monomer units may be independently selected from the groups shown. In certain embodiments, the polymer composition comprises a mixture of all possible combinations of these. In other embodiments, the polymer composition is enriched in one or more of these.

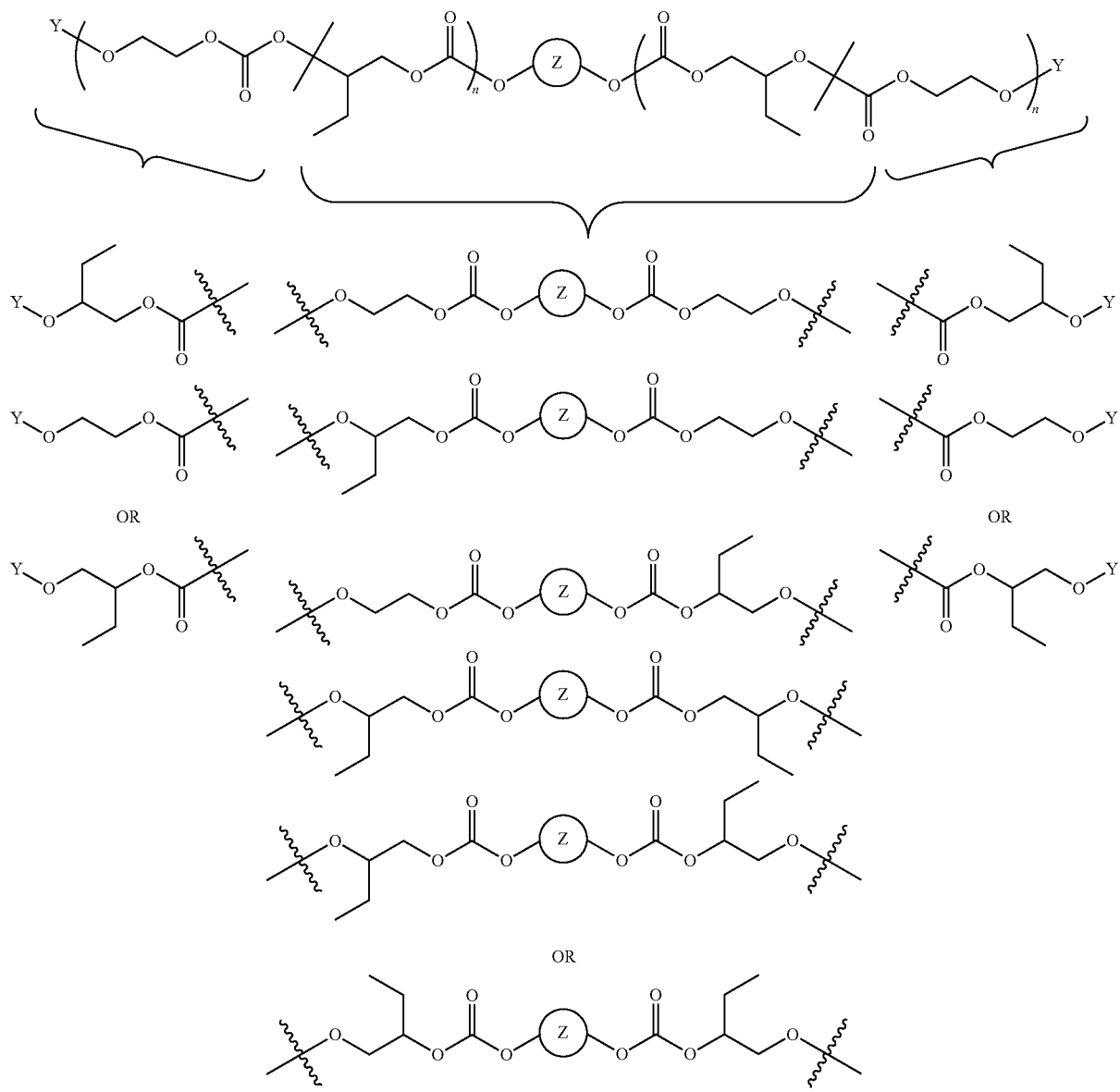
In certain embodiments, the aliphatic polycarbonate polyol is selected from the group consisting of Q1, Q2, Q3, Q4, Q5, Q6, and mixtures of any two or more of these.
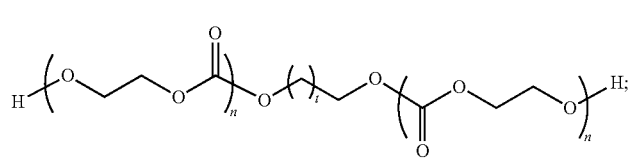
Q1
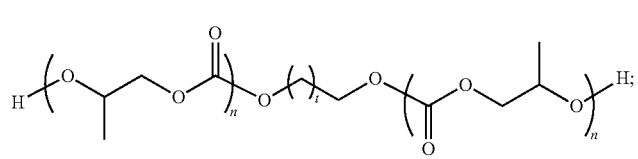
Q2

Q3
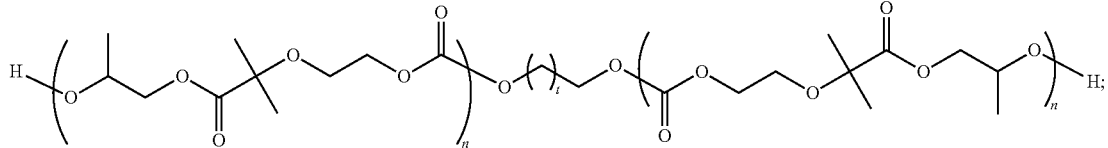

Q4
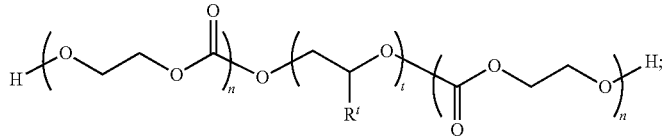

Q5
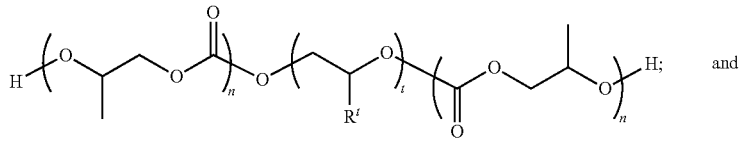 and

Q6
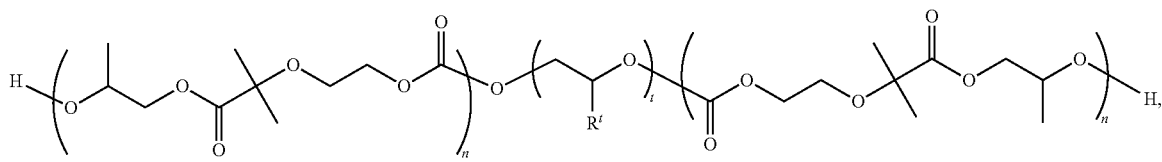

wherein, t is an integer from 1 to 12 inclusive, and $R^t$ is independently at each occurrence —H, or —CH$_3$.

In certain embodiments, the aliphatic polycarbonate polyol is selected from the group consisting of:

Poly(ethylene carbonate) of formula Q1 having an average molecular weight number of between about 500 g/mol and about 3,000 g/mol, a polydispersity index less than about 1.25, at least 85% carbonate linkages, and at least 98% —OH end groups;

Poly(ethylene carbonate) of formula Q1 having an average molecular weight number of about 500 g/mol, a polydispersity index less than about 1.25, at least 85% carbonate linkages, and at least 98% —OH end groups;

Poly(ethylene carbonate) of formula Q1 having an average molecular weight number of about 1,000 g/mol, a polydispersity index less than about 1.25, at least 85% carbonate linkages, and at least 98% —OH end groups;

Poly(ethylene carbonate) of formula Q1 having an average molecular weight number of about 2,000 g/mol, a polydispersity index less than about 1.25, at least 85% carbonate linkages, and at least 98% —OH end groups;

Poly(ethylene carbonate) of formula Q1 having an average molecular weight number of about 3,000 g/mol, a polydispersity index less than about 1.25, at least 85% carbonate linkages, and at least 98% —OH end groups;

Poly(propylene carbonate) of formula Q2 having an average molecular weight number of between about 500 g/mol and about 3,000 g/mol, a polydispersity index less than about 1.25, at least 95% carbonate linkages, and at least 98% —OH end groups;

Poly(propylene carbonate) of formula Q2 having a number average molecular weight of about 500 g/mol, a polydispersity index less than about 1.25, at least 95% carbonate linkages, and at least 98% —OH end groups;

Poly(propylene carbonate) of formula Q2 having a number average molecular weight of about 1,000 g/mol, a polydispersity index less than about 1.25, at least 95% carbonate linkages, and at least 98% —OH end groups;

Poly(propylene carbonate) of formula Q2 having a number average molecular weight of about 2,000 g/mol, a polydispersity index less than about 1.25, at least 95% carbonate linkages, and at least 98% —OH end groups;

Poly(propylene carbonate) of formula Q2 having a number average molecular weight of about 3,000 g/mol, a polydispersity index less than about 1.25, at least 95% carbonate linkages, and at least 98% —OH end groups;

Poly(ethylene-co-propylene carbonate) of formula Q3 having a number average molecular weight of between about 500 g/mol and about 3,000 g/mol, a polydispersity index less than about 1.25, at least 90% carbonate linkages, and at least 98% —OH end groups;

Poly(ethylene-co-propylene carbonate) of formula Q3 having a number average molecular weight of about 500 g/mol, a polydispersity index less than about 1.25, at least 90% carbonate linkages, and at least 98% —OH end groups;

Poly(ethylene-co-propylene carbonate) of formula Q3 having a number average molecular weight of about 1,000 g/mol, a polydispersity index less than about 1.25, at least 90% carbonate linkages, and at least 98% —OH end groups;

Poly(ethylene-co-propylene carbonate) of formula Q3 having a number average molecular weight of about 2,000 g/mol (e.g. n is on average between about 10 and about 11), a polydispersity index less than about 1.25, at least 90% carbonate linkages, and at least 98% —OH end groups;

Poly(ethylene-co-propylene carbonate) of formula Q3 having a number average molecular weight of about 3,000 g/mol, a polydispersity index less than about 1.25, at least 95% carbonate linkages, and at least 98% —OH end groups;

Poly(ethylene carbonate) of formula Q4 having a number average molecular weight of between about 500 g/mol and about 3,000 g/mol (e.g. each n is between about 4 and about 16), a polydispersity index less than about 1.25, at least 95% carbonate linkages, and at least 98% —OH end groups;

Poly(ethylene carbonate) of formula Q4 having a number average molecular weight of about 500 g/mol, a polydispersity index less than about 1.25, at least 85% carbonate linkages, and at least 98% —OH end groups;

Poly(ethylene carbonate) of formula Q4 having a number average molecular weight of about 1,000 g/mol, a polydispersity index less than about 1.25, at least 85% carbonate linkages, and at least 98% —OH end groups;

Poly(ethylene carbonate) of formula Q4 having a number average molecular weight of about 2,000 g/mol, a polydispersity index less than about 1.25, at least 85% carbonate linkages, and at least 98% —OH end groups;

Poly(ethylene carbonate) of formula Q4 having a number average molecular weight of about 3,000 g/mol, a polydispersity index less than about 1.25, at least 85% carbonate linkages, and at least 98% —OH end groups.

Poly(propylene carbonate) of formula Q5 having a number average molecular weight of between about 500 g/mol and about 3,000 g/mol, a polydispersity index less than about 1.25, at least 95% carbonate linkages, and at least 98% —OH end groups;

Poly(propylene carbonate) of formula Q5 having a number average molecular weight of about 500 g/mol, a polydispersity index less than about 1.25, at least 95% carbonate linkages, and at least 98% —OH end groups;

Poly(propylene carbonate) of formula Q5 having a number average molecular weight of about 1,000 g/mol, a polydispersity index less than about 1.25, at least 95% carbonate linkages, and at least 98% —OH end groups;

Poly(propylene carbonate) of formula Q5 having a number average molecular weight of about 2,000 g/mol, a polydispersity index less than about 1.25, at least 95% carbonate linkages, and at least 98% —OH end groups;

Poly(propylene carbonate) of formula Q5 having a number average molecular weight of about 3,000 g/mol, a polydispersity index less than about 1.25, at least 95% carbonate linkages, and at least 98% —OH end groups;

Poly(ethylene-co-propylene carbonate) of formula Q6 having a number average molecular weight of between about 500 g/mol and about 3,000 g/mol, a polydispersity index less than about 1.25, at least 90% carbonate linkages, and at least 98% —OH end groups;

Poly(ethylene-co-propylene carbonate) of formula Q6 having a number average molecular weight of about 500 g/mol, a polydispersity index less than about 1.25, at least 90% carbonate linkages, and at least 98% —OH end groups;

Poly(ethylene-co-propylene carbonate) of formula Q6 having a number average molecular weight of about 1,000 g/mol, a polydispersity index less than about 1.25, at least 90% carbonate linkages, and at least 98% —OH end groups;

Poly(ethylene-co-propylene carbonate) of formula Q6 having a number average molecular weight of about 2,000 g/mol (e.g. n is on average between about 10 and about 11), a polydispersity index less than about 1.25, at least 90% carbonate linkages, and at least 98% —OH end groups; and Poly(ethylene-co-propylene carbonate) of formula Q6 having a number average molecular weight of about 3,000 g/mol, a polydispersity index less than about 1.25, at least 95% carbonate linkages, and at least 98% —OH end groups.

In certain embodiments, the embedded chain transfer agent

is a moiety derived from a polymeric diol or higher polyhydric alcohol. In certain embodiments, such polymeric alcohols are polyether or polyester polyols. In certain embodiments

is a polyether polyol comprising ethylene glycol or propylene glycol repeating units (—OCH$_2$CH$_2$O—, or —OCH$_2$CH(CH$_3$)O—) or combinations of these. In certain embodiments,

is a polyester polyol comprising the reaction product of a diol and a diacid, or a material derived from ring-opening polymerization of lactones.

In certain embodiments where

comprises a polyether diol, the aliphatic polycarbonate polyol has a structure Q7:

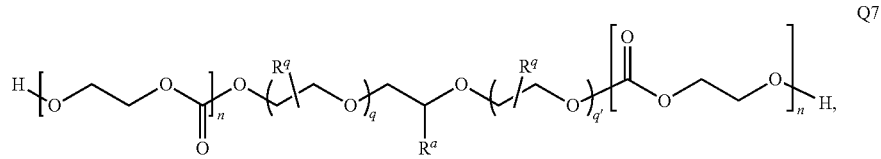

wherein, $R^q$ is at each occurrence in the polymer chain independently —H or —CH$_3$;

$R^a$ is —H, or —CH$_3$;

q and q' are independently an integer from about 2 to about 40; and and n is as defined above and in the examples and embodiments herein.

In certain embodiments, an aliphatic polycarbonate polyol is selected from the group consisting of:

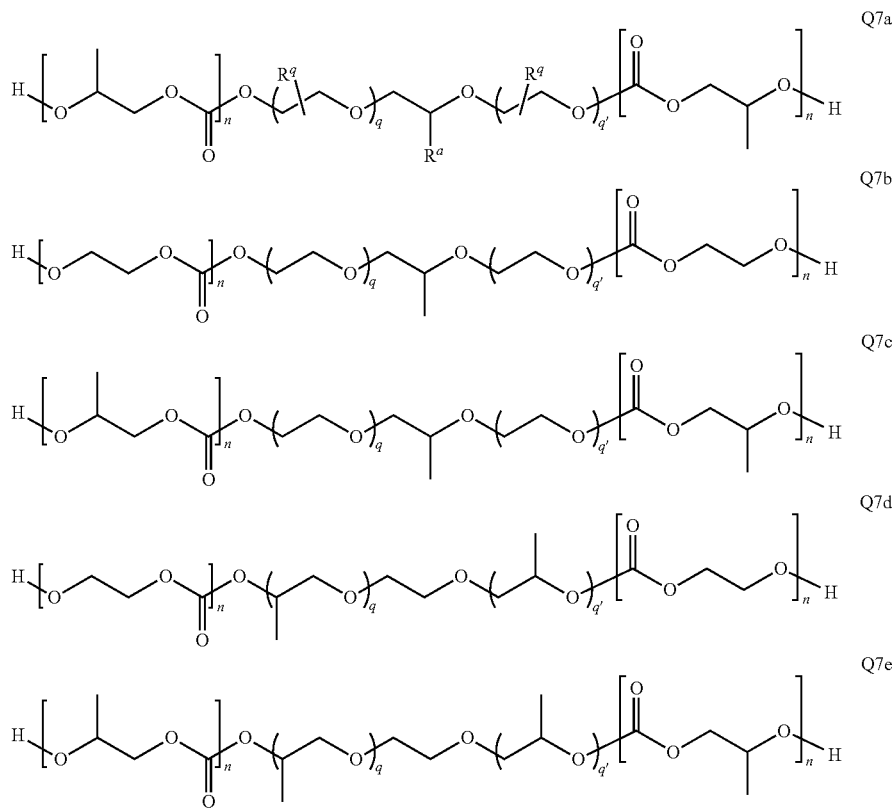

Q7a
Q7b
Q7c
Q7d
Q7e wherein each of $R^a$, $R^q$, q, q', and n is as defined above and described in classes and subclasses herein.

In certain embodiments, where aliphatic polycarbonate polyols comprise compounds conforming to structure Q7, the moiety $$\boxed{Z}$$

is derived from a commercially available polyether polyol such as those typically used in the formulation of polyurethane foam compositions.

In certain embodiments where $$\boxed{Z}$$

comprises a polyester diol, the aliphatic polycarbonate polyol has a structure Q8:

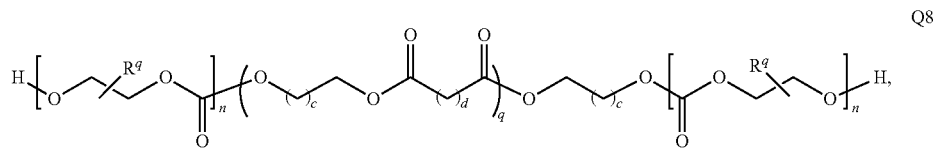

Q8 wherein, c is at each occurrence in the polymer chain independently an integer from 0 to 6;

d is at each occurrence in the polymer chain independently an integer from 1 to 11; and each of $R^q$, n, q, and q' is as defined above and described in classes and subclasses herein.

In certain embodiments, an aliphatic polycarbonate polyol is selected from the group consisting of:

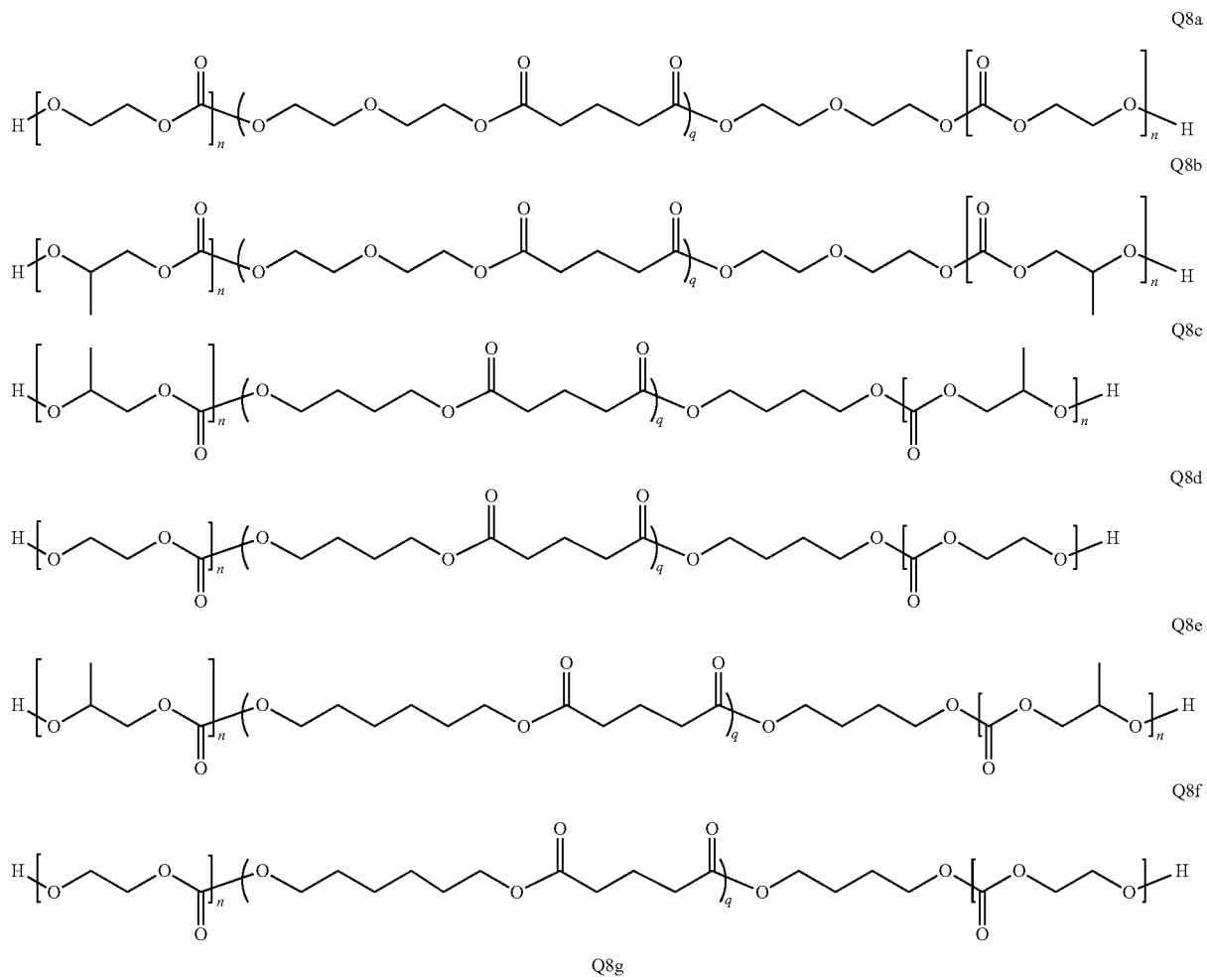

wherein each of n and q is as defined above and described in classes and subclasses herein.

In certain embodiments, where aliphatic polycarbonate polyols comprise compounds conforming to structure Q8, the moiety is derived from a commercially available polyester polyol such as those typically used in the formulation of polyurethane foam compositions.

Appendix B Isocyanate Reagents

This section describes some of the polyisocyanates and isocyanate reagents or their reaction products. The purpose of these isocyanate reagents is to react with the reactive end groups on the aliphatic polycarbonate polyols to form higher molecular weight structures through chain extension and/or cross-linking.

The art of polyurethane synthesis is well advanced and a very large number of isocyanates and related polyurethane precursors are known in the art and available commercially. While this section of the specification describes isocyanates suitable for use in certain embodiments of the present invention, it is to be understood that it is within the capabilities of one skilled in the art of polyurethane formulation to use alternative isocyanates along with the teachings of this disclosure to formulate additional compositions of matter within the scope of the present invention. Descriptions of suitable isocyanate compounds and related methods can be found in: Chemistry and Technology of Polyols for Polyurethanes Ionescu, Mihail 2005 (ISBN 978-1-84735-035-0), and H. Ulrich, "Urethane Polymers," Kirk-Othmer Encyclopedia of Chemical Technology, 1997 the entirety of each of which is incorporated herein by reference.

In certain embodiments, the isocyanate reagents comprise two or more isocyanate groups per molecule. In certain embodiments the isocyanate reagents are diisocyanates. In other embodiments, the isocyanate reagents are higher polyisocyanates such as triisocyanates, tetraisocyanates, isocyanate polymers or oligomers, and the like. In certain embodiments, the isocyanate reagents are aliphatic polyisocyanates or derivatives or oligomers of aliphatic polyisocyanates. In other embodiments, the isocyanates are aromatic polyisocyanates or derivatives or oligomers of aromatic polyisocyanates. In certain embodiments, the compositions may comprise mixtures of any two or more of the above types of isocyanates.

In certain embodiments, the isocyanate component used in the formulation of the novel materials of the present invention have a functionality of 2 or more. In certain embodiments, the isocyanate component of the inventive materials comprise a mixture of diisocyanates and higher isocyanates formulated to achieve a particular functionality number for a given application. In certain embodiments, where the inventive composition is a flexible foam or a soft elastomer, the isocyanate employed has a functionality of about 2. In certain embodiments, such isocyanates have a functionality between about 2 and about 2.7. In certain embodiments, such isocyanates have a functionality between about 2 and about 2.5. In certain embodiments, such isocyanates have a functionality between about 2 and about 2.3. In certain embodiments, such isocyanates have a functionality between about 2 and about 2.2.

In other embodiments, where the inventive composition is a rigid foam or a thermoplastic, the isocyanate employed has a functionality greater than 2. In certain embodiments, such isocyanates have a functionality between about 2.3 and about 4. In certain embodiments, such isocyanates have a functionality between about 2.5 and about 3.5. In certain embodiments, such isocyanates have a functionality between about 2.6 and about 3.1. In certain embodiments, such isocyanates have a functionality of about 3.

In certain embodiments, an isocyanate reagent is selected from the group consisting of: 1,6-hexamethylaminediisocyanate (HDI), isophorone diisocyanate (IPDI), 4,4 Einethylene-bis(cyclohexyl isocyanate) ($H_{12}$MDI), 2,4-toluene diisocyanate (TDI), 2,6-toluene diisocyanate (TDI), diphenylmethane-4,4 Ediisocyanate (MDI), diphenylmethane-2,4 diisocyanate (MDI), xylylene diisocyanate (XDI), 1,3-Bis (isocyanatomethyl)cyclohexane (H6-XDI), 2,2,4-trimethylhexamethylene diisocyanate, 2,4,4-trimethylhexamethylene diisocyanate (TMDI), m-tetramethylxylylene diisocyanate (TMXDI), p-tetramethylxylylene diisocyanate (TMXDI), isocyanatomethyl-1,8-ictane diisocyanate (TIN), triphenylmethane-4,4',4" trii socyanate, Tris(p-isocyanatomethyl) thiosulfate, 1,3-Bis(isocyanatomethyl)benzene, 1,4-tetramethylene diisocyanate, trimethylhexane diisocyanate, 1,6-hexamethylene diisocyanate, 1,4-cyclohexyl diisocyanate, lysine diisocyanate, and mixtures of any two or more of these.

Isocyanates suitable for certain embodiments of the present invention are available commercially under various trade names. Examples of suitable commercially available isocyanates include materials sold under trade names: Desmodur® (Bayer Material Science), Tolonate® (Perstorp), Takenate® (Takeda), Vestanat® (Evonik), Desmotherm® (Bayer Material Science), Bayhydur® (Bayer Material Science), Mondur (Bayer Material Science), Suprasec (Huntsman Inc.), Lupranate® (BASF), Trixene (Baxenden), Hartben® (Benasedo), Ucopol® (Sapici), and Basonat® (BASF). Each of these trade names encompasses a variety of isocyanate materials available in various grades and formulations. The selection of suitable commercially-available isocyanate materials as reagents to produce polyurethane compositions for a particular application is within the capability of one skilled in the art of polyurethane technology using the teachings and disclosure of this patent application along with the information provided in the product data sheets supplied by the above-mentioned suppliers.

Additional isocyanates suitable for certain embodiments of the present invention are sold under the trade name Lupranate® (BASF). In certain embodiments, the isocyanates are selected from the group consisting of the materials shown in Table 1:

TABLE 1

| Products | Description | % NCO | Nominal Funct. |
|---|---|---|---|
| Lupranate M | 4,4' MDI | 33.5 | 2 |
| Lupranate MS | 4,4' MDI | 33.5 | 2 |
| Lupranate MI | 2,4' and 4,4' MDI Blend | 33.5 | 2 |
| Lupranate LP30 | Liquid Pure 4,4 MDI | 33.1 | 2 |
| Lupranate 227 | Monomeric/Modified MDI Blend Carbodiimide Modified MDI | 32.1 | 2 |
| Lupranate 5143 | Carbodiimide Modified 4,4' MDI | 29.2 | 2.2 |
| Lupranate MM103 | Carbodiimide Modified 4,4' MDI | 29.5 | 2.2 |
| Lupranate 219 | Carbodiimide Modified 4,4' MDI | 29.2 | 2.2 |
| Lupranate 81 | Carbodiimide Modified MDI | 29.5 | 2.2 |
| Lupranate 218 | Carbodiimide Modified MDI Polymeric MDI (PMDI) | 29.5 | 2.2 |
| Lupranate M10 | Low Funct. Polymeric | 31.7 | 2.2 |
| Lupranate R2500U | Polymeric MDI Variant | 31.5 | 2.7 |
| Lupranate M20S | Mid-Functionality Polymeric | 31.5 | 2.7 |
| Lupranate M20FB | Mid-Functionality Polymeric | 31.5 | 2.7 |
| Lupranate M70L | High-Functionality Polymeric | 31 | 3 |
| Lupranate M200 | High-Functionality Polymeric Polymeric MDI Blends and Derivatives | 30 | 3.1 |
| Lupranate 241 | Low Functionality Polymeric | 32.6 | 2.3 |
| Lupranate 230 | Low Viscosity Polymeric | 32.5 | 2.3 |
| Lupranate 245 | Low Viscosity Polymeric | 32.3 | 2.3 |
| Lupranate TF2115 | Mid Functionality Polymeric | 32.3 | 2.4 |
| Lupranate 78 | Mid Functionality Polymeric | 32 | 2.3 |
| Lupranate 234 | Low Functionality Polymeric | 32 | 2.4 |
| Lupranate 273 | Low Viscosity Polymeric | 32 | 2.5 |
| Lupranate 266 | Low Viscosity Polymeric | 32 | 2.5 |
| Lupranate 261 | Low Viscosity Polymeric | 32 | 2.5 |
| Lupranate 255 | Low Viscosity Polymeric | 31.9 | 2.5 |
| Lupranate 268 | Low Viscosity Polymeric Select MDI Prepolymers | 30.6 | 2.4 |
| Lupranate 5010 | Higher Functional Prepolymer | 28.6 | 2.3 |
| Lupranate 223 | Low Visc. Derivative of Pure MDI | 27.5 | 2.2 |
| Lupranate 5040 | Mid Functional, Low Viscosity | 26.3 | 2.1 |
| Lupranate 5110 | Polymeric MDI Prepolymer | 25.4 | 2.3 |
| Lupranate MP102 | 4,4' MDI Prepolymer | 23 | 2 |
| Lupranate 5090 | Special 4,4' MDI Prepolymer | 23 | 2.1 |
| Lupranate 5050 | Mid Functional, Mid NCO Prepol | 21.5 | 2.1 |
| Lupranate 5030 | Special MDI Prepolymer | 18.9 | NA |
| Lupranate 5080 | 2,4'-MDI Enhanced Prepolymer | 15.9 | 2 |
| Lupranate 5060 | Low Funct, Higher MW Prepol | 15.5 | 2 |
| Lupranate 279 | Low Funct, Special Prepolymer | 14 | 2 |
| Lupranate 5070 | Special MDI Prepolymer | 13 | 2 |
| Lupranate 5020 | Low Functionality, Low NCO Toluene Diisocyanate (TDI) | 9.5 | 2 |
| Lupranate T80- | 80/20:2,4/2,6 TDI | 48.3 | 2 |
| Lupranate T80- | High Acidity TDI | 48.3 | 2 |
| Lupranate 8020 | 80/20:TDI/Polymeric MDI | 44.6 | 2.1 |

Other isocyanates suitable for certain embodiments of the present invention are sold under the trade name Desmodur® available from Bayer Material Science. In certain embodiments, the isocyanates are selected from the group consisting of the materials shown in Table 2:

TABLE 2

| Trade Name | Description |
|---|---|
| Desmodur ® 2460 M | Monomeric diphenylmethane diisocyanate with high 2,4-isomer content |
| Desmodur ® 44 M | A monomeric diphenylmethane-4,4-diisocyanate (MDI). |
| Desmodur ® 44 MC | Desmodur 44 MC Flakes is a monomeric diphenylmethane-4,4-diisocyanate (MDI). |
| Desmodur ® BL 1100/1 | Blocked aromatic polyisocyanate based on TDI |
| Desmodur ® BL 1265 MPA/X | Blocked aromatic polyisocyanate based on TDI |
| Desmodur ® BL 3175 SN | Blocked, aliphatic polyisocyanate based on HDI |
| Desmodur ® BL 3272 MPA | Blocked aliphatic polyisocyanate based on HDI |
| Desmodur ® BL 3370 MPA | Blocked aliphatic polyisocyanate based on HDI |
| Desmodur ® BL 3475 BA/SN | Aliphatic crosslinking stoving urethane resin based on HDI/IPDI |
| Desmodur ® BL 3575/1 MPA/SN | Blocked aliphatic polyisocyanate based on HDI |
| Desmodur ® BL 4265 SN | Blocked, aliphatic polyisocyanate based on IPDI |
| Desmodur ® BL 5375 | Blocked aliphatic polyisocyanate based on H 12 MDI |
| Desmodur ® CD-L | Desmodur CD-L is a modified isocyanate based on diphenylmethane-4,4-diisocyanate. |
| Desmodur ® CD-S | Desmodur CD-S is a modified isocyanate based on diphenylmethane-4,4-diisocyanate. |
| Desmodur ® D XP 2725 | Hydrophilically modified polyisocyanate |
| Desmodur ® DA-L | Hydrophilic aliphatic polyisocyanate based on hexamethylene diisocyanate |
| Desmodur ® DN | Aliphatic polyisocyanate of low volatility |
| Desmodur ® E 1160 | Aromatic polyisocyanate prepolymer based on toluene diisocyanate |
| Desmodur ® E 1361 BA | Aromatic polyisocyanate prepolymer based on toluylene diisocyanate |
| Desmodur ® E 1361 MPA/X | Aromatic polyisocyanate prepolymer based on toluene diisocyanate |
| Desmodur ® E 14 | Aromatic polyisocyanate prepolymer based on toluene diisocyanate |
| Desmodur ® E 15 | Aromatic polyisocyanate prepolymer based on toluene diisocyanate. |
| Desmodur ® E 1660 | Aromatic polyisocyanate prepolymer based on toluene diisocyanate. |
| Desmodur ® E 1750 PR | Polyisocyanate prepolymer based on toluene diisocyanate |
| Desmodur ® E 20100 | Modified polyisocyanate prepolymer based on diphenylmethane diisocyanate. |
| Desmodur ® E 21 | Aromatic polyisocyanate prepolymer based on diphenylmethane diisocyanate (MDI). |
| Desmodur ® E 2190 X | Aromatic polyisocyanate prepolymer based on diphenylmethane diisocyanate (MDI) |
| Desmodur ® E 22 | Aromatic polyisocyanate prepolymer based on diphenylmethane diisocyanate. |
| Desmodur ® E 2200/76 | Desmodur E 2200/76 is a prepolymer based on (MDI) with isomers. |
| Desmodur ® E 23 | Aromatic polyisocyanate prepolymer based on diphenylmethane diisocyanate (MDI). |
| Desmodur ® E 29 | Polyisocyanate prepolymer based on diphenylmethane diisocyanate. |
| Desmodur ® E 305 | Desmodur E 305 is a largely linear aliphatic NCO prepolymer based on hexamethylene diisocyanate. |
| Desmodur ® E 3265 MPA/SN | Aliphatic polyisocyanate prepolymer based on hexamethylene diisocyanate (HDI) |
| Desmodur ® E 3370 | Aliphatic polyisocyanate prepolymer based on hexamethylene diisocyanate |
| Desmodur ® E XP 2605 | Polyisocyanate prepolymer based on toluene diisocyanate and diphenylmethan diisocyanate |
| Desmodur ® E XP 2605 | Polyisocyanate prepolymer based on toluene diisocyanate and diphenylmethan diisocyanate |
| Desmodur ® E XP 2715 | Aromatic polyisocyanate prepolymer based on 2,4-diphenylmethane diisocyanate (2,4-MDI) and a hexanediol adipate |
| Desmodur ® E XP 2723 | Aromatic polyisocyanate prepolymer based on diphenylmethane diisocyanate (MDI). |
| Desmodur ® E XP 2726 | Aromatic polyisocyanate prepolymer based on 2,4-diphenylmethane diisocyanate (2,4-MDI) |
| Desmodur ® E XP 2727 | Aromatic polyisocyanate prepolymer based on diphenylmethane diisocyanate. |
| Desmodur ® E XP 2762 | Aromatic polyisocyanate prepolymer based on diphenylmethane diisocyanate (MDI). |
| Desmodur ® H | Monomeric aliphatic diisocyanate |
| Desmodur ® HL | Aromatic/aliphatic polyisocyanate based on toluylene diisocyanate/hexamethylene diisocyanate |
| Desmodur ® I | Monomeric cycloaliphatic diisocyanate. |
| Desmodur ® IL 1351 | Aromatic polyisocyanate based on toluene diisocyanate |
| Desmodur ® IL 1451 | Aromatic polyisocyanate based on toluene diisocyanate |
| Desmodur ® IL BA | Aromatic polyisocyanate based on toluene diisocyanate |
| Desmodur ® IL EA | Aromatic polyisocyante resin based on toluylene diisocyanate |
| Desmodur ® L 1470 | Aromatic polyisocyanate based on toluene diisocyanate |
| Desmodur ® L 67 BA | Aromatic polyisocyanate based on tolulene diisocyanate |
| Desmodur ® L 67 MPA/X | Aromatic polyisocyanate based on tolulene diisocyanate |
| Desmodur ® L 75 | Aromatic polyisocyanate based on toluene diisocyanate |
| Desmodur ® LD | Low-functionality isocyanate based on hexamethylene diisocyanate |

TABLE 2-continued

| Trade Name | Description |
|---|---|
| | (HDI) |
| Desmodur ® LS 2424 | Monomeric diphenylmethane diisocyanate with high 2,4- isomer content |
| Desmodur ® MT | Polyisocyanate prepolymer based on diphenylmethane diisocyanate |
| Desmodur ® N 100 | Aliphatic polyisocyanate (HDI biuret) |
| Desmodur ® N 3200 | Aliphatic polyisocyanate (low-viscosity HDI biuret) |
| Desmodur ® N 3300 | Aliphatic polyisocyanate (HDI trimer) |
| Desmodur ® N 3368 BA/SN | Aliphatic polyisocyanate (HDI trimer) |
| Desmodur ® N 3368 SN | Aliphatic polyisocyanate (HDI trimer) |
| Desmodur ® N 3386 BA/SN | Aliphatic polyisocyanate (HDI trimer) |
| Desmodur ® N 3390 BA | Aliphatic polyisocyanate (HDI trimer) |
| Desmodur ® N 3390 BA/SN | Aliphatic polyisocyanate (HDI trimer) |
| Desmodur ® N 3400 | Aliphatic polyisocyanate (HDI uretdione) |
| Desmodur ® N 3600 | Aliphatic polyisocyanate (low-viscosity HDI trimer) |
| Desmodur ® N 3790 BA | Aliphatic polyisocyanate (high functional HDI trimer) |
| Desmodur ® N 3800 | Aliphatic polyisocyanate (flexibilizing HDI trimer) |
| Desmodur ® N 3900 | Low-viscosity, aliphatic polyisocyanate resin based on hexamethylene diisocyanate |
| Desmodur ® N 50 BA/MPA | Aliphatic polyisocyanate (HDI biuret) |
| Desmodur ® N 75 BA | Aliphatic polyisocyanate (HDI biuret) |
| Desmodur ® N 75 MPA | Aliphatic polyisocyanate (HDI biuret) |
| Desmodur ® N 75 MPA/X | Aliphatic polyisocyanate (HDI biuret) |
| Desmodur ® NZ 1 | Aliphatic polyisocyanate |
| Desmodur ® PC-N | Desmodur PC-N is a modified diphenyl-methane-4,4- diisocyanate (MDI). |
| Desmodur ® PF | Desmodur PF is a modified diphenyl-methane-4,4- diisocyanate (MDI). |
| Desmodur ® PL 340, 60% BA/SN | Blocked aliphatic polyisocyanate based on IPDI |
| Desmodur ® PL 350 | Blocked aliphatic polyisocyanate based on HDI |
| Desmodur ® RC | Solution of a polyisocyanurate of toluene diisocyanate (TDI) in ethyl acetate. |
| Desmodur ® RE | Solution of triphenylmethane-4,4,4- triisocyanate in ethyl acetate |
| Desmodur ® RFE | Solution of tris(p-isocyanatophenyl) thiophosphate in ethyl acetate |
| Desmodur ® RN | Solution of a polyisocyanurate with aliphatic and aromatic NCO groups in ethyl acetate. |
| Desmodur ® T 100 | Pure 2,4'-toluene diisocyanate (TDI) |
| Desmodur ® T 65 N | 2,4-and 2,6-toluene diisocyanate (TDI) in the ratio 67:33 |
| Desmodur ® T 80 | 2,4-and 2,6-toluene diisocyanate (TDI) in the ratio 80:20 |
| Desmodur ® T 80 P | 2,4-and 2,6-toluene diisocyanate (TDI) in the ratio 80:20 with an increased content of hydrolysable chlorine |
| Desmodur ® VH 20 N | Polyisocyanate based on diphenylmethane diisocyanate |
| Desmodur ® VK | Desmodur VK products re mixtures of diphenylmethane-4,4- diisocyanate (MDI) with isomers and higher functional homologues |
| Desmodur ® VKP 79 | Desmodur VKP 79 is a modified diphenylmethane-4,4- diisocyanate (MDI) with isomers and homologues. |
| Desmodur ® VKS 10 | Desmodur VKS 10 is a mixture of diphenylmethane-4,4- diisocyanate (MDI) with isomers and higher functional homologues (PMDI). |
| Desmodur ® VKS 20 | Desmodur VKS 20 is a mixture of diphenylmethane-4,4- diisocyanate (MDI) with isomers and higher functional homologues (PMDI). |
| Desmodur ® VKS 20 F | Desmodur VKS 20 F is a mixture of diphenylmethane-4,4- diisocyanate (MDI) with isomers and higher functional homologues |
| Desmodur ® VKS 70 | Desmodur VKS 70 is a mixture of diphenylmethane-4,4- diisocyanate (MDI) with isomers and homologues. |
| Desmodur ® VL | Aromatic polyisocyanate based on diphenylmethane diisocyanate |
| Desmodur ® VP LS 2078/2 | Blocked aliphatic polyisocyanate based on IPDI |
| Desmodur ® VP LS 2086 | Aromatic polyisocyanate prepolymer based on diphenylmethane diisocyanate |
| Desmodur ® VP LS 2257 | Blocked aliphatic polyisocyanate based on HDI |
| Desmodur ® VP LS 2371 | Aliphatic polyisocyanate prepolymer based on isophorone diisocyanate. |
| Desmodur ® VP LS 2397 | Desmodur VP LS 2397 is a linear prepolymer based on polypropylene ether glycol and diphenylmethane diisocyanate (MDI). It contains |
| Desmodur ® W | Monomeric cycloaliphatic diisocyanate |
| Desmodur ® W/1 | Monomeric cycloaliphatic diisocyanate |
| Desmodur ® XP 2404 | Desmodur XP 2404 is a mixture of monomeric polyisocyanates |
| Desmodur ® XP 2406 | Aliphatic polyisocyanate prepolymer based on isophorone diisocyanate |
| Desmodur ® XP 2489 | Aliphatic polyisocyanate |
| Desmodur ® XP 2505 | Desmodur XP 2505 is a prepolymer containing ether groups based on diphenylmethane-4,4'-diisocyanates (MDI) with isomers and higher |
| Desmodur ® XP 2551 | Aromatic polyisocyanate based on diphenylmethane diisocyanate |
| Desmodur ® XP 2565 | Low-viscosity, aliphatic polyisocyanate resin based on isophorone diisocyanate. |
| Desmodur ® XP 2580 | Aliphatic polyisocyanate based on hexamethylene diisocyanate |
| Desmodur ® XP 2599 | Aliphatic prepolymer containing ether groups and based on hexamethylene-1,6-diisocyanate (HDI) |

TABLE 2-continued

| Trade Name | Description |
|---|---|
| Desmodur ® XP 2617 | Desmodur XP 2617 is a largely linear NCO prepolymer based on hexamethylene diisocyanate. |
| Desmodur ® XP 2665 | Aromatic polyisocyanate prepolymer based on diphenylmethane diisocyanate (MDI). |
| Desmodur ® XP 2675 | Aliphatic polyisocyanate (highly functional HDI trimer) |
| Desmodur ® XP 2679 | Aliphatic polyisocyanate (HDI allophanate trimer) |
| Desmodur ® XP 2714 | Silane-functional aliphatic polyisocyanate based on hexamethylene diisocyanate |
| Desmodur ® XP 2730 | Low-viscosity, aliphatic polyisocyanate (HDI uretdione) |
| Desmodur ® XP 2731 | Aliphatic polyisocyanate (HDI allophanate trimer) |
| Desmodur ® XP 2742 | Modified aliphatic Polyisocyanate (HDI-Trimer), contains SiO2-nanoparticles |

Additional isocyanates suitable for certain embodiments of the present invention are sold under the trade name Tolonate® (Perstorp). In certain embodiments, the isocyanates are selected from the group consisting of the materials shown in Table 3:

TABLE 3

| Tolonate ™ D2 | a blocked aliphatic polyisocyanate, supplied at 75% solids in aromatic solvent |
|---|---|
| Tolonate ™ HDB | a viscous solvent-free aliphatic polyisocyanate |
| Tolonate ™ HDB-LV | a solvent free low viscosity aliphatic polyisocyanate |
| Tolonate ™ HDB 75 B | an aliphatic polyisocyanate, supplied at 75% solids in methoxy propyl acetate |
| Tolonate ™ HDB 75 BX | an aliphatic polyisocyanate, supplied at 75% solids |
| Tolonate ™ HDT | a medium viscosity, solvent-free aliphatic polyisocyanate |
| Tolonate ™ HDT-LV | is a solvent free low viscosity aliphatic polyisocyanate |
| Tolonate ™ HDT-LV2 | a solvent free, very low viscosity aliphatic polyisocyanate |
| Tolonate ™ HDT 90 | an aliphatic polyisocyanate, based on HDI-trimer (isocyanurate), supplied at 90% solids |
| Tolonate ™ HDT 90 B | an aliphatic polyisocyanate, based on HDI-trimer (isocyanurate), supplied at 90% solids |
| Tolonate ™ IDT 70 B | an aliphatic polyisocyanate, based on HDI-trimer (isocyanurate), supplied at 70% solids |
| Tolonate ™ IDT 70 S | an aliphatic polyisocyanate, based on HDI-trimer (isocyanurate), supplied at 70% solids |
| Tolonate ™ X FD 90 B | a high functionality, fast drying aliphatic polyisocyanate based on HDI-trimer, supplied at 90% solids |

Other isocyanates suitable for certain embodiments of the present invention are sold under the trade name Mondur® available from Bayer Material Science. In certain embodiments, the isocyanates are selected from the group consisting of the materials shown in Table 4:

TABLE 4

| Trade Name | Description |
|---|---|
| MONDUR 445 | TDI/MDI blend polyisocyanate; blend of toluene diisocyanate and polymeric diphenylmethane diisocyanate; NCO weight 44.5-45.2% |
| MONDUR 448 | modified polymeric diphenylmethane diisocyanate (pMDI) prepolymer; NCO weight 27.7%; viscosity 140 mPa · s @ 25° C.; equivalent weight 152; functionality 2.2 |
| MONDUR 489 | modified polymeric diphenylmethane diisocyanate (pMDI); NCO weight 31.5%; viscosity 700 mPa · s @ 25° C.; equivalent weight 133; functionality 3.0 |
| MONDUR 501 | modified monomeric diphenylmethane diisocyanate (mMDI); isocyanate-terminated polyester prepolymer; NCO weight 19.0%; viscosity 1,100 mPa · s @ 25° C.; equivalent weight 221; functionality 2 |
| MONDUR 541 | polymeric diphenylmethane diisocyanate (pMDI); binder for composite wood products and as a raw material in adhesive formulations; NCO weight 31.5%; viscosity 200 mPa · s @ 25° C. |
| MONDUR 582 | polymeric diphenylmethane diisocyanate (pMDI); binder for composite wood products and as a raw material in adhesive formulations; NCO weight 31.0%; viscosity 200 mPa · s @ 25° C. |
| MONDUR 541-Light | polymeric diphenylmethane diisocyanate (pMDI); NCO weight 32.0%; viscosity 70 mPa · s @ 25° C.; equivalent weight 131; functionality 2.5 |

TABLE 4-continued

| Trade Name | Description |
|---|---|
| MONDUR 841 | modified polymeric MDI prepolymer; NCO, Wt 30.5%; Acidity, Wt 0.02%; Amine Equivalent 132; Viscosity at 25° C., mPa · s 350; Specific gravity at 25° C. 1.24; Flash Point, PMCC, ° F. > 200 |
| MONDUR 1437 | modified diphenylmethane diisocyanate (mMDI); isocyanate-terminated polyether prepolymer; NCO weight 10.0%; viscosity 2,500 mPa · s @ 25° C.; equivalent weight 420; functionality 2 |
| MONDUR 1453 | modified diphenylmethane diisocyanate (mMDI); isocyanate-terminated polyether prepolymer based on polypropylene ether glycol (PPG); NCO weight 16.5%; viscosity 600 mPa · s @ 25° C.; equivalent weight 254; functionality 2 |
| MONDUR 1515 | modified polymeric diphenylmethane diisocyanate (pMDI) prepolymer; used in the production of rigid polyurethane foams, especially for the appliance industry; NCO weight 30.5%; viscosity 350 mPa · s @ 25° C. |
| MONDUR 1522 | modified monomeric 4,4-diphenylmethane diisocyanate (mMDI); NCO weight 29.5%; viscosity 50 mPa · s @ 25° C.; equivalent weight 143; functionality 2.2 |
| MONDUR MA-2300 | modified monomeric MDI, allophanate-modified 4,4'-diphenylmethane diisocyanate (mMDI); NCO weight 23.0%; viscosity 450 mPa · s @ 25° C.; equivalent weight 183; functionality 2.0 |
| MONDUR MA 2600 | modified monomeric MDI, allophanate-modified 4,4'-diphenylmethane diisocyanate (mMDI); NCO weight 26.0%; viscosity 100 mPa · s @ 25° C.; equivalent weight 162; functionality 2.0 |
| MONDUR MA 2601 | aromatic diisocyanate blend, allophanate-modified 4,4'-diphenylmethane diisocyanate (MDI) blended with polymeric diphenylmethane diisocyanate (pMDI) containing 2,4'-isomer; NCO weight 29.0%; viscosity 60 mPa · s @ 25° C.; equivalent weight 145; functionality 2.2 |
| MONDUR MA 2603 | MDI prepolymer; isocyanate-terminated (MDI) prepolymer blended with an allophanate-modified 4,4'-diphenylmethane diisocyanate (MDI); NCO weight 16.0%; viscosity 1,050 mPa · s @ 25° C.; equivalent weight 263; functionality 2.0 |
| MONDUR MA-2902 | modified monomeric MDI, allophanate-modified 4,4'-diphenylmethane diisocyanate (mMDI); NCO weight 29.0%; viscosity 40 mPa · s @ 25° C.; equivalent weight 145; functionality 2.0 |
| MONDUR MA-2903 | modified monomeric MDI; isocyanate-terminated (MDI) prepolymer; NCO weight 19.0%; viscosity 400 mPa · s @ 25° C.; equivalent weight 221; functionality 2.0 |
| MONDUR MA-2904 | Allophanate-modified MDI polyether prepolymer; NCO weight 12.0%; viscosity 1,800 mPa · s @ 25° C.; equivalent weight 350; functionality of 2.0 |
| MONDUR MB | high-purity grade difunctional isocyanante, diphenylmethane 4,4'-diiscocyanate; used in production of polyurethane elastomers, adhesives, coatings and intermediate polyurethane products; appearance colorless solid or liquid; specific gravity @ 50° C. ± 15.5 1.19; flash point 202° C. PMCC; viscosity (in molten form) 4.1 mPa · s; bult density 10 lb/gal (fused) or 9.93 lb/gal (molten); freezing temperature 39° C. |
| MONDUR MLQ | monomeric diphenylmethan diisocyanate; used in a foams, cast elastomers, coatings and andesives; appearance light yellow clear liquid, NCO 33.4% wt; 1.19 specific gravity at 25° C., 196° C. flash point, DIN 51758; 11-15° C. freezing temperature |
| MONDUR MQ | high-purity-grade difunctional isocyanate, diphenylmethane 4,4'-diisocyanate (MDI); used in production of solid polyurethane elastomers, adhesives, coatings and in intermediate polyurethane products; appearance colorless solid or liquid; specific gravity 1.19 @ 50° C.; flash point 202° C. PMCC; viscosity 4.1 mPa · s; bulk density 10 lb./gal (fused) or 9.93 lb./gal (molten); freezing temperature 39° C. |
| MONDUR MR | polymeric diphenylmethane diisocyanate (pMDI); NCO weight 31.5%; viscosity 200 mPa · s @ 25° C.; equivalent weight 133; functionality 2.8 |
| MONDUR MR LIGHT | polymeric diphenylmethane diisocyanate (pMDI); NCO weight 31.5%; viscosity 200 mPa · s @ 25° C.; equivalent weight 133; functionality 2.8 |
| MONDUR MR-5 | polymeric diphenylmethane diisocyanate (pMDI); NCO weight 32.5%; viscosity 50 mPa · s @ 25° C.; equivalent weight 129; functionality 2.4 |
| MONDUR MRS | 2,4-rich polymeric diphenylmethane diisocyanate (pMDI); NCO weight 31.5%; viscosity 200 mPa · s @ 25° C.; equivalent weight 133; functionality 2.6 |
| MONDUR MRS 2 | 2,4-rich polymeric diphenylmethane diisocyanate (pMDI); NCO weight 33.0%; viscosity 25 mPa · s @ 25° C.; equivalent weight 127; functionality 2.2 |
| MONDUR MRS-4 | 2,4-rich polymeric diphenylmethane diisocyanate (pMDI); NCO weight 32.5%; viscosity 40 mPa · s @ 25° C.; equivalent weight 129; functionality 2.4 |
| MONDUR MRS-5 | 2,4-rich polymeric diphenylmethane diisocyanate (pMDI); NCO weight 32.3%; viscosity 55 mPa · s @ 25° C.; equivalent weight 130; functionality 2.4 |
| MONDUR PC | modified 4,4-diphenylmethane diisocyanate (mMDI); NCO weight 25.8%; viscosity 145 mPa · s @ 25° C.; equivalent weight 163; functionality 2.1 |
| MONDUR PF | modified 4,4-diphenylmethane diisocyanate (mMDI) prepolymer; NCO weight 22.9%; viscosity 650 mPa · s @ 25° C.; equivalent weight 183; functionality 2 |
| MONDUR TD-65 | monomeric toluene diisocyanate (TDI); 65/35 mixture of 2,4 and 2.6 TDI; NCO weight 48%; viscosity 3 mPa · s @ 25° C.; equivalent weight 87.5; functionality 2 |
| MONDUR TD-80 GRADE A | monomeric toluene diisocyanate (TDI); 80/20 mixture of the 2,4 and 2,6 isomer; NCO weight 48%; viscosity 5 mPa · s @ 25° C.; equivalent weight 87.5; functionality 2 |
| MONDUR TD-80 GRADE A/ GRADE B | monomeric toluene diisocyanate (TDI); 80/20 mixture of the 2,4 and 2,6 isomer; NCO weight 48%; viscosity 5 mPa · s @ 25° C.; equivalent weight 87.5; functionality 2 |

APPENDIX C Additives

As described above, in some embodiments, methods and compositions of the present invention comprise so-called B-side mixtures comprising one or more of the aliphatic polycarbonate polyols. To produce a foam, the B-side mixture is reacted with an A-side mixture containing one or more polyisocyanates (or polyisocyanate precursors). Typically, one or both of the A-side and B-side mixtures will contain additional components and additives of various sorts. In certain embodiments, the B-side mixtures from which any of the foams of the present invention are produced contain one or more additional polyols and/or one or more additives. In certain embodiments, the additives are selected from the group consisting of: solvents, water, catalysts, surfactants, blowing agents, colorants, UV stabilizers, flame retardants, antimicrobials, plasticizers, cell-openers, antistatic compositions, compatibilizers, and the like. In certain embodiments, the B-side mixtures comprise additional reactive small molecules such as amines, water, alcohols, thiols or carboxylic acids that participate in bond-forming reactions with isocyanates.

A. Additional Polyols

In certain embodiments, the B-side mixtures of the present invention comprise aliphatic polycarbonate polyols as described above in combination with one or more additional polyols such as are traditionally used in polyurethane foam compositions. In embodiments where additional polyols are present, they may comprise up to about 95 weight percent of the total polyol content with the balance of the polyol mixture made up of one or more aliphatic polycarbonate polyols described in Section I above and in the examples and specific embodiments herein.

In embodiments where B-side mixtures of the present invention comprise or derived from a mixture of one or more aliphatic polycarbonate polyols and one or more additional polyols, the additional polyols are selected from the group consisting of polyether polyols, polyester polyols, polystyrene polyols, polyether-carbonate polyols, polyether-ester carbonates, and mixtures of any two or more of these. In certain embodiments, B-side mixtures of the present invention comprise or derived from a mixture of one or more aliphatic polycarbonate polyols as described herein and one or more other polyols selected from the group consisting of materials available commercially under the trade names: Voranol® (Dow), SpecFlex® (Dow), Tercarol® (Dow), Caradol® (Shell), Hyperliter®, Acclaim® (Bayer Material Science), Ultracel® (Bayer Material Science), Desmophen® (Bayer Material Science), and Arcol® (Bayer Material Science).

In certain embodiments, B-side mixtures of the present invention comprise mixtures containing polyether polyols in combination with one or more aliphatic polycarbonate polyols as described herein. In certain embodiments, such polyether polyols are characterized in that they have an Mn between about 500 and about 10,000 g/mol. In certain embodiments, such polyether polyols have an Mn between about 500 and about 5,000 g/mol. In certain embodiments, the polyether polyols comprise polyethylene glycol. In certain embodiments, the polyether polyols comprise polypropylene glycol.

Polyether polyols that may be present include those which can be obtained by known methods, for example, polyether polyols can be produced by anionic polymerization with alkali hydroxides such as sodium hydroxide or potassium hydroxide or alkali alcoholates, such as sodium methylate, sodium ethylate, potassium ethylate or potassium isopropylate as catalysts and with the addition of at least one initiator molecule containing 2 to 8, preferably 3 to 8, reactive hydrogens or by cationic polymerization with Lewis acids such as antimony pentachloride, boron trifluoride etherate, etc., or bleaching earth as catalysts from one or more alkylene oxides with 2 to 4 carbons in the alkylene radical. Any suitable alkylene oxide may be used such as 1,3-propylene oxide, 1,2- and 2,3butylene oxide, amylene oxides, styrene oxide, and preferably ethylene oxide and propylene oxide and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups, preferably secondary hydroxyl groups from the addition of propylene oxide onto an initiator because these groups are slower to react. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramefhylene and polyoxyethylene glycols, and copolymer glycols prepared from blends or sequential addition of two or more alkylene oxides. The polyalkylene polyether polyols may be prepared by any known process such as, for example, the process disclosed by Wurtz in Encyclopedia of Chemical Technology, Vol. 7, pp. 257-262, published by Interscience Publishers, Inc. (1951) or in U.S. Pat. No. 1,922,459. Polyethers include the alkylene oxide addition products of polyhydric alcohols such as ethylene glycol, propylene glycol, dipropylene glycol, trimethylene glycol, 1,2- butanediol, 1,5-pentanediol, 1,6hexanediol, 1,7-heptanediol, hydroquinone, resorcinol glycerol, glycerine, 1,1, 1-trimethylol-propane, 1,1,1trimethylolethane, pentaerythritol, 1,2,6-hexanetriol, a-methyl glucoside, sucrose, and sorbitol. Also included within the term "polyhydric alcohol" are compounds derived from phenol such as 2,2-bis(4-hydroxyphenyl)-propane, commonly known as Bisphenol A. Particularly preferred in the polyol composition is at least one polyol which is initiated with a compound having at least two primary or secondary amine groups, a polyhydric alcohol having 4 or more hydroxyl groups, such as sucrose, or a mixture of initiators employing a polyhydric alcohol having at least 4 hydroxyl groups and compounds having at least two primary or secondary amine groups. Suitable organic amine initiators which may be condensed with alkylene oxides include aromatic amines-such as aniline, N-alkylphenylene-diamines, 2,4□, 2,2□, and 4,4 □ methylenedianiline, 2,6- or 2,4-toluenediamine, vicinal toluenediamines, o-chloroaniline, p-aminoaniline, 1,5-diaminonaphthalene, methylene dianiline, the various condensation products of aniline and formaldehyde, and the isomeric diaminotoluenes; and aliphatic amines such as mono-, di-, and trialkanolamines, ethylene diamine, propylene diamine, diethylenetriamine, methylamine, triisopropanolamine, 1,3-diaminopropane, 1,3-diaminobutane, and 1,4-diaminobutane. Preferable amines include monoethanolamine, vicinal toluenediamines, ethylenediamines, and propylenediamine. Yet another class of aromatic polyether polyols contemplated for use in this invention are the Mannich-based polyol an alkylene oxide adduct of phenol/formaldehyde/alkanolamine resin, frequently called a "Mannich" polyol such as disclosed in U.S. Pat. Nos. 4,883,826; 4,939,182; and 5,120, 815.

In certain embodiments where additional polyols are present, they comprise from about 5 weight percent to about 95 weight percent of the total polyol content with the balance of the polyol mixture made up of one or more aliphatic polycarbonate polyols described in Section I above and in the examples and specific embodiments herein. In certain embodiments, up to about 75 weight percent of the total polyol content of the B-side mixture is aliphatic polycarbonate polyol. In certain embodiments, up to about 50 weight percent of the total polyol content of the B-side mixture is aliphatic polycarbonate polyol. In certain embodiments, up to about 40 weight percent, up to about 30 weight percent, up to about 25 weight percent, up to about 20 weight percent, up to about 15 weight percent, or up to about 10 weight percent of the total polyol content of the B-side mixture is aliphatic polycarbonate polyol. In certain embodiments, at least about 5 weight percent of the total polyol content of the B-side mixture is aliphatic polycarbonate polyol. In certain embodiments, at least about 10 weight percent of the total polyol content of the B-side mixture is aliphatic polycarbonate polyol. In certain embodiments, at least about 15 weight percent, at least about 20 weight percent, at least about 25 weight percent, at least about 40 weight percent, or at least about 50 weight percent, of the total polyol content of the B-side mixture is aliphatic polycarbonate polyol.

B. Catalysts

In certain embodiments, B-side mixtures contain one or more catalysts for the reaction of the polyol (and water, if present) with the polyisocyanate. Any suitable urethane catalyst may be used, including tertiary amine compounds and organometallic compounds. Exemplary tertiary amine compounds include triethylenediamine, N-methylmorpholine, N,N-dimethylcyclohexylamine, pentamethyldiethylenetriamine, tetramethylethylenediamine, 1-methyl-4-dimethylaminoethylpiperazine, 3-methoxy-N-dimethylpropylamine, N-ethylmorpholine, diethylethanolamine, N-cocomorpholine, N,N-dimethyl- N Ḙ, NḘ, dimethyl isopropylpropylenediamine, N,N-diethyl-3-diethylaminopropylamine dimethylbenzyl amine, 1, 8-Diazabicycloundec-7-ene (DBU), 1,4-diazabicyclo[2.2.2]octane (DABCO) triazabicyclodecene (TBD), and N-methyltriazabicyclodecene. (MTBD) Exemplary organometallic catalysts include organomercury, organolead, organoferric and organotin catalysts, with organotin catalysts being preferred among these. Suitable tin catalysts include stannous chloride, tin salts of carboxylic acids such as dibutyltin dilaurate, as well as other organometallic compounds such as are disclosed in U.S. Pat. No. 2,846,408 and elsewhere. A catalyst for the trimerization of polyisocyanates, resulting in a polyisocyanurate, such as an alkali metal alkoxide may also optionally be employed herein. Such catalysts are used in an amount which measurably increases the rate of polyurethane or polyisocyanurate formation.

In certain embodiments, where B-side mixtures of the present invention comprise catalysts, the catalysts comprise tin based materials. In certain embodiments, tin catalysts included in the B-side mixtures are selected from the group consisting of: di-butyl tin dilaurate, dibutylbis(laurylthio) stannate, dibutyltinbis(isooctylmercapto acetate) and dibutyltinbis(isooctylmaleate), tin octanoate and mixtures of any two or more of these.

In certain embodiments, catalysts included in the B-side mixtures comprise tertiary amines. In certain embodiments, catalysts included in the B-side mixtures are selected from the group consisting of: DABCO, pentametyldipropylenetriamine, bis(dimethylamino ethyl ether), pentamethyldiethylenetriamine, DBU phenol salt, dimethylcyclohexylamine, 2,4,6-tris(N,N-dimethylaminomethyl)phenol (DMT-30), 1,3,5-tris(3-dimethylaminopropyl)hexahydro-s-triazine, ammonium salts and combinations or formulations of any of these.

Typical amounts of catalyst are 0.001 to 10 parts of catalyst per 100 parts by weight of total polyol in the B-side mixture. In certain embodiments, catalyst levels in the formulation, when used, range between about 0.001 pph (weight parts per hundred) and about 3pph based on the amount of polyol present in the B-side mixture. In certain embodiments, catalyst levels range between about 0.05 pph and about 1 pph, or between about 0.1 pph and about 0.5 pph.

C. Blowing Agents

In certain embodiments, B-side mixtures of the present invention contain blowing agents. Blowing agents may be chemical blowing agents (typically molecules that react with A-side components to liberate $CO_2$ or other volatile compounds) or they may be physical blowing agents (typically molecules with a low boiling point that vaporize during the foam formation. Many blowing agents are known in the art and may be applied to B-side compositions of the present invention according to conventional methodology. The choice of blowing agent and the amounts added can be a matter of routine experimentation.

In certain embodiments, the blowing agent comprises a chemical blowing agent. In certain embodiments, water is present as a blowing agent. Water functions as a blowing agent by reacting with a portion of the isocyanate in the A-side mixture to produce carbon dioxide gas. Similarly, formic acid can be included as a blowing agent. Formic acid functions as a blowing agent by reacting with a portion of the isocyanate to produce carbon dioxide and carbon monoxide gas.

In certain embodiments, water is present in an amount of from 0.5 to 20 parts per 100 parts by weight of the polyol in the B-side composition. In certain embodiments, water is present from about 1 to 10 parts, from about 2 to 8 parts, or from about 4 to 6 parts per 100 parts by weight of polyol in the B-side composition. In certain embodiments, it is advantageous not to exceed 2 parts of water, not-to exceed 1.5 parts of water, or not to exceed 0.75 parts of water. In certain embodiments, it is advantageous to have water absent.

In certain embodiments, formic acid is present in an amount of from 0.5 to 20 parts per 100 parts by weight of the polyol in the B-side composition. In certain embodiments, formic acid is present from about 1 to 10 parts, from about 2 to 8 parts, or from about 4 to 6 parts per 100 parts by weight of polyol in the B-side composition.

In certain embodiments physical blowing agents can be used. Suitable physical blowing agents include hydrocarbons, fluorine-containing organic molecules hydrocarbons, chlorocarbons, acetone, methyl formate and carbon dioxide. In some embodiments, fluorine-containing organic molecules comprise perfluorinated compounds, chlorofluorocarbons, hydrochlorofluorocarbons, and hydrofluorocarbons. Suitable hydrofluoroalkanes are $C_{1-4}$ compounds including difluoromethane (R-32), 1,1,1,2-tetrafluoroethane (R-134a), 1,1-difluoroethane (R-152a), difluorochloroethane (R-142b), trifluoromethane (R-23), heptafluoropropane (R-227a), hexafluoropropane (R136), 1,1,1-trifluoroethane (R-133), fluoroethane (R-161), 1,1,1,2,2-pentafluoropropane (R-245fa), pentafluoropropylene (R2125 a), 1,1,1,3-tetrafluoropropane, tetrafhioropropyl ene (R-2134a), 1,1,2, 3,3-pentafluoropropane and 1,1,1,3,3-pentafiuoro-n-butane.

In certain embodiments, when a hydrofluorocarbon blowing agent is present in the B-side mixture, it is selected from the group consisting of: tetrafluoroethane (R-134a), pentafluoropropane (R-245fa) and pentafluorobutane (R-365).

Suitable hydrocarbons for use as blowing agent include nonhalogenated hydrocarbons such as butane, isobutane, 2,3-dimethylbutane, n- and i-pentane isomers, hexane isomers, heptane isomers and cycloalkanes including cyclopentane, cyclohexane and cycloheptane.

Preferred hydrocarbons for use as blowing agents include cyclopentane and notably n-pentane an iso-pentane. In a certain embodiments the B-side composition comprises a physical blowing agent selected from the group consisting of tetrafluoroethane (R-134a), pentafluoropropane (R-245fa), pentafluorobutane (R-365), cyclopentane, n-pentane and iso-pentane.

In certain embodiments where a physical blowing agent is present, it is used in an amount of from about 1 to about 20 parts per 100 parts by weight of the polyol in the B-side composition. In certain embodiments, the physical blowing agent is present from 2 to 15 parts, or from 4 to 10 parts per 100 parts by weight of the polyol in the B-side composition.

D. Reactive Small Molecules

In certain embodiments, B-side mixtures of the present invention include one or more small molecules reactive toward isocyanates. In certain embodiments, reactive small molecules included in the inventive B-side mixtures comprise organic molecules having one or more functional groups selected from the group consisting of alcohols, amines, carboxylic acids, thiols, and combinations of any two or more of these. In some embodiments, a non-polymeric small molecule has a molecular weight less than 1,000 g/mol, or less than 1,500 g/mol.

In certain embodiments, B-side mixtures of the present invention include one or more alcohols. In certain embodiments, the B-side mixtures include polyhydric alcohols.

In certain embodiments, reactive small molecules included in the inventive B-side mixtures comprise dihydric alcohols. In certain embodiments, the dihydric alcohol comprises a $C_{2-40}$ diol. In certain embodiments, the dihydric alcohol is selected from the group consisting of: 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 2-methyl-2,4-pentane diol, 2-ethyl-1,3-hexane diol, 2-methyl-1,3-propane diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, isosorbide, glycerol monoesters, glycerol monoethers, trimethylolpropane monoesters, trimethylolpropane monoethers, pentaerythritol diesters, pentaerythritol diethers, and alkoxylated derivatives of any of these.

In certain embodiments, a reactive small molecule included in the inventive B-side mixtures comprises a dihydric alcohol selected from the group consisting of: diethylene glycol, triethylene glycol, tetraethylene glycol, higher poly(ethylene glycol), such as those having number average molecular weights of from 220 to about 2000 g/mol, dipropylene glycol, tripropylene glycol, and higher poly(propylene glycols) such as those having number average molecular weights of from 234 to about 2000 g/mol.

In certain embodiments, a reactive small molecule included in the inventive B-side mixtures comprises an alkoxylated derivative of a compound selected from the group consisting of: a diacid, a diol, or a hydroxy acid. In certain embodiments, the alkoxylated derivatives comprise ethoxylated or propoxylated compounds.

In certain embodiments, a reactive small molecule included in the inventive B-side mixtures comprises a polymeric diol. In certain embodiments, a polymeric diol is selected from the group consisting of polyethers, polyesters, hydroxy-terminated polyolefins, polyether-copolyesters, polyether polycarbonates, polycarbonate-copolyesters, and alkoxylated analogs of any of these. In certain embodiments, the polymeric diol has an average molecular weight less than about 2000 g/mol.

In some embodiments, a reactive small molecule included in the inventive B-side mixtures comprises a triol or higher polyhydric alcohol. In certain embodiments, a reactive small molecule is selected from the group consisting of: glycerol, 1,2,4-butanetriol, 2-(hydroxymethyl)-1,3-propanediol; hexane triols, trimethylol propane, trimethylol ethane, trimethylolhexane, 1,4-cyclohexanetrimethanol, pentaerythritol mono esters, pentaerythritol mono ethers, and alkoxylated analogs of any of these. In certain embodiments, alkoxylated derivatives comprise ethoxylated or propoxylated compounds.

In some embodiments, a reactive small molecule comprises a polyhydric alcohol with four to six hydroxy groups. In certain embodiments, a coreactant comprises dipentaerithrotol or an alkoxylated analog thereof. In certain embodiments, coreactant comprises sorbitol or an alkoxylated analog thereof.

In certain embodiments, a reactive small molecule comprises a hydroxy-carboxylic acid having the general formula $(HO)_xQ(COOH)_y$, wherein Q is a straight or branched hydrocarbon radical containing 1 to 12 carbon atoms, and x and y are each integers from 1 to 3. In certain embodiments, a coreactant comprises a diol carboxylic acid. In certain embodiments, a coreactant comprises a bis(hydroxylalkyl) alkanoic acid. In certain embodiments, a coreactant comprises a bis(hydroxylmethyl) alkanoic acid. In certain embodiments the diol carboxylic acid is selected from the group consisting of 2,2 bis-(hydroxymethyl)-propanoic acid (dimethylolpropionic acid, DMPA) 2,2-bis(hydroxymethyl) butanoic acid (dimethylolbutanoic acid; DMBA), dihydroxysuccinic acid (tartaric acid), and 4,4'-bis(hydroxyphenyl) valeric acid. In certain embodiments, a coreactant comprises an N,N-bis(2-hydroxyalkyl)carboxylic acid.

In certain embodiments, a reactive small molecule comprises a polyhydric alcohol comprising one or more amino groups. In certain embodiments, a reactive small molecule comprises an amino diol. In certain embodiments, a reactive small molecule comprises a diol containing a tertiary amino group. In certain embodiments, an amino diol is selected from the group consisting of: diethanolamine (DEA), N-methyldiethanolamine (MDEA), N-ethyldiethanolamine (EDEA), N-butyldiethanolamine (BDEA), N,N-bis(hydroxyethyl)-α-amino pyridine, dipropanolamine, diisopropanolamine (DIPA), N-methyldiisopropanolamine, Diisopropanol-p-toluidine, N,N-Bis(hydroxyethyl)-3-chloroaniline, 3-di ethylaminopropane-1,2-diol, 3-dimethylaminopropane-1,2-diol and N-hydroxyethylpiperidine. In certain embodiments, a coreactant comprises a diol containing a quaternary amino group. In certain embodiments, a coreactant comprising a quaternary amino group is an acid salt or quaternized derivative of any of the amino alcohols described above.

In certain embodiments, a reactive small molecule is selected from the group consisting of: inorganic or organic polyamines having an average of about 2 or more primary and/or secondary amine groups, polyalcohols, ureas, and combinations of any two or more of these. In certain embodiments, a reactive small molecule is selected from the group consisting of: diethylene triamine (DETA), ethylene diamine (EDA), meta-xylylenediamine (MXDA), aminoethyl ethanolamine (AEEA), 2-methyl pentane diamine, and the like, and mixtures thereof. Also suitable for practice in the present invention are propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4, 4-diamino diphenylmethane, and sulfonated primary and/or secondary amines. In certain embodiments, reactive small molecule is selected from the group consisting of: hydrazine, substituted hydrazines, hydrazine reaction products, and the like, and mixtures thereof. In certain embodiments, a reactive small molecule is a polyalcohol including those having from 2 to 12 carbon atoms, preferably from 2 to 8 carbon atoms, such as ethylene glycol, diethylene glycol, neopentyl glycol, butanediols, hexanediol, and the like, and mixtures thereof. Suitable ureas include urea and its derivatives, and the like, and mixtures thereof.

In certain embodiments, reactive small molecules containing at least one basic nitrogen atom are selected from the group consisting of: mono-, bis- or polyalkoxylated aliphatic, cycloaliphatic, aromatic or heterocyclic primary amines, N-methyl diethanolamine, N-ethyl diethanolamine, N-propyl diethanolamine, N-isopropyl diethanolamine, N-butyl diethanolamine, N-isobutyl diethanolamine, N-oleyl diethanolamine, N-stearyl diethanolamine, ethoxylated coconut oil fatty amine, N-allyl diethanolamine, N-methyl diisopropanolamine, N-ethyl diisopropanolamine, N-propyl diisopropanolamine, N-butyl diisopropanolamine, cyclohexyl diisopropanolamine, N,N-diethoxylaniline, N,N-diethoxyl toluidine, N,N-diethoxyl-1-aminopyridine, N,N'-diethoxyl piperazine, dimethyl-bis-ethoxyl hydrazine, N,N'-bis-(2-hydroxyethyl)-N,N'-diethylhexahydr op-phenylenediamine, N-12-hydroxyethyl piperazine, polyalkoxylated amines, propoxylated methyl diethanolamine, N-methyl-N,N-bis-3-aminopropylamine, N-(3-aminopropyl)-N,N'-dimethyl ethylenediamine, N-(3-aminopropyl)-N-methyl ethanolamine, N,N'-bis-(3-aminopropyl)-N,N'-dimethyl ethylenediamine, N,N'-bis-(3-aminopropyl)-piperazine, N-(2-aminoethyl)-piperazine, N,N'-bisoxyethyl propylenediamine, 2,6-diaminopyridine, diethanolaminoacetamide, diethanolamidopropionamide, N,N-bisoxyethylphenyl thiosemicarbazide, N,N-bis-oxyethylmethyl semicarbazide, p,p'-bis-aminomethyl dibenzyl methyl amine, 2,6-diaminopyridine, 2-dimethylaminomethyl-2-methylpropanel, 3-diol. In certain embodiments, chain-extending agents are compounds that contain two amino groups. In certain embodiments, chain-extending agents are selected from the group consisting of: ethylene diamine, 1,6-hexamethylene diamine, and 1,5-diamino-1-methyl-pentane.

E. Additives

In addition to the above components, A-side or B-side mixtures of the present invention may optionally contain various additives as are known in the art of polyurethane foam technology. Such additives may include, but are not limited to compatibilizers, colorants, surfactants, flame retardants, antistatic compounds, antimicrobials, UV stabilizers, plasticizers, and cell openers.

Colorants

In certain embodiments, B-side mixtures of the present invention comprise one or more suitable colorants. Many foam products are color coded during manufacture to identify product grade, to conceal yellowing, or to make a consumer product. The historical method of coloring foam was to blend in traditional pigments or dyes. Typical inorganic coloring agents included titanium dioxide, iron oxides and chromium oxide. Organic pigments originated from the azo/diazo dyes, phthalocyanines and dioxazines, as well as carbon black. Typical problems encountered with these colorants included high viscosity, abrasive tendencies, foam instability, foam scorch, migrating color and a limited range of available colors. Recent advances in the development of polyol-bound colorants are described in:

Miley, J. W.; Moore, P. D. "Reactive Polymeric Colorants For Polyurethane", Proceedings Of The SPI-26th Annual Technical Conference; Technomic: Lancaster, Pa., 1981; 83-86.

Moore, P. D.; Miley, J. W.; Bates, S. H.; "New Uses For Highly Miscible Liquid Polymeric Colorants In The Manufacture of Colored Urethane Systems"; Proceedings of the SPI-27th Annual Technical/Marketing Conference; Technomic: Lancaster, Pa., 1982; 255-261.

Bates, S. H.; Miley, J. W. "Polyol-Bound Colorants Solve Polyurethane Color Problems"; Proceedings Of The SPI-30th Annual Technical/Marketing Conference; Technomic: Lancaster, Pa., 1986; 160-165

Vielee, R. C.; Haney, T. V. "Polyurethanes"; In Coloring of Plastics; Webber, T. G., Ed., Wiley-Interscience: New York, 1979, 191-204.

UV Stabilizers

In certain embodiments, B-side mixtures of the present invention comprise one or more suitable UV stabilizers. Polyurethanes based on aromatic isocyanates will typically turn dark shades of yellow upon aging with exposure to light. A review of polyurethane weathering phenomena is presented in: Davis, A.; Sims, D. Weathering Of Polymers; Applied Science: London, 1983, 222-237. The yellowing is not a problem for most foam applications. Light protection agents, such as hydroxybenzotriazoles, zinc dibutyl thiocarbamate, 2,6-ditertiary butylcatechol, hydroxybenzophenones, hindered amines and phosphites have been used to improve the light stability of polyurethanes. Color pigments have also been used successfully.

Flame Retardants

In certain embodiments, B-side mixtures of the present invention comprise one or more suitable flame retardants. Low-density, open-celled flexible polyurethane foams have a large surface area and high permeability to air and thus will burn given the application of sufficient ignition source and oxygen. Flame retardants are often added to reduce this flammability. The choice of flame retardant for any specific foam often depends upon the intended service application of that foam and the attendant flammability testing scenario governing that application. Aspects of flammability that may be influenced by additives include the initial ignitability, burning rate and smoke evolution.

The most widely used flame retardants are the chlorinated phosphate esters, chlorinated paraffins and melamine powders. These and many other compositions are available from specialty chemical suppliers. A review of this subject has been given: Kuryla, W. C.; Papa, A. J. Flame Retardancy of Polymeric Materials, Vol. 3; Marcel Dekker: New York, 1975, 1-133.

Bacteriostats

Under certain conditions of warmth and high humidity, polyurethane foams are susceptible to attack by microorganisms. When this is a concern, additives against bacteria, yeast or fungi are added to the foam during manufacture. In certain embodiments, B-side mixtures of the present invention comprise one or more suitable bacteriostats.

Plasticizers

In certain embodiments, B-side mixtures of the present invention comprise one or more suitable plasticizers. Non-reactive liquids have been used to soften a foam or to reduce viscosity for improved processing. The softening effect can be compensated for by using a polyol of lower equivalent weight, so that a higher cross-linked polymer structure is obtained. These materials increase foam density and often adversely affect physical properties.

Cell-Openers

In certain embodiments, B-side mixtures of the present invention comprise one or more suitable cell openers. In some polyurethane foams it is necessary to add cell-openers to obtain foam that does not shrink upon cooling. Known additives for inducing cell-opening include silicone-based antifoamers, waxes, finely divided solids, liquid perfluocarbons, paraffin oils, long-chain fatty acids and certain polyether polyols made using high concentrations of ethylene oxide.

Antistatic Agents

In certain embodiments, B-side mixtures of the present invention comprise one or more suitable antistatic compounds. Some flexible foams are used in packaging, clothing and other applications where it is desired to minimize the electrical resistance of the foam so that buildup of static electrical charges is minimized. This has traditionally been accomplished through the addition of ionizable metal salts, carboxylic acid salts, phosphate esters and mixtures thereof. These agents function either by being inherently conductive or by absorbing moisture from the air. The desired net result is orders of magnitude reduction in foam surface resistivity.

Compatibilizers

In certain embodiments, B-side mixtures of the present invention comprise one or more suitable compatibilizers. Compatibilizers are molecules that allow two or more non-miscible ingredients to come together and give a homogeneous liquid phase. Many such molecules are known to the polyurethane industry, these include: amides, amines, hydrocarbon oils, phthalates, polybutyleneglycols, and ureas.

Certain Embodiments

In certain embodiments, the present invention can be described as in the following clauses.

1. A method for increasing the load bearing properties of a polyurethane foam composition, the foam composition comprising the reaction product of a polyol component and a polyisocyanate component, the method comprising the step of incorporating into the polyol component a polycarbonate polyol derived from the copolymerization of one or more epoxides and carbon dioxide, wherein the polycarbonate polyol is added in a quantity from about 2 weight percent to about 50 weight percent of all polyols present in the polyol component.
2. The method of clause 1, wherein the polyol component comprises one or more polyols selected from the group consisting of polyether polyols, polyester polyols, aliphatic polyols, and mixtures of any two or more of these.
3. The method of clause 1, wherein the polyol component substantially comprises polyether polyol.
4. The method of clause 1, wherein the polycarbonate polyol is added in a quantity from about 5 weight percent, to about 25 weight percent of all polyol present in the polyol component.
5. The method of clause 4, wherein the polycarbonate polyol is added in a quantity from about 2 weight percent to about 10 weight percent of all polyol present in the polyol component.
6. The method of clause 4, wherein the polycarbonate polyol is added in a quantity from about 10 weight percent, to about 20 weight percent of all polyol present in the polyol component.
7. The method of clause 4, wherein the polycarbonate polyol is added in a quantity from about 20 weight percent, to about 30 weight percent of all polyol present in the polyol component.
8. The method of clause 4, wherein the polycarbonate polyol is added in a quantity from about 30 weight percent, to about 50 weight percent of all polyol present in the polyol component.
9. The method of clause 1, wherein a compression force deflection (CFD) value measured according to ASTM D3574 of the foam composition comprising the added polycarbonate polyol is greater than the CFD value of the corresponding foam composition lacking the added polycarbonate polyol.
10. The method of clause 9, wherein the CFD value of the foam composition comprising the added polycarbonate polyol is at least 10%, at least 20%, at least 30%, at least 40% or at least 50% greater than the CFD value of the corresponding foam composition lacking the added polycarbonate polyol.
11. The method of clause 10, wherein the CFD value of the foam comprising the added polycarbonate polyol is at least 20%, at least 30%, at least 40% or at least 50% greater than the CFD value of the corresponding foam without the added polycarbonate polyol.
12. The method of any one of clauses 9-11, wherein the CFD values are normalized for density of the foam compositions being compared.
13. The method of any one of clauses 9-11, wherein the foam compositions are formulated such that the foam composition comprising the added polycarbonate polyol and the corresponding foam composition lacking the added polycarbonate polyol have substantially the same density.
14. The method of clause 1, wherein the foam composition comprises flexible polyurethane foam.
15. The method of clause 1, wherein the foam composition comprises viscoelastic polyurethane foam.
16. The method of clause 1, wherein the foam composition comprises rigid polyurethane foam.
17. The method of clause 1, wherein the density measured according to ASTM D3574 of the foam composition comprising the added polycarbonate polyol is less than the density of the corresponding foam composition lacking the added polycarbonate polyol, and wherein a compression force deflection (CFD) value measured according to ASTM D3574 of the foam composition comprising the added polycarbonate polyol is greater than the CFD value of the corresponding foam composition lacking the added polycarbonate polyol.
18. The method of clause 18, wherein the density of the foam composition comprising the added polycarbonate polyol is at least 10% less than the density of the corresponding foam composition lacking the added polycarbonate polyol.
19. The method of clause 18, wherein the density of the foam with the added polycarbonate polyol is at least 20% less than the density of the corresponding foam without the added polycarbonate polyol.

20. The method of clause 19, wherein the density of the foam with the added polycarbonate polyol is at least 25%, at least 30%, at least 40% or at least 50% greater than the CFD value of the corresponding foam without the added polycarbonate polyol.
21. The method of any of clauses 17-19, wherein the CFD value of the foam composition comprising the added polycarbonate polyol is at least 10% greater than the CFD value of the corresponding foam composition lacking the added polycarbonate polyol.
22. The method of clause 21, wherein the CFD value of the foam comprising the added polycarbonate polyol is at least 20%, at least 30%, at least 40% or at least 50% greater than the CFD value of the corresponding foam without the added polycarbonate polyol.
23. The method of clause 1, wherein the polycarbonate polyol contains a primary repeating unit having a structure:

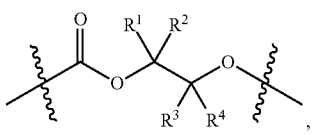

where $R^1$, $R^2$, $R^3$, and $R^4$ are, at each occurrence in the polymer chain, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of $R^1$, $R^2$, $R^3$, and $R^4$ may optionally be taken together with intervening atoms to form one or more optionally substituted rings optionally containing one or more heteroatoms.
24. The method of clause 23, wherein the polycarbonate polyol contains a primary repeating unit having a structure:

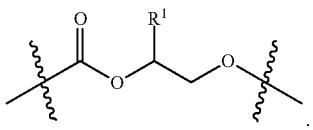

25. The method of clause 24, wherein $R^1$ is, at each occurrence in the polymer chain, independently —H, or —$CH_3$.
26. The method of clause 25, wherein the polycarbonate polyol is characterized in that it has an Mn between about 500 g/mol and about 20,000 g/mol.
27. The method of clause 26, wherein the polycarbonate polyol is characterized in that it has an Mn between about 1,000 g/mol and about 5,000 g/mol.
28. The method of clause 26, wherein the polycarbonate polyol is characterized in that it has an Mn between about 1,000 g/mol and about 3,000 g/mol.
29. The method of clause 28, wherein the polycarbonate polyol is characterized in that it has an Mn of about 1,000 g/mol, about 1,200 g/mol, about 1,500 g/mol, about 2,000 g/mol, about 2,500 g/mol or about 3,000 g/mol.
30. The method of clause 25, wherein the aliphatic polycarbonate polyol is characterized in that more than 98%, more than 99%, or more than 99.5% of the chain ends are groups reactive toward isocyanate.
31. The method of clause 25, wherein the chain ends reactive toward isocyanate comprise —OH groups.
32. A polyurethane foam composition comprising the reaction product of a polyol component and a polyisocyanate component, wherein the polyol component comprises a polycarbonate polyol derived from the copolymerization of one or more epoxides and carbon dioxide, wherein the polycarbonate polyol is present in a quantity from about 2 weight percent to about 50 weight percent of all polyols present in the polyol component and characterized in that a compression force deflection (CFD) value measured according to ASTM D3574 of the foam composition comprising the added polycarbonate polyol is greater than the CFD value of a corresponding foam composition lacking the polycarbonate polyol.
33. The polyurethane foam composition of clause 32, wherein the polyol component comprises one or more polyols selected from the group consisting of polyether polyols, polyester polyols, aliphatic polyols, and mixtures of any two or more of these.
34. The polyurethane foam composition of clause 32, wherein the polyol component substantially comprises polyether polyol.
35. The polyurethane foam composition of clause 32, wherein the polycarbonate polyol is present in a quantity from about 5 weight percent, to about 25 weight percent of all polyol present in the polyol component.
36. The polyurethane foam composition of clause 32, wherein the polycarbonate polyol is present in a quantity from about 2 weight percent to about 10 weight percent of all polyol present in the polyol component.
37. The polyurethane foam composition of clause 32, wherein the polycarbonate polyol is present in a quantity from about 10 weight percent, to about 20 weight percent of all polyol present in the polyol component.
38. The polyurethane foam composition of clause 32, wherein the polycarbonate polyol is present in a quantity from about 20 weight percent, to about 30 weight percent of all polyol present in the polyol component.
39. The polyurethane foam composition of clause 32, wherein the polycarbonate polyol is present in a quantity from about 30 weight percent, to about 50 weight percent of all polyol present in the polyol component.
40. The polyurethane foam composition of clause 32, wherein the CFD value of the foam composition comprising the polycarbonate polyol is at least 10% greater than the CFD value of the corresponding foam composition lacking the polycarbonate polyol.
41. The polyurethane foam composition of clause 40, wherein the CFD value of the foam with the polycarbonate polyol is at least 20%, at least 30%, at least 40% or at least 50% greater than the CFD value of the corresponding foam without the polycarbonate polyol.
42. The polyurethane foam composition of clause 40 or 41, wherein the CFD values are normalized for density of the foam compositions being compared.
43. The polyurethane foam composition of clause 40 or 41, wherein the foam composition is formulated such that the foam composition comprising the added polycarbonate polyol and the corresponding foam composition lacking the added polycarbonate polyol have substantially the same density.
44. The polyurethane foam composition of clause 32, wherein the foam composition comprises flexible polyurethane foam.

45. The polyurethane foam composition of clause 32, wherein the foam composition comprises viscoelastic polyurethane foam.
46. The polyurethane foam composition of clause 32, wherein the foam composition comprises rigid polyurethane foam.
47. The polyurethane foam composition of clause 32, wherein the density measured according to ASTM D3574 of the foam composition comprising the polycarbonate polyol is less than the density of the corresponding foam composition lacking the polycarbonate polyol.
48. The polyurethane foam composition of clause 47, wherein the density of the foam comprising the polycarbonate polyol is at least 10% less than the density of the corresponding foam composition lacking the added polycarbonate polyol.
49. The polyurethane foam composition of clause 47, wherein the density of the foam with the added polycarbonate polyol is at least 20%, at least 30%, at least 40% or at least 50% greater than the CFD value of the corresponding foam composition without the added polycarbonate polyol.
50. The polyurethane foam composition of any of clauses 47-49, wherein the measured CFD value is at least 10% greater than the CFD value of the corresponding foam composition lacking the polycarbonate polyol.
51. The polyurethane foam composition of clause 50, wherein the CFD value of the foam with the polycarbonate polyol is at least 20%, at least 30%, at least 40% or at least 50% greater than the CFD value of the corresponding foam without the added polycarbonate polyol.
52. The polyurethane foam composition of clause 32, wherein the polycarbonate polyol contains a primary repeating unit having a structure:

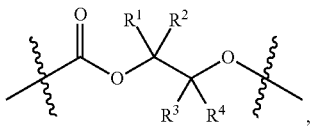

where $R^1$, $R^2$, $R^3$, and $R^4$ are, at each occurrence in the polymer chain, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of $R^1$, $R^2$, $R^3$, and $R^4$ may optionally be taken together with intervening atoms to form one or more optionally substituted rings optionally containing one or more heteroatoms.

53. The polyurethane foam composition of clause 32, wherein the polycarbonate polyol contains a primary repeating unit having a structure:

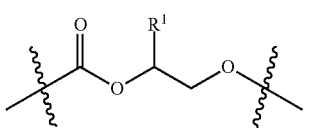

54. The polyurethane foam composition of clause 32, wherein $R^1$ is, at each occurrence in the polymer chain, independently —H, or —CH$_3$.

55. The polyurethane foam composition of clause 54, wherein the polycarbonate polyol is characterized in that it has an Mn between about 500 g/mol and about 20,000 g/mol.
56. The polyurethane foam composition of clause 55, wherein the polycarbonate polyol is characterized in that it has an Mn between about 1,000 g/mol and about 5,000 g/mol.
57. The polyurethane foam composition of clause 55, wherein the polycarbonate polyol is characterized in that it has an Mn between about 1,000 g/mol and about 3,000 g/mol.
58. The polyurethane foam composition of clause 55, wherein the polycarbonate polyol is characterized in that it has an Mn of about 1,000 g/mol, about 1,200 g/mol, about 1,500 g/mol, about 2,000 g/mol, about 2,500 g/mol or about 3,000 g/mol.
59. The polyurethane foam composition of clause 55, wherein the polycarbonate polyol is characterized in that more than 98%, more than 99%, or more than 99.5% of the chain ends are groups reactive toward isocyanate.
60. The polyurethane foam composition of clause 59, wherein the chain ends reactive toward isocyanate comprise —OH groups.
61. A seating foam comprising the reaction product between an isocyanate component and a polyol component wherein the polyol component comprises from about 5 weight percent to about 20 weight percent of a polycarbonate polyol having a primary repeating unit with the structure:

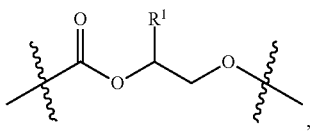

wherein,
$R^1$ is, at each occurrence in the polymer chain, independently —H, or —CH$_3$;
the polycarbonate polyol has an Mn between about 1,000 g/mol and about 5,000 g/mol; and
the polycarbonate polyol is characterized in that more than 99% of the chain ends are groups reactive toward isocyanate.

62. A viscoelastic foam article comprising the reaction product between an isocyanate component and a polyol component wherein the polyol component comprises from about 5 weight percent to about 20 weight percent of a polycarbonate polyol having a primary repeating unit with the structure:

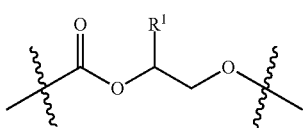

wherein,
$R^1$ is, at each occurrence in the polymer chain, independently —H, or —CH$_3$;
the polycarbonate polyol has an Mn between about 1,000 g/mol and about 5,000 g/mol; and the polycarbonate polyol is characterized in that more than 99% of the chain ends are groups reactive toward isocyanate.

What is claimed is:

1. A method for increasing the load bearing properties or strength of a polyurethane foam composition, the foam composition comprising the reaction product of a polyol component and a polyisocyanate component, the method comprising the step of incorporating into the polyol component a polycarbonate polyol derived from the copolymerization of one or more epoxides and carbon dioxide, wherein:
the polycarbonate polyol is added in a quantity from about 2 weight percent to about 50 weight percent, from about 5 weight percent to about 25 weight percent, from about 2 weight percent to about 10 weight percent, from about 10 weight percent to about 20 weight percent, from about 20 weight percent to about 30 weight percent, or from about 30 weight percent to about 50 weight percent of all polyols present in the polyol component; and
the polyurethane foam composition contains less than 20% graft polyol additives.

2. The method of claim 1, wherein the polyol component comprises one or more polyols selected from the group consisting of polyether polyols, polyester polyols, aliphatic polyols, and mixtures of any two or more of these.

3. The method of claim 2, wherein the polyol component comprises polyether polyol.

4. The method of claim 1, characterized in that one or more load bearing or strength properties of the foam composition comprising the added polycarbonate polyol are enhanced relative to the corresponding foam composition formulated without the added polycarbonate polyol, wherein the one or more load bearing or strength properties are selected from the group consisting of tensile strength at break, as measured by ASTM D3574-08 Test E; tear strength, as measured by ASTM D3574-08 Test F; compression force deflection (CFD), as measured by ASTM D3574-08 Test C; and tensile strength and elongation after dry heat aging for 22 hours at 140° C., as measured by ASTM D3574-08 Test K.

5. The method of claim 4, wherein the CFD value, tensile strength, or tear strength of the foam composition comprising the added polycarbonate polyol is greater than the CFD value, tensile strength, or tear strength of the corresponding foam composition formulated without the added polycarbonate polyol.

6. The method of claim 5, wherein the CFD value, tensile strength, or tear strength of the foam composition comprising the added polycarbonate polyol is at least 10%, at least 20%, at least 30%, at least 40%, at least 50%, or at least 100% greater than the CFD value, tensile strength, or tear strength of the corresponding foam composition formulated without the added polycarbonate polyol.

7. The method of claim 5, wherein the CFD value, tensile strength, or tear strength is normalized for density of the foam compositions being compared.

8. The method of claim 5, wherein the foam compositions are formulated such that the foam composition comprising the added polycarbonate polyol and the corresponding foam composition formulated without the added polycarbonate polyol have the same density.

9. The method of claim 1, wherein the foam composition comprises flexible polyurethane foam, or wherein the foam composition comprises viscoelastic polyurethane foam, or wherein the foam composition comprises rigid polyurethane foam.

10. The method of claim 5, wherein the density measured according to ASTM D3574 of the foam composition comprising the added polycarbonate polyol is less than the density of the corresponding foam composition formulated without the added polycarbonate polyol, and wherein the CFD value, tensile strength, or tear strength of the foam composition comprising the added polycarbonate polyol is greater than the CFD value, tensile strength, or tear strength of the corresponding foam composition formulated without the added polycarbonate polyol.

11. The method of claim 10, wherein the density of the foam composition comprising the added polycarbonate polyol is at least 10%, at least 20%, at least 30%, at least 40% or at least 50% less than the density of the corresponding foam composition formulated without the added polycarbonate polyol.

12. The method of claim 10, wherein the CFD value, tensile strength, or tear strength of the foam composition comprising the added polycarbonate polyol is at least 10%, at least 20%, at least 30%, at least 40% or at least 50% greater than the CFD value, tensile strength, or tear strength of the corresponding foam composition formulated without the added polycarbonate polyol.

13. The method of claim 1, wherein the polycarbonate polyol contains a primary repeating unit having a structure:

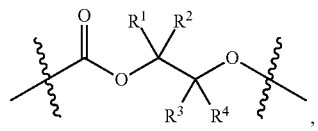

where $R^1$, $R^2$, $R^3$, and $R^4$ are, at each occurrence in the polymer chain, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of $R^1$, $R^2$, $R^3$, and $R^4$ may optionally be taken together with intervening atoms to form one or more optionally substituted rings optionally containing one or more heteroatoms.

14. The method of claim 13, wherein the polycarbonate polyol contains a primary repeating unit having a structure:

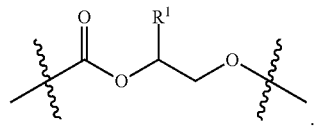

15. The method of claim 14, wherein $R^1$ is, at each occurrence in the polymer chain, independently —H or —$CH_3$.

16. The method of claim 13, wherein the polycarbonate polyol is characterized in that it has an Mn between about 500 g/mol and about 20,000 g/mol, between about 1,000 g/mol and about 5,000 g/mol, between about 1,000 g/mol and about 3,000 g/mol, or between about 1,000 g/mol and about 3,000 g/mol, or an Mn of about 1,000 g/mol, about 1,200 g/mol, about 1,500 g/mol, about 2,000 g/mol, about 2,500 g/mol, or about 3,000 g/mol.

17. The method of claim 13, wherein the aliphatic polycarbonate polyol is characterized in that more than 98%, more than 99%, or more than 99.5% of the chain ends are groups reactive toward isocyanate.

18. The method of claim 17, wherein the chain ends reactive toward isocyanate comprise —OH groups.

19. The method of claim 1, wherein the polycarbonate polyol is characterized in that, on average in the composition, the percentage of carbonate linkages is 90% or greater.

20. The method of claim 19, wherein the polycarbonate polyol is characterized in that, on average in the composition, the percentage of carbonate linkages is 99% or greater.

21. The method of claim 1, wherein the polyurethane foam composition contains less than 5% graft polyol additives.

22. The method of claim 1, wherein the polyurethane foam composition contains less than 1% graft polyol additives.

23. The method of claim 1, wherein the polyurethane foam composition does not contain graft polyol additives.

24. The method of claim 1, wherein the graft polyols are selected from the group consisting of polyurea dispersion polyols, polyurethane dispersion polyols, epoxy dispersion polyols, aminoplast dispersions, and acrylic polyols.

25. The method of claim 24, wherein the graft polyols are Poly Harnstoff Dispersion (PHD) polyols or polyisocyanate poly addition (PIPA) polyols.

26. A polyurethane foam composition comprising the reaction product of a polyol component and a polyisocyanate component; wherein:
the polyol component comprises a polycarbonate polyol derived from the copolymerization of one or more epoxides and carbon dioxide;
the polycarbonate polyol is present in a quantity from about 2 weight percent to about 50 weight percent, from about 5 weight percent to about 25 weight percent, from about 2 weight percent to about 10 weight percent, from about 10 weight percent to about 20 weight percent, from about 20 weight percent to about 30 weight percent, or from about 30 weight percent to about 50 weight percent of all polyols present in the polyol component;
the polyurethane foam composition contains less than 20% graft polyol additives; and
the polyurethane foam composition has higher load bearing or strength properties than a corresponding foam formulated without the polycarbonate polyol.

27. The polyurethane foam composition of claim 26, wherein the polyol component comprises one or more polyols selected from the group consisting of polyether polyols, polyester polyols, aliphatic polyols, and mixtures of any two or more of these.

28. The polyurethane foam composition of claim 27, wherein the polyol component comprises polyether polyol.

29. The polyurethane foam composition of claim 26, characterized in that one or more load bearing or strength properties of the foam composition comprising the added polycarbonate polyol are enhanced relative to the corresponding foam composition formulated without the added polycarbonate polyol, wherein the one or more load bearing or strength properties are selected from the group consisting of tensile strength at break, as measured by ASTM D3574-08 Test E; tear strength, as measured by ASTM D3574-08 Test F; CFD, as measured by ASTM D3574-08 Test C; and tensile strength and elongation after dry heat aging for 22 hours at 140° C., as measured by ASTM D3574-08 Test K.

30. The polyurethane foam composition of claim 29, wherein the CFD value, tensile strength, or tear strength of the foam composition comprising the polycarbonate polyol is at least 10%, at least 20%, at least 30%, at least 40%, at least 50%, or at least 100% greater than the CFD value, tensile strength, or tear strength of the corresponding foam composition formulated without the polycarbonate polyol.

31. The polyurethane foam composition of claim 30, wherein the CFD value, tensile strength, or tear strength are normalized for density of the foam compositions being compared.

32. The polyurethane foam composition of claim 30, wherein the foam composition is formulated such that the foam composition comprising the polycarbonate polyol and the corresponding foam composition formulated without the polycarbonate polyol have the same density.

33. The polyurethane foam composition of claim 26, wherein the foam composition comprises flexible polyurethane foam, or wherein the foam composition comprises viscoelastic polyurethane foam, or wherein the foam composition comprises rigid polyurethane foam.

34. The polyurethane foam composition of claim 29, wherein the density measured according to ASTM D3574-08 of the foam composition comprising the polycarbonate polyol is less than the density of the corresponding foam composition formulated without the polycarbonate polyol.

35. The polyurethane foam composition of claim 34, wherein the density of the foam comprising the polycarbonate polyol is at least 10%, at least 20%, at least 30%, at least 40% or at least 50% less than the density of the corresponding foam composition formulated without the polycarbonate polyol.

36. The polyurethane foam composition of claim 34, wherein the measured CFD value, tensile strength, or tear strength is at least 10%, at least 20%, at least 30%, at least 40% or at least 50% greater than the CFD value, tensile strength, or tear strength of the corresponding foam composition formulated without the polycarbonate polyol.

37. The polyurethane foam composition of claim 26, wherein the polycarbonate polyol contains a primary repeating unit having a structure:

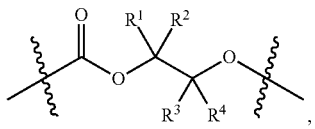

where $R^1$, $R^2$, $R^3$, and $R^4$ are, at each occurrence in the polymer chain, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of $R^1$, $R^2$, $R^3$, and $R^4$ may optionally be taken together with intervening atoms to form one or more optionally substituted rings optionally containing one or more heteroatoms.

38. The polyurethane foam composition of claim 37, wherein the polycarbonate polyol contains a primary repeating unit having a structure:

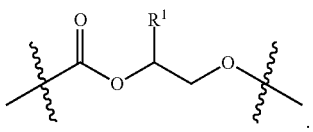

39. The polyurethane foam composition of claim 38, wherein $R^1$ is, at each occurrence in the polymer chain, independently —H or —CH$_3$.

40. The polyurethane foam composition of claim 37, wherein the polycarbonate polyol is characterized in that it has an Mn between about 500 g/mol and about 20,000 g/mol, between about 1,000 g/mol and about 5,000 g/mol, or between about 1,000 g/mol and about 3,000 g/mol, or an Mn of about 1,000 g/mol, about 1,200 g/mol, about 1,500 g/mol, about 2,000 g/mol, about 2,500 g/mol, or about 3,000 g/mol.

41. The polyurethane foam composition of claim 37, wherein the polycarbonate polyol is characterized in that more than 98%, more than 99%, or more than 99.5% of the chain ends are groups reactive toward isocyanate.

42. The polyurethane foam composition of claim 41, wherein the chain ends reactive toward isocyanate comprise OH groups.

43. The polyurethane foam composition of claim 26, wherein the polycarbonate polyol is characterized in that, on average in the composition, the percentage of carbonate linkages is 90% or greater.

44. The polyurethane foam composition of claim 43, wherein the polycarbonate polyol is characterized in that, on average in the composition, the percentage of carbonate linkages is 99% or greater.

45. The polyurethane foam composition of claim 26, wherein the polyurethane foam composition contains less than 5% graft polyol additives.

46. The polyurethane foam composition of claim 26, wherein the polyurethane foam composition contains less than 1% graft polyol additives.

47. The polyurethane foam composition of claim 26, wherein the polyurethane foam composition does not contain graft polyol additives.

48. The polyurethane foam composition of claim 26, wherein the graft polyols are selected from the group consisting of polyurea dispersion polyols, polyurethane dispersion polyols, epoxy dispersion polyols, aminoplast dispersions, and acrylic polyols.

49. The polyurethane foam composition of claim 48, wherein the graft polyols are Poly Harnstoff Dispersion (PHD) polyols or polyisocyanate poly addition (PIPA) polyols.

* * * * *